US011203486B2

(12) United States Patent
Lert, Jr. et al.

(10) Patent No.: US 11,203,486 B2
(45) Date of Patent: Dec. 21, 2021

(54) ORDER FULFILLMENT SYSTEM

(71) Applicant: ALERT INNOVATION INC., North Billerica, MA (US)

(72) Inventors: John G. Lert, Jr., Wakefield, MA (US); William J. Fosnight, Windham, NH (US); Julian Warhurst, Portsmouth, RI (US); Mark Solomon, Lexington, MA (US)

(73) Assignee: Alert Innovation Inc., North Billerica, MA (US)

( * ) Notice: Subject to any disclaimer, the term of this patent is extended or adjusted under 35 U.S.C. 154(b) by 0 days.

(21) Appl. No.: 16/419,910

(22) Filed: May 22, 2019

(65) Prior Publication Data

US 2019/0270591 A1 Sep. 5, 2019

Related U.S. Application Data

(63) Continuation-in-part of application No. 15/591,956, filed on May 10, 2017, which is a continuation-in-part of application No. 15/171,802, filed on Jun. 2, 2016, now Pat. No. 10,435,241.

(60) Provisional application No. 62/334,946, filed on May 11, 2016, provisional application No. 62/169,615, filed on Jun. 2, 2015.

(51) Int. Cl.
*B65G 1/04* (2006.01)
*B65G 1/137* (2006.01)
*B65G 1/06* (2006.01)

(52) U.S. Cl.
CPC .......... *B65G 1/0435* (2013.01); *B65G 1/0492* (2013.01); *B65G 1/065* (2013.01); *B65G 1/1378* (2013.01); *B65G 2201/0258* (2013.01)

(58) Field of Classification Search
CPC .................................................... B65G 1/0435
USPC ........................................................ 414/280
See application file for complete search history.

(56) References Cited

U.S. PATENT DOCUMENTS

| 4,221,076 A | 9/1980 | Ozawa | |
| 4,352,622 A * | 10/1982 | Wieschel | B65G 1/0435 414/277 |
| 4,361,411 A * | 11/1982 | Di Liddo | B65G 1/0435 414/277 |

(Continued)

FOREIGN PATENT DOCUMENTS

| DE | 3624033 | 8/1987 | |
| DE | 9310689 U1 * | 9/1993 | B65G 1/0435 |

(Continued)

OTHER PUBLICATIONS

Office Action dated Jun. 21, 2019 in U.S. Appl. No. 15/867,373.

(Continued)

*Primary Examiner* — James Keenan
(74) *Attorney, Agent, or Firm* — Vierra Magen Marcus LLP

(57) ABSTRACT

An order fulfillment system is disclosed including a multi-level tote storage structure, one or more autonomous mobile robots configured to pick, transport and place one or more tote; one or more workstations configured to accommodate a picker that transports one or more eaches from a tote on one of the autonomous mobile robots to a "put" location, wherein the autonomous mobile robots are configured to move from level to level in the order fulfillment apparatus.

28 Claims, 118 Drawing Sheets

(56) References Cited

U.S. PATENT DOCUMENTS

| | | | |
|---|---|---|---|
| 4,556,355 A * | 12/1985 | Glater | B65G 1/0435 198/728 |
| 4,656,949 A * | 4/1987 | Ragot | B65G 1/0435 104/172.1 |
| 4,812,102 A * | 3/1989 | Smith | B65G 1/0435 414/280 |
| 4,856,956 A * | 8/1989 | Zur | B65G 1/0435 414/280 |
| 5,179,329 A | 1/1993 | Nishikawa et al. | |
| 5,213,463 A * | 5/1993 | Rothlisberger | B65G 1/0435 414/280 |
| 5,433,293 A | 7/1995 | Sager | |
| 5,472,309 A | 12/1995 | Bernard et al. | |
| 5,501,295 A | 3/1996 | Muller et al. | |
| 5,551,823 A | 9/1996 | Maruyama | |
| 5,564,880 A * | 10/1996 | Lederer | B65G 1/0435 414/280 |
| 5,595,264 A | 1/1997 | Trotta, Jr. | |
| 5,626,453 A * | 5/1997 | Bouche | B65G 1/0435 198/803.1 |
| 5,636,966 A | 6/1997 | Lyon et al. | |
| 5,642,976 A | 7/1997 | Konstant | |
| 5,890,136 A | 3/1999 | Kipp | |
| 5,953,234 A | 9/1999 | Singer et al. | |
| 5,996,316 A | 12/1999 | Kirschner | |
| 6,289,260 B1 | 9/2001 | Bradley et al. | |
| 6,325,586 B1 | 12/2001 | Loy | |
| 6,494,313 B1 | 12/2002 | Trescott | |
| 6,539,876 B1 | 4/2003 | Campbell et al. | |
| 6,671,580 B2 | 12/2003 | Campbell et al. | |
| 6,729,836 B2 | 5/2004 | Stingel, III et al. | |
| 6,744,436 B1 | 6/2004 | Chirieleison, Jr. et al. | |
| 6,805,526 B2 | 10/2004 | Stefani | |
| 6,997,665 B2 * | 2/2006 | Bouche | B65G 1/0435 414/280 |
| 7,054,832 B1 | 5/2006 | Vallabh | |
| 7,101,139 B1 | 9/2006 | Benedict | |
| 7,110,855 B2 | 9/2006 | Leishman | |
| 7,139,637 B1 | 11/2006 | Waddington et al. | |
| 7,246,706 B1 | 7/2007 | Shakes et al. | |
| 7,255,525 B2 | 8/2007 | Smith et al. | |
| 7,381,022 B1 | 6/2008 | King | |
| 7,532,947 B2 | 5/2009 | Waddington et al. | |
| 7,591,630 B2 | 9/2009 | Lert, Jr. | |
| 7,603,299 B1 | 10/2009 | Dewey, Jr. et al. | |
| 7,640,863 B2 | 1/2010 | Minges | |
| 7,861,844 B2 | 1/2011 | Hayduchok et al. | |
| 7,894,932 B2 | 2/2011 | Mountz et al. | |
| 7,894,933 B2 | 2/2011 | Mountz et al. | |
| 7,896,243 B2 | 3/2011 | Herskovitz | |
| 7,931,431 B2 | 4/2011 | Benedict et al. | |
| 7,938,324 B2 | 5/2011 | Tamarkin et al. | |
| 7,991,505 B2 | 8/2011 | Lert, Jr. et al. | |
| 8,104,601 B2 | 1/2012 | Hayduchok et al. | |
| 8,201,737 B1 | 6/2012 | Palacios Durazo et al. | |
| 8,276,740 B2 | 10/2012 | Hayduchok et al. | |
| 8,311,902 B2 | 11/2012 | Mountz et al. | |
| 8,327,609 B2 | 12/2012 | Krizmanic et al. | |
| 8,425,173 B2 | 4/2013 | Lert et al. | |
| 8,447,665 B1 | 5/2013 | Schoenharl et al. | |
| 8,483,869 B2 | 7/2013 | Wurman et al. | |
| 8,527,325 B1 | 9/2013 | Atreya et al. | |
| 8,579,574 B2 | 11/2013 | Hanel | |
| 8,594,835 B2 | 11/2013 | Lert et al. | |
| 8,622,194 B2 | 1/2014 | DeWitt et al. | |
| 8,626,335 B2 | 1/2014 | Wurman et al. | |
| 8,639,531 B2 | 1/2014 | Hasan et al. | |
| 8,690,510 B1 | 4/2014 | Razumov | |
| 8,694,152 B2 | 4/2014 | Cyrulik et al. | |
| 8,718,814 B1 | 5/2014 | Clark et al. | |
| 8,721,250 B2 | 5/2014 | Razumov | |
| 8,721,251 B1 | 5/2014 | Razumov | |
| 8,734,079 B1 | 5/2014 | Razumov | |
| 8,738,177 B2 | 5/2014 | Van Ooyen et al. | |
| 8,740,538 B2 | 6/2014 | Lert et al. | |
| 8,831,984 B2 | 9/2014 | Hoffman et al. | |
| 8,892,240 B1 | 11/2014 | Vliet et al. | |
| 8,965,562 B1 | 2/2015 | Wurman et al. | |
| 8,972,045 B1 | 3/2015 | Mountz et al. | |
| 8,983,647 B1 | 3/2015 | Dwarakanath et al. | |
| 9,008,828 B2 | 4/2015 | Worsley | |
| 9,008,829 B2 | 4/2015 | Worsley | |
| 9,008,830 B2 | 4/2015 | Worsley | |
| 9,010,517 B2 | 4/2015 | Hayduchok et al. | |
| 9,020,632 B2 | 4/2015 | Naylor | |
| 9,037,286 B2 | 5/2015 | Lert | |
| 9,051,120 B2 | 6/2015 | Lert et al. | |
| 9,096,375 B2 | 8/2015 | Lert et al. | |
| 9,111,251 B1 | 8/2015 | Brazeau | |
| 9,120,622 B1 | 9/2015 | Elazary et al. | |
| 9,129,250 B1 | 9/2015 | Sestini et al. | |
| 9,139,363 B2 | 9/2015 | Lert | |
| 9,147,208 B1 | 9/2015 | Argue et al. | |
| 9,216,857 B1 | 12/2015 | Kalyan et al. | |
| 9,242,798 B2 | 1/2016 | Guan | |
| 9,260,245 B2 | 2/2016 | Este et al. | |
| 9,321,591 B2 | 4/2016 | Lert et al. | |
| 9,330,373 B2 | 5/2016 | Mountz et al. | |
| 9,334,113 B2 | 5/2016 | Naylor | |
| 9,334,116 B2 | 5/2016 | DeWitt et al. | |
| 9,378,482 B1 | 6/2016 | Pikler et al. | |
| 9,409,664 B1 | 8/2016 | Vliet et al. | |
| 9,423,796 B2 | 8/2016 | Sullivan et al. | |
| 9,428,295 B2 | 8/2016 | Vliet et al. | |
| 9,466,045 B1 | 10/2016 | Kumar | |
| 9,487,356 B1 | 11/2016 | Aggarwal | |
| 9,550,624 B2 | 1/2017 | Khodl et al. | |
| 9,558,472 B1 | 1/2017 | Tubilla Kuri | |
| 9,626,709 B2 | 4/2017 | Koch et al. | |
| 9,733,646 B1 | 8/2017 | Nusser et al. | |
| 9,815,625 B2 | 11/2017 | DeWitt et al. | |
| 9,821,959 B2 | 11/2017 | Hognaland | |
| 9,827,683 B1 | 11/2017 | Hance et al. | |
| 9,852,396 B2 | 12/2017 | Jones et al. | |
| 9,978,036 B1 | 5/2018 | Eller | |
| 10,127,514 B2 | 11/2018 | Napoli | |
| 10,189,641 B2 | 1/2019 | Hognaland | |
| 10,229,385 B2 | 3/2019 | Evers et al. | |
| 10,360,531 B1 | 7/2019 | Stallman et al. | |
| 10,482,421 B1 | 11/2019 | Ducrou et al. | |
| 10,579,965 B2 | 3/2020 | Meurer | |
| 2002/0059121 A1 | 5/2002 | Schneider et al. | |
| 2002/0143669 A1 | 10/2002 | Scheer | |
| 2003/0110104 A1 | 6/2003 | King et al. | |
| 2003/0197061 A1 | 10/2003 | Din | |
| 2004/0010337 A1 | 1/2004 | Mountz | |
| 2004/0010339 A1 | 1/2004 | Mountz | |
| 2004/0024730 A1 | 2/2004 | Brown et al. | |
| 2004/0111337 A1 | 6/2004 | Feeney et al. | |
| 2004/0249497 A1 | 12/2004 | Saigh et al. | |
| 2004/0254825 A1 | 12/2004 | Hsu et al. | |
| 2005/0047895 A1 | 3/2005 | Lert | |
| 2005/0060246 A1 | 3/2005 | Lastinger et al. | |
| 2005/0096936 A1 | 5/2005 | Lambers | |
| 2005/0108114 A1 | 5/2005 | Kaled | |
| 2005/0149226 A1 | 7/2005 | Stevens et al. | |
| 2005/0182695 A1 | 8/2005 | Lubow et al. | |
| 2005/0256787 A1 | 11/2005 | Wadawadigi et al. | |
| 2005/0267791 A1 | 12/2005 | LaVoie et al. | |
| 2005/0278062 A1 | 12/2005 | Janert et al. | |
| 2006/0020366 A1 | 1/2006 | Bloom | |
| 2006/0108419 A1 | 5/2006 | Som | |
| 2006/0182548 A1 | 8/2006 | Gretsch et al. | |
| 2006/0257236 A1 | 11/2006 | Stingel, III et al. | |
| 2007/0011053 A1 | 1/2007 | Yap | |
| 2007/0016496 A1 | 1/2007 | Bar et al. | |
| 2007/0127691 A1 | 6/2007 | Lert, Jr. | |
| 2007/0162353 A1 | 7/2007 | Borders et al. | |
| 2007/0244758 A1 | 10/2007 | Xie | |
| 2007/0276535 A1 | 11/2007 | Haag | |
| 2007/0294029 A1 | 12/2007 | D'Andrea et al. | |
| 2008/0040244 A1 | 2/2008 | Ricciuti et al. | |
| 2008/0131241 A1 | 6/2008 | King | |

(56) References Cited

U.S. PATENT DOCUMENTS

| | | |
|---|---|---|
| 2008/0215180 A1 | 9/2008 | Kota |
| 2009/0074545 A1 | 3/2009 | Lert, Jr. |
| 2009/0149985 A1 | 6/2009 | Chirnomas |
| 2009/0157472 A1 | 6/2009 | Burazin et al. |
| 2009/0276264 A1 | 11/2009 | Pandit et al. |
| 2010/0010902 A1 | 1/2010 | Casey |
| 2010/0060455 A1 | 3/2010 | Frabasile |
| 2010/0076591 A1 | 3/2010 | Lert, Jr. |
| 2010/0114790 A1 | 5/2010 | Strimling et al. |
| 2010/0262278 A1 | 10/2010 | Winkler |
| 2010/0310344 A1 | 12/2010 | Hinnen et al. |
| 2010/0316468 A1 | 12/2010 | Lert et al. |
| 2010/0316469 A1 | 12/2010 | Lert et al. |
| 2010/0316470 A1 | 12/2010 | Lert et al. |
| 2010/0322746 A1 | 12/2010 | Lert |
| 2010/0322747 A1 | 12/2010 | Lert et al. |
| 2011/0008138 A1 | 1/2011 | Yamashita |
| 2012/0029685 A1 | 2/2012 | Keller et al. |
| 2012/0101627 A1 | 4/2012 | Lert |
| 2012/0143427 A1 | 6/2012 | Hoffman et al. |
| 2012/0150340 A1 | 6/2012 | Suess et al. |
| 2012/0173351 A1 | 7/2012 | Hanson et al. |
| 2012/0186942 A1 | 7/2012 | Toebes et al. |
| 2012/0195720 A1 | 8/2012 | Sullivan et al. |
| 2012/0298688 A1 | 11/2012 | Stiernagle |
| 2012/0330458 A1 | 12/2012 | Weiss |
| 2013/0181586 A1 | 7/2013 | Hognaland |
| 2013/0226718 A1 | 8/2013 | Ascarrunz et al. |
| 2013/0235206 A1 | 9/2013 | Smith et al. |
| 2013/0246229 A1 | 9/2013 | Mountz et al. |
| 2013/0310967 A1 | 11/2013 | Olson et al. |
| 2013/0317642 A1 | 11/2013 | Asaria et al. |
| 2013/0346204 A1 | 12/2013 | Wissner-Gross et al. |
| 2014/0003727 A1 | 1/2014 | Lortz et al. |
| 2014/0040075 A1 | 2/2014 | Perry et al. |
| 2014/0052498 A1 | 2/2014 | Marshall et al. |
| 2014/0088758 A1 | 3/2014 | Lert et al. |
| 2014/0100769 A1 | 4/2014 | Wurman et al. |
| 2014/0100999 A1 | 4/2014 | Mountz et al. |
| 2014/0136218 A1 | 5/2014 | Bolene et al. |
| 2014/0143099 A1 | 5/2014 | Wilkins |
| 2014/0156553 A1 | 6/2014 | Leach et al. |
| 2014/0212249 A1 | 7/2014 | Kawano |
| 2014/0257555 A1 | 9/2014 | Bastian, II et al. |
| 2014/0271063 A1 | 9/2014 | Lert et al. |
| 2014/0279294 A1 | 9/2014 | Field-Darragh et al. |
| 2014/0288696 A1 | 9/2014 | Lert |
| 2014/0308098 A1 | 10/2014 | Lert et al. |
| 2014/0324491 A1 | 10/2014 | Banks et al. |
| 2014/0330603 A1 | 11/2014 | Corder et al. |
| 2014/0336814 A1 | 11/2014 | Moore et al. |
| 2014/0343717 A1 | 11/2014 | Dorval et al. |
| 2014/0351101 A1 | 11/2014 | Danelski |
| 2014/0365341 A1 | 12/2014 | MacLaurin et al. |
| 2015/0032252 A1 | 1/2015 | Galluzzo et al. |
| 2015/0051994 A1 | 2/2015 | Ward et al. |
| 2015/0071743 A1 | 3/2015 | Lert |
| 2015/0154535 A1 | 6/2015 | Wappler et al. |
| 2015/0170256 A1 | 6/2015 | Pettyjohn et al. |
| 2015/0178671 A1 | 6/2015 | Jones et al. |
| 2015/0178673 A1 | 6/2015 | Penneman |
| 2015/0220896 A1 | 8/2015 | Carr et al. |
| 2015/0266672 A1 | 9/2015 | Lert et al. |
| 2015/0286967 A1 | 10/2015 | Lert et al. |
| 2015/0294333 A1 | 10/2015 | Avegliano et al. |
| 2015/0307279 A1 | 10/2015 | Almada et al. |
| 2015/0310447 A1 | 10/2015 | Shaw |
| 2015/0375938 A9 | 12/2015 | Lert et al. |
| 2016/0016733 A1 | 1/2016 | Lert |
| 2016/0055452 A1 | 2/2016 | Qin |
| 2016/0063604 A1 | 3/2016 | Shaffer et al. |
| 2016/0075512 A1 | 3/2016 | Lert |
| 2016/0101940 A1 | 4/2016 | Grinnell et al. |
| 2016/0107838 A1 | 4/2016 | Swinkels et al. |
| 2016/0110702 A1 | 4/2016 | Landers, Jr. et al. |
| 2016/0129592 A1 | 5/2016 | Saboo et al. |
| 2016/0140488 A1 | 5/2016 | Lindbo |
| 2016/0145045 A1 | 5/2016 | Mountz et al. |
| 2016/0167227 A1 | 6/2016 | Wellman et al. |
| 2016/0171592 A1 | 6/2016 | Pugh et al. |
| 2016/0194151 A1 | 7/2016 | Lindbo et al. |
| 2016/0223339 A1 | 8/2016 | Pellow et al. |
| 2016/0236867 A1 | 8/2016 | Brazeau et al. |
| 2016/0253740 A1 | 9/2016 | Goulart |
| 2016/0260158 A1 | 9/2016 | High et al. |
| 2016/0299782 A1 | 10/2016 | Jones et al. |
| 2016/0304281 A1 | 10/2016 | Elazary et al. |
| 2016/0311617 A1 | 10/2016 | Van Den Berk |
| 2016/0314431 A1 | 10/2016 | Quezada |
| 2016/0325933 A1 | 11/2016 | Stiernagle et al. |
| 2016/0355337 A1 | 12/2016 | Lert et al. |
| 2016/0364786 A1 | 12/2016 | Wankhede |
| 2016/0371650 A1 | 12/2016 | Schmidt et al. |
| 2017/0036798 A1 | 2/2017 | Prahlad et al. |
| 2017/0043953 A1 | 2/2017 | Battles et al. |
| 2017/0066592 A1 | 3/2017 | Bastian, II et al. |
| 2017/0068973 A1 | 3/2017 | Sinkel |
| 2017/0132559 A1 | 5/2017 | Jones et al. |
| 2017/0137222 A1 | 5/2017 | Lert, Jr. |
| 2017/0137223 A1 | 5/2017 | Lert, Jr. |
| 2017/0158430 A1 | 6/2017 | Raizer |
| 2017/0166356 A1 | 6/2017 | Tubilla Kuri |
| 2017/0166399 A1 | 6/2017 | Stubbs et al. |
| 2017/0185933 A1 | 6/2017 | Adulyasak et al. |
| 2017/0185955 A1 | 6/2017 | Hufschmid et al. |
| 2017/0200108 A1 | 7/2017 | Au et al. |
| 2017/0206480 A1 | 7/2017 | Naumann et al. |
| 2017/0213186 A1 | 7/2017 | Grifoni |
| 2017/0220995 A1 | 8/2017 | Paulweber et al. |
| 2017/0228701 A1 | 8/2017 | Wosk et al. |
| 2017/0260008 A1 | 9/2017 | DeWitt et al. |
| 2017/0267452 A1 | 9/2017 | Goren et al. |
| 2017/0269607 A1 | 9/2017 | Fulop |
| 2017/0278047 A1 | 9/2017 | Welty et al. |
| 2017/0285648 A1 | 10/2017 | Welty et al. |
| 2017/0297820 A1 | 10/2017 | Grinnell et al. |
| 2017/0301004 A1 | 10/2017 | Chirnomas |
| 2017/0313514 A1 | 11/2017 | Lert, Jr. et al. |
| 2017/0316233 A1 | 11/2017 | Kherani et al. |
| 2017/0323250 A1 | 11/2017 | Lindbo et al. |
| 2017/0330142 A1 | 11/2017 | Kanellos et al. |
| 2017/0330270 A1 | 11/2017 | Kanellos et al. |
| 2018/0005173 A1 | 1/2018 | Elazary et al. |
| 2018/0005174 A1 | 1/2018 | Dixon et al. |
| 2018/0029797 A1 | 2/2018 | Hance et al. |
| 2018/0032949 A1 | 2/2018 | Galluzzo et al. |
| 2018/0137452 A1 | 5/2018 | Khatravath et al. |
| 2018/0182054 A1 | 6/2018 | Yao et al. |
| 2018/0211203 A1 | 6/2018 | Greenberg |
| 2018/0237221 A1 | 8/2018 | Lindbo et al. |
| 2018/0237222 A1 | 8/2018 | Issing et al. |
| 2018/0300680 A1 | 10/2018 | Undernehr et al. |
| 2018/0314991 A1 | 11/2018 | Grundberg |
| 2018/0319590 A1 | 11/2018 | Lindbo et al. |
| 2018/0342031 A1 | 11/2018 | Tada et al. |
| 2019/0197451 A1 | 6/2019 | Balasingham |
| 2021/0032034 A1 | 2/2021 | Kalouche |

FOREIGN PATENT DOCUMENTS

| | | | |
|---|---|---|---|
| DE | 102012100354 | 7/2013 | |
| EP | 0302205 A2 | 2/1989 | |
| EP | 0425346 A1 * | 5/1991 | ........... B65G 1/0435 |
| EP | 1348646 A2 | 10/2003 | |
| EP | 2650237 B1 | 11/2014 | |
| EP | 2651786 B1 | 5/2016 | |
| EP | 2651787 B1 | 5/2016 | |
| EP | 3056454 | 8/2016 | |
| JP | H0642810 U | 6/1994 | |
| WO | 0068856 | 11/2000 | |
| WO | 2005097550 | 10/2005 | |
| WO | 2010100513 A2 | 9/2010 | |
| WO | 20100118412 A1 | 10/2010 | |
| WO | 2014166640 A2 | 10/2014 | |

(56) References Cited

FOREIGN PATENT DOCUMENTS

| WO | 2015005873 A1 | 1/2015 |
|---|---|---|
| WO | 2016172793 A1 | 11/2016 |
| WO | 2016199033 A1 | 12/2016 |
| WO | 2017064401 A1 | 4/2017 |

OTHER PUBLICATIONS

International Search Report and Written Opinion dated Sep. 6, 2017 in International Patent Application No. PCT/US2017/032171.
Non-Final Rejection dated Sep. 3, 2014 in U.S. Appl. No. 14/213,187.
Amendment filed Feb. 27, 2015 in U.S. Appl. No. 14/213,187.
Notice of Allowance and Fees Due dated May 20, 2015 in U.S. Appl. No. 14/213,187.
Non-Final Rejection dated Jan. 12, 2016 in U.S. Appl. No. 14/860,410.
Amendment filed Apr. 8, 2016, in U.S. Appl. No. 14/860,410.
Non-Final Rejection dated Jul. 20, 2016 in U.S. Appl. No. 14/860,410.
Amendment filed Sep. 27, 2016 in U.S. Appl. No. 14/860,410.
Notice of Allowance and Fees Due dated Nov. 10, 2016 in U.S. Appl. No. 14/860,410.
Non-Final Rejection dated Apr. 10, 2017 in U.S. Appl. No. 15/421,208.
Amendment filed Sep. 11, 2017 in U.S. Appl. No. 15/421,208.
Supplemental Amendment filed Oct. 12, 2017 in U.S. Appl. No. 15/421,208.
Notice of Allowance and Fees Due dated Oct. 5, 2017 in U.S. Appl. No. 15/421,239.
International Search Report dated Oct. 7, 2016 in International Application No. PCT/US2016/035547.
Restriction Requirement dated Nov. 3, 2017 in U.S. Appl. No. 15/171,802, filed Jun. 2, 2016.
U.S. Appl. No. 15/699,700, filed Sep. 8, 2017.
U.S. Appl. No. 15/816,832, filed Nov. 17, 2017.
Response to Restriction Requirement filed Nov. 20, 2017 in U.S. Appl. No. 15/171,802.
English language Abstract for WO2014166640 published Oct. 16, 2014.
Notice of Allowance dated Mar. 20, 2019 in U.S. Appl. No. 15/421,208.
Response to Office Action filed Mar. 22, 2019 in U.S. Appl. No. 15/816,832.
Office Action dated Apr. 15, 2019 in U.S. Appl. No. 15/816,832.
Notice of Allowance and Fees Due dated Jan. 29, 2019 in U.S. Appl. No. 15/171,802.
Notice of Allowance dated Jan. 17, 2019 in U.S. Appl. No. 15/421,208.
Notice of Allowance and Fees Due dated Oct. 9, 2018 in U.S. Appl. No. 15/171,802.
Final Office Action dated Nov. 2, 2018 in U.S. Appl. No. 15/816,832.
Response to Office Action filed Nov. 13, 2018 in U.S. Appl. No. 15/421,208.
Response to Office Action filed Aug. 2, 2018 in U.S. Appl. No. 15/816,832.
Final Office Action dated Aug. 7, 2018 in U.S. Appl. No. 15/171,802.
Response to Office Action filed Sep. 12, 2018 in U.S. Appl. No. 15/171,802.
Notice of Allowance and Fees Due dated Aug. 31, 2018 in U.S. Appl. No. 15/978,423.
International Search Report for International Application No. PCT/US2018/013203 dated Apr. 5, 2018.
International Search Report for International Application No. PCT/US2018/19537 dated Apr. 13, 2018.
Office Action dated May 4, 2018 in U.S. Appl. No. 15/816,832.
Response to Office Action filed May 9, 2018 in U.S. Appl. No. 15/171,802.
Notice of Allowance and Fees Due dated Dec. 8, 2017 in U.S. Appl. No. 15/421,209.
Notice of Allowance and Fees Due dated Jan. 19, 2018 in U.S. Appl. No. 15/421,239.
Office Action dated Feb. 12, 2018 in U.S. Appl. No. 15/171,802.
International Search Report for International Application No. PCT/US2017/062423 dated Feb. 5, 2018.
Notice of Allowance and Fees Due dated Jan. 16, 2018 in U.S. Appl. No. 15/699,700.
U.S. Appl. No. 15/826,045, filed Nov. 29, 2017.
English language Abstract for WO2017064401 published Apr. 20, 2017.
Restriction Requirement dated May 28, 2019 in U.S. Appl. No. 15/591,956.
Amendment filed Jun. 10, 2019 in U.S. Appl. No. 15/591,956.
Office Action dated Nov. 18, 2019 in U.S. Appl. No. 15/903,993.
Response to Office Action filed Apr. 16, 2020 in U.S. Appl. No. 15/903,993.
Notice of Allowance and Fee(s) Due dated May 15, 2020 in U.S. Appl. No. 15/903,993.
Qi Xu, "Improving Responsiveness of Supply Chain through RFID Visibility Technology", 2009 IEEE/INFORMS International Conference on Service Operations, Logistics and Informatics, Chicago, IL, Jul. 22-24, 2009, pp. 513-517.
Harrison et al., "Intelligent distribution and logistics", IEE Proceedings—Intelligent Transport Systems, vol. 153, No. 2, pp. 167-180, Jun. 2006.
N. Viswanadham, "The past, present, and future of supply-chain automation", IEE Robotics & Automation Magazine, vol. 9, No. 2, pp. 48-56, Jun. 2002.
C. Prasse et al., "How IoT will change the design and operation of logistics systems", 2014 International Conference on the Internet of Things (IOT), Oct. 6-8, 2014, pp. 55-60.
Leung et al., "Design of a Case-Based Multi-Agent Wave Picking Decision Support System for Handling E-Commerce Shipments", 2016 Portland International Conference on Management of Engineering and Technology (PICMET), Sep. 4-8, 2016, pp. 2248-2256.
Final Office Action dated Jun. 18, 2020 in U.S. Appl. No. 15/826,045.
Office Action dated Nov. 20, 2019 in U.S. Appl. No. 15/826,045.
Office Action dated Dec. 5, 2019 in U.S. Appl. No. 15/867,373.
Preliminary Amendment filed Dec. 20, 2019 in U.S. Appl. No. 16/594,647.
Response to Office Action filed Jan. 24, 2020 in U.S. Appl. No. 15/951,956.
Response to Office Action filed Jul. 20, 2020 in U.S. Appl. No. 15/867,373.
Office Action dated Aug. 11, 2020 in Japanese Patent Application No. 2018-515183.
Notice of Allowance and Fee(s) Due dated Aug. 19, 2020 in U.S. Appl. No. 15/867,373.
Office Action dated Aug. 20, 2020 in U.S. Appl. No. 16/121,212.
Response to Office Action filed Aug. 31, 2020 in U.S. Appl. No. 15/816,832.
Response to Office Action filed Aug. 24, 2020 in U.S. Appl. No. 15/591,956.
Response to Office Action filed Aug. 21, 2020, with English translation of claims as amended therein, in Chinese Patent Application No. 20168004385.X.
Office Action dated Sep. 14, 2020 in U.S. Appl. No. 15/591,956.
Office Action dated Sep. 14, 2020 in U.S. Appl. No. 15/903,993.
International Search Report and Written Opinion dated Sep. 4, 2020 in International Patent Application No. PCT/US2020/033250.
English language Abstract for DE3624033 published Aug. 6, 1987.
Response to Office Action filed Mar. 5, 2020 in U.S. Appl. No. 15/867,373.
Office Action dated Mar. 20, 2020 in U.S. Appl. No. 15/867,373.
Extended European Search Report dated Mar. 13, 2020 in European Patent Application No. 19217215.3.
Final Office Action dated Mar. 24, 2020 in U.S. Appl. No. 15/951,956.
Response to Office Action filed Mar. 30, 2020 in U.S. Appl. No. 15/816,832.
Office Action dated Apr. 30, 2020 in U.S. Appl. No. 15/816,832.
Response to Office Action filed Apr. 15, 2020 in U.S. Appl. No. 15/826,045.
Response to Office Action filed Apr. 17, 2020 in European Patent Application No. 18709235.8.
Response to Office Action filed Mar. 6, 2020 in European Patent Application No. 18702006.0.

(56) References Cited

OTHER PUBLICATIONS

Response to Office Action filed Oct. 21, 2019 in U.S. Appl. No. 15/867,373.
Response to Office Action filed Oct. 29, 2019 in U.S. Appl. No. 15/826,045.
Final Office Action dated Nov. 1, 2019 in U.S. Appl. No. 15/816,832.
Office Action filed Oct. 19, 2020 in U.S. Appl. No. 15/816,832.
Response to Office Action filed Nov. 2, 2020, with English machine translation, in Chinese Patent Application No. 201780042943.2.
Response to Office Action filed Sep. 23, 2019 in European Patent Application No. 16804451.9.
Notice of Allowance and Fee(s) Due dated Feb. 11, 2021 in U.S. Appl. No. 15/903,993.
C. Wurll, "Mixed Case Palletizing with Industrial Robots," Proceedings of ISR 2016: 47st International Symposium on Robotics, Munich, Germany, pp. 1-6, Jun. 21-22, 2016.
Notice of Allowance and Fee(s) Due dated Apr. 1, 2021 in U.S. Appl. No. 15/816,832.
Response to Office Action filed Dec. 18, 2020, with English language translation of claims as amended, in Japanese Patent Application No. 2018-515183.
Office Action dated Dec. 24, 2020, with English language translation, in Japanese Patent Application No. 2020-038556.
Office Action dated Nov. 25, 2020, with English language translation, in Japanese Patent Application No. 2019-526569.
Office Action dated Dec. 24, 2020 in U.S. Appl. No. 16/273,449.
Extended European Search Report dated May 12, 2021 in European Patent Application No. 21163777.2.
Response to Office Action filed May 17, 2021 in U.S. Appl. No. 16/273,449.
Supplemental Response to Office Action filed May 26, 2021 in U.S. Appl. No. 16/273,449.
Notice of Allowance and Fee(s) Due dated May 26, 2021 in U.S. Appl. No. 15/591,956.
Notice of Allowance and Fee(s) Due dated Jun. 4, 2021 in U.S. Appl. No. 15/591,956.
Notice of Allowance and Fee(s) Due dated Jun. 9, 2021 in U.S. Appl. No. 15/816,832.
Decision for Final Rejection dated May 27, 2021, and English language translation thereof, in Japanese Patent Application No. 2019-548543.
Response to Office Action filed Jun. 15, 2021, and English language machine translation thereof, in Chinese Patent Application No. 201780042943.2.
Office Action dated Jun. 18, 2021 in U.S. Appl. No. 15/903,993A.

\* cited by examiner

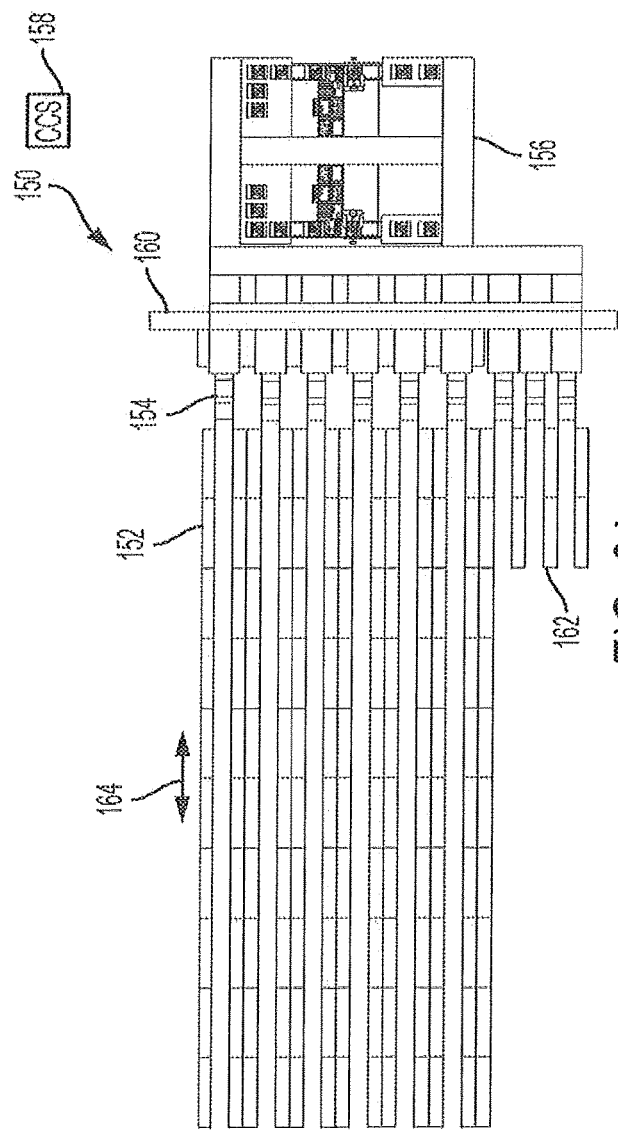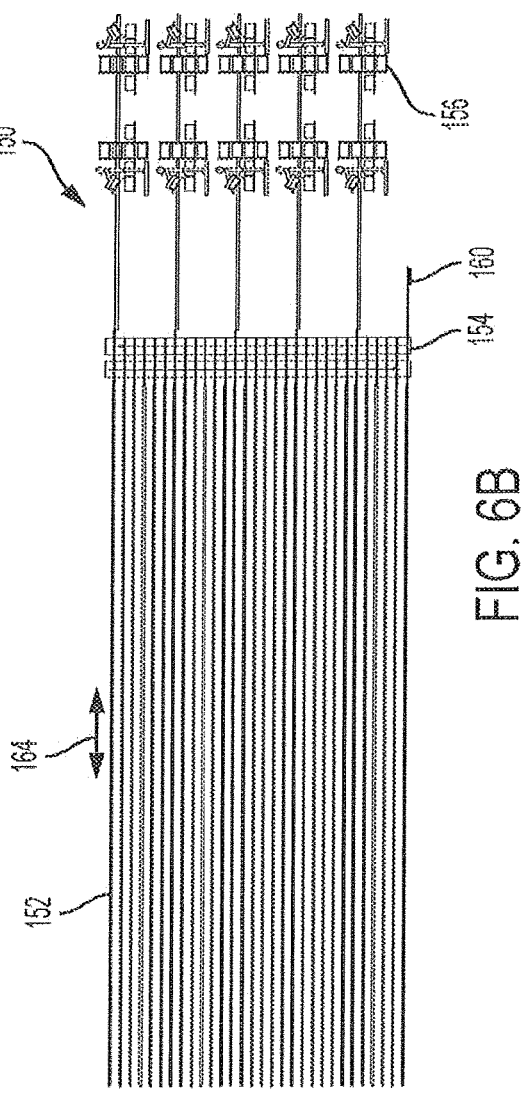

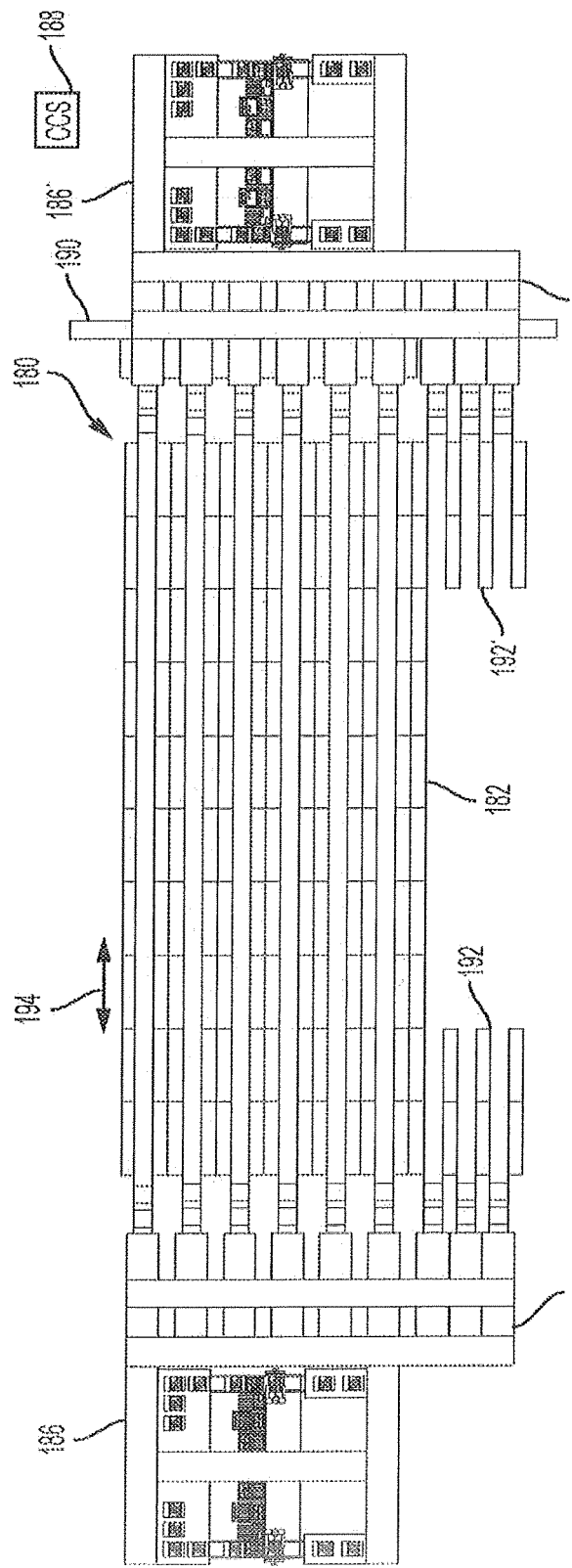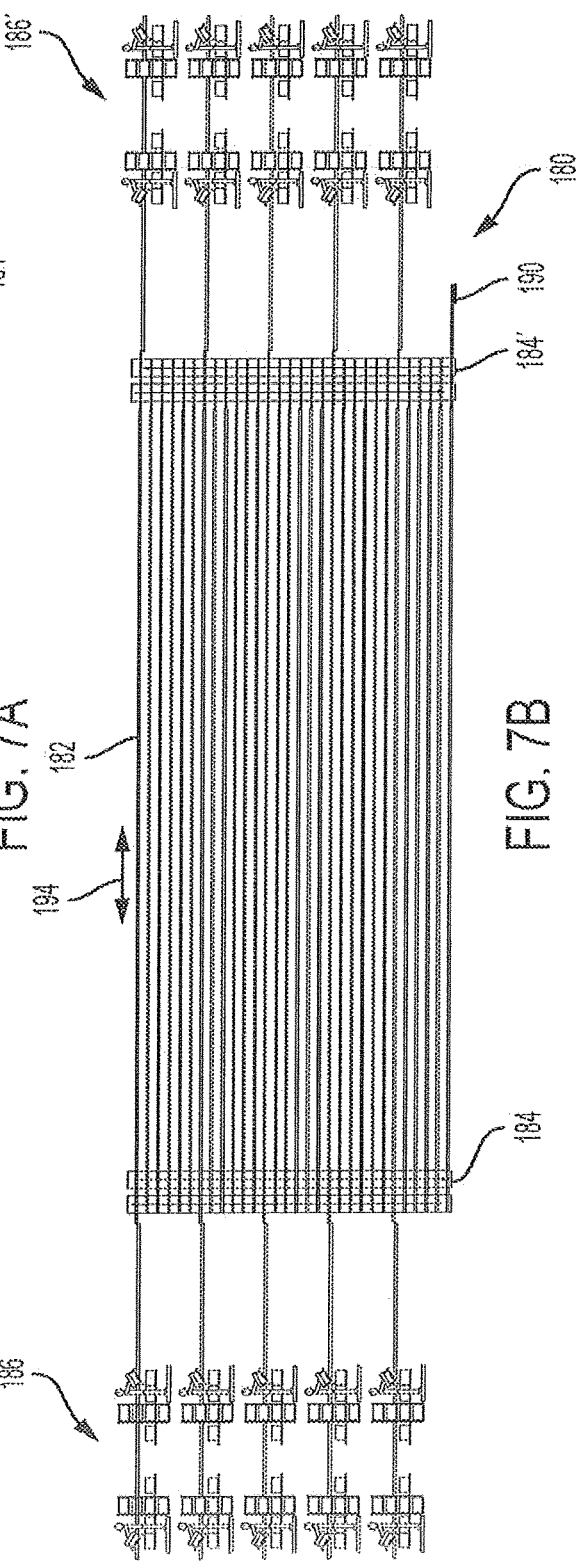
FIG. 7A
FIG. 7B

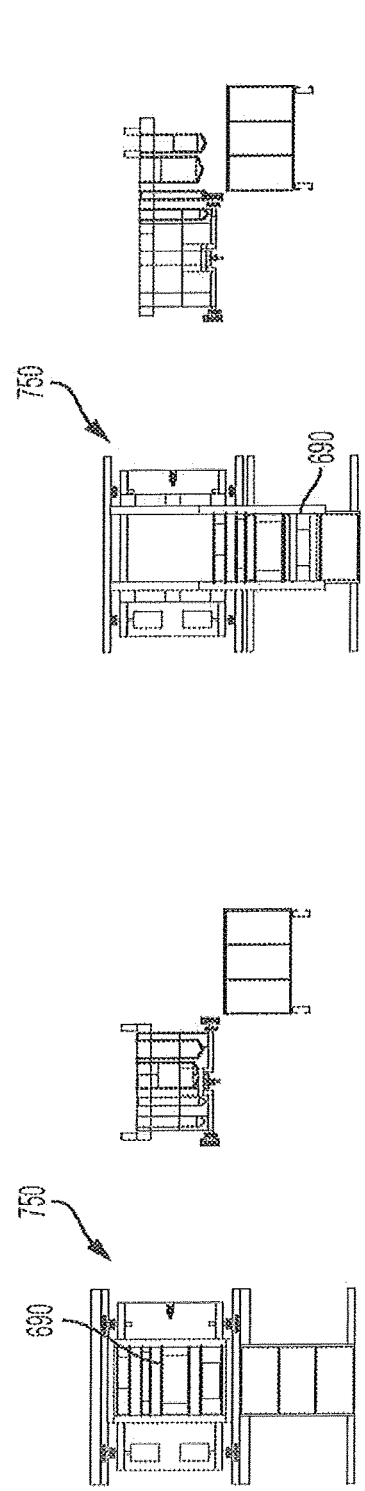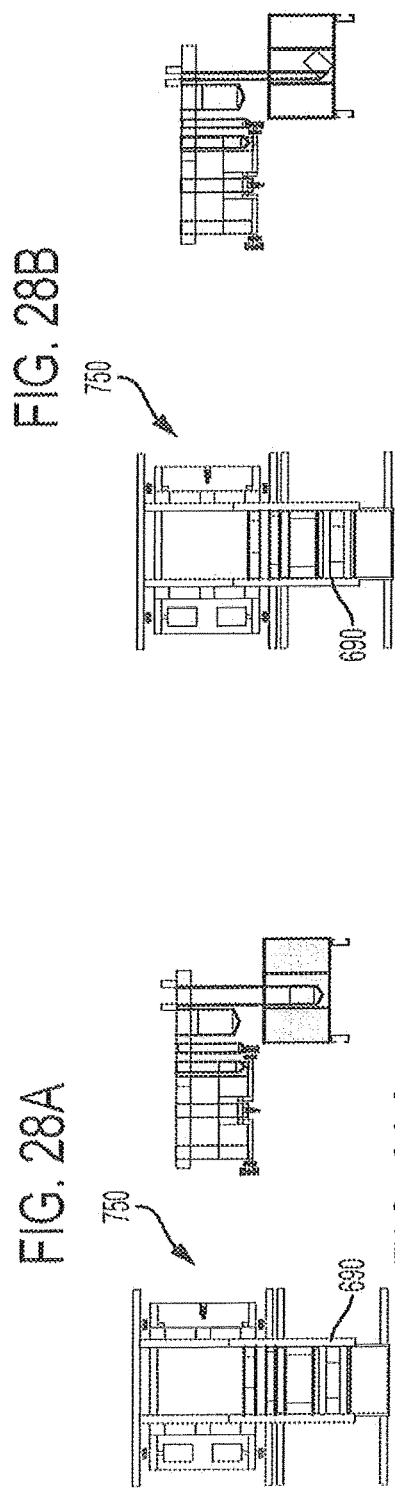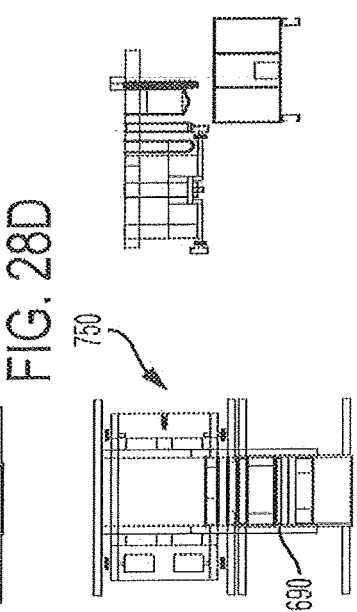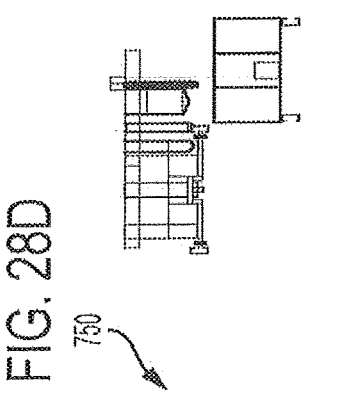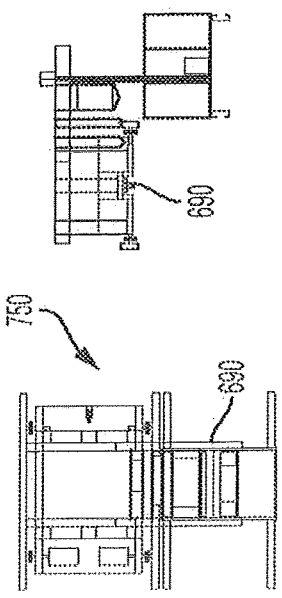

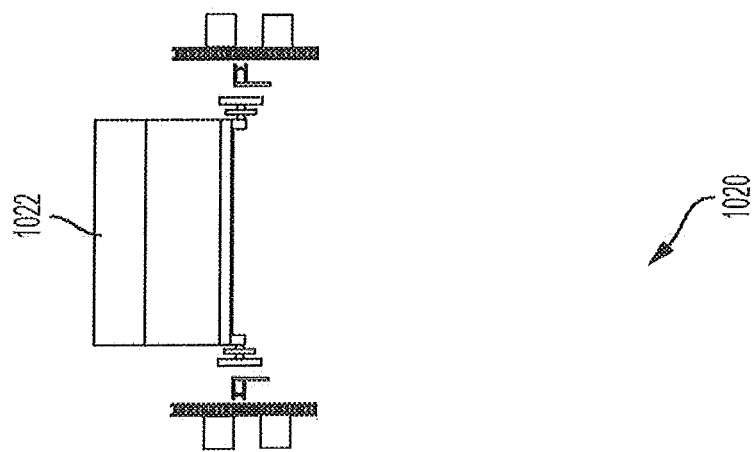
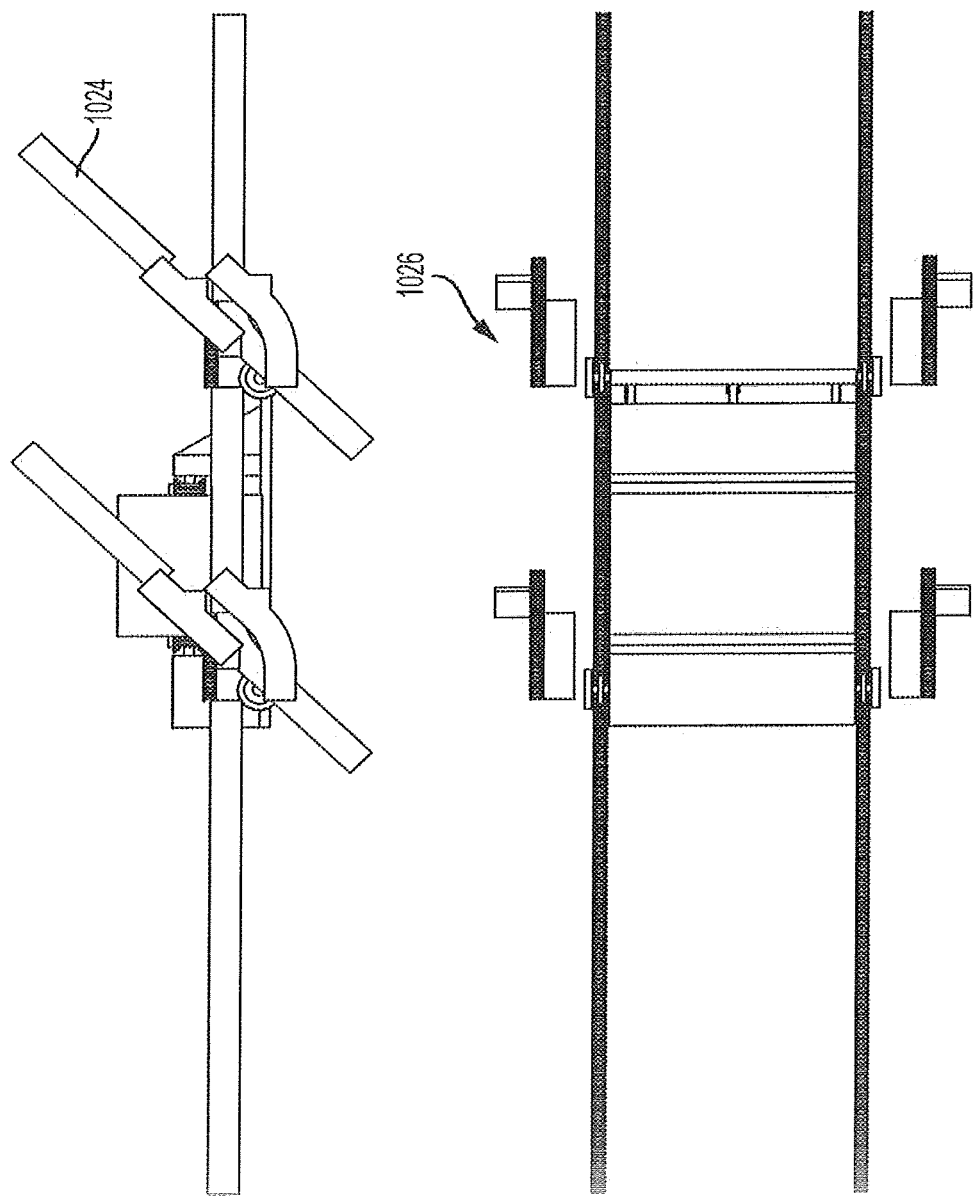
FIG. 38B

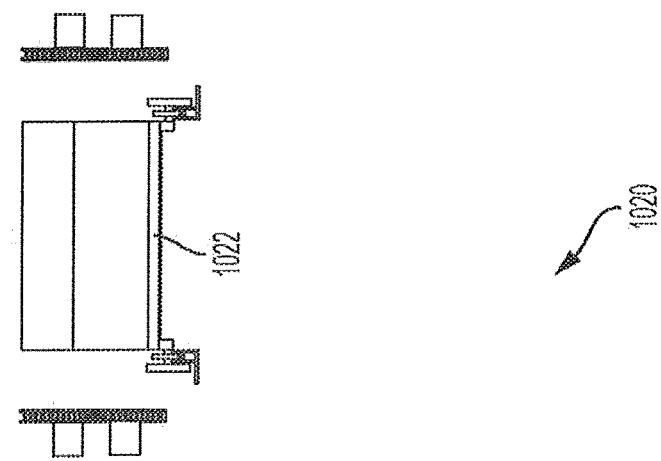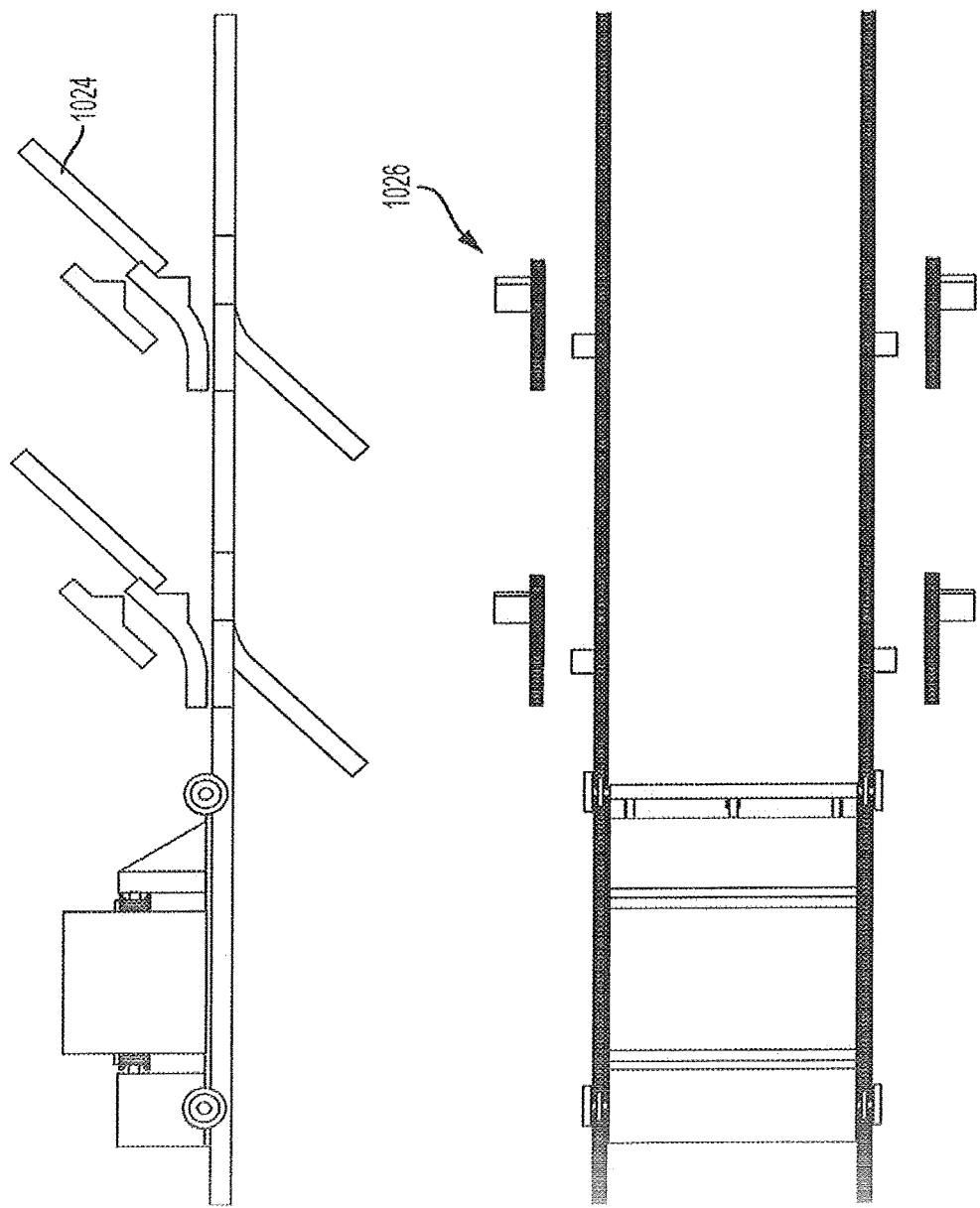
FIG. 38C

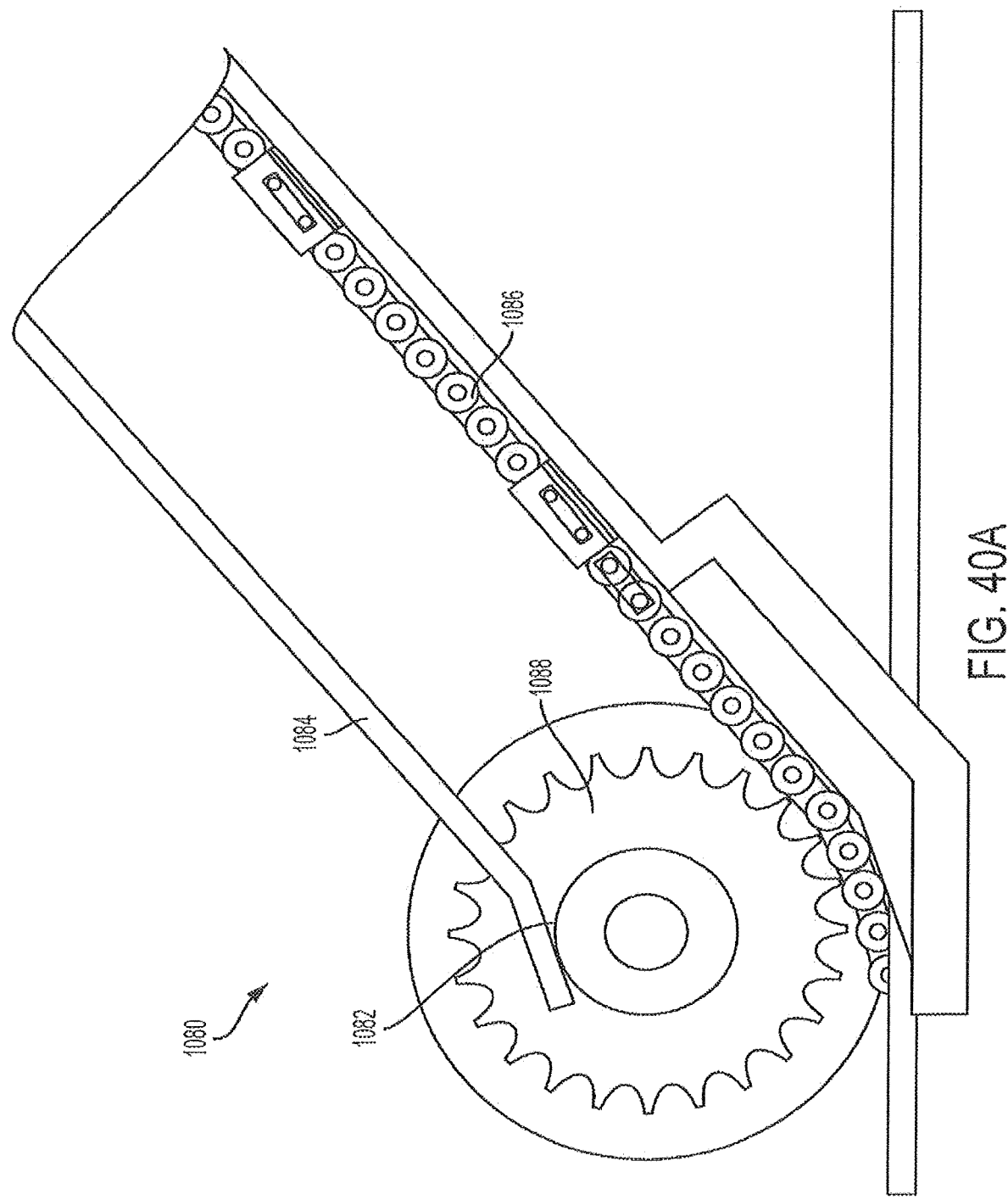

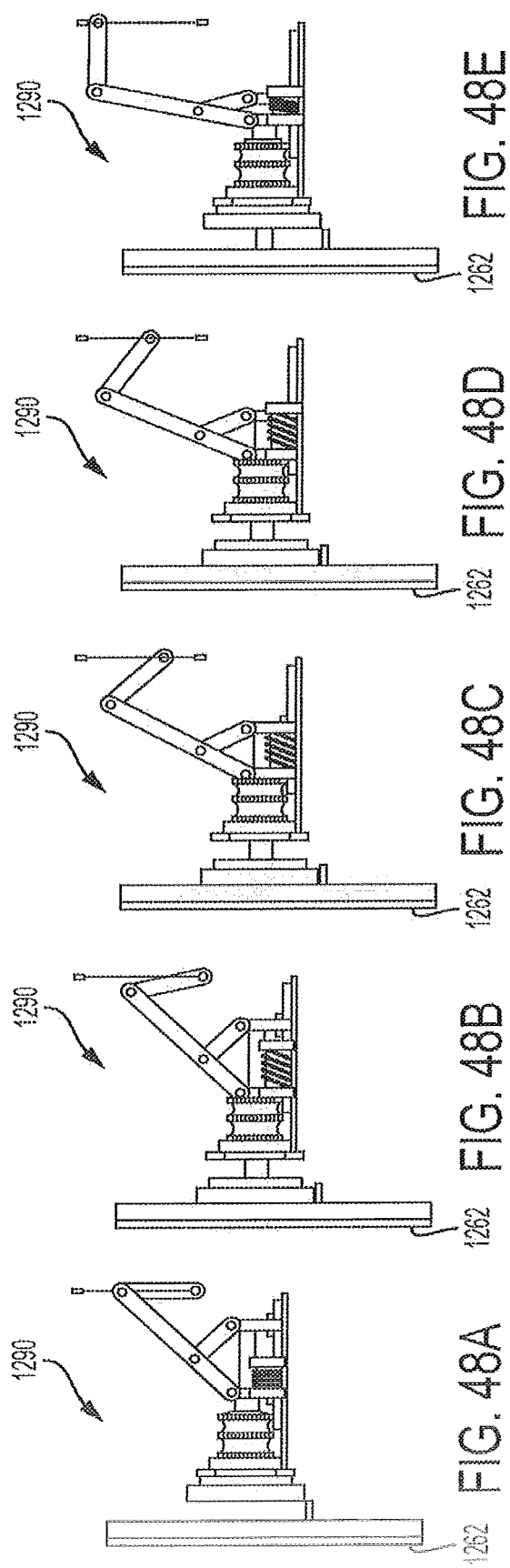
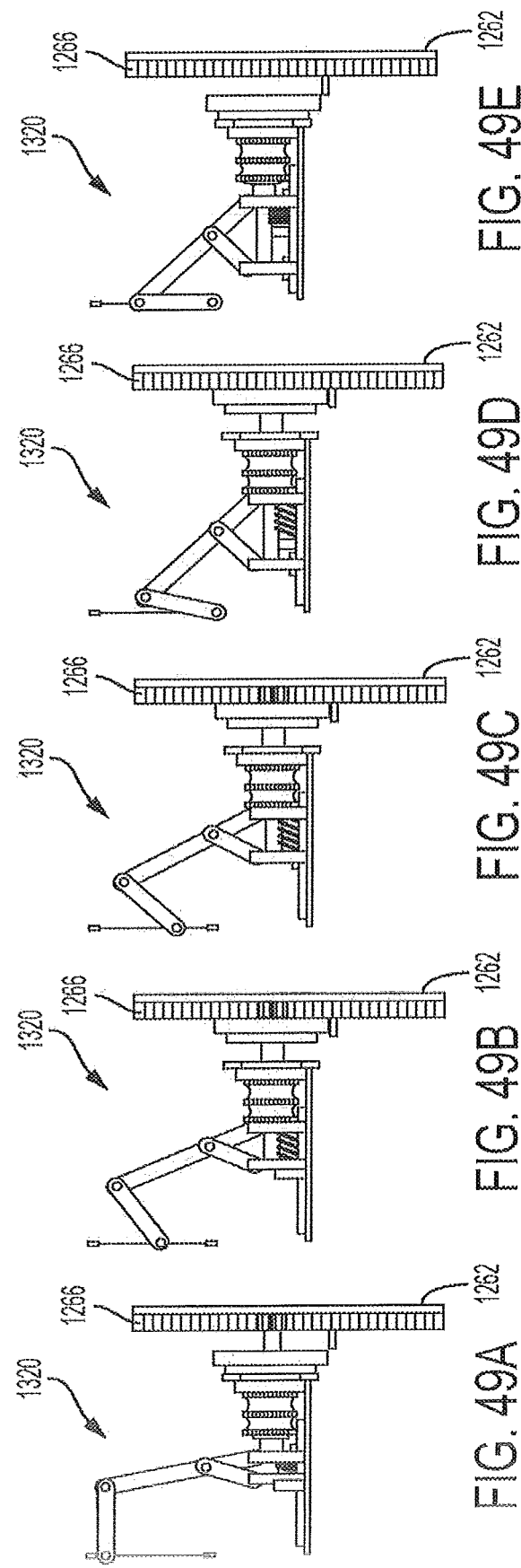

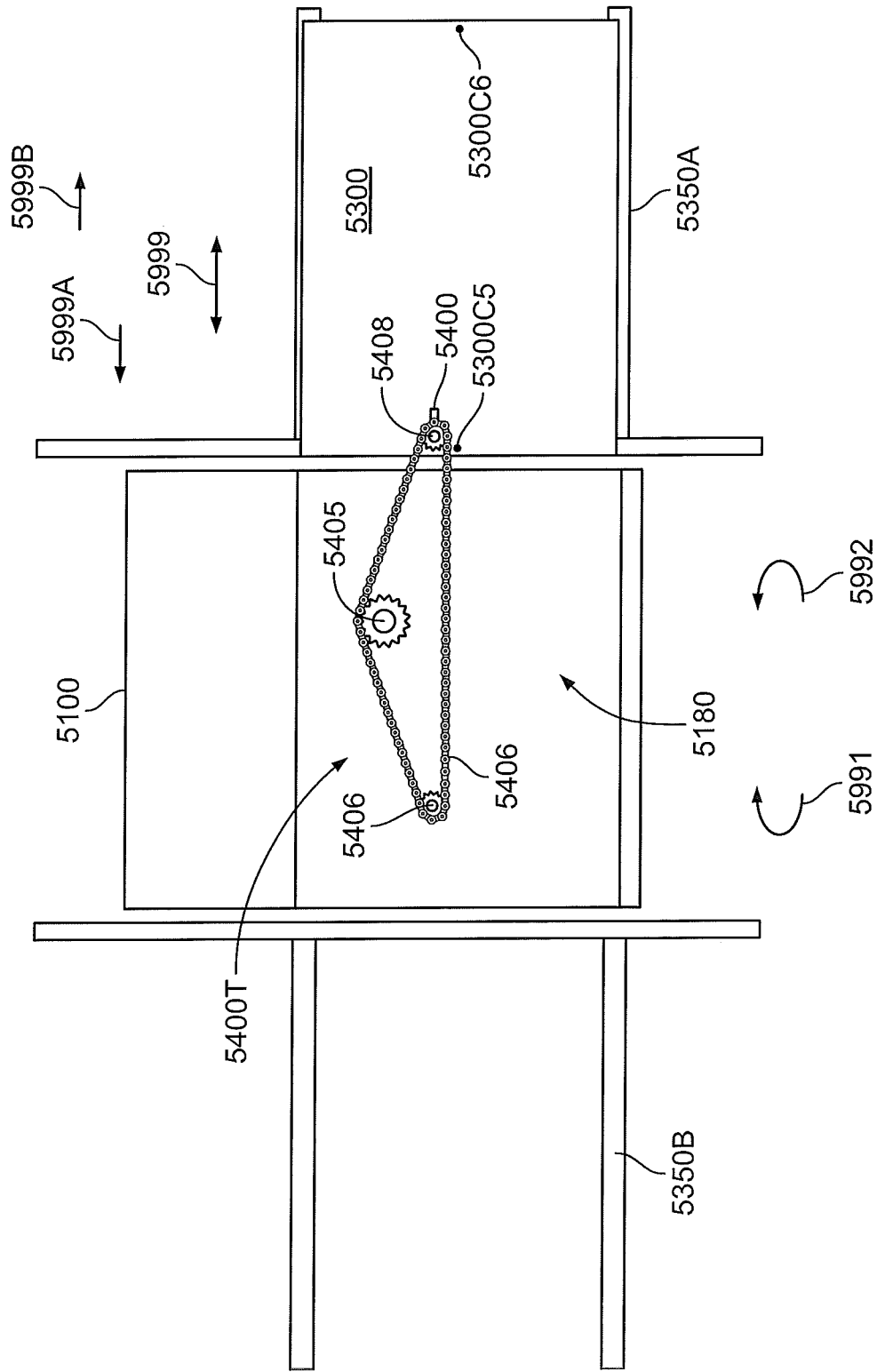

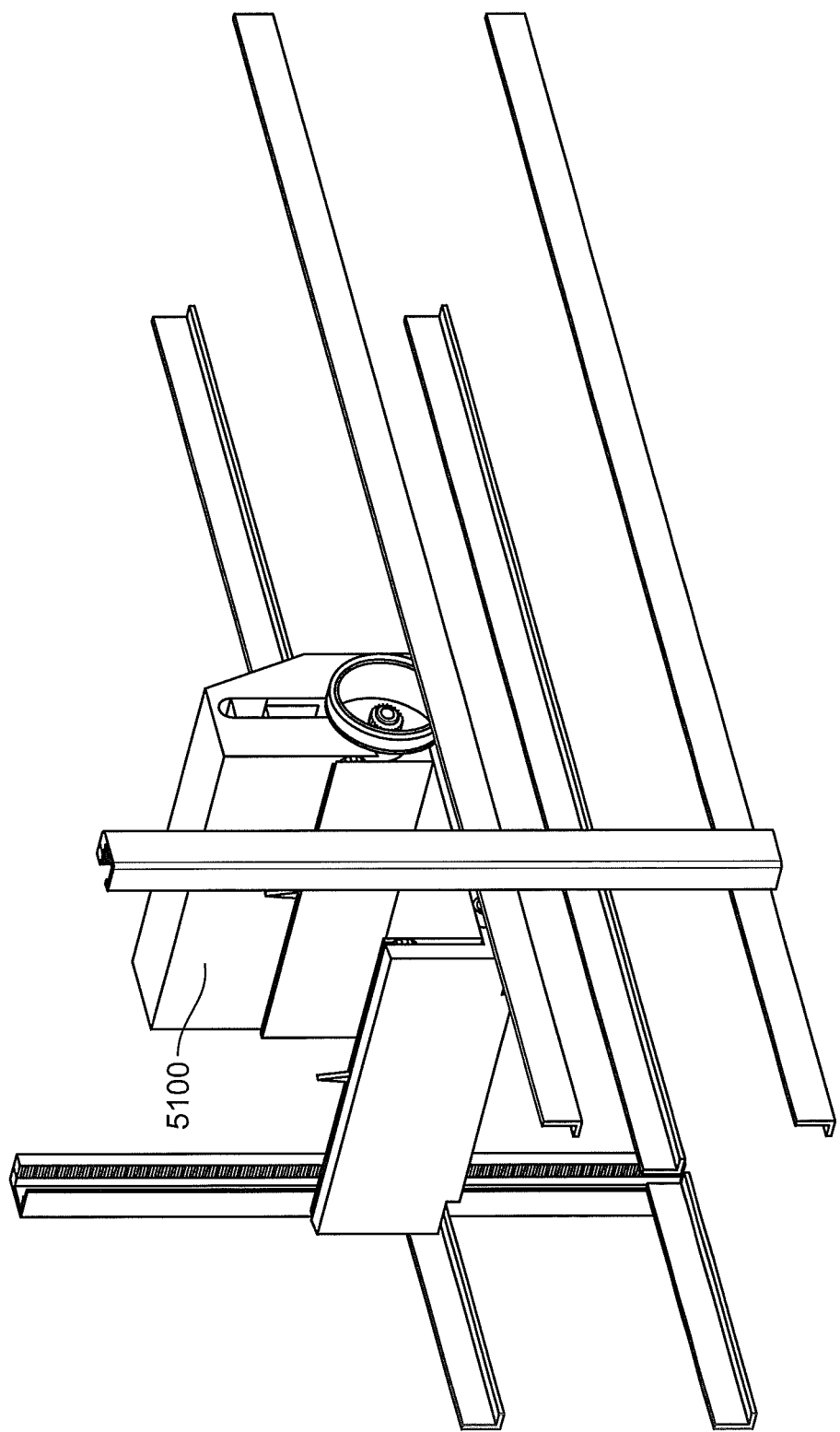

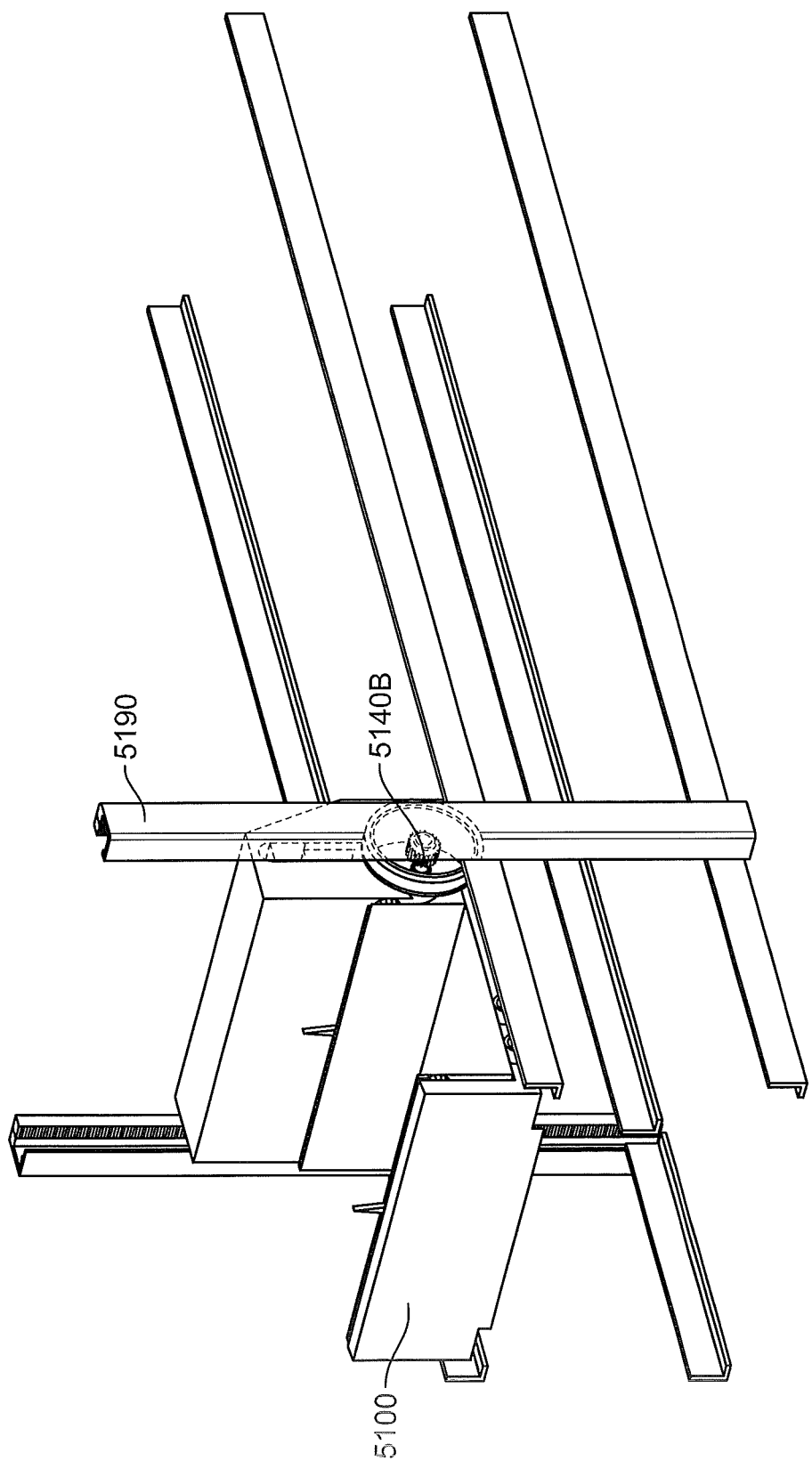

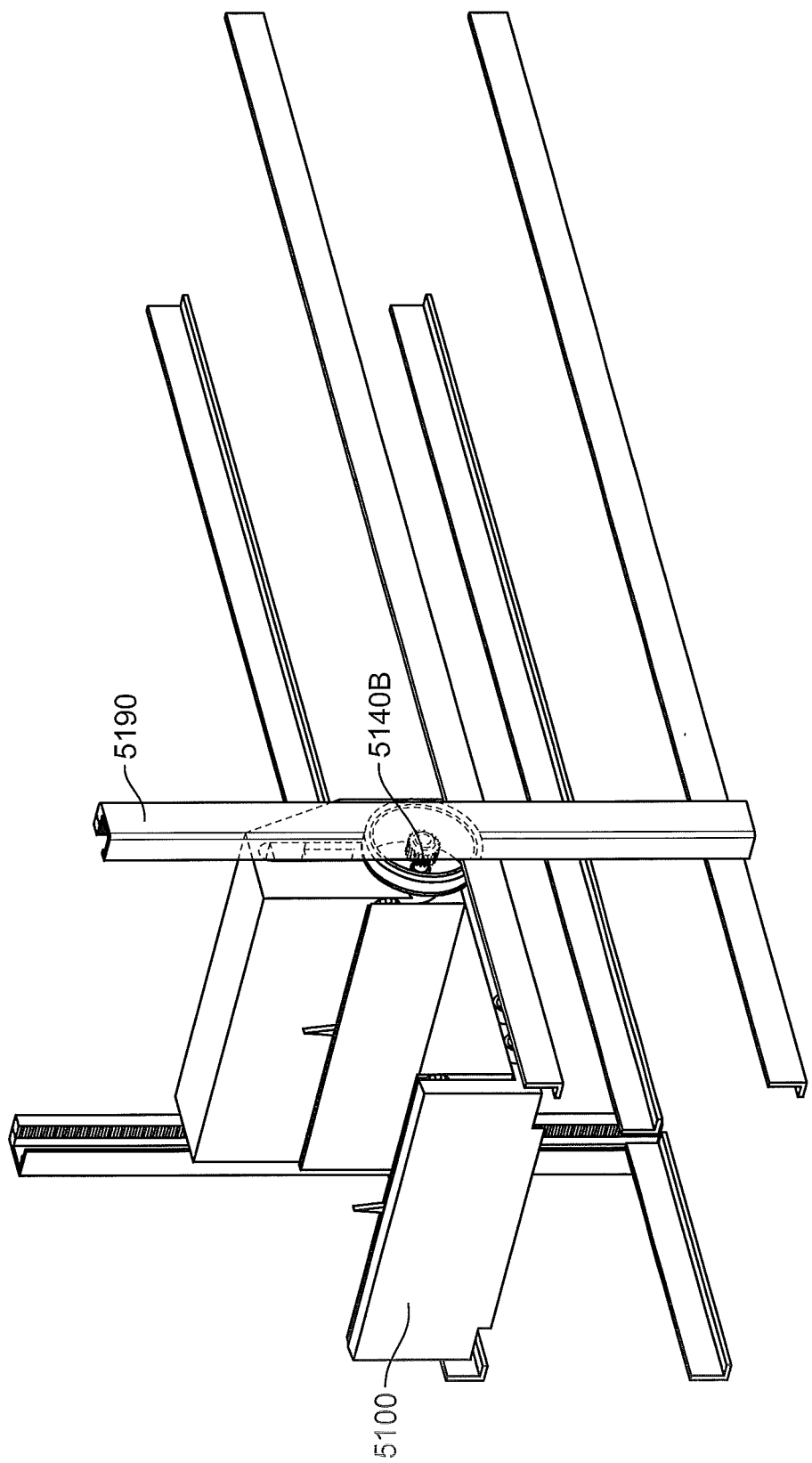

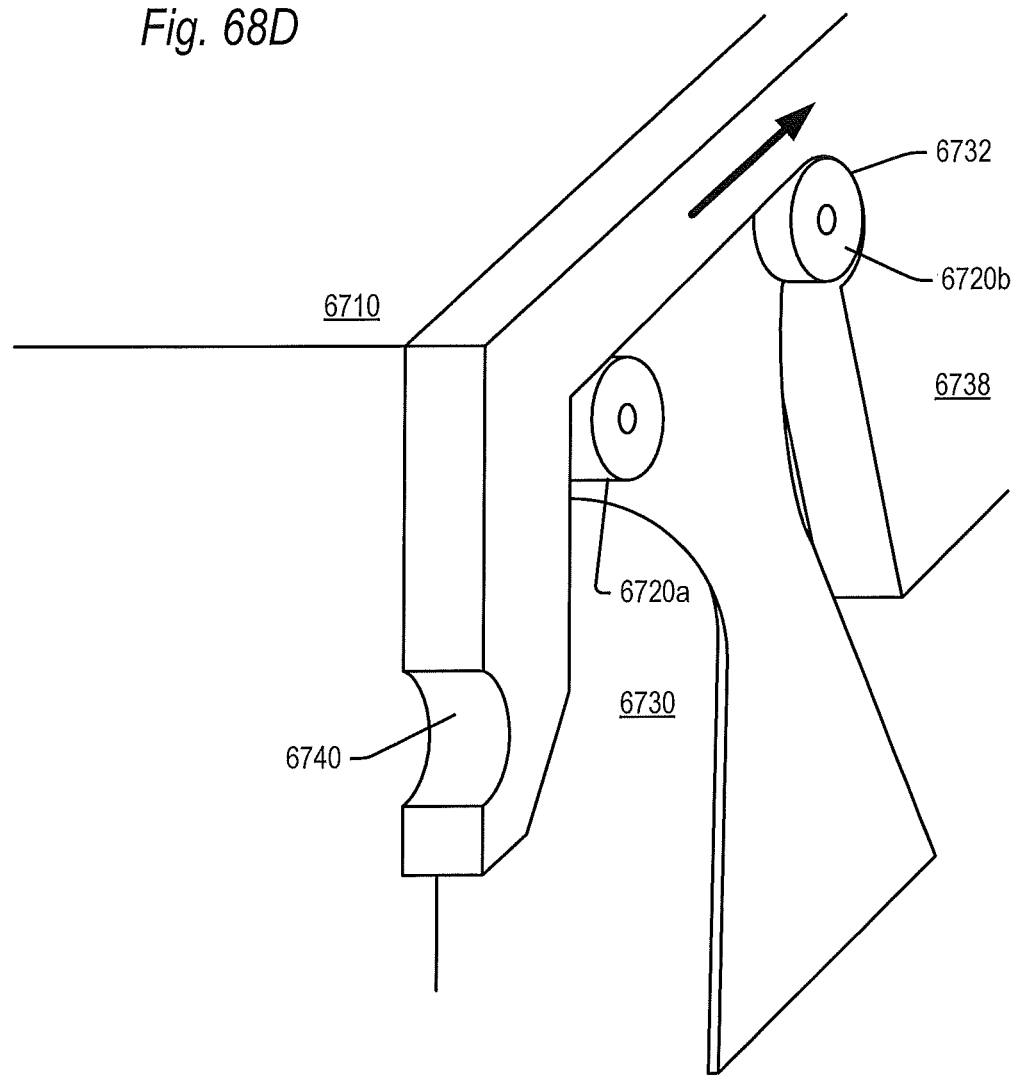

ORDER FULFILLMENT SYSTEM

1. PRIORITY CLAIM

The present application is a continuation-in-part of U.S. patent application Ser. No. 15/591,956, filed on May 10, 2017 which application claims priority to U.S. Provisional Patent Application No. 62/334,946, filed on May 11, 2016, entitled "Order Fulfillment System," which applications are incorporated by reference herein in their entirety.

U.S. patent application Ser. No. 15/591,956 is also a continuation-in-part of U.S. patent application Ser. No. 15/171,802, filed on Jun. 2, 2016, entitled "Storage and Retrieval System," which application claims priority to U.S. Provisional Patent Application No. 62/169,615, filed on Jun. 2, 2015, entitled "Order Fulfillment System", which applications are incorporated by reference herein in their entirety.

2. BACKGROUND

An order-fulfillment system for use in supply chains, for example in retail supply chains, may fulfill orders for individual product units, referred to herein as "eaches" (also called "pieces", "articles", "items" or, generally, any articles available for purchase in retail as a purchase unit, etc.), which are typically packaged and shipped by the manufacturer in containers known as "cases". The "each" as used herein for convenience purposes, may be considered the most granular unit of handling in retail supply chains. Conventional operations to fulfill orders for eaches (usually referred to as "each-picking" or "piece-picking") are generally labor-intensive because they generally apply man-to-goods processes that are not highly automated.

The field of each-picking within retail supply chains can be viewed as comprising two application domains: (1) store-replenishment applications, in which the orders are placed by retail stores and the picked eaches are delivered to those stores and placed on shelves to be selected and purchased by customers in the stores, and (2) direct-to-consumer applications, in which the orders are placed by end users and the picked eaches are delivered directly to those end users. In both domains, an order consists of a series of "order-lines", each order-line specifying a particular product (or "stock keeping unit" or simply "SKU") and a quantity (number of eaches) of that product to be delivered. However, there are several important differences in the operational metrics of applications within these two domains. Store-replenishment applications typically have many fewer orders than direct-to-consumer applications (as there are many fewer stores than end users), but the average number of order-lines per order is much higher for store-replenishment orders than for typical direct-to-consumer order. Also, the average number of units per order line is far greater for store-replenishment orders than for direct-to-consumer orders (because stores are buying units to sell to many customers whereas consumers are buying for their individual use). And most importantly, the total number of order lines for a given SKU (order-lines per SKU), relative to total order lines to be filled during a given time period, is much higher in the store-replenishment domain than in the direct-to-consumer domain. This is because stores typically carry very similar assortments and order more SKUs in each order, making it much more likely that a given SKU will be included in a relatively high percentage of orders, whereas consumers have diverse tastes and preferences and are ordering fewer SKUs, making it more likely that a given SKU will be contained in a relatively low percentage of orders.

These last two metrics—units per order-line and order-lines per SKU—are factors in the design of an each-picking system, and the differences in these metrics between the two domains typically results in very different system designs. Accordingly, there is a desire to be highly cost-efficient and effective in both domains of each-picking, but to provide design flexibility that allows the configuration to be optimized for the application based on operational metrics.

SUMMARY

The following summary is merely intended to be exemplary. The summary is not intended to limit the scope of the claims.

In accordance with an example embodiment, an order fulfillment apparatus is provided comprising a multi-level tote storage structure, one or more autonomous mobile robots configured to pick, transport and place one or more tote; one or more workstations configured to accommodate a picker that transports one or more eaches from a tote on one of the autonomous mobile robots to a "put" location, and an input/output interface where material is inducted into the order fulfillment apparatus and where fulfilled orders are discharged from the order fulfillment apparatus wherein the autonomous mobile robots are further configured to move from level to level in the order fulfillment apparatus via stationary verticals or stationary ramps.

In accordance with another example embodiment, an order fulfillment apparatus is provided comprising a multi-level tote storage structure, one or more autonomous mobile robots configured to pick, transport and place one or more tote; one or more workstations configured to accommodate a picker that transports one or more eaches from a tote on one of the autonomous mobile robots to a "put" location, and an input/output interface where material is inducted into the order fulfillment apparatus and where fulfilled orders are discharged from the order fulfillment apparatus wherein the autonomous mobile robots are further configured to move from level to level in the order fulfillment apparatus via stationary verticals or stationary ramps and wherein the autonomous mobile robots are further configured to move from level to level in a horizontal attitude.

In accordance with another example embodiment, an order fulfillment workstation is provided comprising a tote support and a tilted location adjacent the tote support; wherein the tilted location supports an autonomous mobile robot and wherein a picker transfers one or more eaches from the autonomous mobile robot to a tote located on the tote support.

In accordance with another example embodiment, an order fulfillment workstation is provided comprising a robot support and a tilted location adjacent the robot support; wherein the tilted location supports a first autonomous mobile robot and wherein a picker transfers one or more eaches from the first autonomous mobile robot to a second autonomous robot located on the robot support.

In accordance with another example embodiment, an order fulfillment workstation is provided comprising a product support; a tilted location adjacent the robot support; a machine vision subsystem; a target illuminator and a picker interface; wherein the tilted location supports an autonomous mobile robot and wherein a picker transfers one or more eaches from the autonomous mobile robot to the product support and wherein the machine vision subsystem follows movement of the picker and wherein the target illuminator illuminates eaches to be picked and locations where eaches are to be placed and wherein the picker interface provides information to the picker.

In accordance with another example embodiment, an autonomous mobile robot is provided comprising a frame chassis; a tote transfer mechanism coupled to the frame; two traction drives coupled to a first end of the frame; two wheels coupled to a second end of the frame and a caster coupled to the frame; wherein the two traction drives and the caster engage a common surface when the autonomous mobile robot is supported by a deck and wherein the two traction drives and the two wheels engage rails when the autonomous mobile robot is supported by rails.

In accordance with another example embodiment, an autonomous mobile robot is provided comprising a frame chassis; a tote transfer mechanism coupled to the frame; four actuated wheel assemblies coupled to the frame, each of the four actuated wheel assemblies having a traction wheel and a sprocket.

BRIEF DESCRIPTION OF THE DRAWINGS

The foregoing aspects and other features are explained in the following description, taken in connection with the accompanying drawings, wherein:

FIG. 6A is a top view of an example order fulfillment system in accordance with aspects of the disclosed embodiment;

FIG. 6B is a side view of an example order fulfillment system in accordance with aspects of the disclosed embodiment;

FIG. 7A is a top view of an example order fulfillment system in accordance with aspects of the disclosed embodiment;

FIG. 7B is a side view of an example order fulfillment system in accordance with aspects of the disclosed embodiment;

FIG. 28A is a top and side view of a vehicle in accordance with aspects of the disclosed embodiment;

FIG. 28B is a top and side view of a vehicle in accordance with aspects of the disclosed embodiment;

FIG. 28C is a top and side view of a vehicle in accordance with aspects of the disclosed embodiment;

FIG. 28D is a top and side view of a vehicle in accordance with aspects of the disclosed embodiment;

FIG. 28E is a top and side view of a vehicle in accordance with aspects of the disclosed embodiment;

FIG. 28F is a top and side view of a vehicle in accordance with aspects of the disclosed embodiment;

FIG. 38B is a side, end and top view of a vehicle with a ramp in accordance with aspects of the disclosed embodiment;

FIG. 38C is a side, end and top view of a vehicle with a ramp in accordance with aspects of the disclosed embodiment;

FIG. 40A is a side schematic view of a transmission in accordance with aspects of the disclosed embodiment;

FIG. 48A is an end view of an orthogonal drive unit in accordance with aspects of the disclosed embodiment;

FIG. 48B is an end view of an orthogonal drive unit in accordance with aspects of the disclosed embodiment;

FIG. 48C is an end view of an orthogonal drive unit in accordance with aspects of the disclosed embodiment;

FIG. 48D is an end view of an orthogonal drive unit in accordance with aspects of the disclosed embodiment;

FIG. 48E is an end view of an orthogonal drive unit in accordance with aspects of the disclosed embodiment;

FIG. 49A is an end view of an orthogonal drive unit in accordance with aspects of the disclosed embodiment;

FIG. 49B is an end view of an orthogonal drive unit in accordance with aspects of the disclosed embodiment;

FIG. 49C is an end view of an orthogonal drive unit in accordance with aspects of the disclosed embodiment;

FIG. 49D is an end view of an orthogonal drive unit in accordance with aspects of the disclosed embodiment;

FIG. 49E is an end view of an orthogonal drive unit in accordance with aspects of the disclosed embodiment;

FIG. 50D is an isometric view of an orthogonal drive unit in accordance with aspects of the disclosed embodiment;

FIG. 50E is an isometric view of an orthogonal drive unit;

FIG. 51A is a top isometric view of a vehicle in accordance with aspects of the disclosed embodiment;

FIG. 51B is a top isometric view of a vehicle in accordance with aspects of the disclosed embodiment;

FIG. 51C is a top isometric view of a vehicle in accordance with aspects of the disclosed embodiment;

FIG. 51D is a bottom isometric view of a vehicle in accordance with aspects of the disclosed embodiment;

FIG. 51E is a partial top-front isometric view of a vehicle in accordance with aspects of the disclosed embodiment;

FIG. 51F is a partial top-back isometric view of a vehicle in accordance with aspects of the disclosed embodiment;

FIG. 51G is a top view of a vehicle in accordance with aspects of the disclosed embodiment;

FIG. 51H is a side view of a vehicle in accordance with aspects of the disclosed embodiment;

FIG. 51I is a partial top-back isometric view of a vehicle in accordance with aspects of the disclosed embodiment;

FIG. 51J is a partial bottom-front isometric view of a vehicle in accordance with aspects of the disclosed embodiment;

Figure 52A:
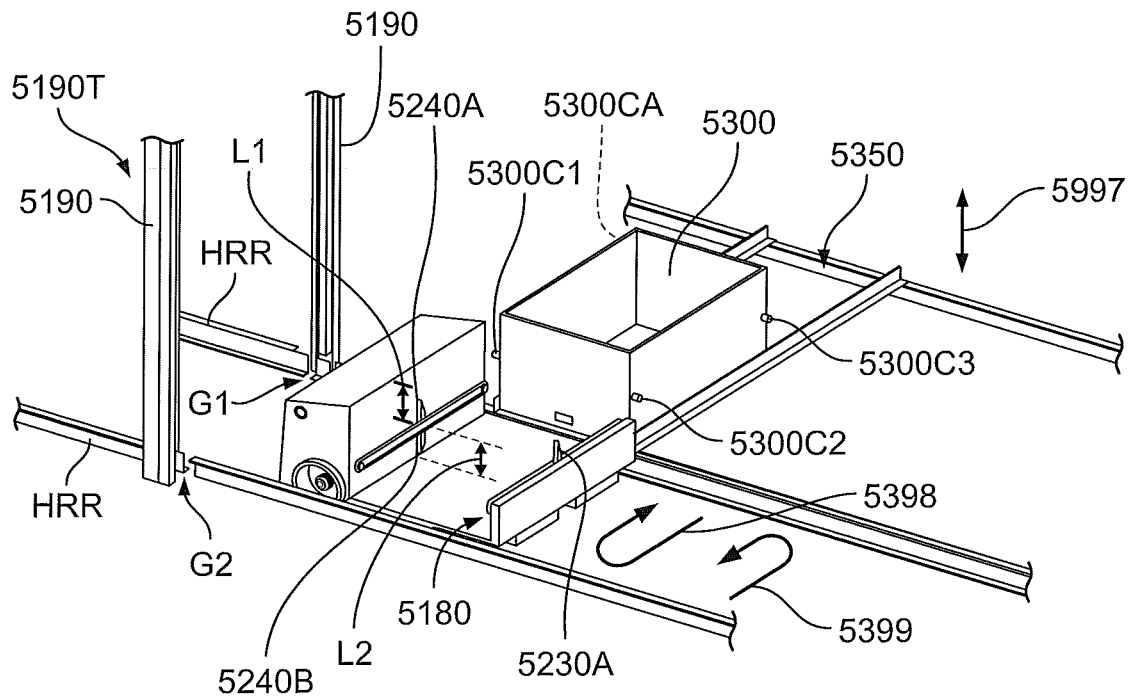
Figure 52B:
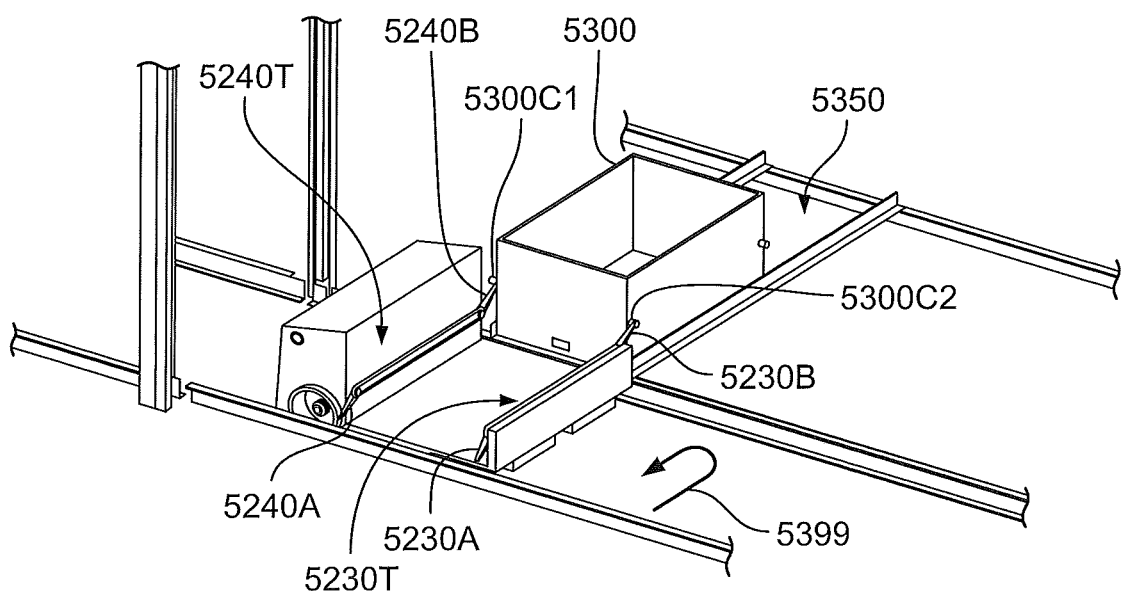
Figure 52C:
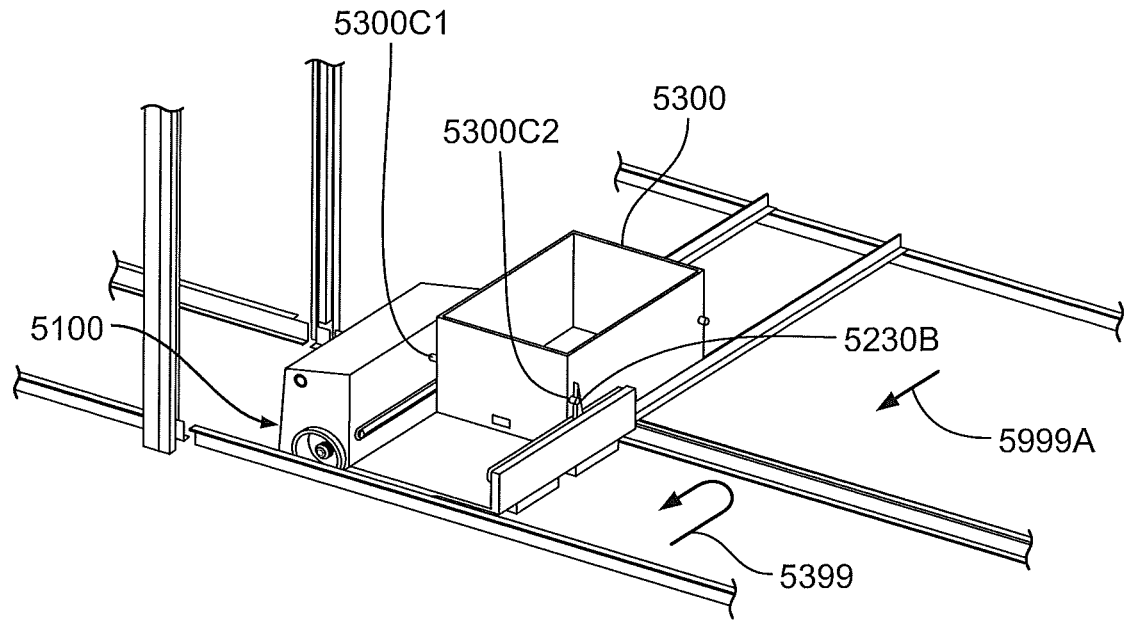
Figure 52D:
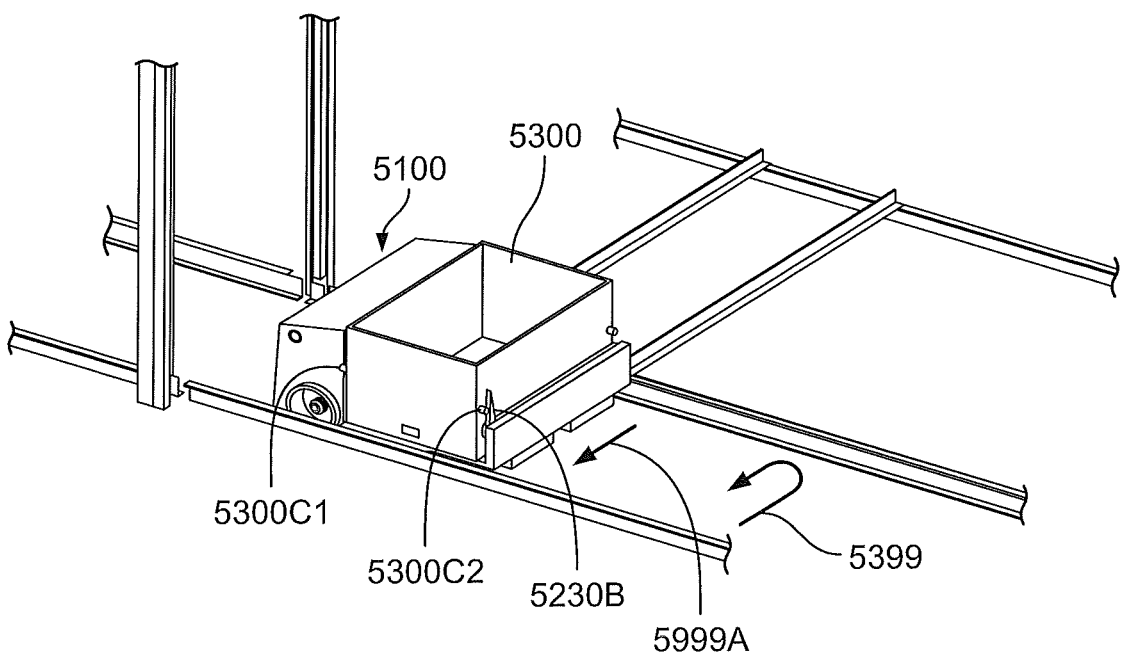
Figure 52E:
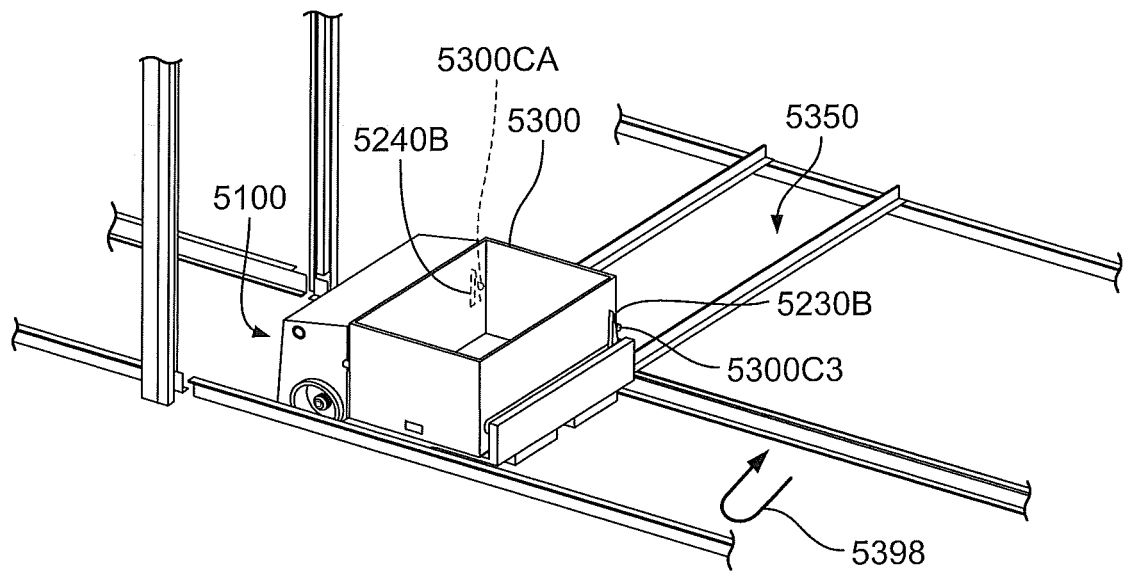
Figure 52F:
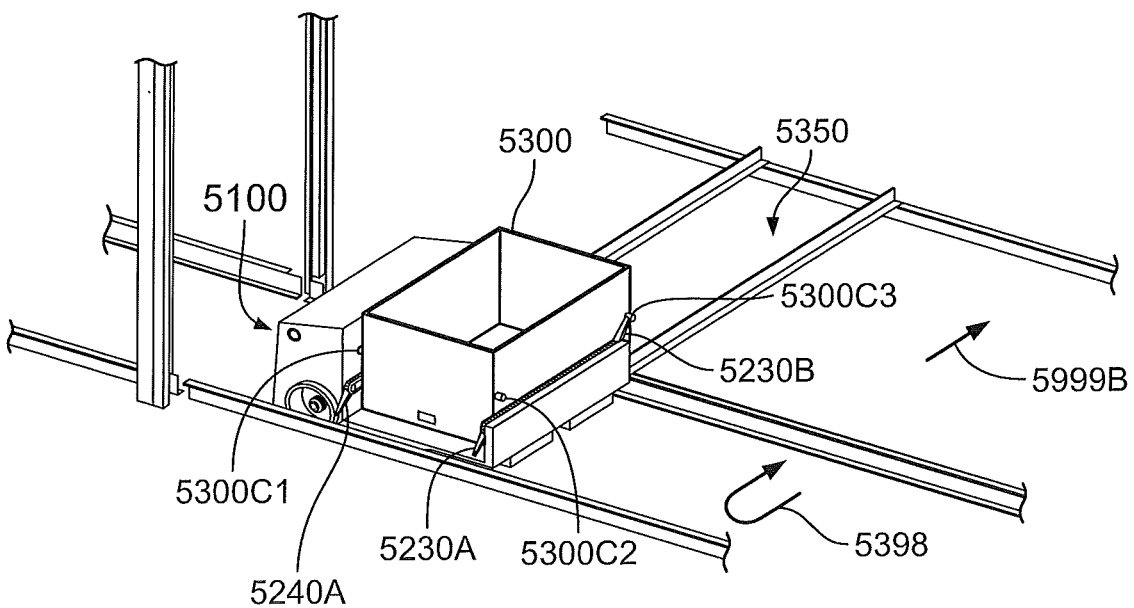
Figure 52G:
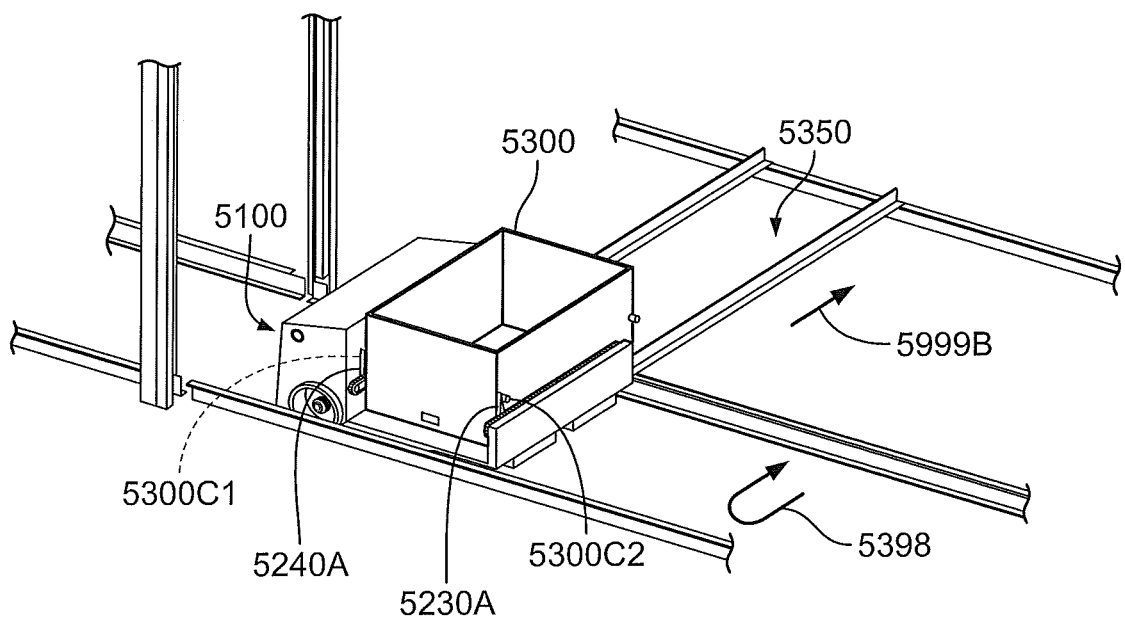
Figure 52H:
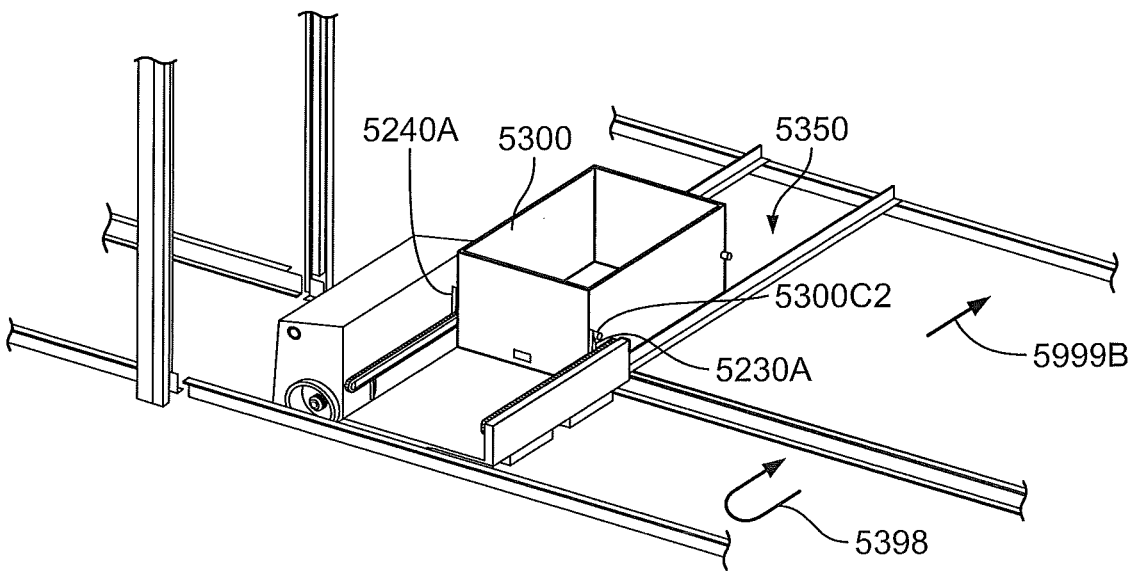
Figure 52I:
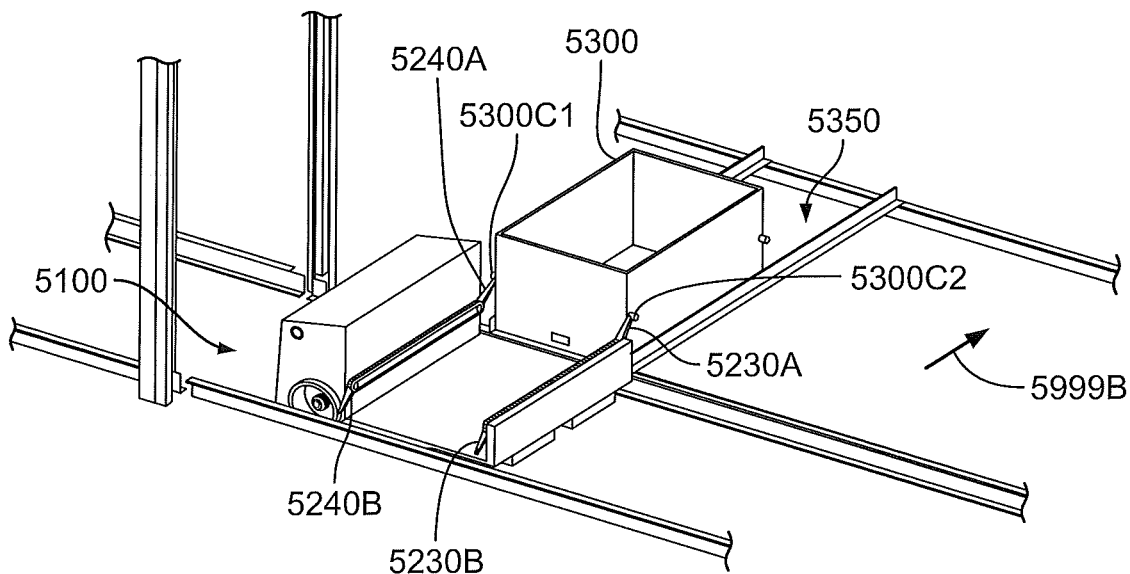
Figure 52J:
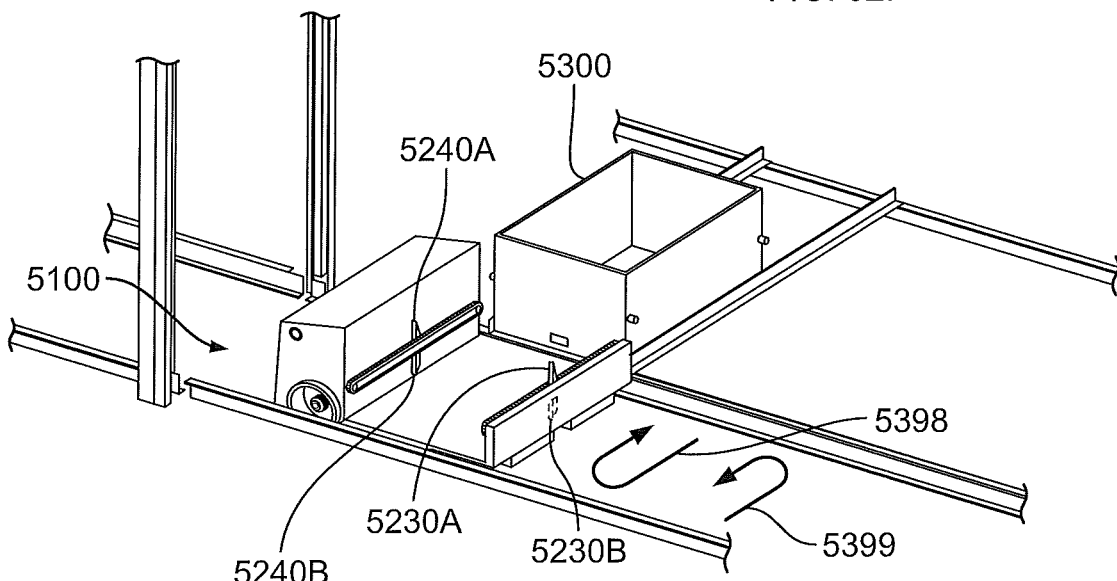
Figure 52K:
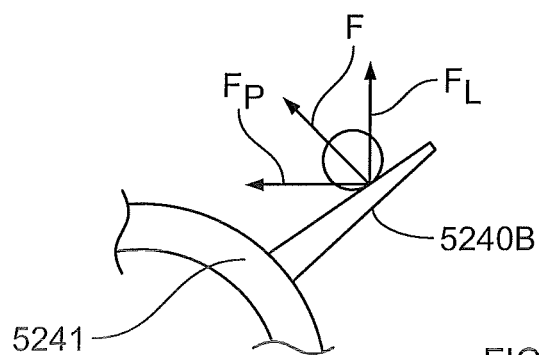
Figure 53A:
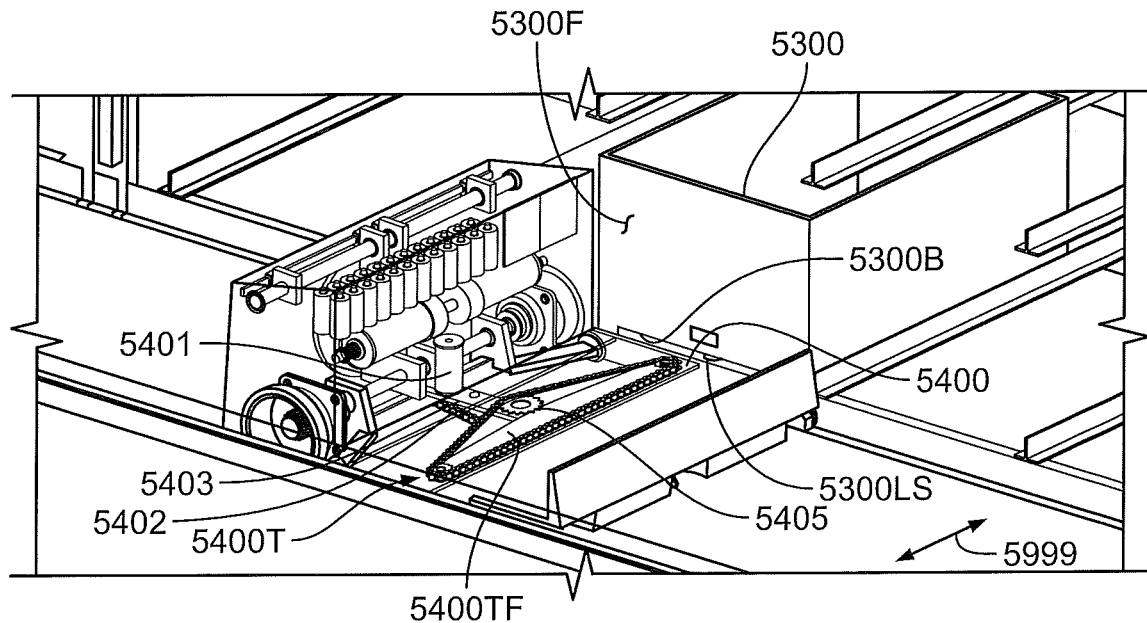
Figure 53B:
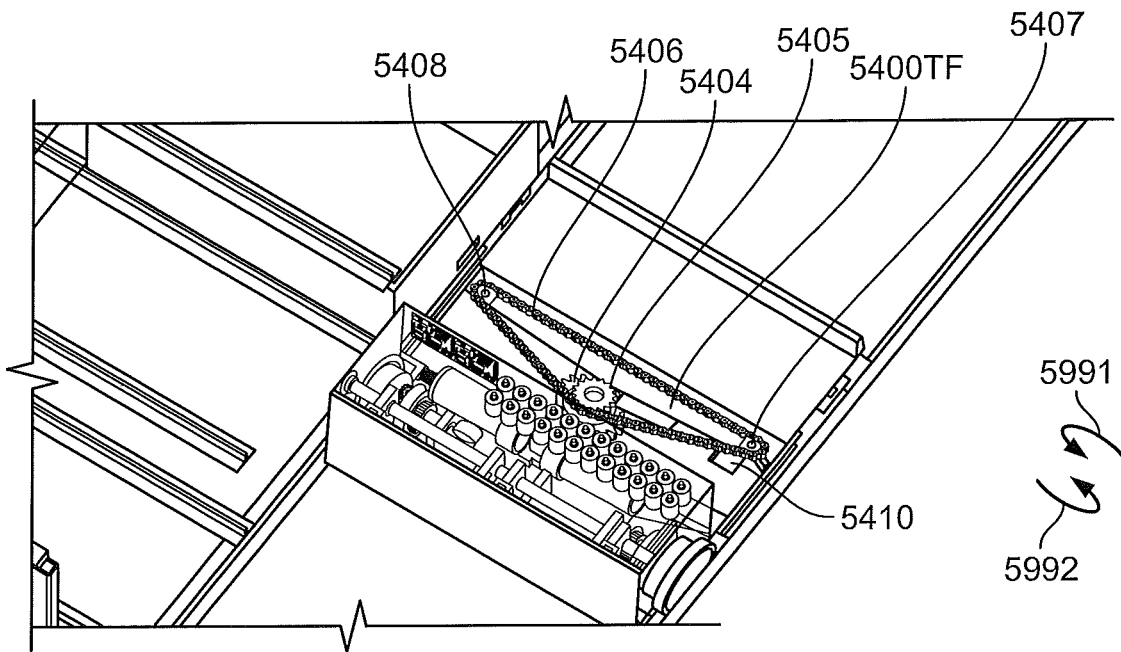
Figure 53C:
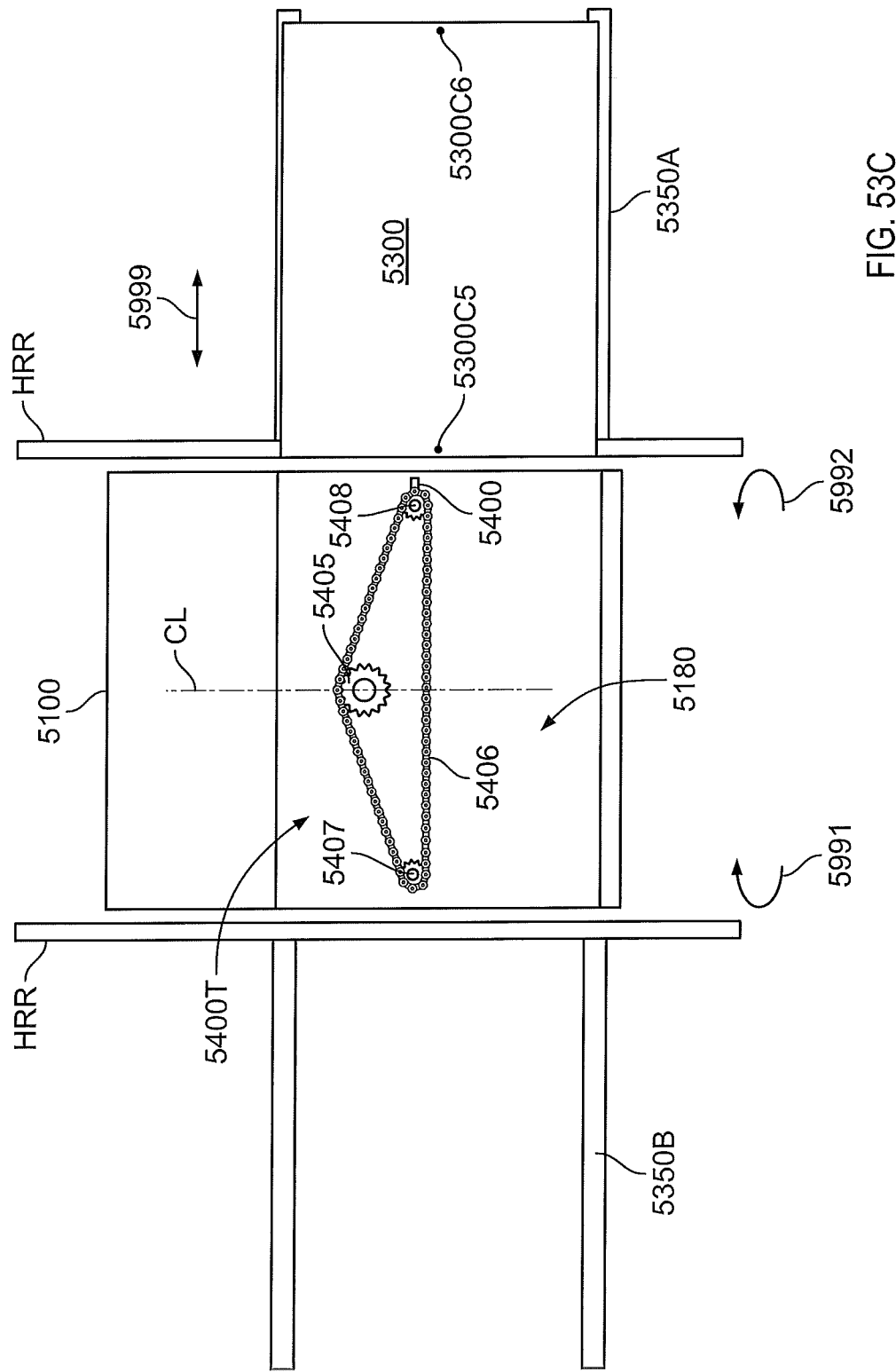
Figure 53E:
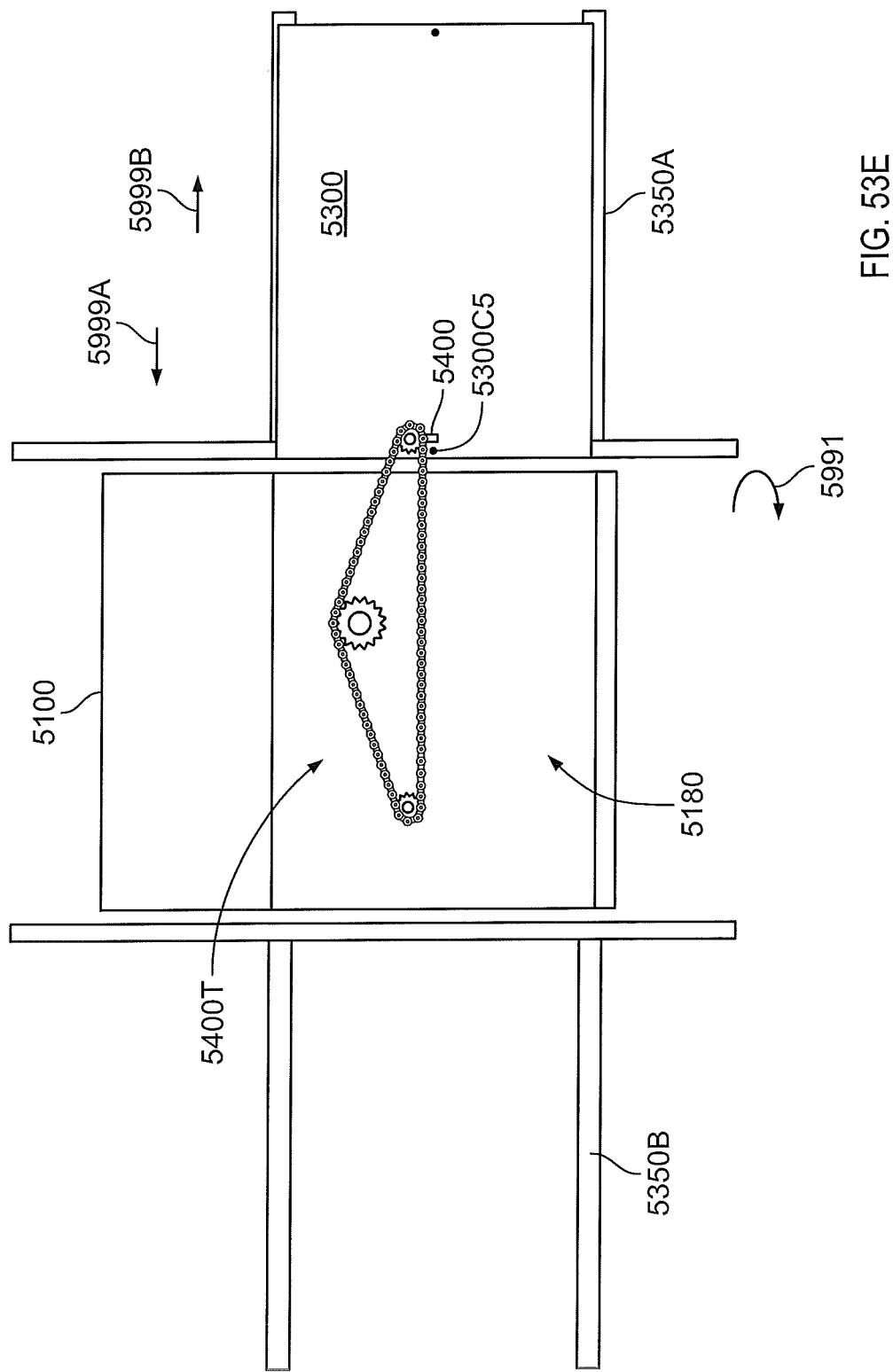
Figure 53F:
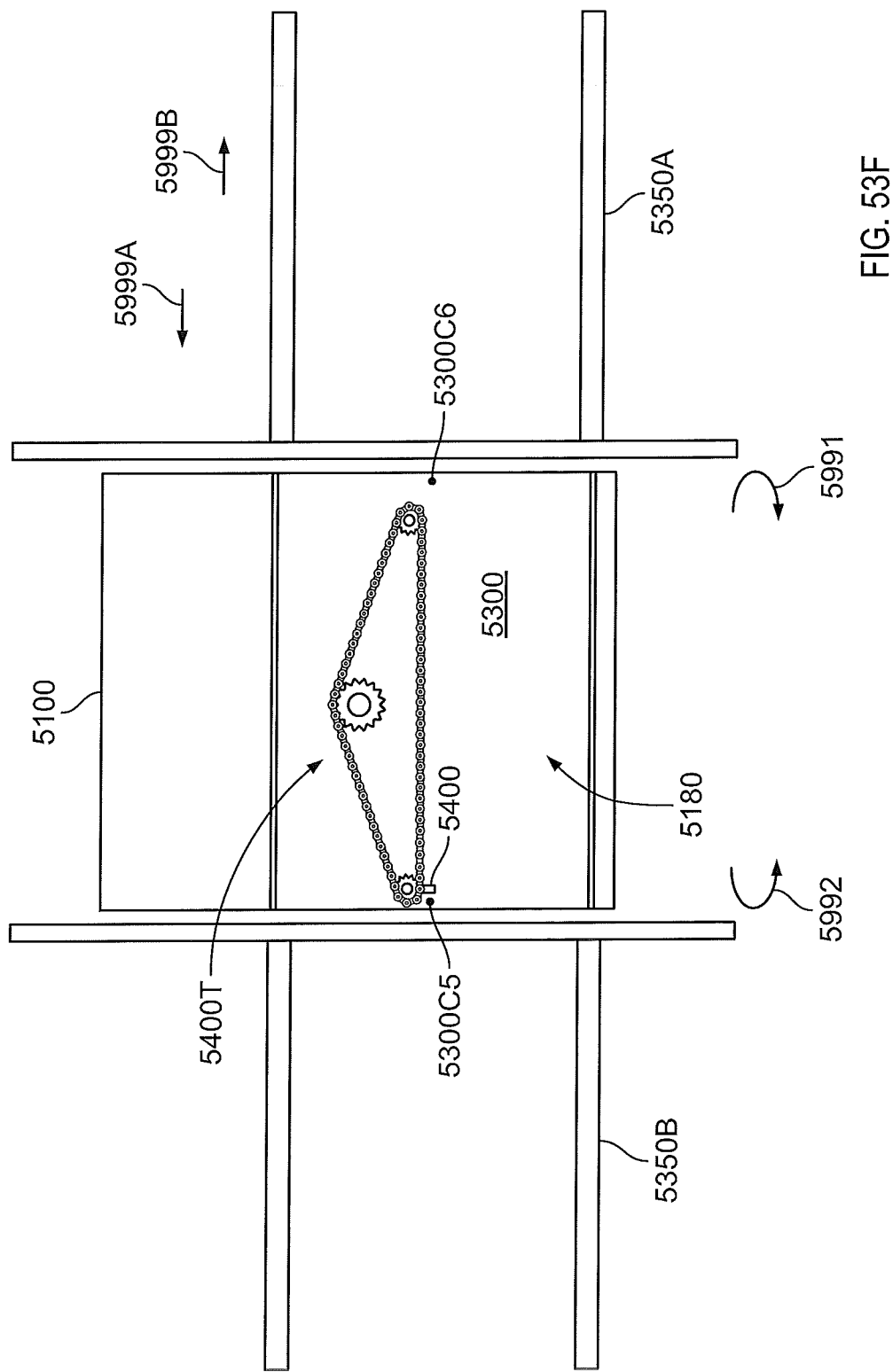
Figure 53G:
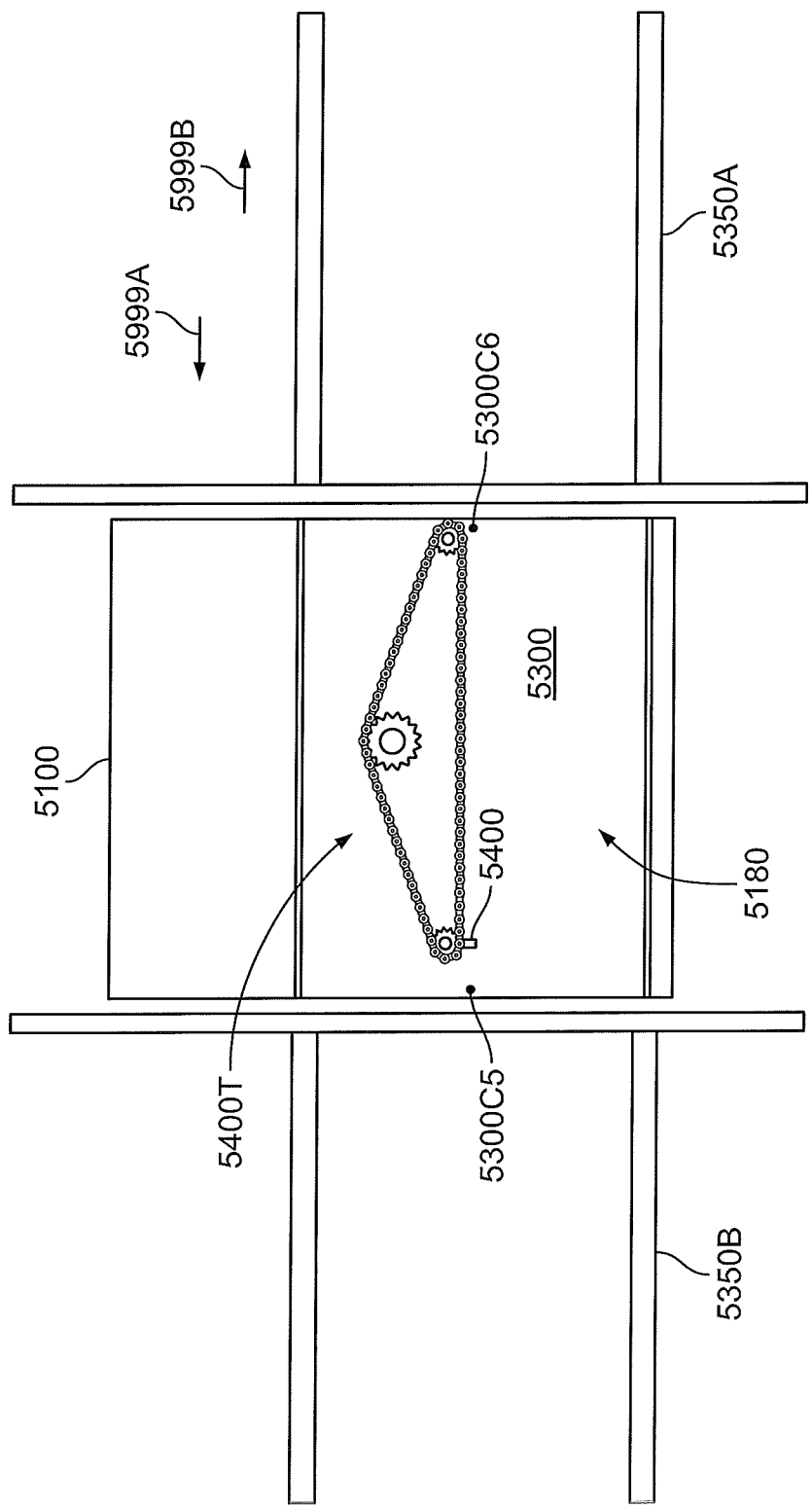
Figure 53H:
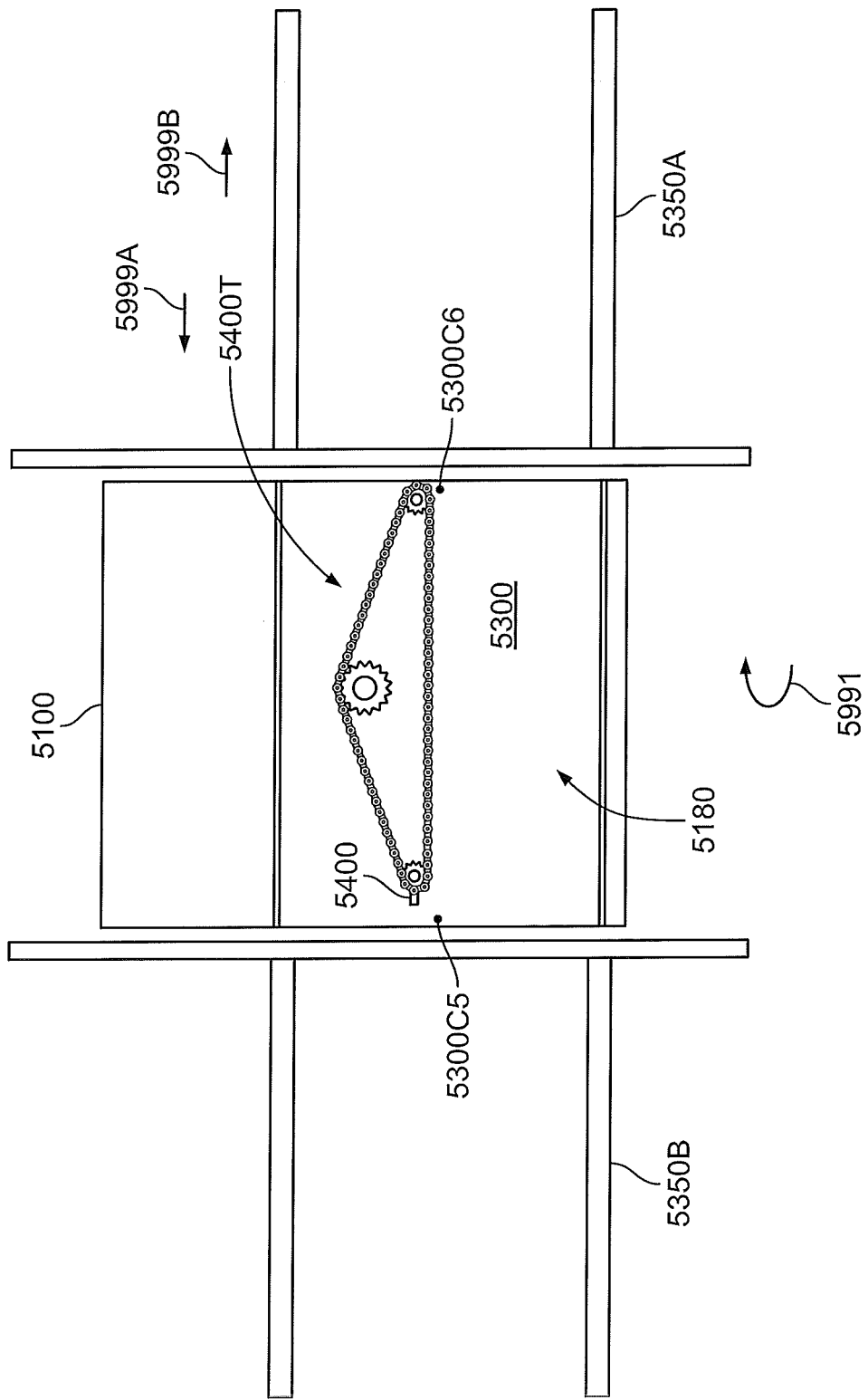
Figure 53I:
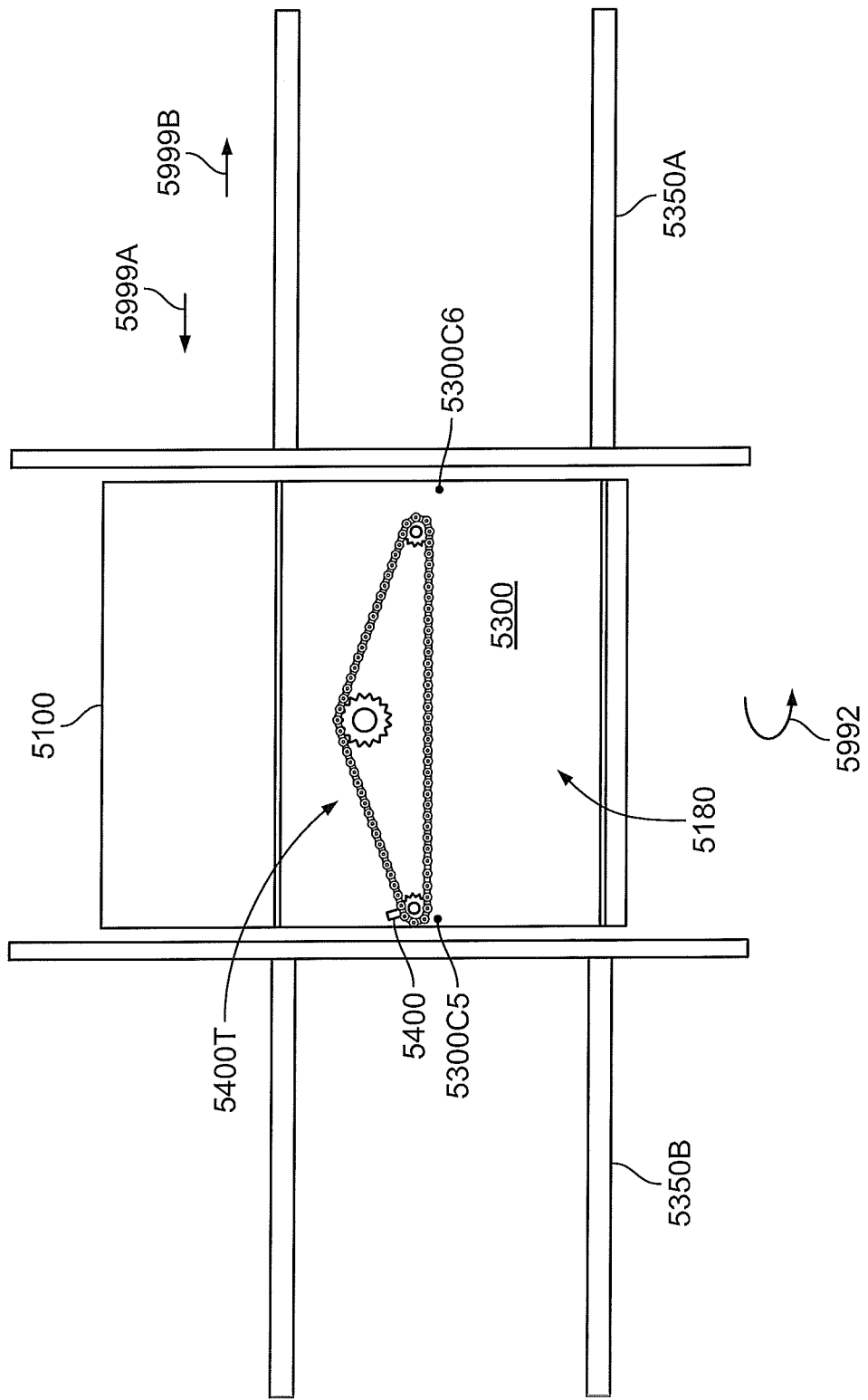
Figure 53J:
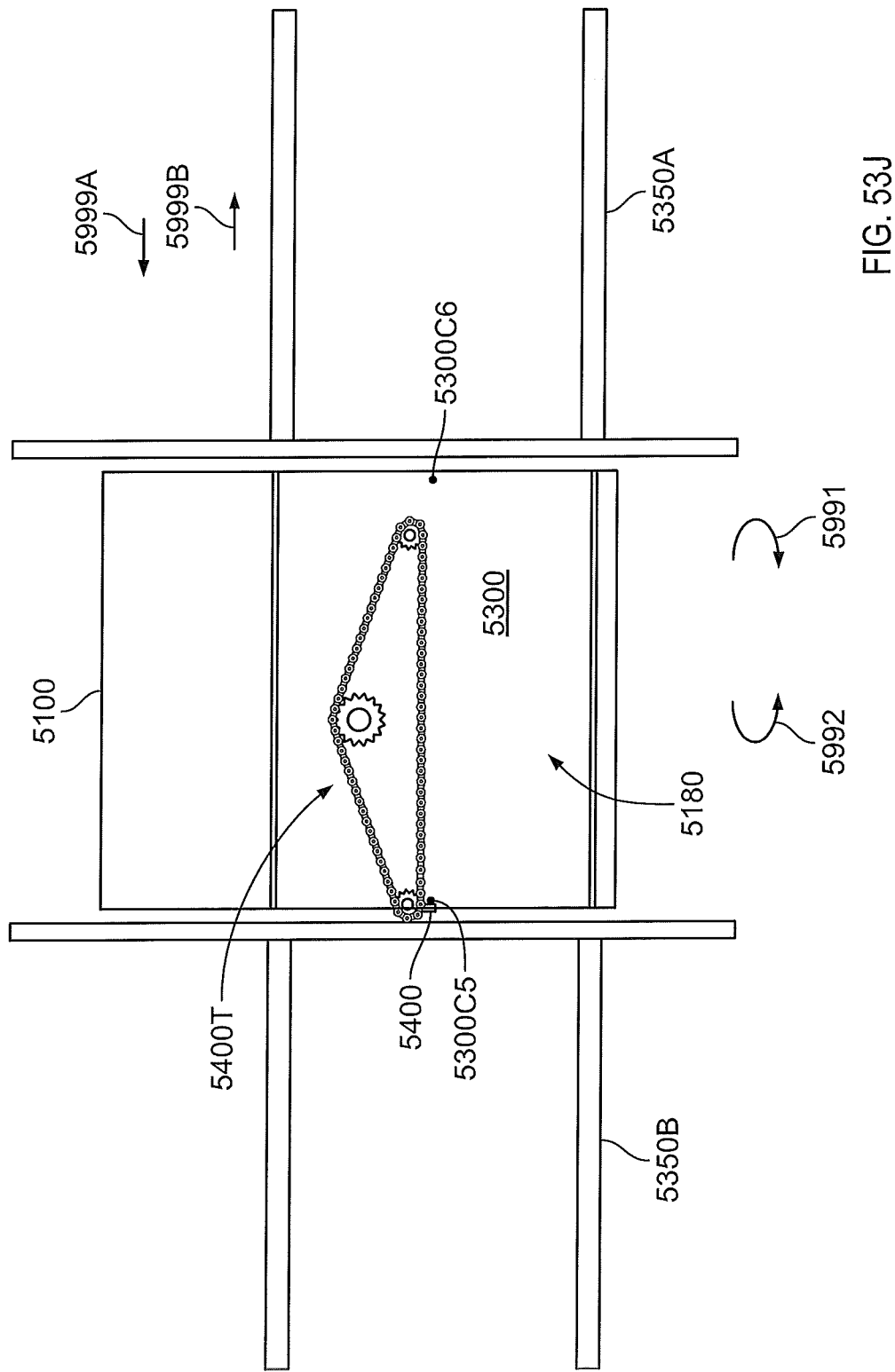
Figure 53K:
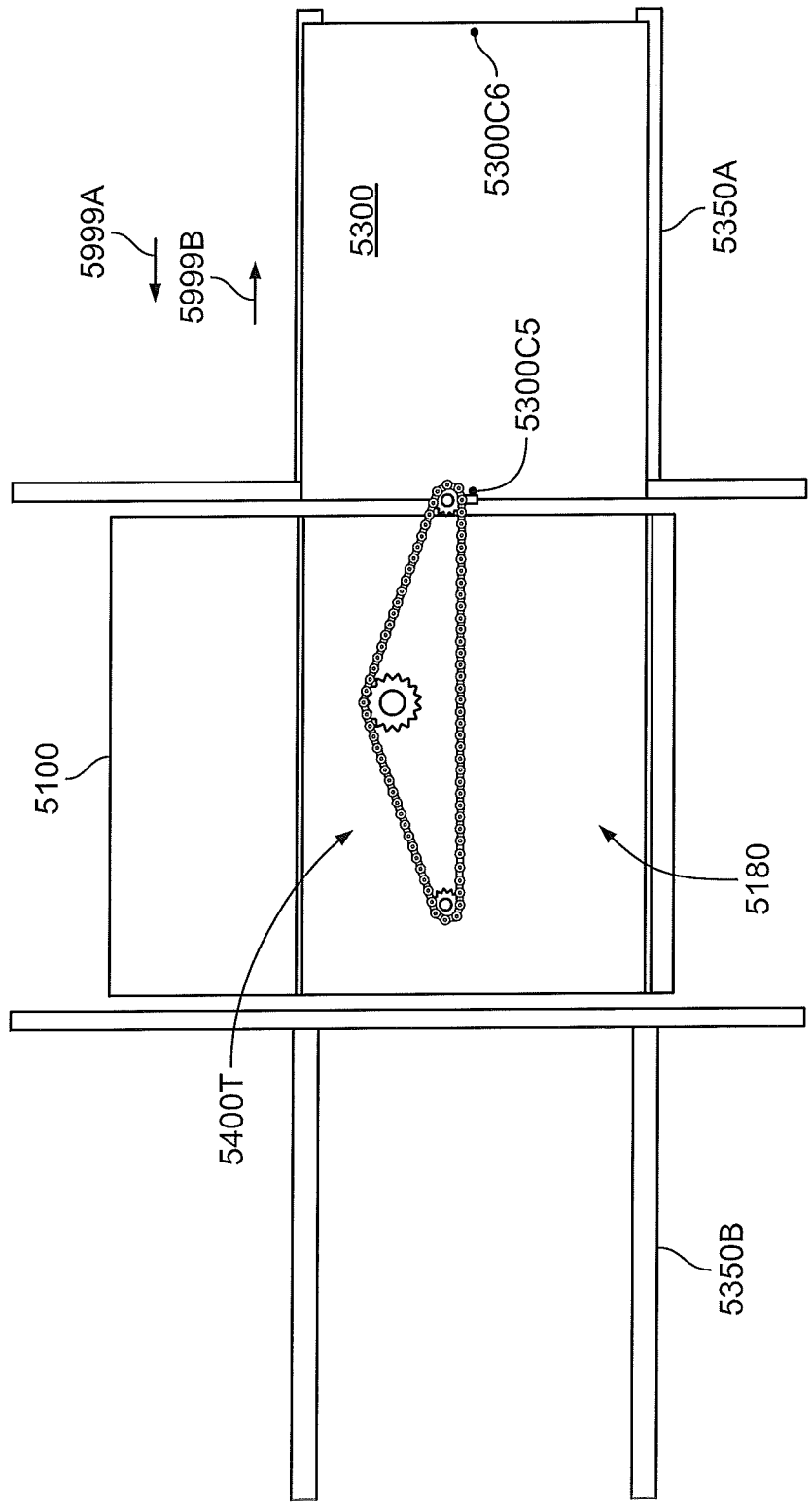
Figure 54A:
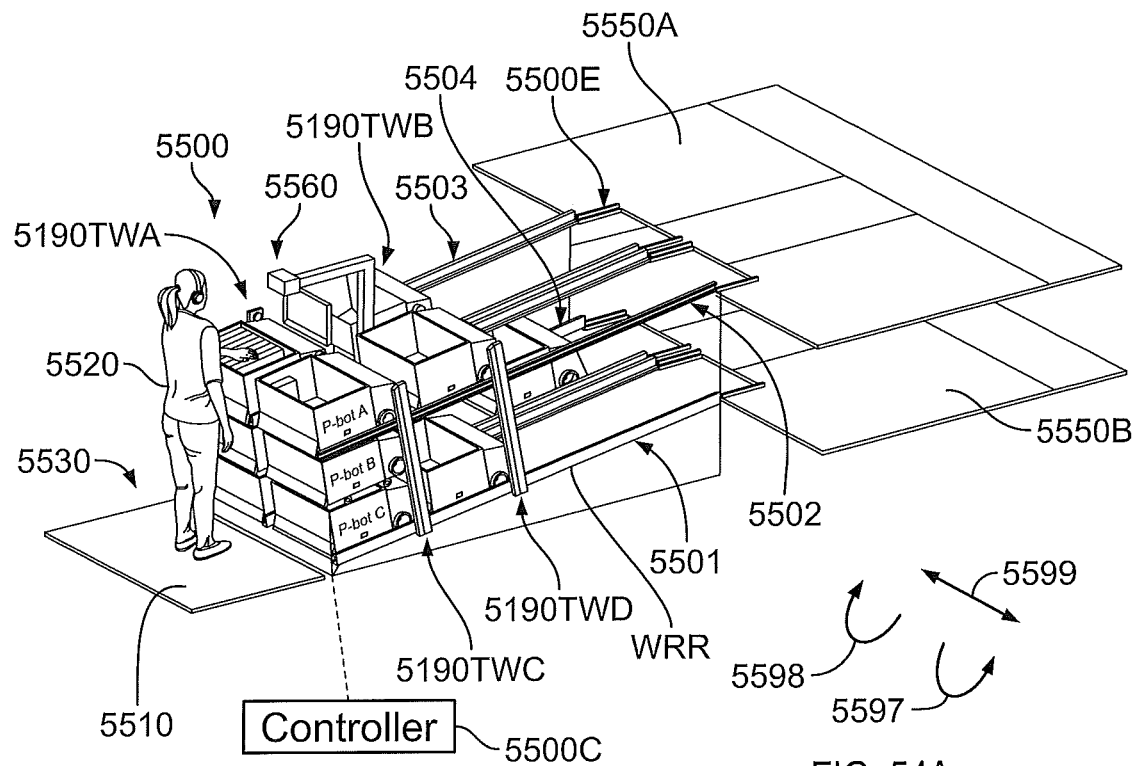
Figure 54B:
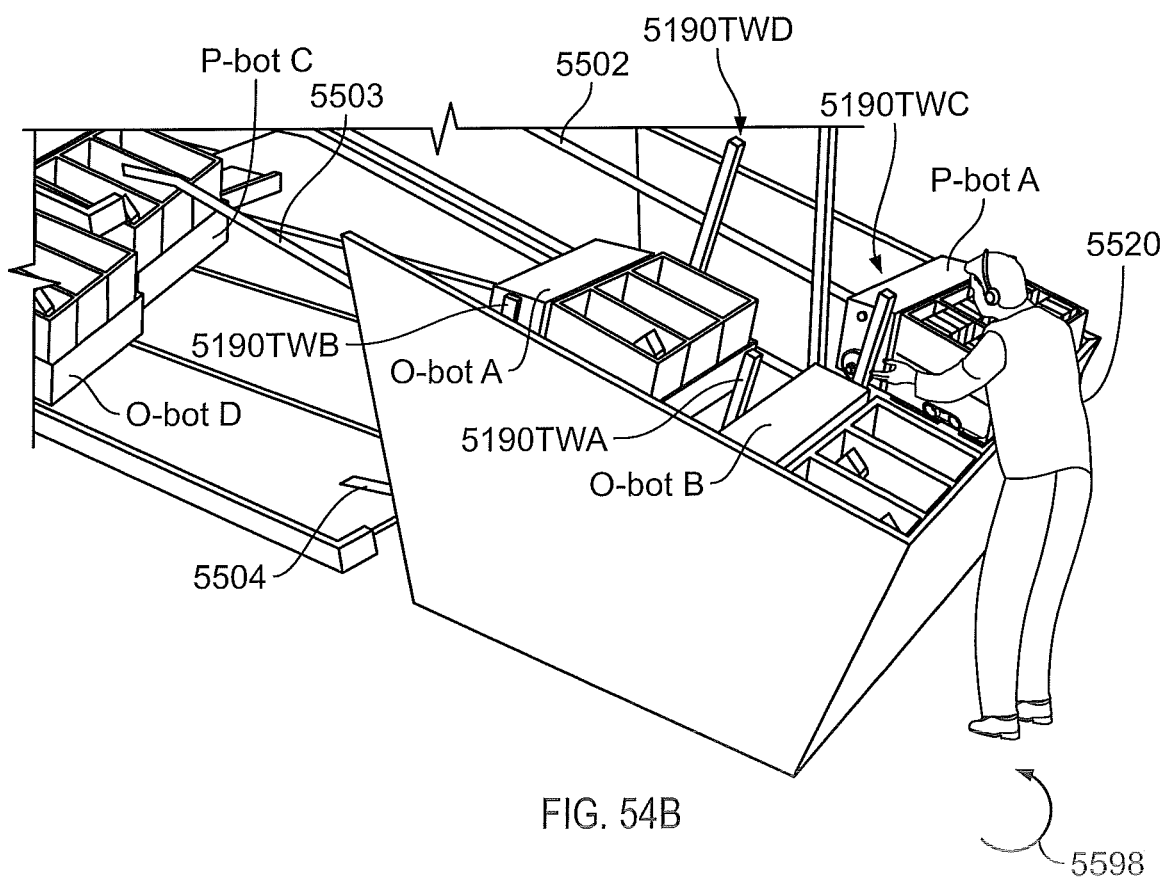
Figure 54C:
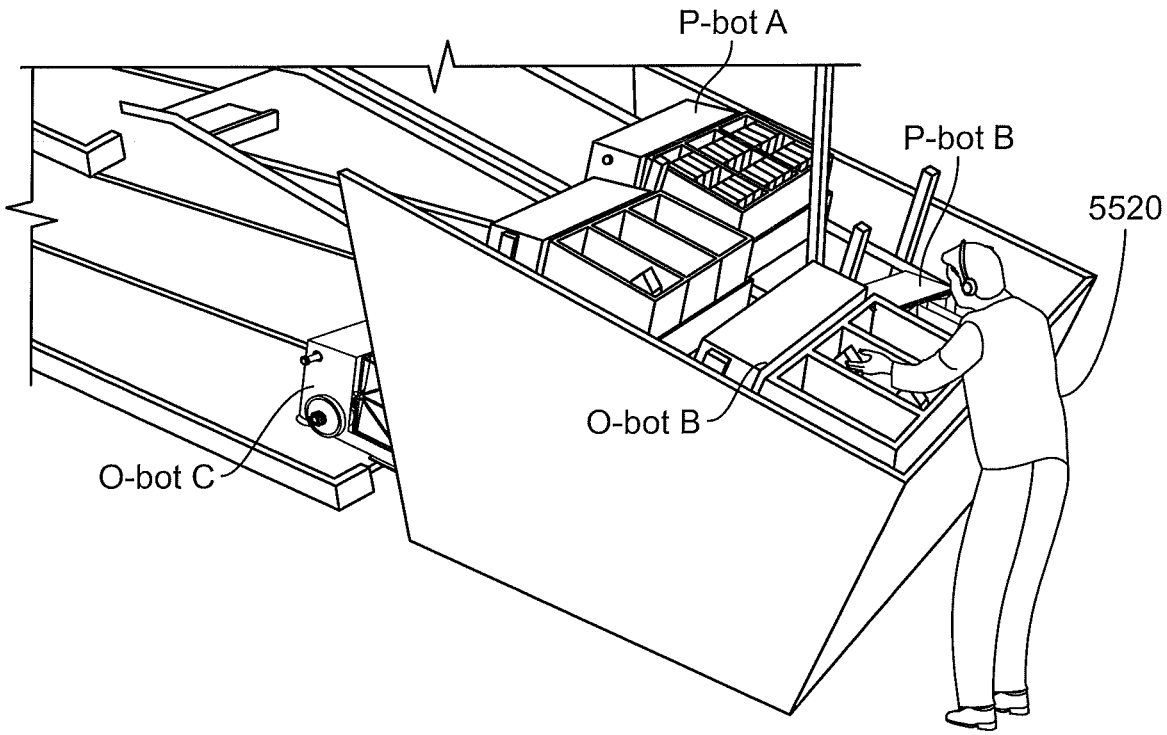
Figure 54D:
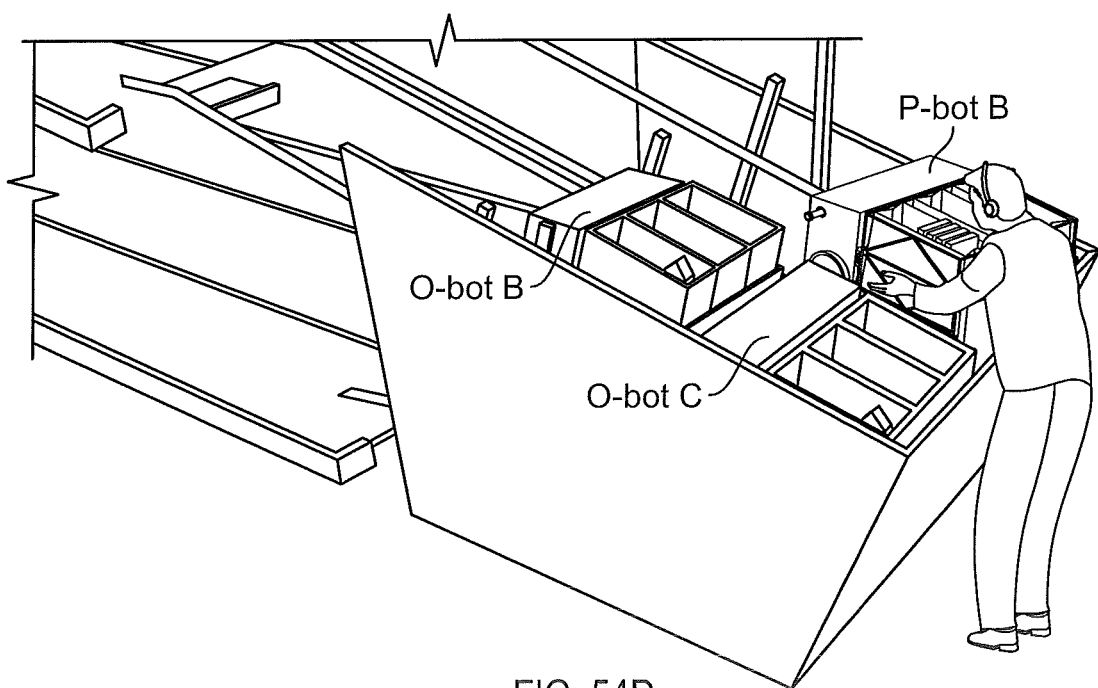
Figure 54E:
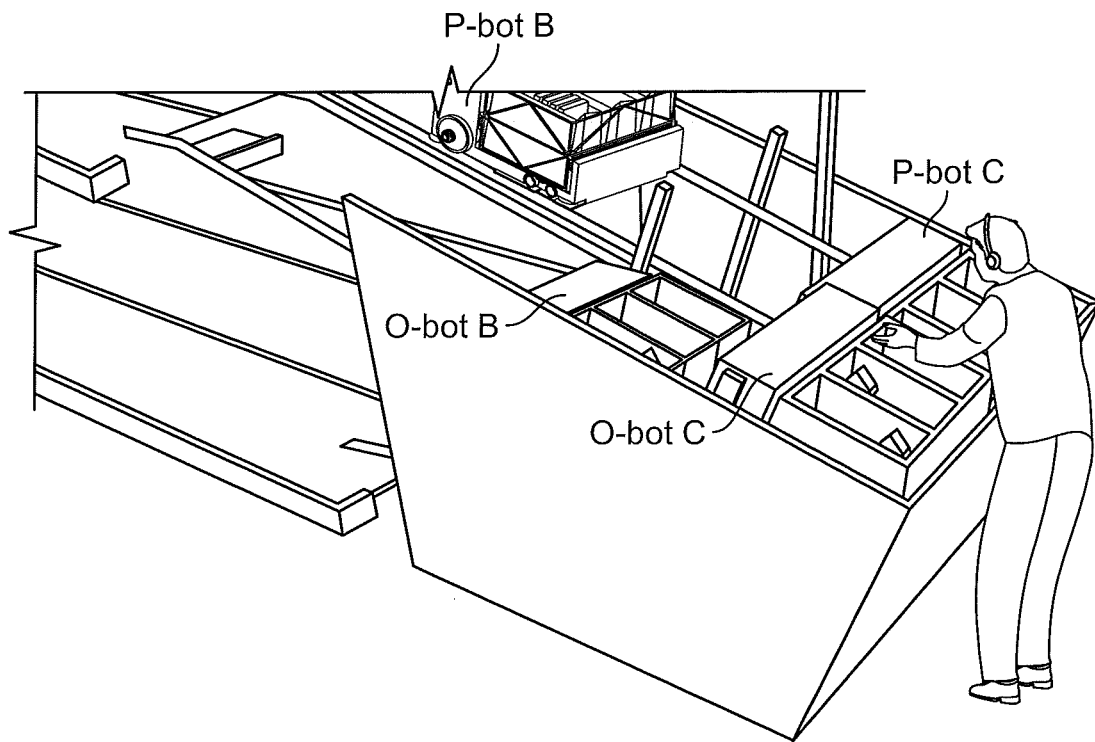
Figure 54F:
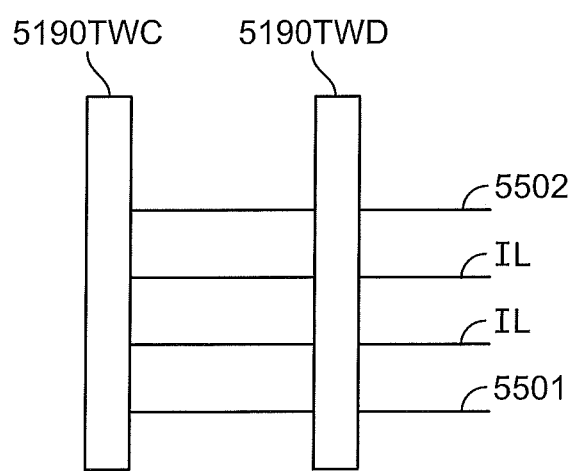
Figure 54G:
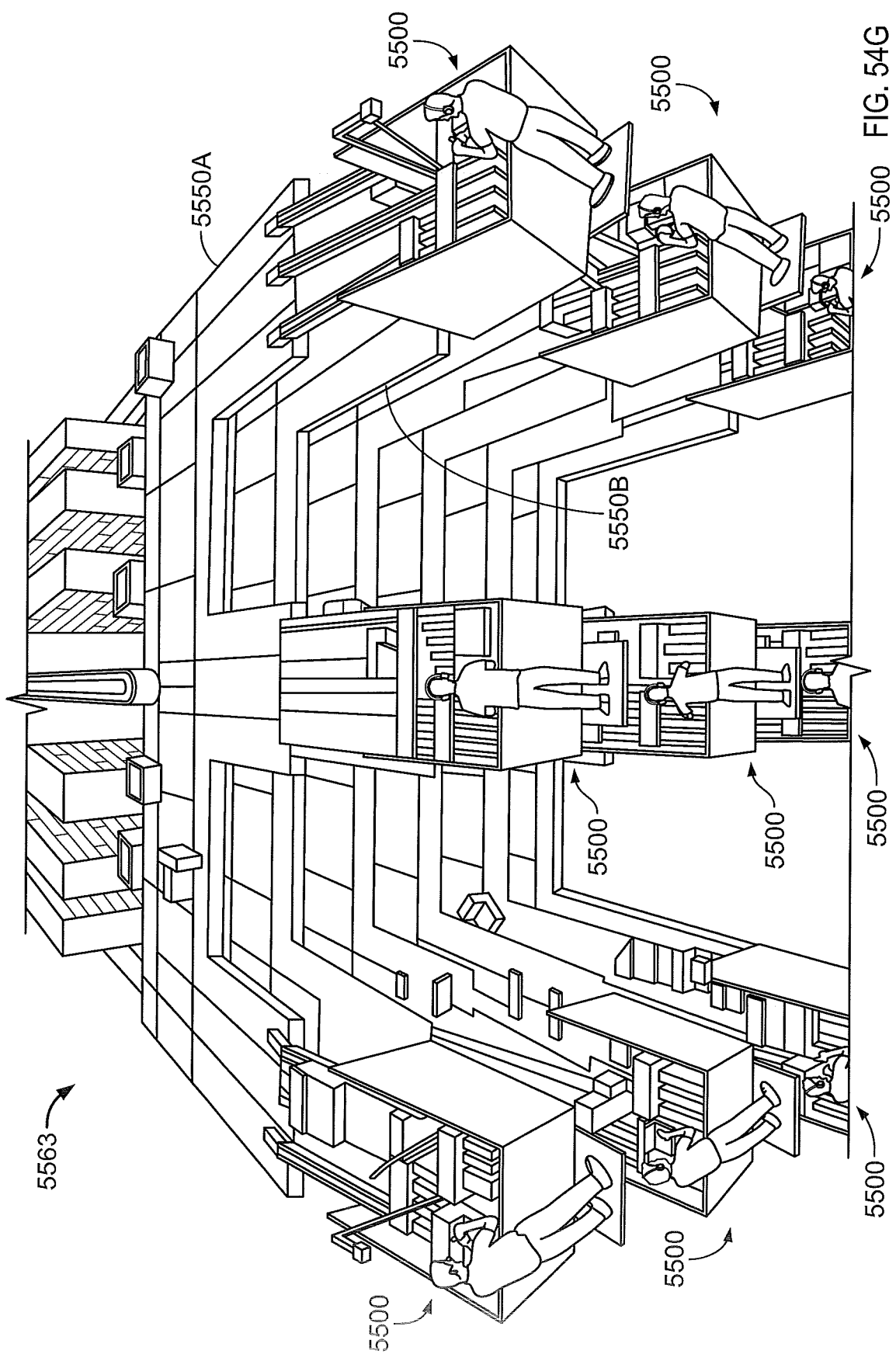
Figure 55:
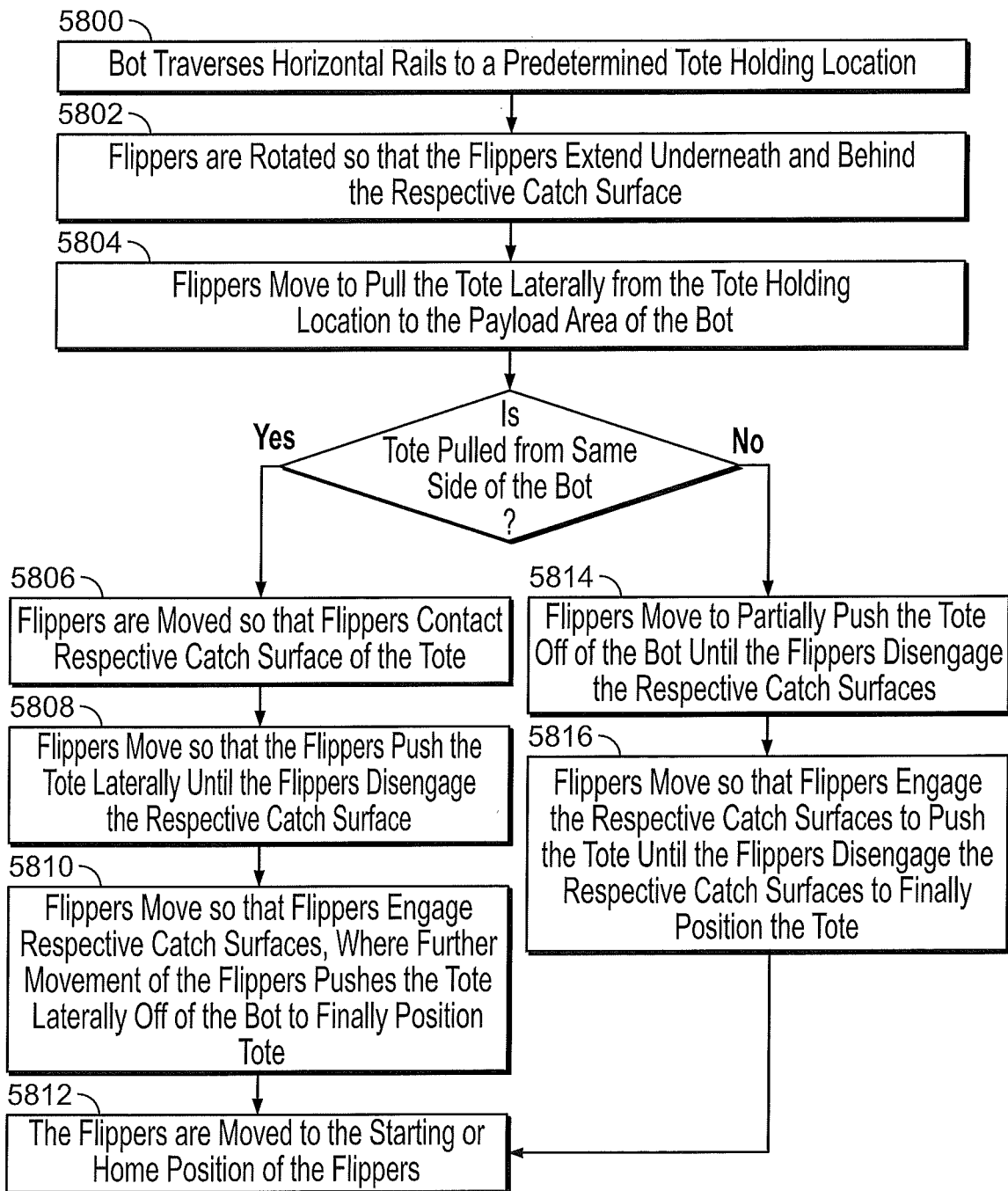
Figure 56:
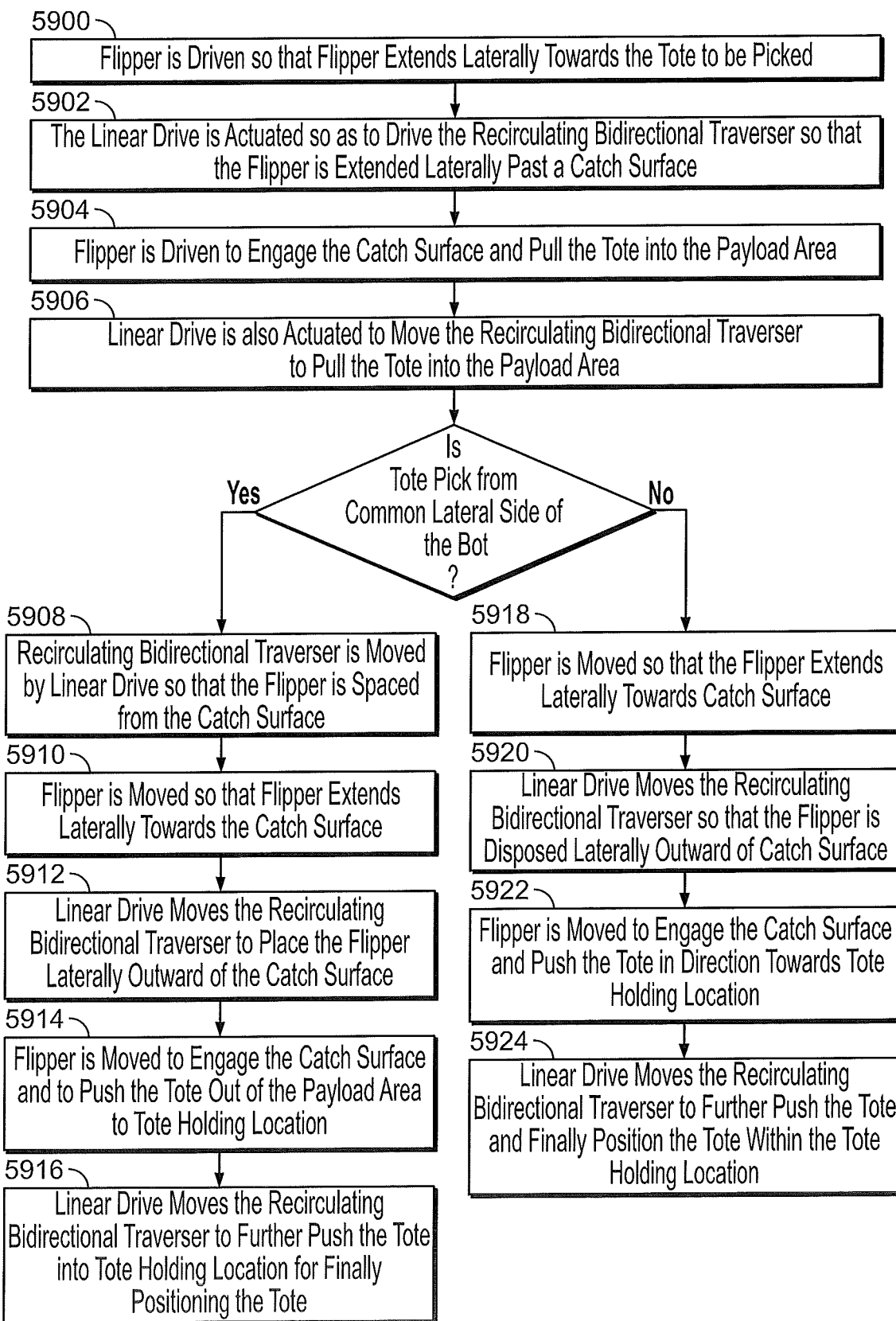
Figure 57:
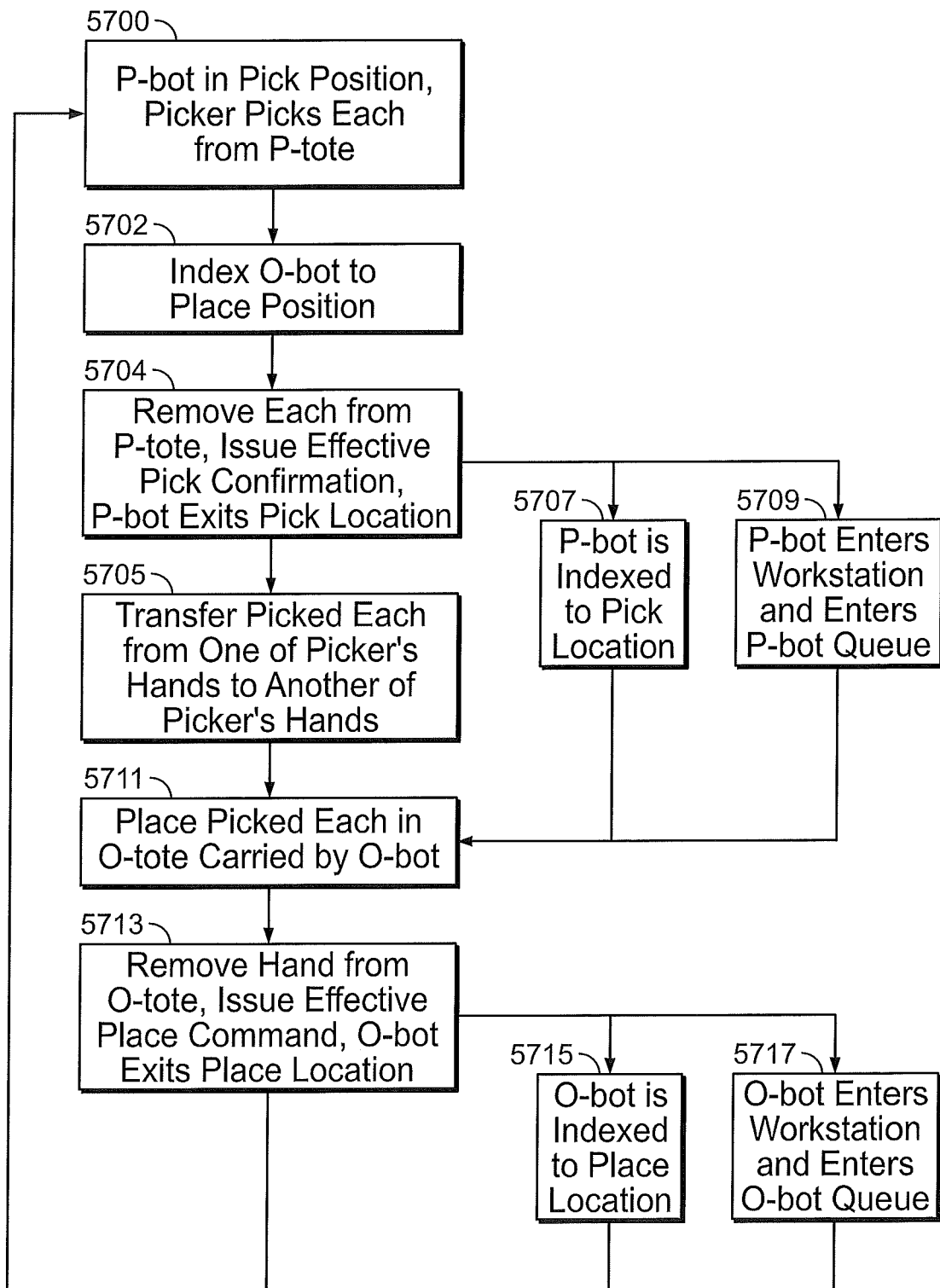
Figure 58:
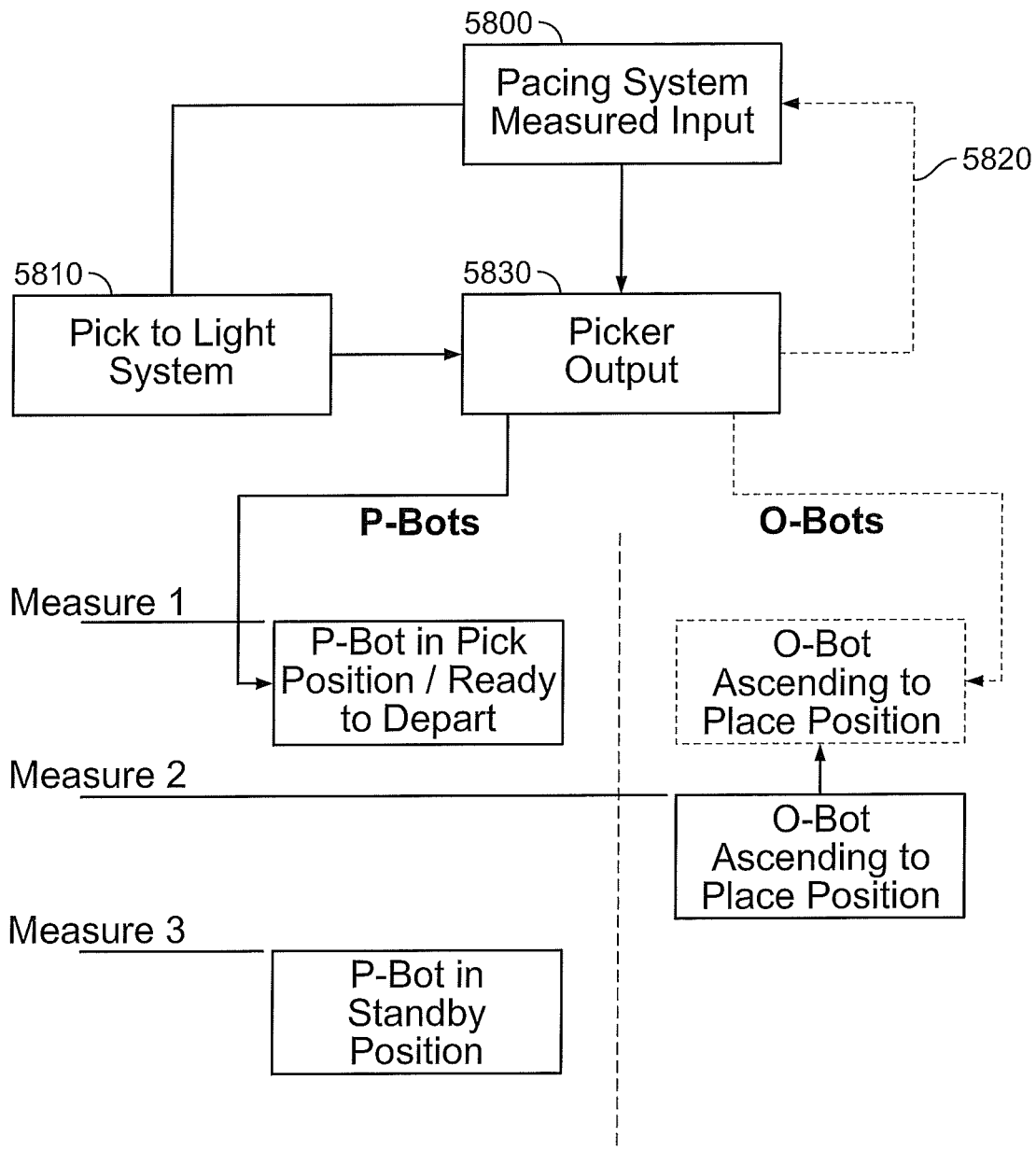
Figure 59:
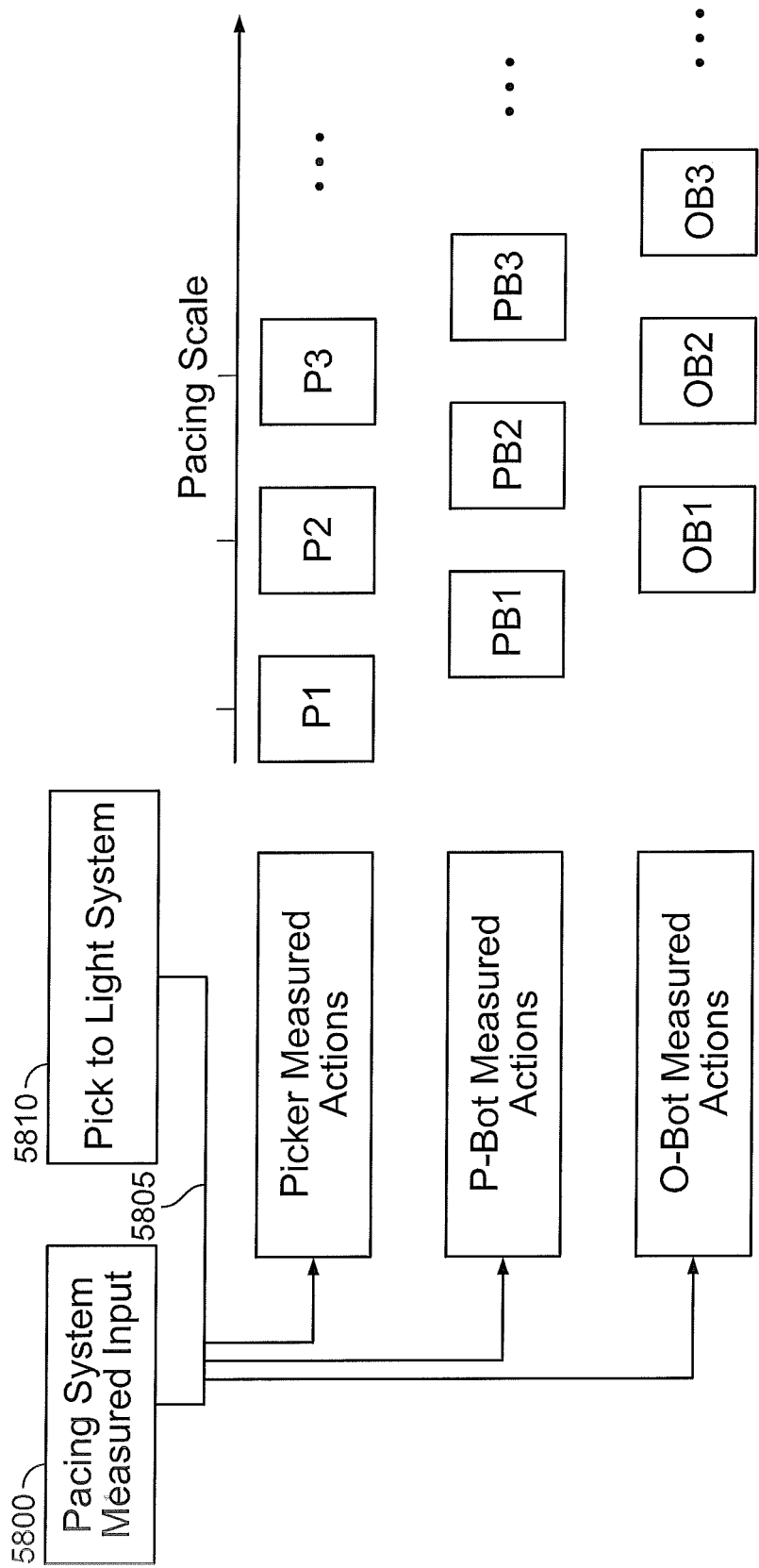
Figure 60A:
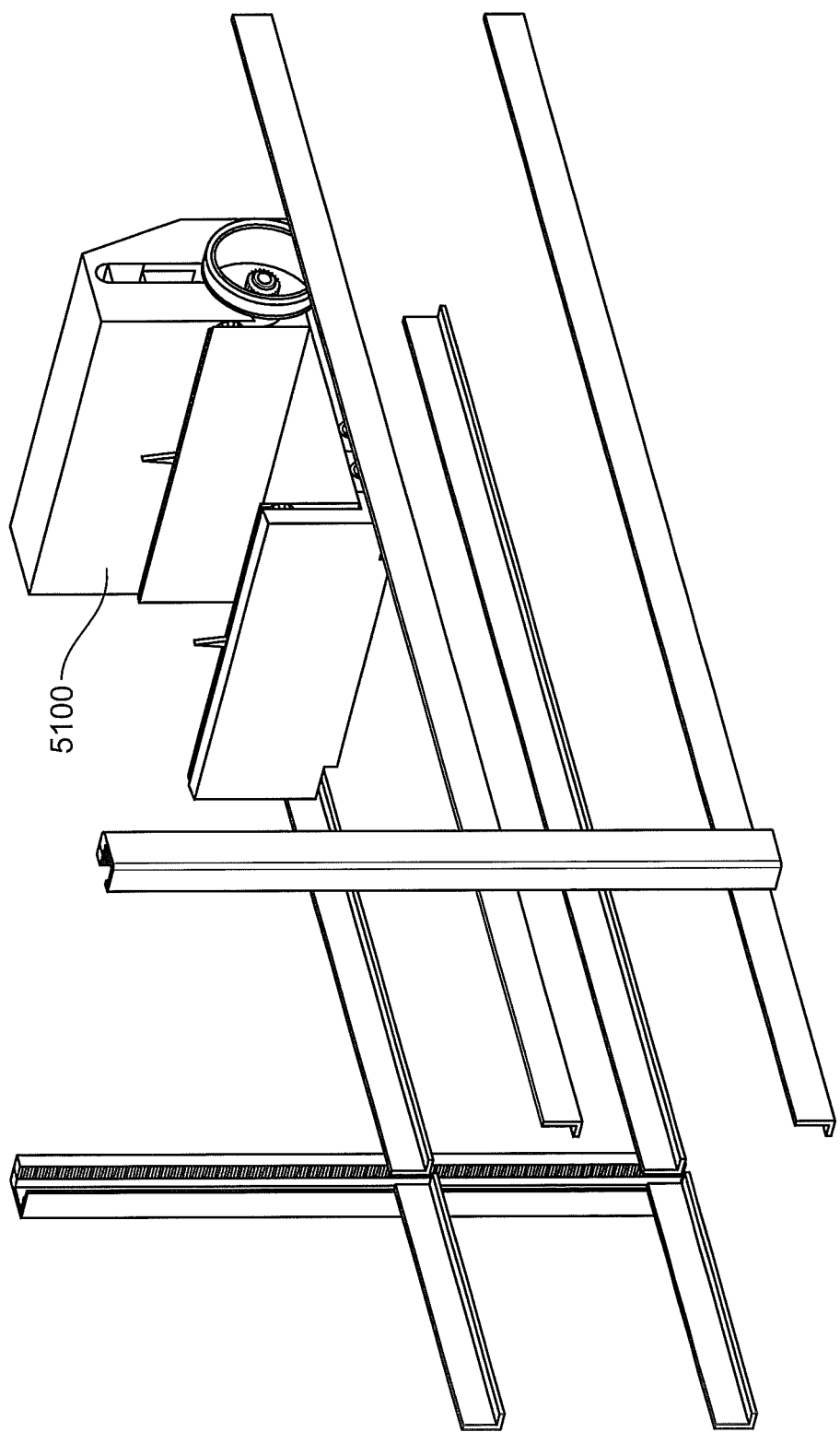
Figure 60C:
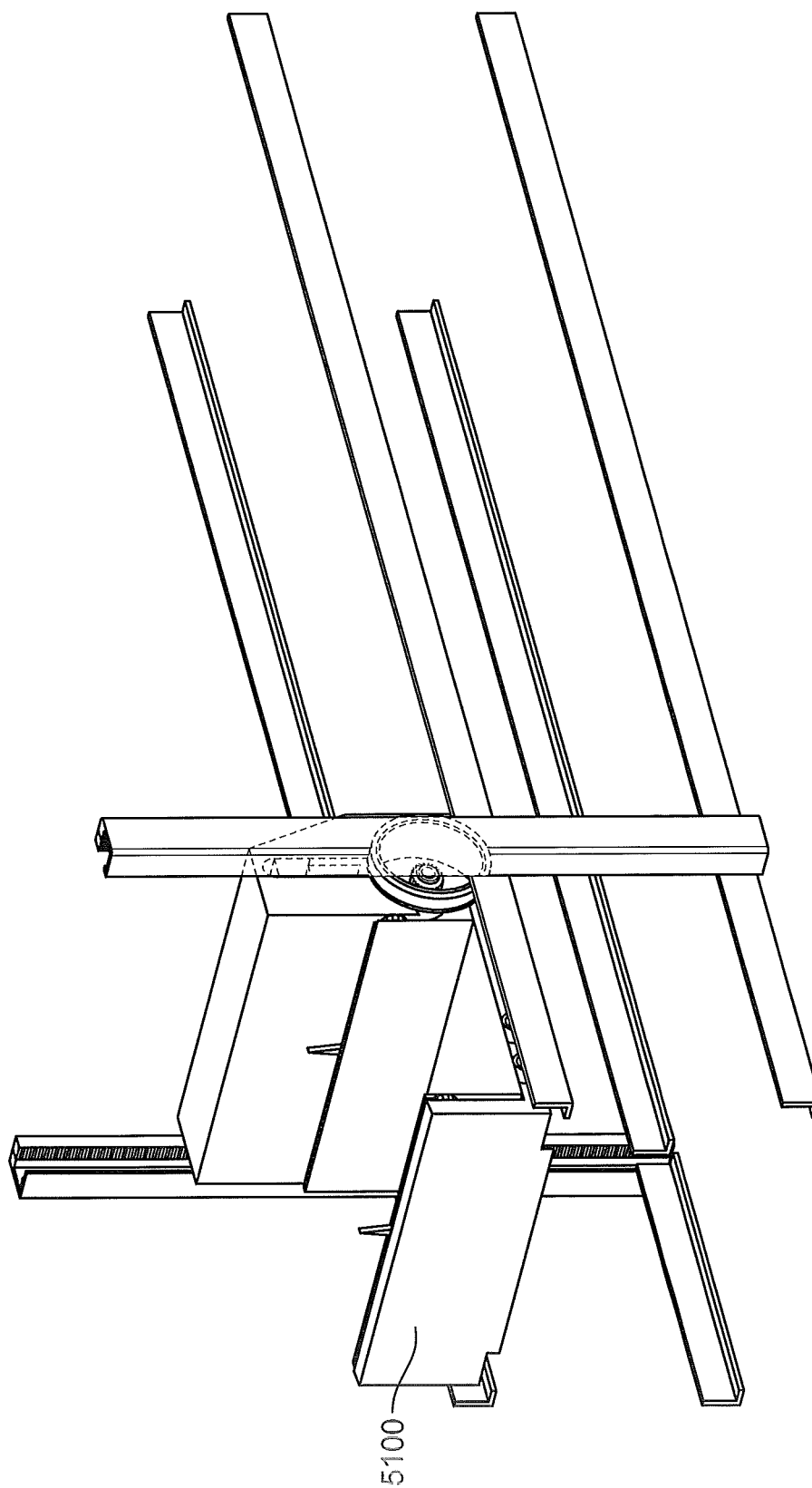
Figure 60F:
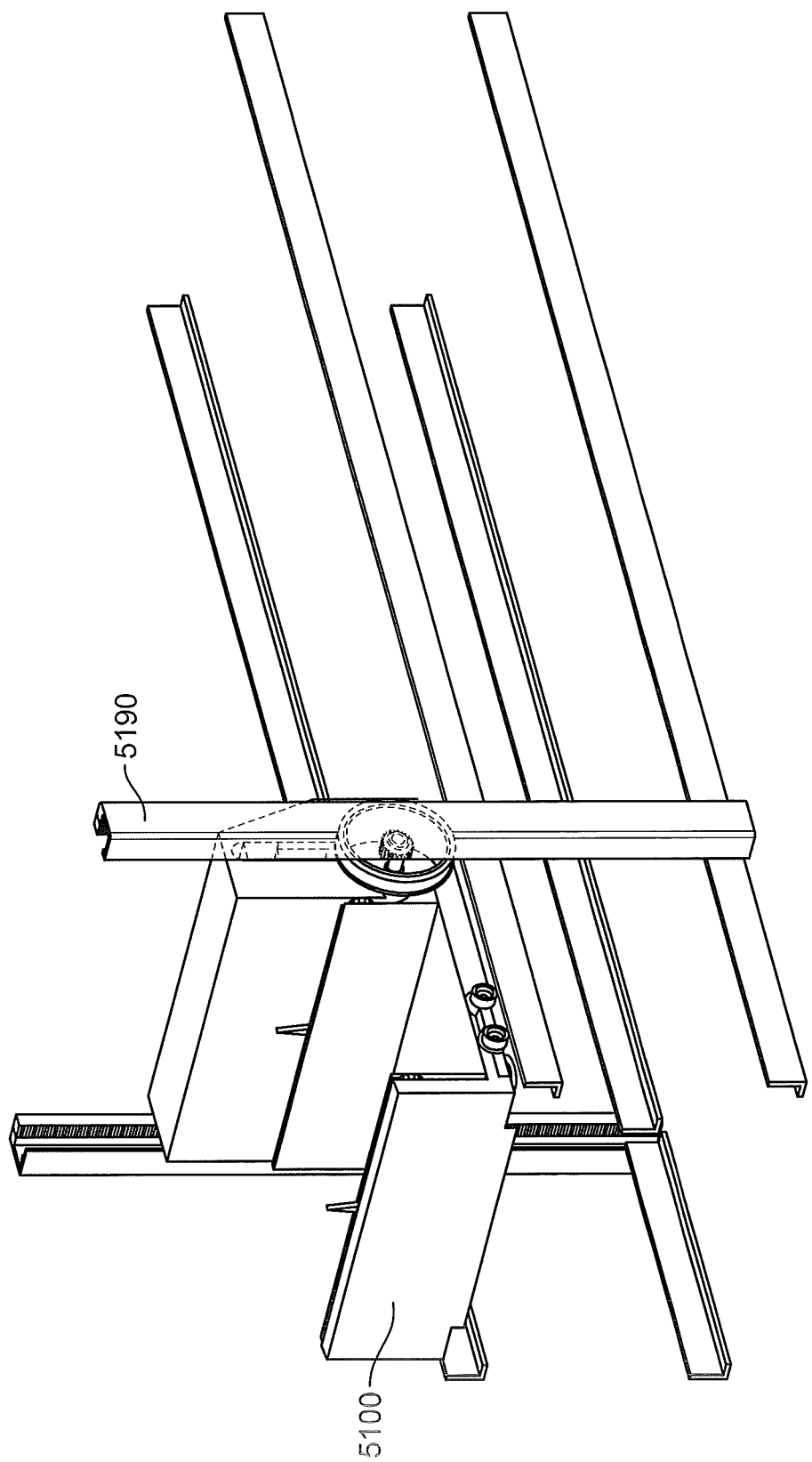
Figure 60G:
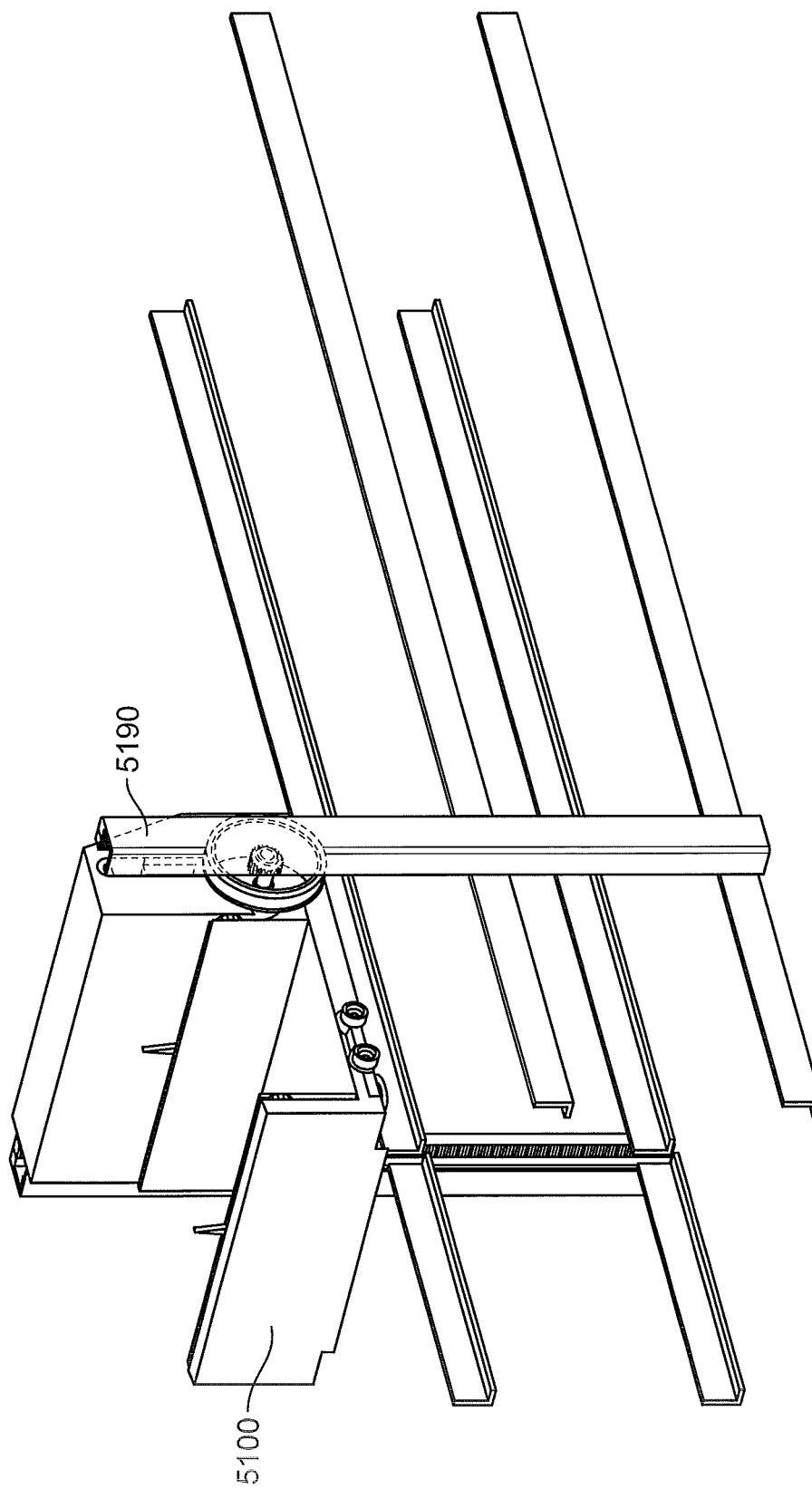
Figure 61:
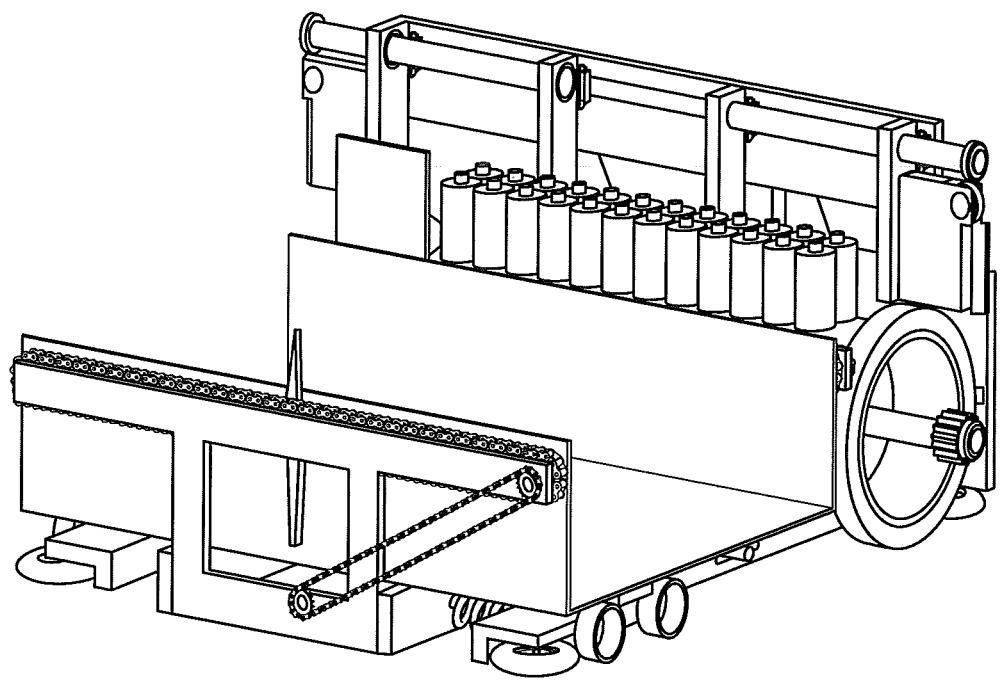
Figure 62:
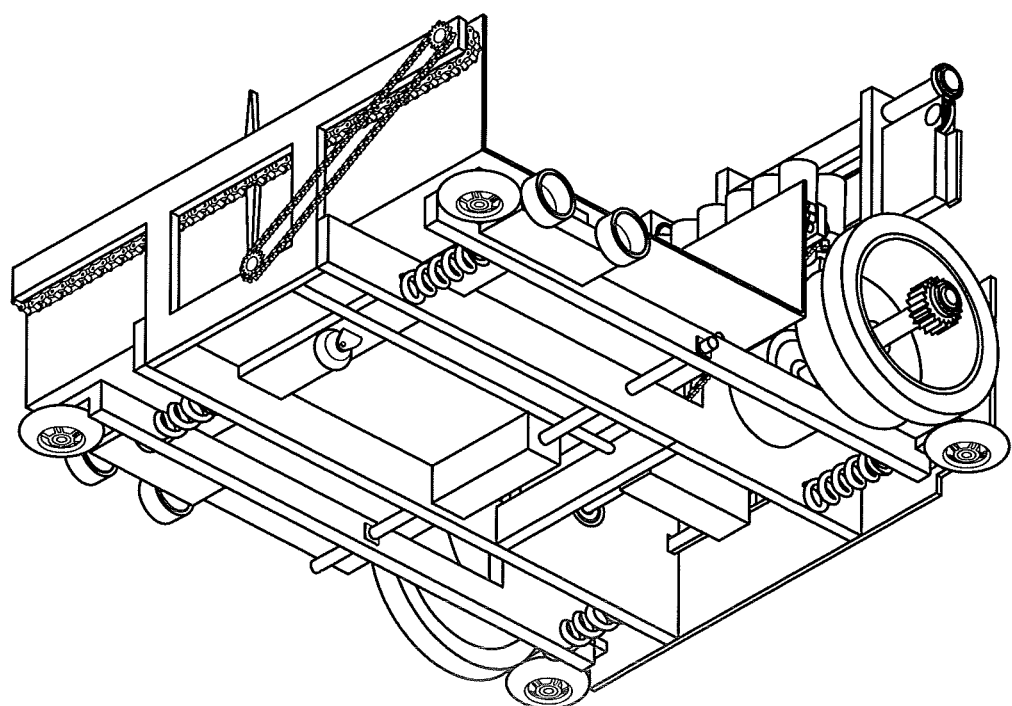
Figure 63A:
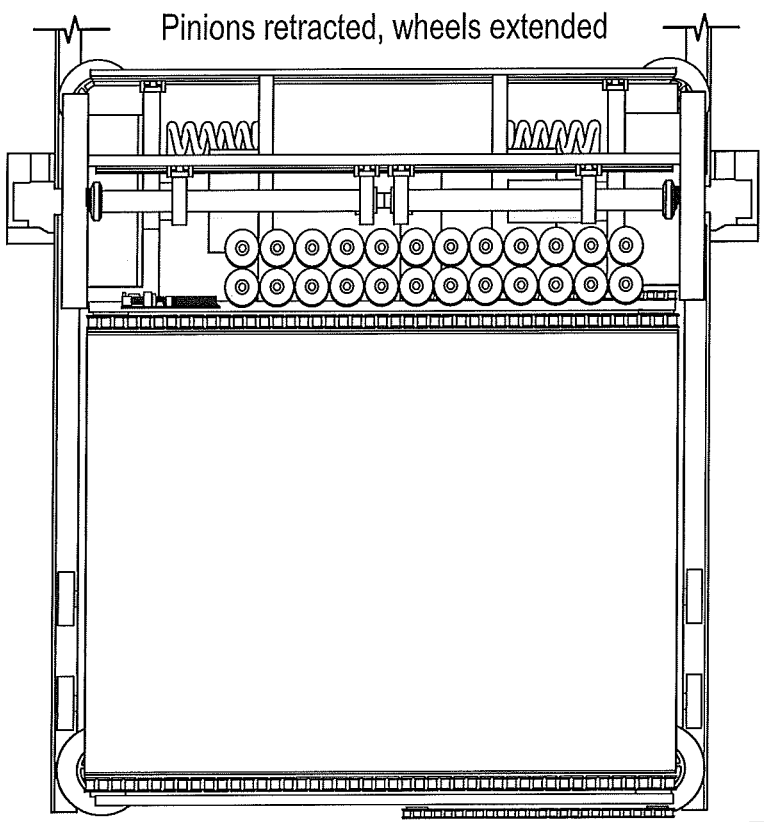
Figure 63B:
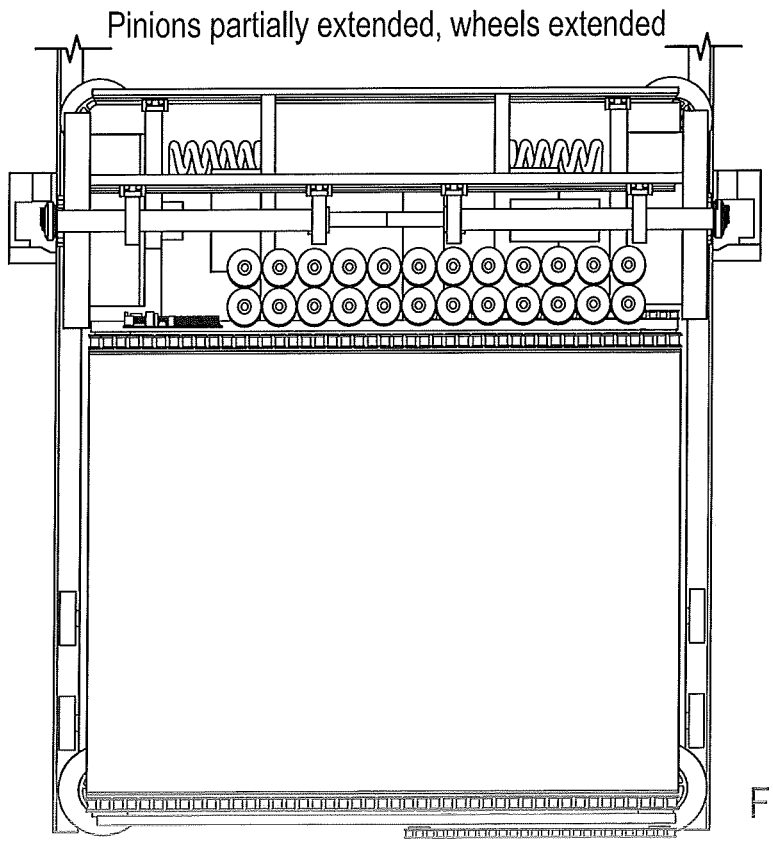
Figure 63C:
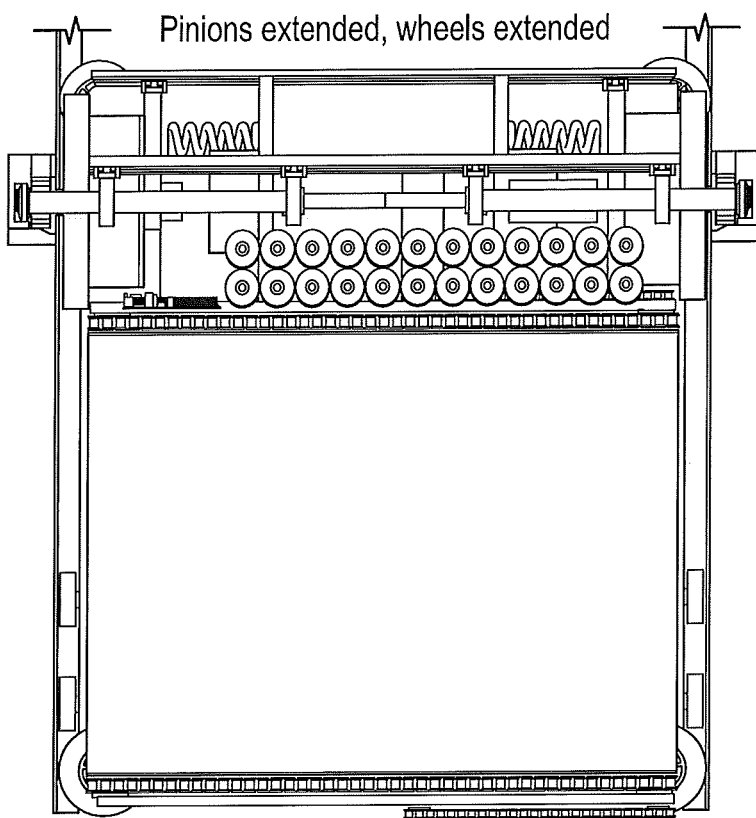
Figure 63D:
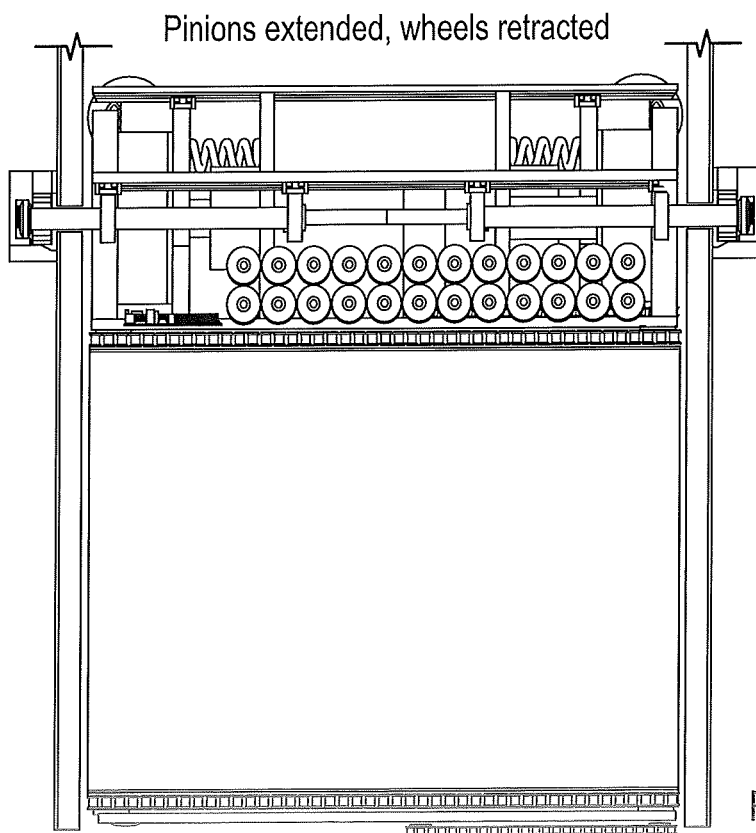
Figure 64:
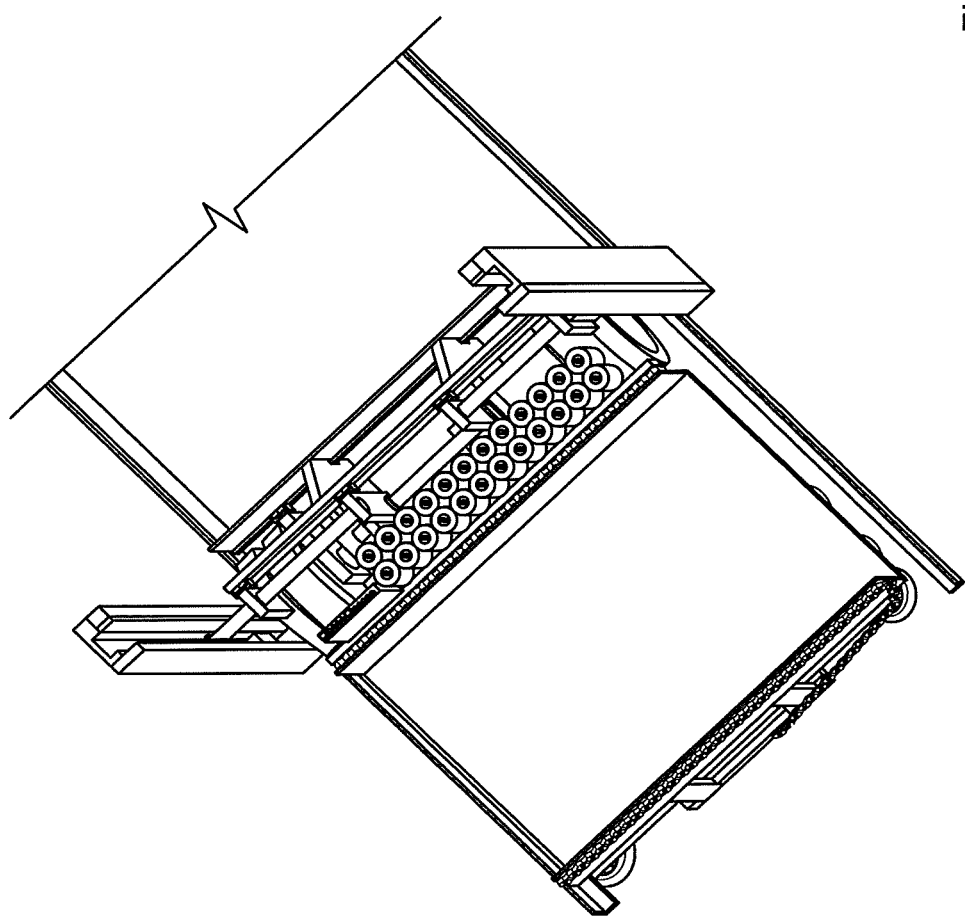
Figure 65:
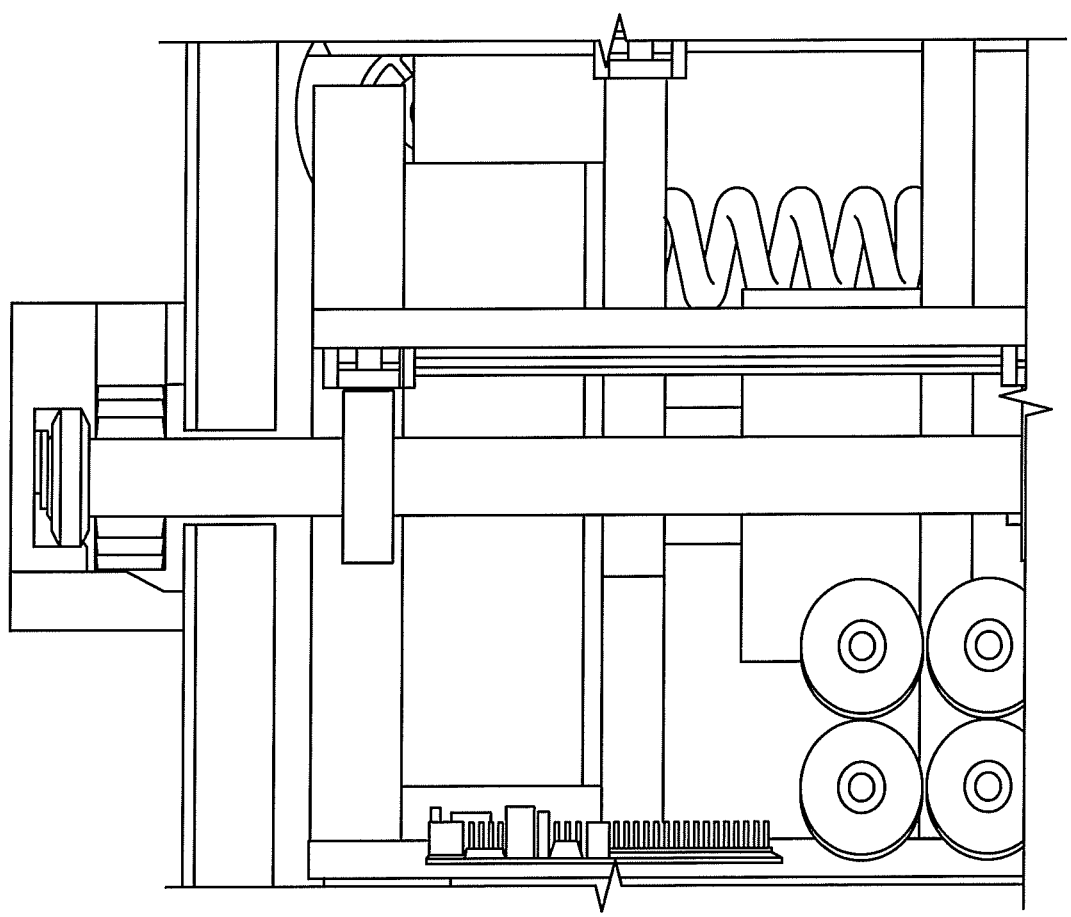
Figure 66:
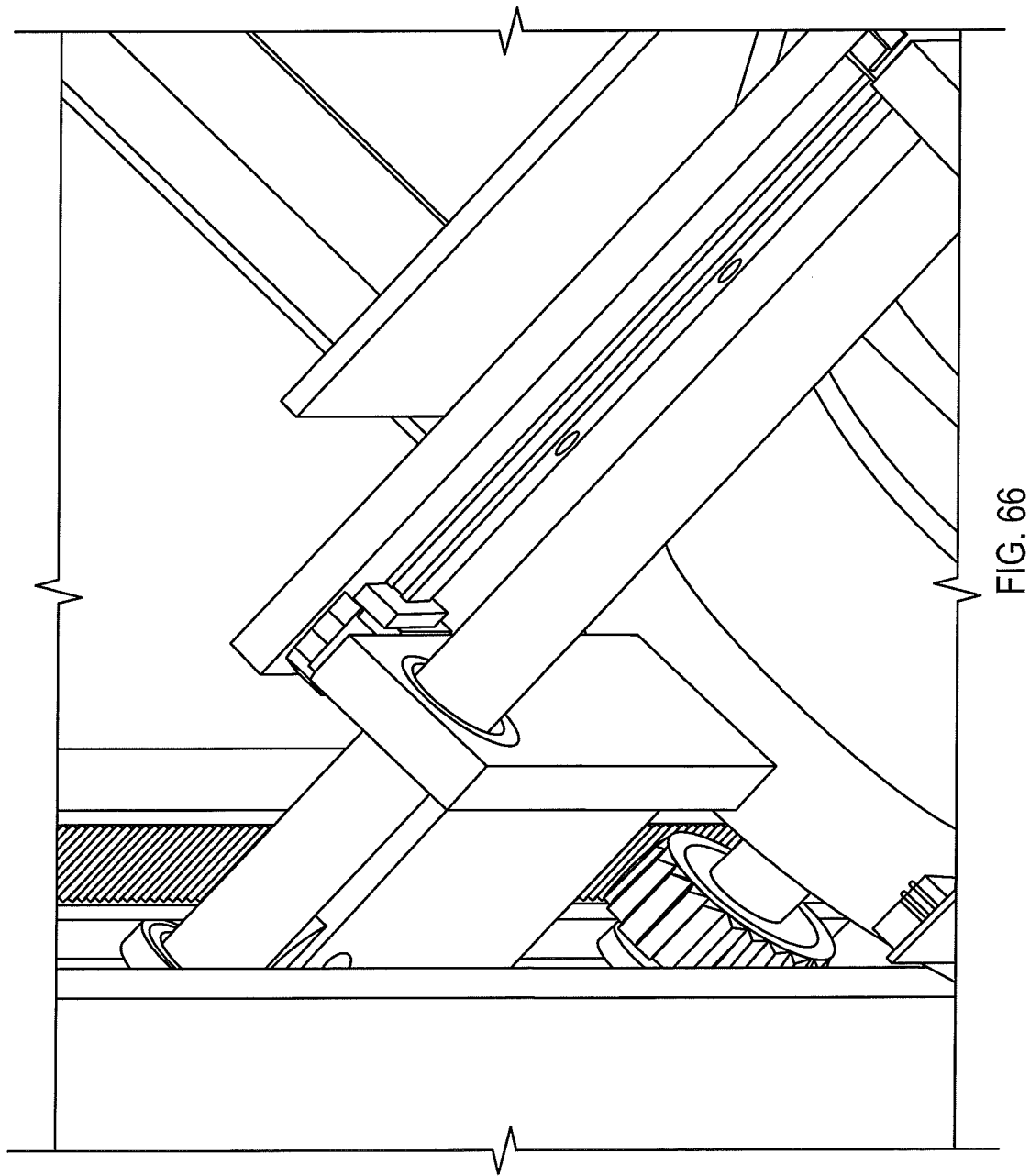

FIG. 52A is a top isometric view of a vehicle illustrating a case or tote transfer mechanism in accordance with aspects of the disclosed embodiment;

FIG. 52B is a top isometric view of a vehicle illustrating a case or tote transfer mechanism in accordance with aspects of the disclosed embodiment;

FIG. 52C is a top isometric view of a vehicle illustrating a case or tote transfer mechanism in accordance with aspects of the disclosed embodiment;

FIG. 52D is a top isometric view of a vehicle illustrating a case or tote transfer mechanism in accordance with aspects of the disclosed embodiment;

FIG. 52E is a top isometric view of a vehicle illustrating a case or tote transfer mechanism in accordance with aspects of the disclosed embodiment;

FIG. 52F is a top isometric view of a vehicle illustrating a case or tote transfer mechanism in accordance with aspects of the disclosed embodiment;

FIG. 52G is a top isometric view of a vehicle illustrating a case or tote transfer mechanism in accordance with aspects of the disclosed embodiment;

FIG. 52H is a top isometric view of a vehicle illustrating a case or tote transfer mechanism in accordance with aspects of the disclosed embodiment;

FIG. 52I is a top isometric view of a vehicle illustrating a case or tote transfer mechanism in accordance with aspects of the disclosed embodiment;

FIG. 52J is a top isometric view of a vehicle illustrating a case or tote transfer mechanism in accordance with aspects of the disclosed embodiment;

FIG. 52K is a schematic illustration of a portion of a case or tote transfer mechanism in accordance with aspects of the disclosed embodiment;

FIG. 53A is a partial top isometric view of a vehicle illustrating a case or tote transfer mechanism in accordance with aspects of the disclosed embodiment;

FIG. 53B is a partial top isometric view of a vehicle illustrating a case or tote transfer mechanism in accordance with aspects of the disclosed embodiment;

FIG. 53C is a partial top isometric view of a vehicle illustrating a case or tote transfer mechanism in accordance with aspects of the disclosed embodiment;

FIG. 53D is a partial top isometric view of a vehicle illustrating a case or tote transfer mechanism in accordance with aspects of the disclosed embodiment;

FIG. 53E is a partial top isometric view of a vehicle illustrating a case or tote transfer mechanism in accordance with aspects of the disclosed embodiment;

FIG. 53F is a partial top isometric view of a vehicle illustrating a case or tote transfer mechanism in accordance with aspects of the disclosed embodiment;

FIG. 53G is a partial top isometric view of a vehicle illustrating a case or tote transfer mechanism in accordance with aspects of the disclosed embodiment;

FIG. 53H is a partial top isometric view of a vehicle illustrating a case or tote transfer mechanism in accordance with aspects of the disclosed embodiment;

FIG. 53I is a partial top isometric view of a vehicle illustrating a case or tote transfer mechanism in accordance with aspects of the disclosed embodiment;

FIG. 53J is a partial top isometric view of a vehicle illustrating a case or tote transfer mechanism in accordance with aspects of the disclosed embodiment;

FIG. 53K is a partial top isometric view of a vehicle illustrating a case or tote transfer mechanism in accordance with aspects of the disclosed embodiment;

FIG. 54A is an isometric view of a workstation in accordance with aspects of the disclosed embodiment;

FIG. 54B is an isometric view of a workstation in accordance with aspects of the disclosed embodiment;

FIG. 54C is an isometric view of a workstation in accordance with aspects of the disclosed embodiment;

FIG. 54D is an isometric view of a workstation in accordance with aspects of the disclosed embodiment;

FIG. 54E is an isometric view of a workstation in accordance with aspects of the disclosed embodiment;

FIG. 54F is a schematic illustration of a portion of a workstation in accordance with aspects of the disclosed embodiment;

FIG. 54G is a schematic illustration of a portion of storage structure in accordance with aspects of the disclosed embodiment;

FIG. 55 is a flow diagram in accordance with aspects of the disclosed embodiment;

FIG. 56 is a flow diagram in accordance with aspects of the disclosed embodiment;

FIG. 57 is a flow diagram in accordance with aspects of the disclosed embodiment;

FIG. 58 is a schematic illustration of a portion of a workstation in accordance with aspects of the disclosed embodiment; and FIG. 59 is a schematic illustration of a portion of a workstation in accordance with aspects of the disclosed embodiment; and FIGS. 60A, 60B, 60C, 60D, 60E, 60F and 60G represent a step-wise progression of the vehicle transitioning from horizontal movement to vertical movement, in accordance with aspects of the disclosed embodiment FIG. 61 is an isometric view of the vehicle wherein the pinion and counterbearing assembly are extended outward as when engaged in the vertical tower with the power pickup located on the same counterbearing assembly;

FIG. 62 is a diagrammatic illustration of the bottom of the vehicle with the stepper motor and opposing thread leadscrews shown that drive wheels inward and outward, as well as the servomotor with gearhead that drives longitudinal driveshaft used to power Tote pull-and-push mechanism;

FIG. 63A is a top view of the vehicle with wheels extended outward and pinions/counterbearings retracted inward, shown at a time when the vehicle arrives at the vertical tower location;

FIG. 63B is a top view of the vehicle with pinion/counterbearing partially extended into the vertical tower channels;

FIG. 63C is a top view of the vehicle with pinion/counterbearing fully extended in the vertical tower channels, wherein a bearing orthogonal to the counterbearings mates with the back of the channel to ensure the vehicle tracks vertically, the pinions remain aligned with the racks, and the power pickups are not excessively forced into the conductor rails;

FIG. 63D is a top view of the vehicle after it has driven vertically above the horizontal rails, wherein the wheels are retracted inward of the Alphabot envelope to allow it to vertically pass through higher horizontal rail pairs;

FIG. 64 is a view of the vehicle with covers removed to show the pinion/counterbearing assemblies, wherein the pinion/counterbearing assemblies are guided by linear rails, and driven inward/outward by the stepper motor with opposed thread leadscrews shown;

FIG. 65 is a top view of counterbearings, orthogonal bearing, and pinion, engaged within the vertical tower channel, wherein the power pickup on the pinion/counterbearing assembly is extended to mate with the conductor rail in the back of the channel and the power pickups have light spring compliance to ensure they maintain constant contact with the conductor rail, without excessive force; and FIG. 66 is an isometric view of counterbearings, orthogonal bearing, and pinion, engaged within the vertical tower channel, wherein the power pickup on the pinion/counterbearing assembly is extended to mate with the conductor rail in the back of the channel, and the linear rail used to guide the pinion/counterbearing assembly is shown.

FIGS. 67A-68I illustrate an embodiment of a novel tote and novel system for transferring totes between a mobile robot and tote holding locations without generating vertical forces that can otherwise overturn the tote or disrupt proper seating of a tote on the mobile robot or tote holding location.

DETAILED DESCRIPTION OF THE EMBODIMENTS

The disclosed embodiment may be described as an order-fulfillment system for use in supply chains, for example in retail supply chains. The embodiment is disclosed for fulfilling orders from retail stores for cases of products received from manufacturers or for fulfilling orders for discreet product units contained in such cases, referred to herein as "eaches" (other commonly used synonyms include "pieces", "articles", "items"), or generally any articles ordered by stores or individual consumers in less-than-case quantities. While the embodiment can be used in other applications, such as storage and retrieval of parts and work-in-process within manufacturing operations, one field of use is order-fulfillment in retail supply chains.

The embodiments may have the following major component subsystems:

(1) a multi-level rack structure that holds picking stock, generally configured to maximize space utilization by using all available cubic volume, from floor to ceiling;

(2) mobile vehicles or robots, which are autonomous vehicles that perform various transfer and transport functions depending on embodiment, including handling the movement of containers of products (picking stock) between storage locations within the rack structure and workstations;

(3) workstations at which human or robotic pickers transfer cases or eaches either directly into order containers of some form or to intermediate robots which then transfer to order containers, depending on embodiment; and (4) a centralized control system, comprising computers, software, and communications components, which manages the operation of the entire system. An operational system may also include one or more input/output interfaces where product is inducted into the system to replenish the picking stock and completed orders are discharged from the system to be delivered eventually to customers, though the details of that interface will tend to vary across different applications.

In the exemplary each-picking embodiments, the each is the most granular unit of handling, for example, in retail supply chains. Processes to fulfill orders for eaches, usually referred to as "each-picking" or "piece-picking", may be the most labor-intensive of all fulfillment processes, especially using the traditional "picker-to-goods" process models in which pickers move to stationary product-storage locations to pick ordered eaches. In the exemplary embodiment, the word "Tote" is a term commonly used in the field of materials handling for a container that holds materials being stored or handled, and is used hereinafter to refer to both product and order containers.

To maximize picker throughput and achieve a very high or even total level of automation, the disclosed embodiment implements a "goods-to-picker" process model in which autonomous robotic vehicles transport containers of eaches to workstations where stationary pickers (either human or robotic) pick ordered eaches from the containers. The picked eaches may then be ultimately placed into order containers for eventual delivery to customers, either stores or consumers.

By way of example, two each-picking embodiments are disclosed herein, the essential difference between being the "put" process by which the eaches are transferred into the order container. In the first embodiment ("E-1"), this transfer process is the typical "direct-put" process in which the each is transferred in a single move from the product container directly into the order container. The second embodiment ("E-2") features an "indirect-put" process in which this transfer is made in two moves: the picked each is first put into another mobile robot that serves as an intermediate carrier that transports the each to, and then puts it into, the order container.

Both E-1 (direct put) and E-2 (indirect put) may include the following seven elements or subsystems:

(1) Product Totes (hereinafter referred to as "P-Totes") containing the picking stock of eaches used to fulfill orders;

(2) Order Totes (hereinafter referred to as "O-Totes") containing the eaches picked to fulfill orders;

(3) Robotic vehicles that transfer and transport payloads, usually (but not always) Totes, hereinafter referred to as "T-Bots" (or generically as "Bots");

(4) A Tote-Storage Structure (hereinafter referred to as the "TSS"), which provides the structural support for stored Totes (both P-Totes and O-Totes) and also for the Bots operating therein;

(5) Picking Workstations where human or robotic pickers remove eaches from P-Totes and place them into either O-Totes or another T-Bot, depending on embodiment; and (6) A Central Control System (hereinafter referred to as "CCS"), consisting of software, computers, and network equipment, which manages most of the resources within the system (including all of the various robots), orchestrates the entire order-fulfillment process and all related processes, and provides status and control interfaces to human operators of the system and to external systems;

(7) Input/Output ("I/O") Interfaces at which T-Bots discharge Totes leaving the system and receive Totes entering the system.

E-2 (indirect put) further includes two additional elements or subsystems:

(8) T-Bots equipped with Each-Transfer Assemblies that receive and hold eaches picked at the Picking Workstations and then transfer them into target O-Totes (such Bots hereinafter referred to as "Each-Bots" or simply "E-Bots"); and (9) An Order-Loading Structure (hereinafter referred to as "OLS") that provides structural support for O-Totes being loaded and for O-Bots and E-Bots operating therein;

These elements and their respective interoperation are described in greater detail below. It is to be understood that associated with these systems are additional ancillary equipment and subsystems, such as maintenance hoists for use in removing disabled robotic vehicles, safety features for robotic vehicle containment and safe human access, fire-suppression systems, etc.

Figure 1:
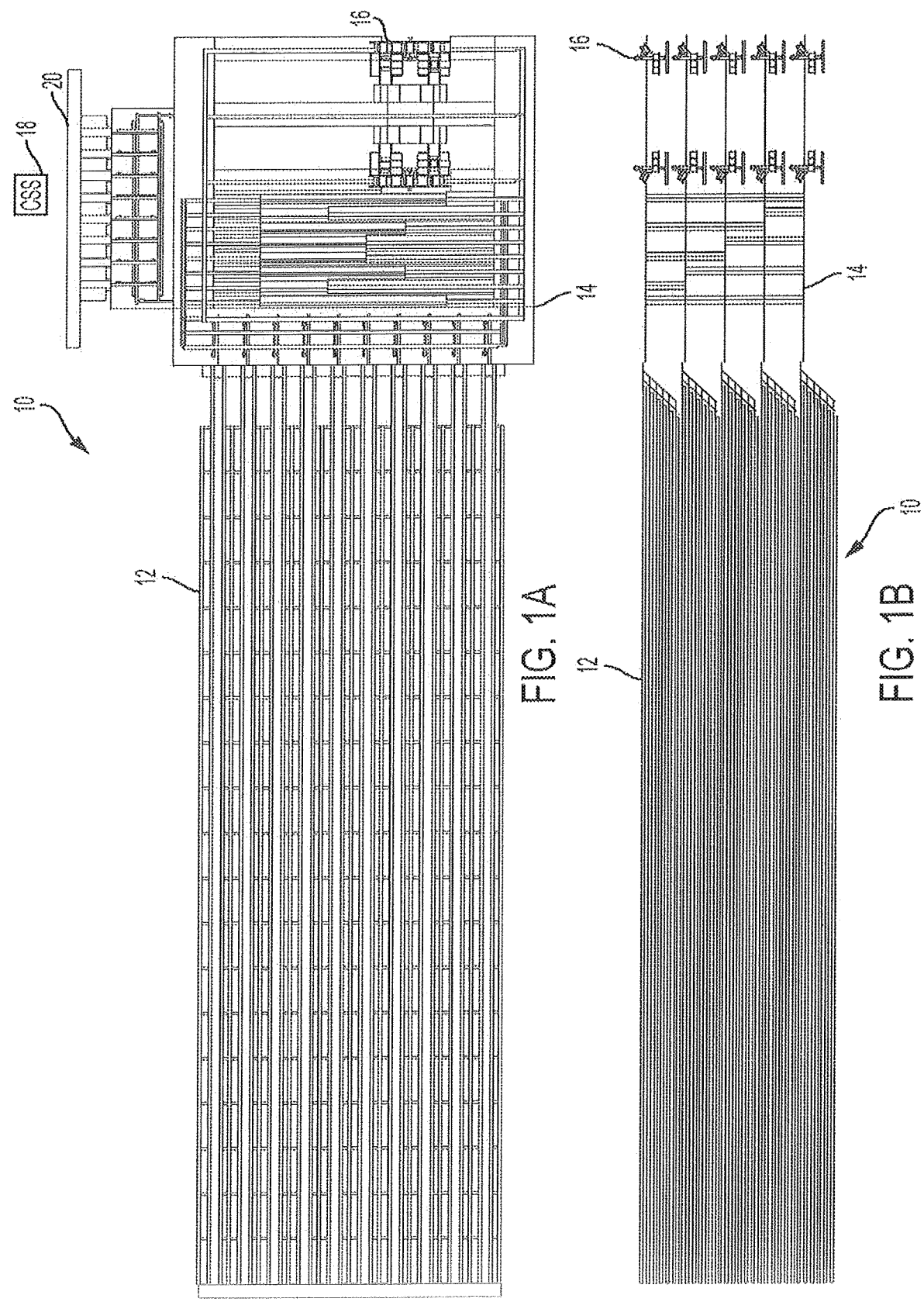
FIG. 1A is a top view of an example order fulfillment system in accordance with aspects of the disclosed embodiment.
FIG. 1B is a side view of an example order fulfillment system in accordance with aspects of the disclosed embodiment.

Referring to FIG. 1A, there is shown a schematic top plan view of an example order fulfillment system 10. Although the present embodiment will be described with reference to the embodiments shown in the drawings, it should be understood that the present invention may be embodied in many forms of alternative embodiments. In addition, any suitable size, shape or type of materials or elements could be used. Order fulfillment system 10 and the disclosed embodiments may have features as described and/or may have in any suitable combination features as described in U.S. patent application Ser. No. 14/213,187 filed Mar. 14, 2014 and entitled "Automated Systems for Transporting Payloads" hereby incorporated by reference in its entirety. Referring also to FIG. 1B, there is shown a side view of example order fulfillment system 10. Order fulfillment system 10 may have product Totes and order Totes with autonomous mobile robots or vehicles that transfer and transport Totes. Tote storage structure 12 is shown as structural support for stored Totes and also for the mobile robots operating therein and as will be described in greater detail. Mobile robot transit structures 14 are shown whereby mobile robots travel in three dimensions: horizontally on planar transit decks that interconnect the rack structure and workstations; and vertically on vertical tracks or ramps that interconnect storage lanes and workstations at multiple elevations. Picking workstations 16 are shown arrayed at multiple elevations where human or robotic pickers remove eaches from product Totes and place them into either order Totes or a robot, depending on the system configuration. Central control system 18 is shown consisting of software, computers, and network equipment, which manages system resources as will be described, for example with respect to FIG. 19. Input/output interface 20 is shown as a conveyor with spurs where mobile robots receive Totes entering the system (filled product Totes and empty order Totes) and discharge Totes leaving the system (empty product Totes and filled order Totes) at the spurs.

Figure 2:
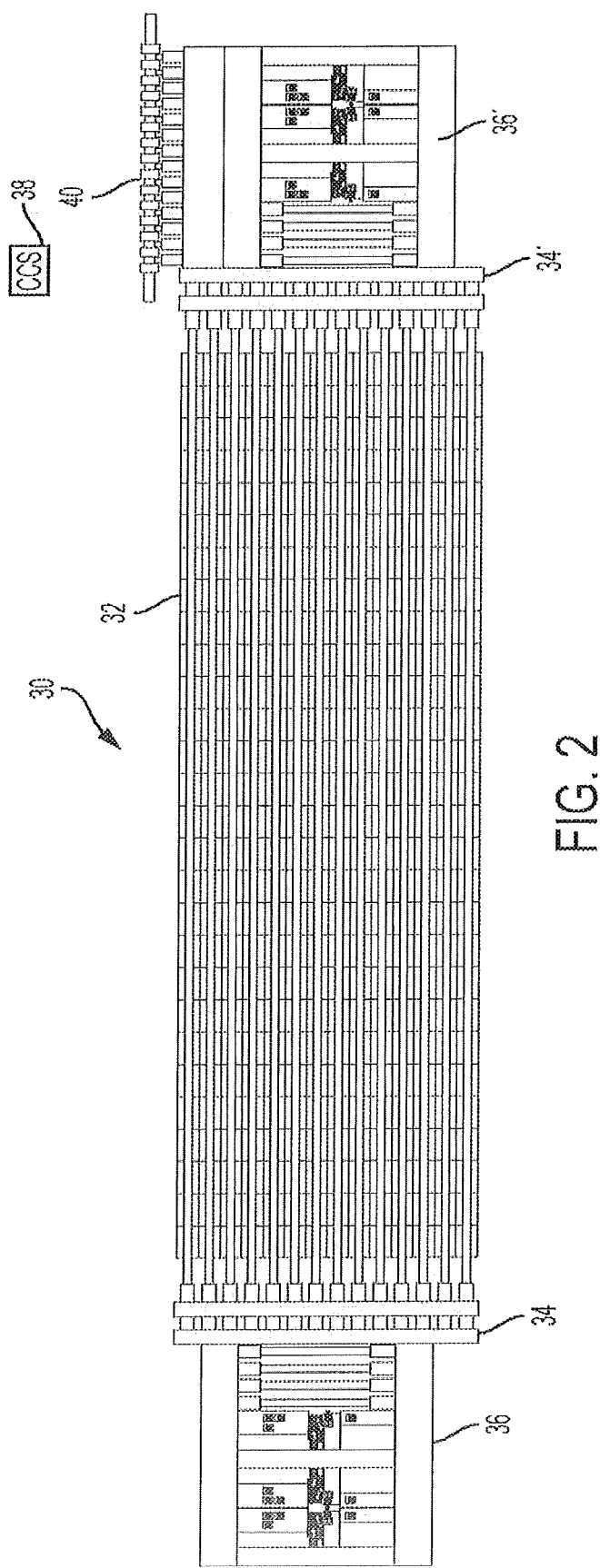
FIG. 2 is a top view of an example order fulfillment system in accordance with aspects of the disclosed embodiment.

Referring now to FIG. 2, there is shown a top view of example order fulfillment system 30. Order fulfillment system 30 is configured using aisle and transit ramps and may have product Totes and order Totes with autonomous mobile robots or vehicles that transfer and transport Totes. Tote storage structure 32 is shown as structural support for stored Totes and also for the mobile robots operating therein and as will be described in greater detail. Mobile robot transit structures 34, 34' are shown whereby mobile robots travel in three dimensions: horizontally on planar transit decks that interconnect the rack structure and workstations; and vertically on vertical tracks or ramps that interconnect storage lanes and workstations at multiple elevations. Picking workstations 36, 36' are shown arrayed at multiple elevations where human or robotic pickers remove eaches from product Totes and place them into either order Totes or a mobile robot, depending on the system configuration. Central control system 38 is shown consisting of software, computers, and network equipment, which manages system resources as will be described, for example with respect to FIG. 19. Input/output interface 40 is shown as a conveyor with spurs where mobile robots receive Totes entering the system (filled product Totes and empty order Totes) and discharge Totes leaving the system (empty product Totes and filled order Totes) at the spurs.

Figure 3:
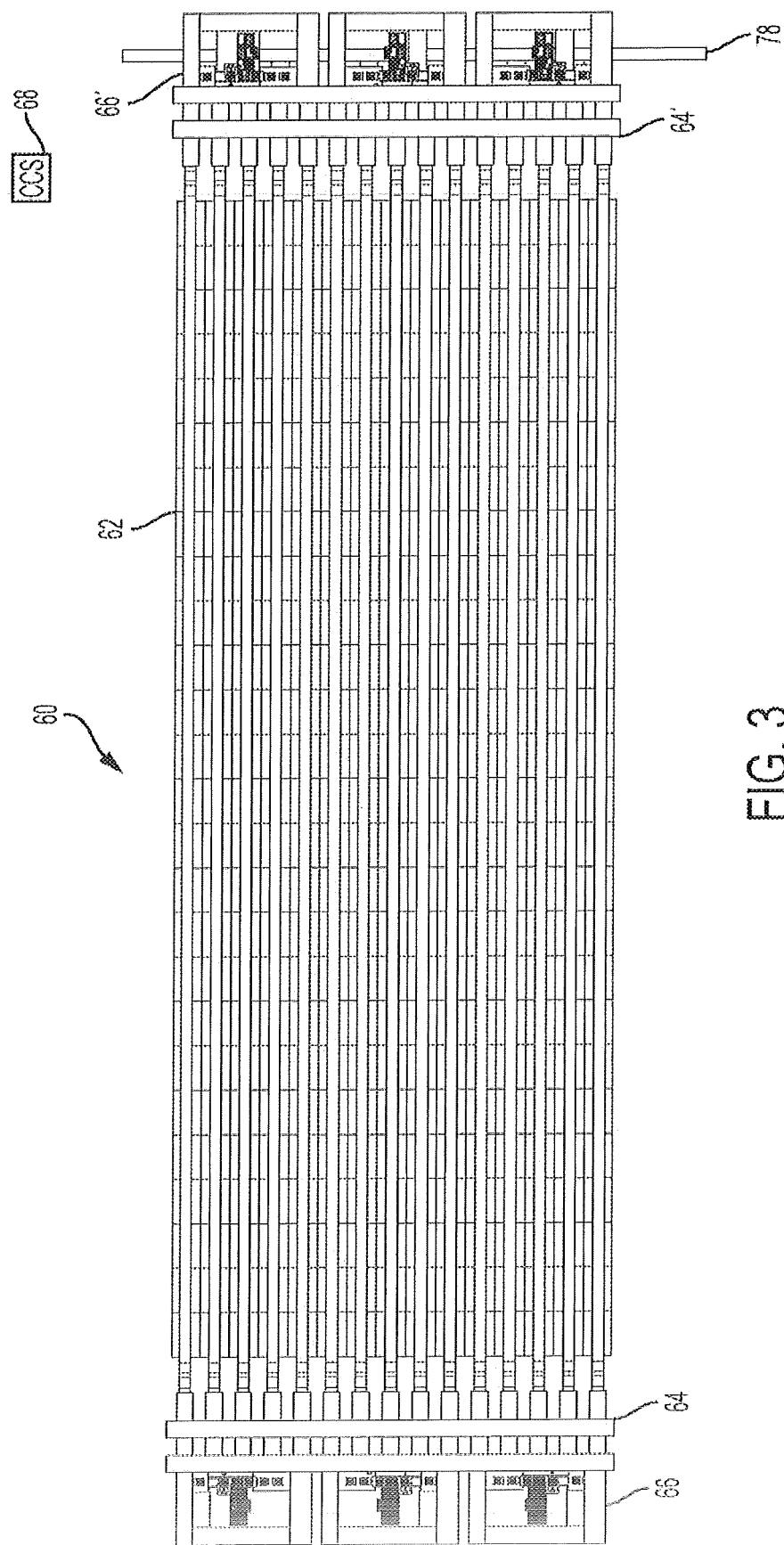
FIG. 3 is a top view of an example order fulfillment system in accordance with aspects of the disclosed embodiment.

Referring now to FIG. 3, there is shown a top view of example order fulfillment system 60. Order fulfillment system 60 is configured using mobile robot towers and may have product Totes and order Totes with autonomous mobile robots or vehicles that transfer and transport Totes. Tote storage structure 62 is shown as structural support for stored Totes and also for the mobile robots operating therein and as will be described in greater detail. Mobile robot transit structures 64, 64' are shown whereby mobile robots travel in three dimensions: horizontally on planar transit decks that interconnect the rack structure and workstations; and vertically on vertical tracks or ramps that interconnect storage lanes and workstations at multiple elevations. Picking workstations 66, 66' are shown arrayed at multiple elevations where human or robotic pickers remove eaches from product Totes and place them into either order Totes or a mobile robot, depending on the system configuration. Central control system 68 is shown consisting of software, computers, and network equipment, which manages system resources as will be described, for example with respect to FIG. 19. Input/output interface 70 is shown as a conveyor with spurs where mobile robots receive Totes entering the system (filled product Totes and empty order Totes) and discharge Totes leaving the system (empty product Totes and filled order Totes) at the spurs. System 60 may utilize vertical tracks or towers allowing the system I/O 70 to have its own deck.

Figure 4:
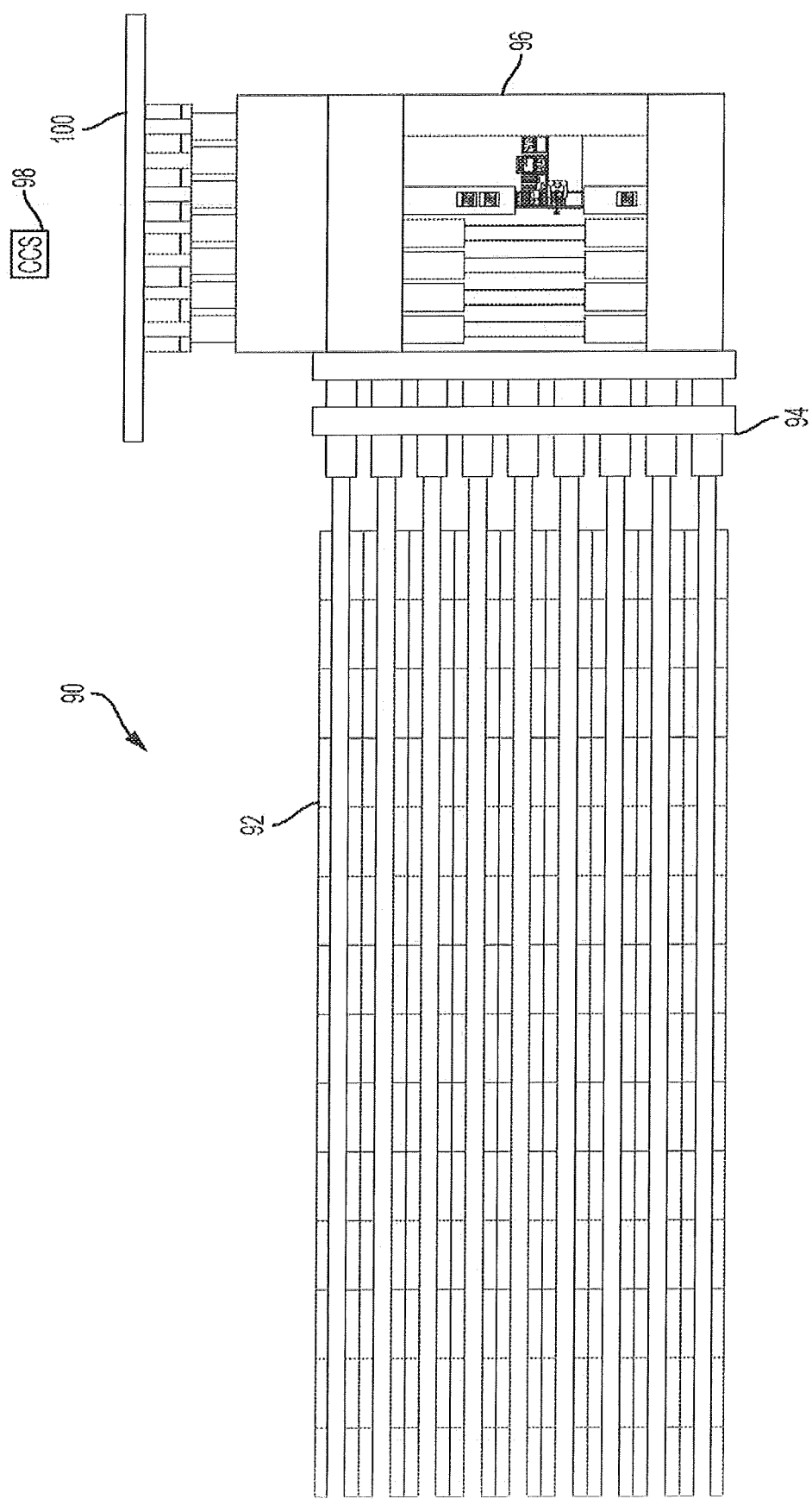
FIG. 4 is a top view of an example order fulfillment system in accordance with aspects of the disclosed embodiment.

Referring now to FIG. 4, there is shown a top view of example order fulfillment system 90. Order fulfillment system 90 may have product Totes and order Totes with autonomous mobile robots or vehicles that transfer and transport Totes. Tote storage structure 92 is shown as structural support for stored Totes and also for the mobile robots operating therein and as will be described in greater detail. Mobile robot transit structures 94 are shown whereby mobile robots travel in three dimensions: horizontally on planar transit decks that interconnect the rack structure and workstations; and vertically on vertical tracks or ramps that interconnect storage lanes and workstations at multiple elevations. Picking workstations 96 are shown arrayed at multiple elevations where human or robotic pickers remove eaches from product Totes and place them into either order Totes or a mobile robot, depending on the system configuration. Central control system 98 is shown consisting of software, computers, and network equipment, which manages system resources as will be described, for example with respect to FIG. 19. Input/output interface 100 is shown as a conveyor with spurs where mobile robots receive Totes entering the system (filled product Totes and empty order Totes) and discharge Totes leaving the system (empty product Totes and filled order Totes) at the spurs.

Figure 5:
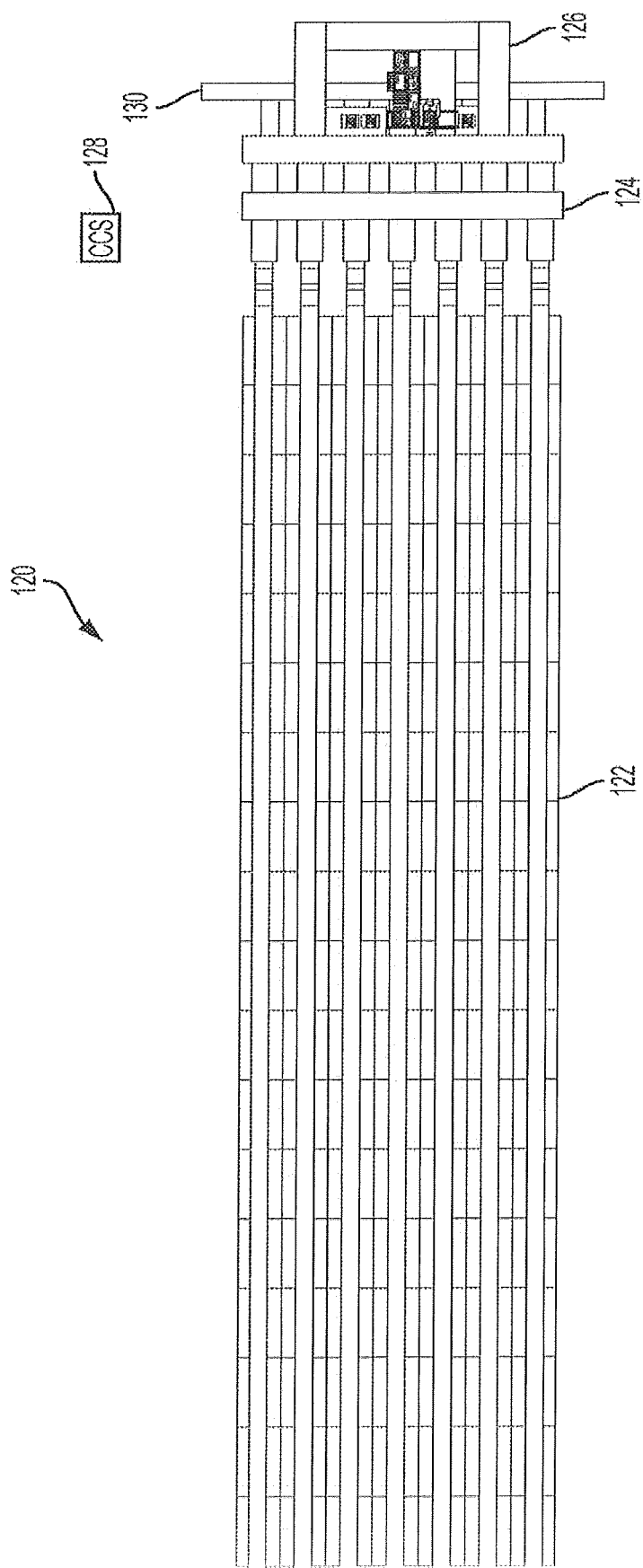
FIG. 5 is a top view of an example order fulfillment system in accordance with aspects of the disclosed embodiment.

Referring now to FIG. 5, there is shown a top view of example order fulfillment system 120. Order fulfillment system 120 may have product Totes and order Totes with autonomous mobile robots or vehicles that transfer and transport Totes. Tote storage structure 122 is shown as structural support for stored Totes and also for the mobile robots operating therein and as will be described in greater detail. Mobile robot transit structures 124 are shown whereby mobile robots travel in three dimensions: horizontally on planar transit decks that interconnect the rack structure and workstations; and vertically on vertical tracks or ramps that interconnect storage lanes and workstations at multiple elevations. Picking workstations 126 are shown arrayed at multiple elevations where human or robotic pickers remove eaches from product Totes and place them into either order Totes or a mobile robot, depending on the system configuration. Central control system 128 is shown consisting of software, computers, and network equipment, which manages system resources as will be described, for example with respect to FIG. 19. Input/output interface 130 is shown as a conveyor with spurs where mobile robots receive Totes entering the system (filled product Totes and empty order Totes) and discharge Totes leaving the system (empty product Totes and filled order Totes) at the spurs. System 120 may utilize vertical tracks or towers allowing the system I/O 130 to have its own deck.

Referring now to FIGS. 6A and 6B, there are shown top and side views respectively of example order fulfillment system 150. Order fulfillment system 150 is shown in a single ended bidirectional flow system configuration whereby mobile robots travel bidirectionally within aisles and workstations are configured on a single end. Order fulfillment system 150 may have product Totes and order Totes with autonomous mobile robots or vehicles that transfer and transport Totes. Tote storage structure 152 is shown as structural support for stored Totes and also for the mobile robots operating therein and as will be described in greater detail. Mobile robot transit structures 154 are shown whereby mobile robots travel in three dimensions: horizontally on planar transit decks that interconnect the rack structure and workstations; and vertically on vertical tracks or ramps that interconnect storage lanes and workstations at multiple elevations. Picking workstations 156 are shown arrayed at multiple elevations where human or robotic pickers remove eaches from product Totes and place them into either order Totes or a mobile robot, depending on the system configuration. Central control system 158 is shown consisting of software, computers, and network equipment, which manages system resources as will be described, for example with respect to FIG. 19. Input/output interface 160 is shown where mobile robots receive Totes entering the system (filled product Totes and empty order Totes) and discharge Totes leaving the system (empty product Totes and filled order Totes). System 150 may utilize vertical tracks or towers allowing the system I/O 160 to have its own deck. Order fulfillment system 150 may further have order loading structure 162 where order loading structure 162 has features similar to Tote storage structure 152 except where mobile robots may access Totes from both sides of the Tote. Totes travel through system 150 in a bidirectional 164 manner.

Referring now to FIGS. 7A and 7B, there are shown top and side views respectively of example order fulfillment system 180. Order fulfillment system 180 is shown in a double ended bidirectional flow system configuration whereby mobile robots travel bidirectionally within aisles and workstations are configured on both ends. Order fulfillment system 180 may have product Totes and order Totes with autonomous mobile robots or vehicles that transfer and transport Totes. Tote storage structure 182 is shown as structural support for stored Totes and also for the mobile robots operating therein and as will be described in greater detail. Mobile robot transit structures 184, 184' are shown whereby mobile robots travel in three dimensions: horizontally on planar transit decks that interconnect the rack structure and workstations; and vertically on vertical tracks or ramps that interconnect storage lanes and workstations at multiple elevations. Picking workstations 186, 186' are shown arrayed at multiple elevations where human or robotic pickers remove eaches from product Totes and place them into either order Totes or a mobile robot, depending on the system configuration. Central control system 188 is shown consisting of software, computers, and network equipment, which manages system resources as will be described, for example with respect to FIG. 19. Input/output interface 190 is shown where mobile robots receive Totes entering the system (filled product Totes and empty order Totes) and discharge Totes leaving the system (empty product Totes and filled order Totes). System 180 may utilize vertical tracks or towers allowing the system I/O 190 to have its own deck. Order fulfillment system 180 may further have order loading structures 192, 192' where order loading structures 192, 192' has features similar to Tote storage structure 182 except where mobile robots may access Totes from both sides of the Tote. Totes travel through system 180 in a bidirectional 194 manner.

Figure 8A:
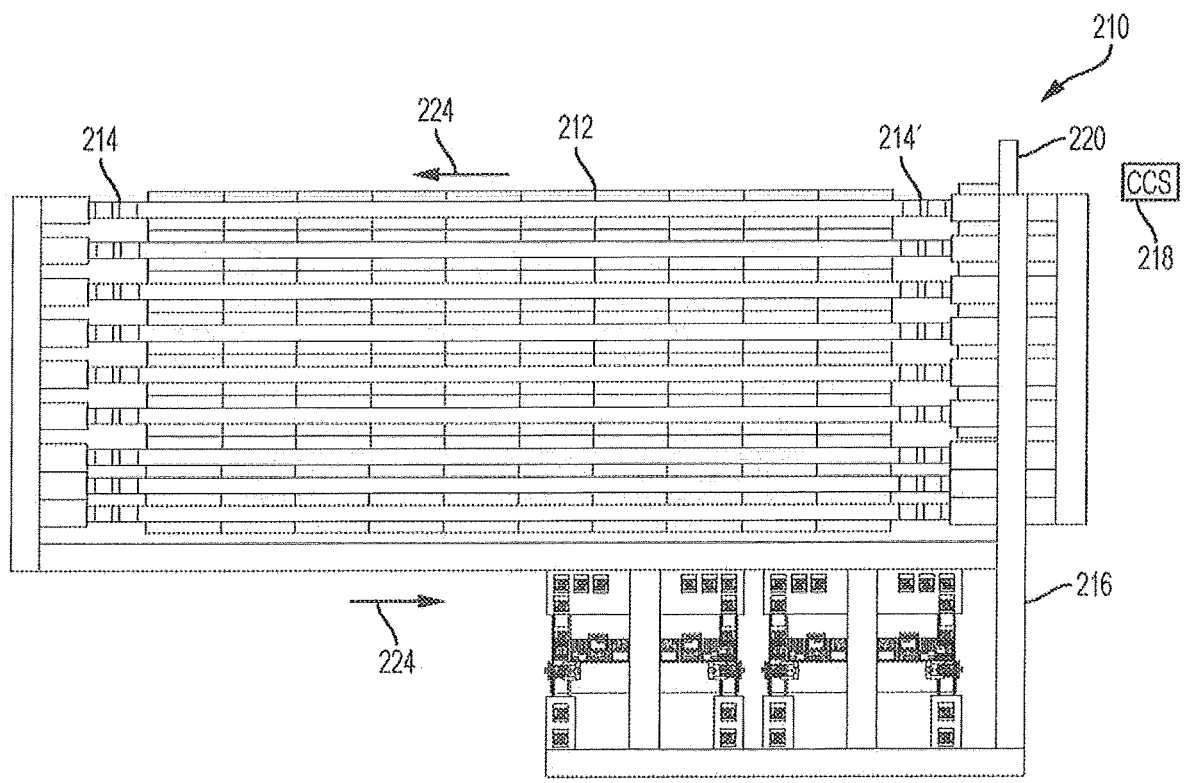
FIG. 8A is a top view of an example order fulfillment system in accordance with aspects of the disclosed embodiment.
Figure 8B:
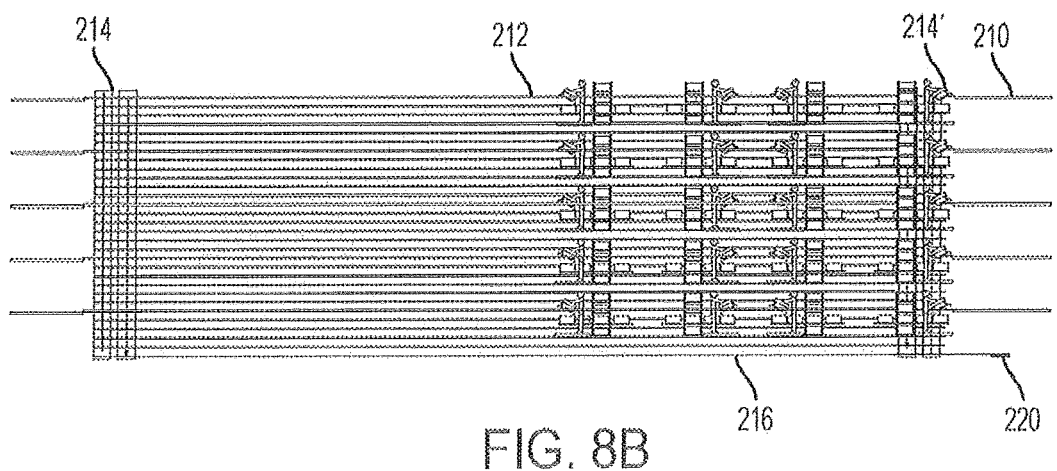
FIG. 8B is a side view of an example order fulfillment system in accordance with aspects of the disclosed embodiment.

Referring now to FIGS. 8A and 8B, there are shown top and side views respectively of example order fulfillment system 210. Order fulfillment system 210 is shown in a double ended unidirectional flow system configuration whereby mobile robots travel unidirectionally within aisles and workstations are configured on the side of system 210 accessible from both ends. Order fulfillment system 210 may have product Totes and order Totes with autonomous mobile robots or vehicles that transfer and transport Totes. Tote storage structure 212 is shown as structural support for stored Totes and also for the mobile robots operating therein and as will be described in greater detail. Mobile robot transit structures 214, 214' are shown whereby mobile robots travel in three dimensions: horizontally on planar transit decks that interconnect the rack structure and workstations; and vertically on vertical tracks or ramps that interconnect storage lanes and workstations at multiple elevations. Picking workstations 216 are shown arrayed at multiple elevations where human or robotic pickers remove eaches from product Totes and place them into either order Totes or a mobile robot, depending on the system configuration. Central control system 218 is shown consisting of software, computers, and network equipment, which manages system resources as will be described, for example with respect to FIG. 19. Input/output interface 220 is shown where mobile robots receive Totes entering the system (filled product Totes and empty order Totes) and discharge Totes leaving the system (empty product Totes and filled order Totes). System 210 may utilize vertical tracks or towers allowing the system I/O 220 to have its own deck. Totes travel through system 210 in a unidirectional 224 manner.

Figure 9:
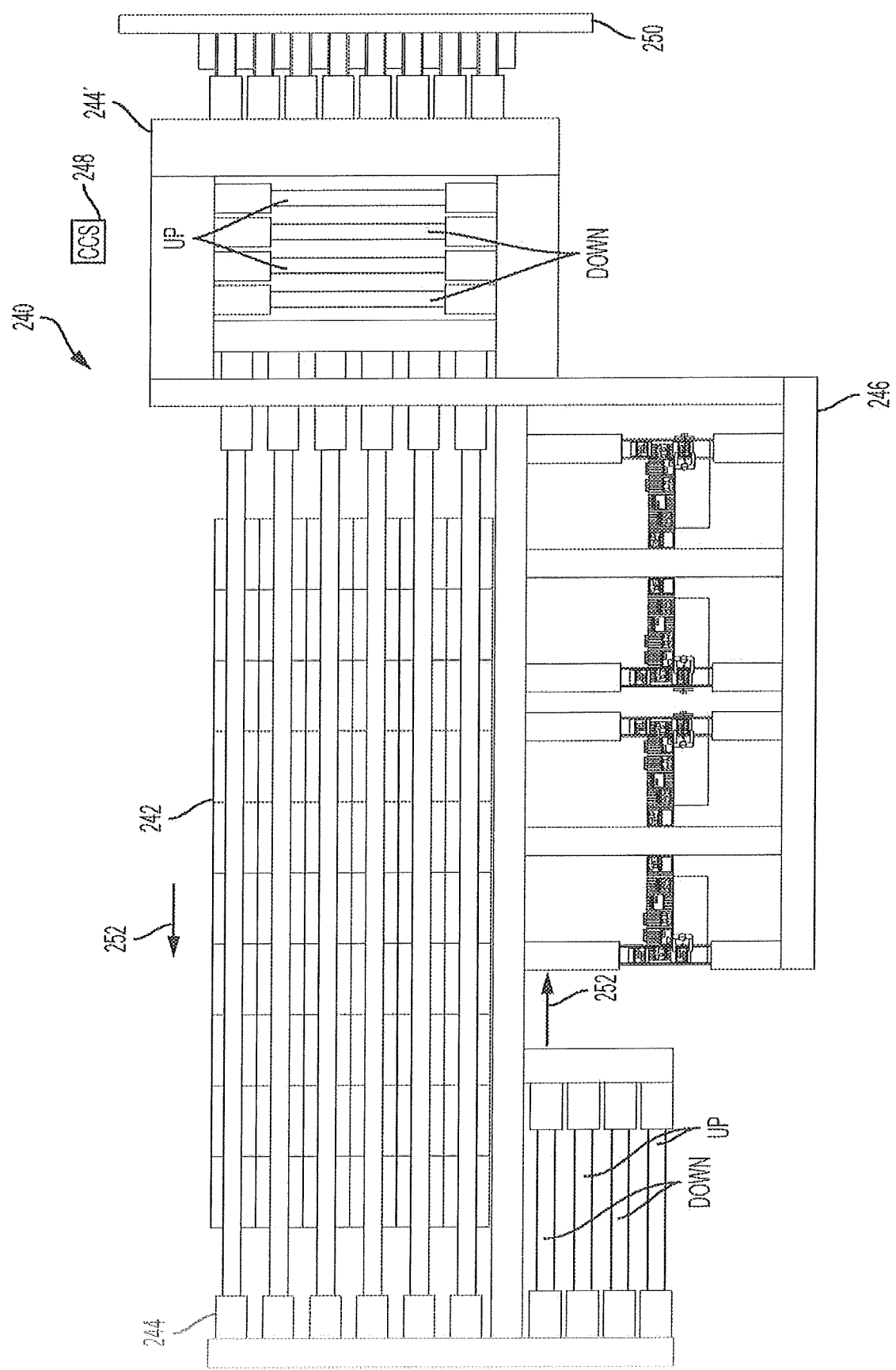
FIG. 9 is a top view of an example order fulfillment system in accordance with aspects of the disclosed embodiment.

Referring now to FIG. 9, there is shown a top view of example order fulfillment system 240. Order fulfillment system 240 is shown in a direct put, double ended unidirectional flow system configuration whereby mobile robots travel unidirectionally within aisles and workstations are configured on the side of system 240 as direct put workstations accessible from both ends. Order fulfillment system 240 may have product Totes and order Totes with autonomous mobile robots or vehicles that transfer and transport Totes. Tote storage structure 242 is shown as structural support for stored Totes and also for the mobile robots operating therein and as will be described in greater detail. Mobile robot transit structures 244, 244' are shown whereby mobile robots travel in three dimensions: horizontally on planar transit decks that interconnect the rack structure and workstations; and vertically on vertical tracks or ramps that interconnect storage lanes and workstations at multiple elevations. Picking workstations 246 are shown arrayed at multiple elevations where human or robotic pickers remove eaches from product Totes and place them into either order Totes or a mobile robot, depending on the system configuration. Central control system 248 is shown consisting of software, computers, and network equipment, which manages system resources as will be described, for example with respect to FIG. 19. Input/output interface 250 is shown where mobile robots receive Totes entering the system (filled product Totes and empty order Totes) and discharge Totes leaving the system (empty product Totes and filled order Totes). Totes travel through system 240 in a unidirectional 252 manner.

Figure 10:
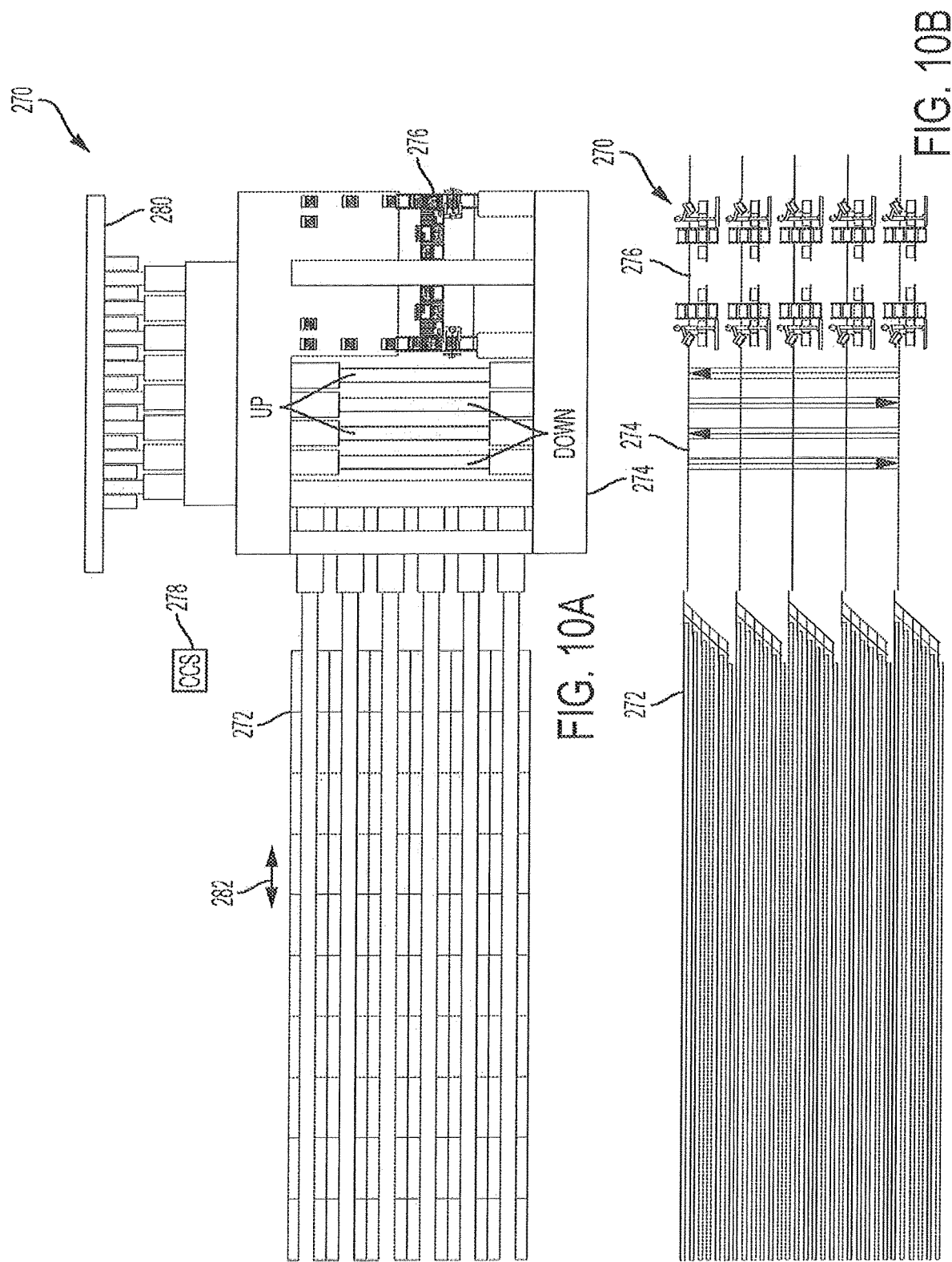
FIG. 10A is a top view of an example order fulfillment system in accordance with aspects of the disclosed embodiment.
FIG. 10B is a side view of an example order fulfillment system in accordance with aspects of the disclosed embodiment.

Referring now to FIGS. 10A and 10B, there are shown top and side views respectively of example order fulfillment system 270. Order fulfillment system 270 is shown in a direct put, single ended bidirectional flow system configuration whereby mobile robots travel bidirectionally within aisles and workstations are configured on the end of system 270 as direct put workstations accessible from one end. Order fulfillment system 270 may have product Totes and order Totes with autonomous mobile robots or vehicles that transfer and transport Totes. Tote storage structure 272 is shown as structural support for stored Totes and also for the mobile robots operating therein and as will be described in greater detail. Mobile robot transit structures 274 are shown whereby mobile robots travel in three dimensions: horizontally on planar transit decks that interconnect the rack structure and workstations; and vertically on vertical tracks or ramps that interconnect storage lanes and workstations at multiple elevations. Picking workstations 276 are shown arrayed at multiple elevations where human or robotic pickers remove eaches from product Totes and place them into either order Totes or a mobile robot, depending on the system configuration. Central control system 278 is shown consisting of software, computers, and network equipment, which manages system resources as will be described, for example with respect to FIG. 19. Input/output interface 280 is shown where mobile robots receive Totes entering the system (filled product Totes and empty order Totes) and discharge Totes leaving the system (empty product Totes and filled order Totes). Totes travel through system 270 in a bidirectional 282 manner.

Figure 11:
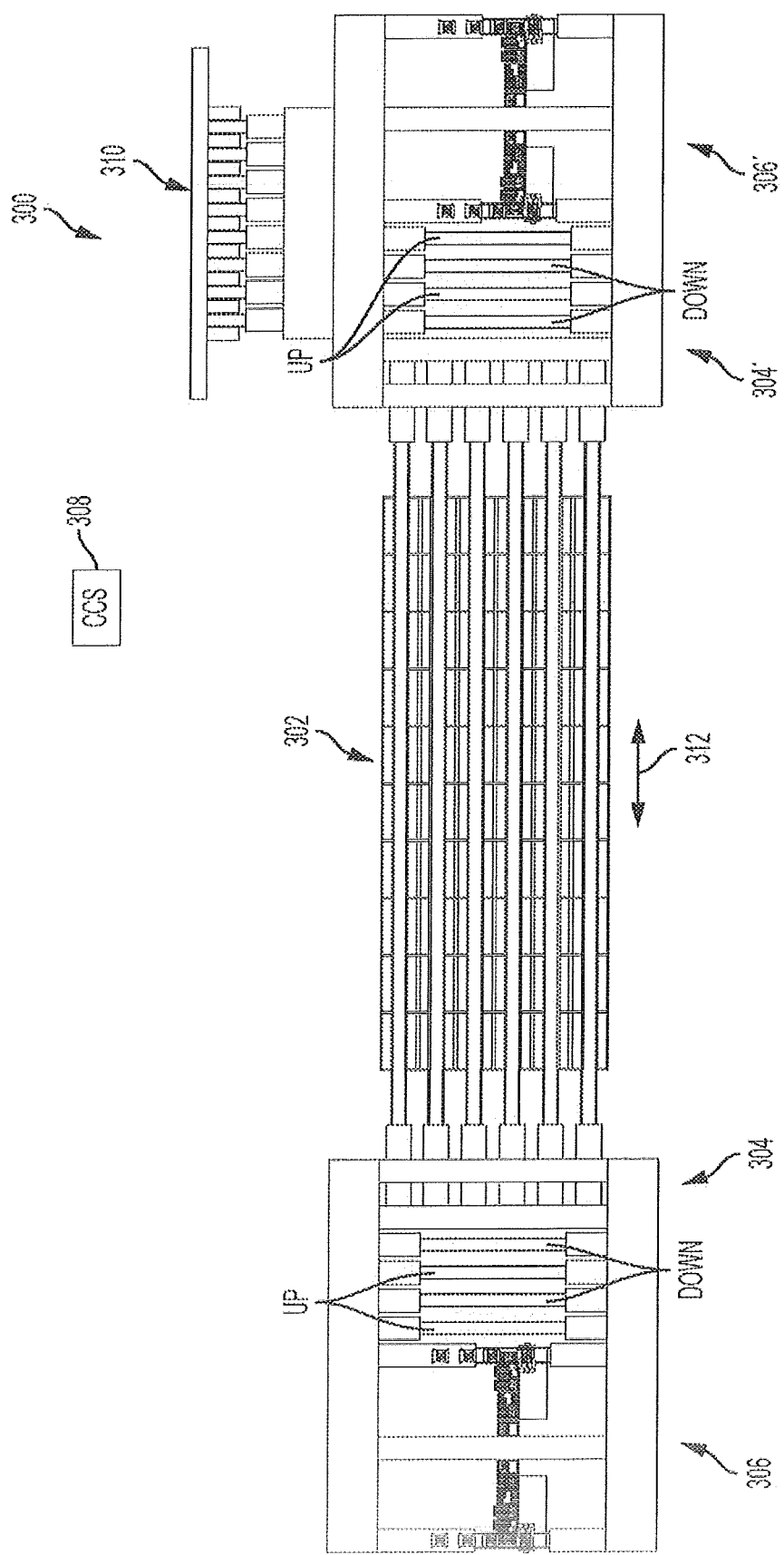
FIG. 11 is a top view of an example order fulfillment system in accordance with aspects of the disclosed embodiment.

Referring now to FIG. 11, there is shown a top view of example order fulfillment system 300. Order fulfillment system 300 is shown in a direct put, double ended bidirectional flow system configuration whereby mobile robots travel bidirectionally within aisles and workstations are configured on both ends of system 300 as direct put workstations accessible from both ends. Order fulfillment system 300 may have product Totes and order Totes with autonomous mobile robots or vehicles that transfer and transport Totes. Tote storage structure 302 is shown as structural support for stored Totes and also for the mobile robots operating therein and as will be described in greater detail. Mobile robot transit structures 304, 304' are shown whereby mobile robots travel in three dimensions: horizontally on planar transit decks that interconnect the rack structure and workstations; and vertically on vertical tracks or ramps that interconnect storage lanes and workstations at multiple elevations. Picking workstations 306, 306' are shown arrayed at multiple elevations where human or robotic pickers remove eaches from product Totes and place them into either order Totes or a mobile robot, depending on the system configuration. Central control system 308 is shown consisting of software, computers, and network equipment, which manages system resources as will be described, for example with respect to FIG. 19. Input/output interface 310 is shown where mobile robots receive Totes entering the system (filled product Totes and empty order Totes) and discharge Totes leaving the system (empty product Totes and filled order Totes). Totes travel through system 300 in a bidirectional 312 manner.

Figure 12:
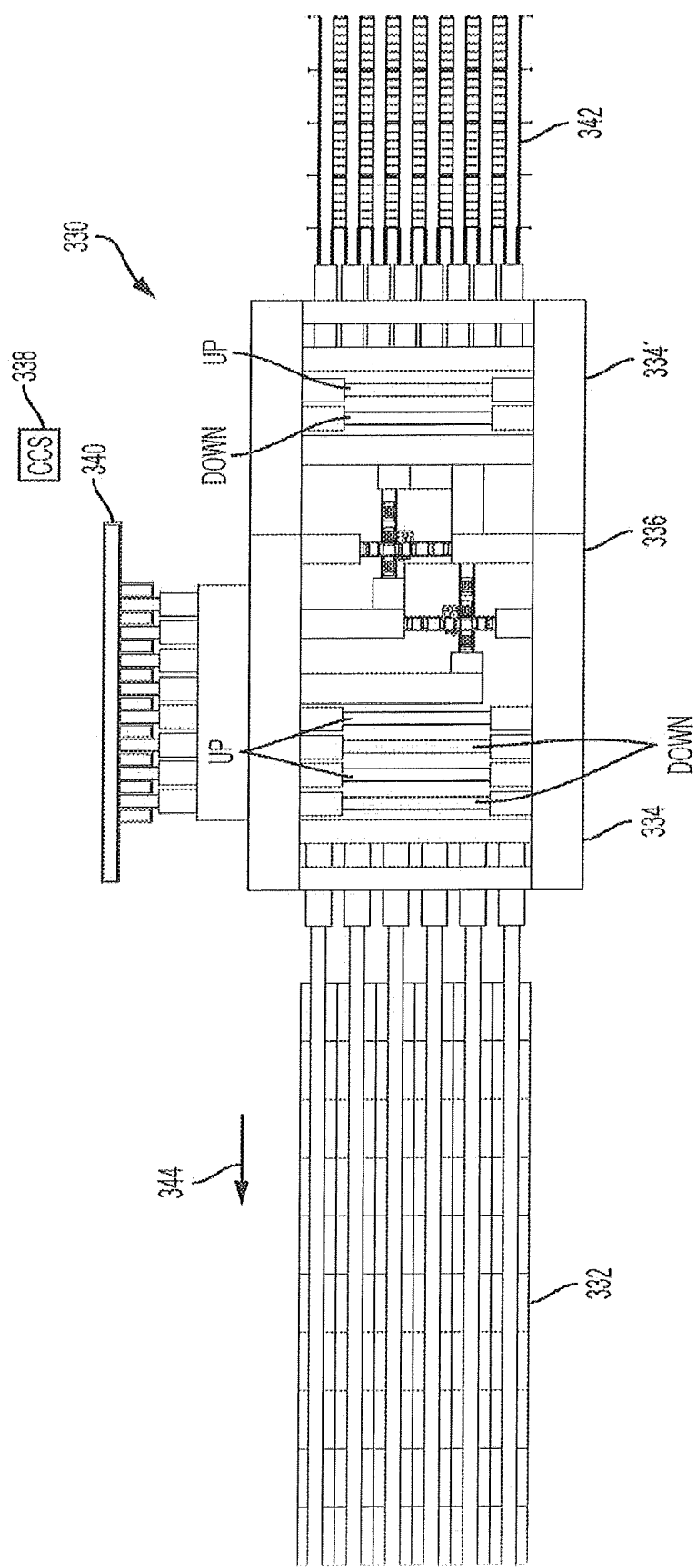
FIG. 12 is a top view of an example order fulfillment system in accordance with aspects of the disclosed embodiment.

Referring now to FIG. 12, there is shown a top view of example order fulfillment system 330. Order fulfillment system 330 is shown in an indirect put, single ended bidirectional flow system configuration whereby mobile robots travel bidirectionally within aisles and workstations are configured on one end of system 330 as indirect put workstations accessible from the middle. Order fulfillment system 330 may have product Totes and order Totes with autonomous mobile robots or vehicles that transfer and transport Totes. Tote storage structure 332 is shown as structural support for stored Totes and also for the mobile robots operating therein and as will be described in greater detail. Mobile robot transit structures 334, 334' are shown whereby mobile robots travel in three dimensions: horizontally on planar transit decks that interconnect the rack structure and workstations; and vertically on vertical tracks or ramps that interconnect storage lanes and workstations at multiple elevations. Picking workstations 336 are shown arrayed at multiple elevations where human or robotic pickers remove eaches from product Totes and place them into either order Totes or a mobile robot, depending on the system configuration. Central control system 338 is shown consisting of software, computers, and network equipment, which manages system resources as will be described, for example with respect to FIG. 19. Input/output interface 340 is shown where mobile robots receive Totes entering the system (filled product Totes and empty order Totes) and discharge Totes leaving the system (empty product Totes and filled order Totes). Order fulfillment system 330 may further have order loading structures 342 where order loading structures 342 has features similar to Tote storage structure 332 except where mobile robots may access Totes from both sides of the Tote. Totes travel through system 330 in a bidirectional 344 manner.

Figure 13:
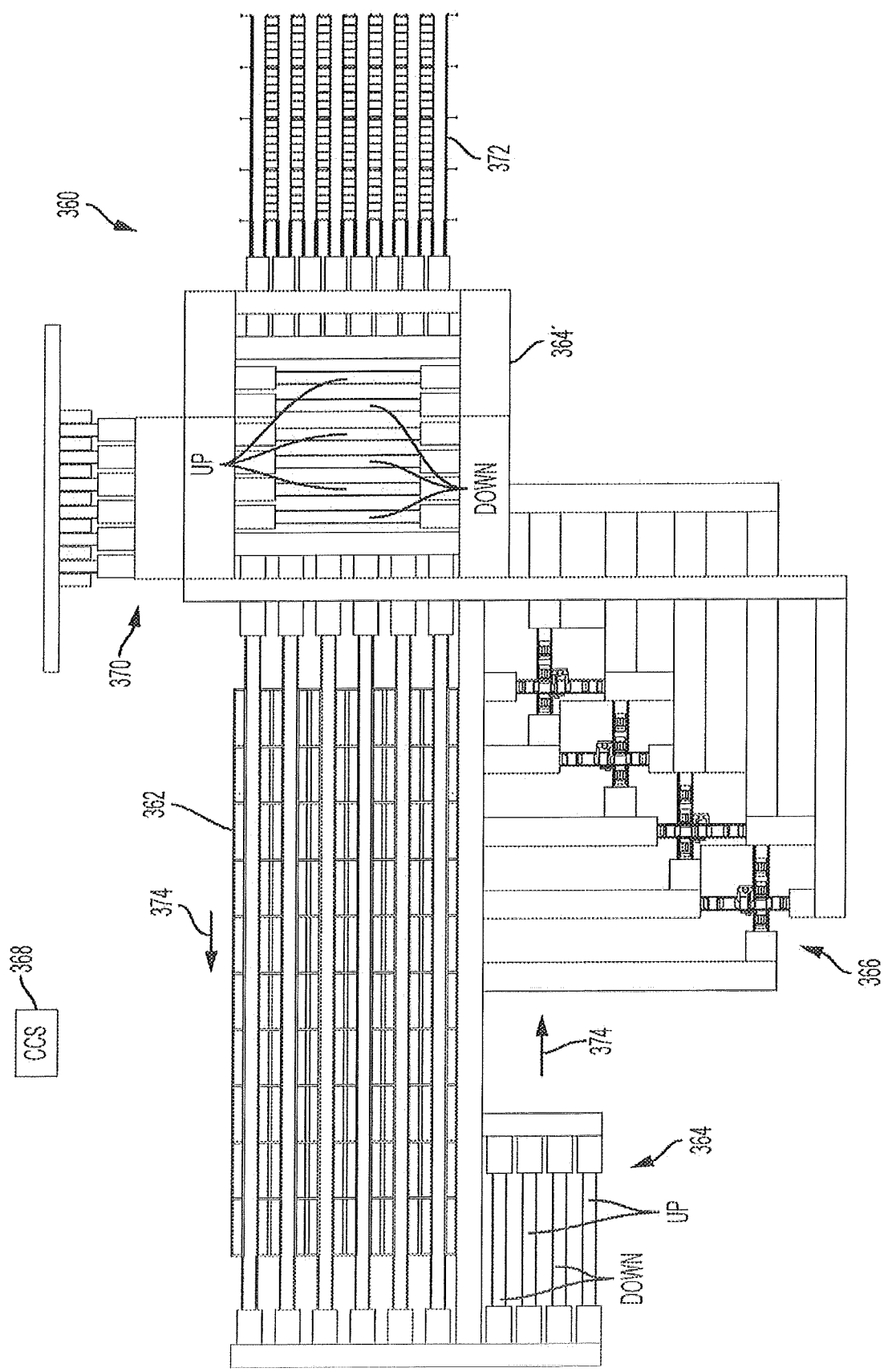
FIG. 13 is a top view of an example order fulfillment system in accordance with aspects of the disclosed embodiment.

Referring now to FIG. 13, there is shown a top view of example order fulfillment system 360. Order fulfillment system 360 is shown in an indirect put, double ended unidirectional flow system configuration whereby mobile robots travel unidirectionally within aisles and workstations are configured on one side of system 360 as indirect put workstations accessible from the middle. Order fulfillment system 360 may have product Totes and order Totes with autonomous mobile robots or vehicles that transfer and transport Totes. Tote storage structure 362 is shown as structural support for stored Totes and also for the mobile robots operating therein and as will be described in greater detail. Mobile robot transit structures 364, 364' are shown whereby mobile robots travel in three dimensions: horizontally on planar transit decks that interconnect the rack structure and workstations; and vertically on vertical tracks or ramps that interconnect storage lanes and workstations at multiple elevations. Picking workstations 366 are shown arrayed at multiple elevations where human or robotic pickers remove eaches from product Totes and place them into either order Totes or a mobile robot, depending on the system configuration. Central control system 368 is shown consisting of software, computers, and network equipment, which manages system resources as will be described, for example with respect to FIG. 19. Input/output interface 370, 370' is shown where mobile robots receive Totes entering the system (filled product Totes and empty order Totes) and discharge Totes leaving the system (empty product Totes and filled order Totes). Order fulfillment system 360 may further have order loading structures 372 where order loading structures 372 has features similar to Tote storage structure 362 except where mobile robots may access Totes from both sides of the Tote. Totes travel through system 360 in a unidirectional 374 manner.

Figure 14:
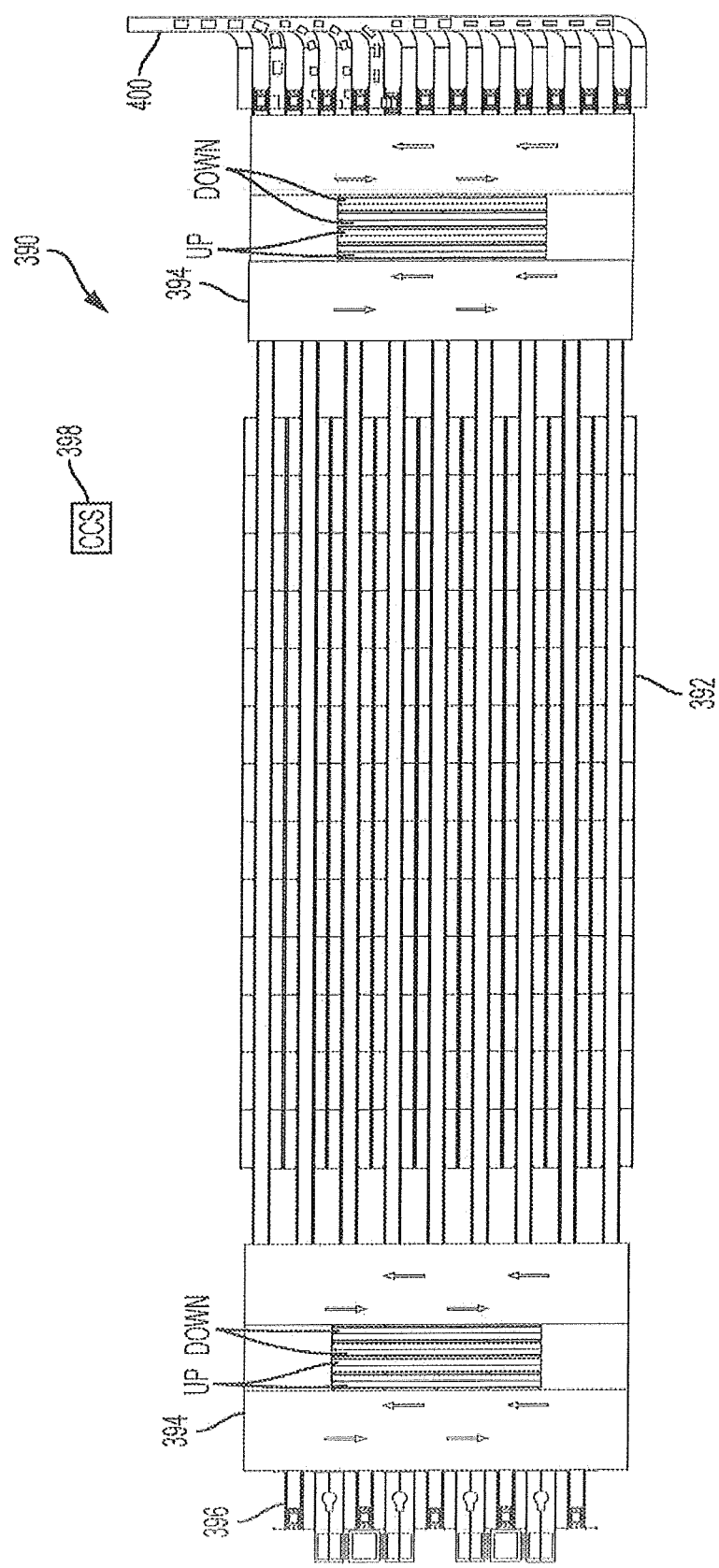
FIG. 14 is a top view of an example order fulfillment system in accordance with aspects of the disclosed embodiment.

Referring now to FIG. 14, there is shown a top view of example order fulfillment system 390. Order fulfillment system 390 is shown in an exemplary case picking configuration. Order fulfillment system 390 may have cases with autonomous mobile robots or vehicles that transfer and transport cases. Case storage structure 392 is shown as structural support for stored cases and also for the mobile robots operating therein and as will be described in greater detail. Mobile robot transit structures 394, 394' are shown whereby mobile robots travel in three dimensions: horizontally on planar transit decks that interconnect the rack structure and workstations; and vertically on vertical tracks or ramps that interconnect storage lanes and workstations at multiple elevations. Palletizing workstations 396 are shown arrayed at multiple elevations where human or robotic pickers remove cases (after being placed by mobile robots) from shelves and place them on pallets which subsequently may be wrapped and exit via conveyor or otherwise. Central control system 398 is shown consisting of software, computers, and network equipment, which manages system resources as will be described, for example with respect to FIG. 19. Input interface 400 is shown where mobile robots receive cases entering the system via conveyor where the mobile robots may transport one or more cases to the case storage structure 392.

Figure 15:
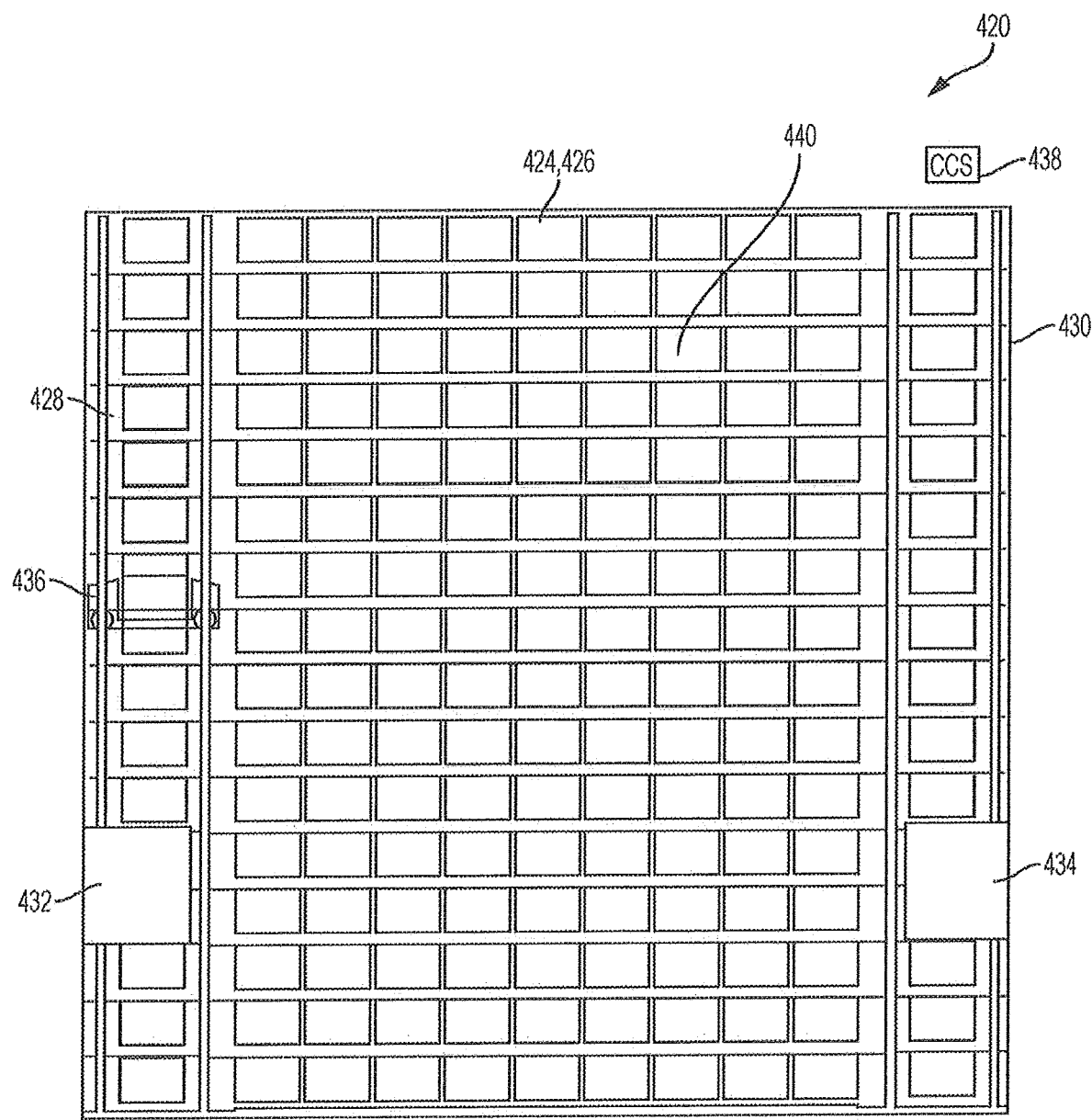
FIG. 15 is a side view of an example order fulfillment system in accordance with aspects of the disclosed embodiment.
Figure 16A:
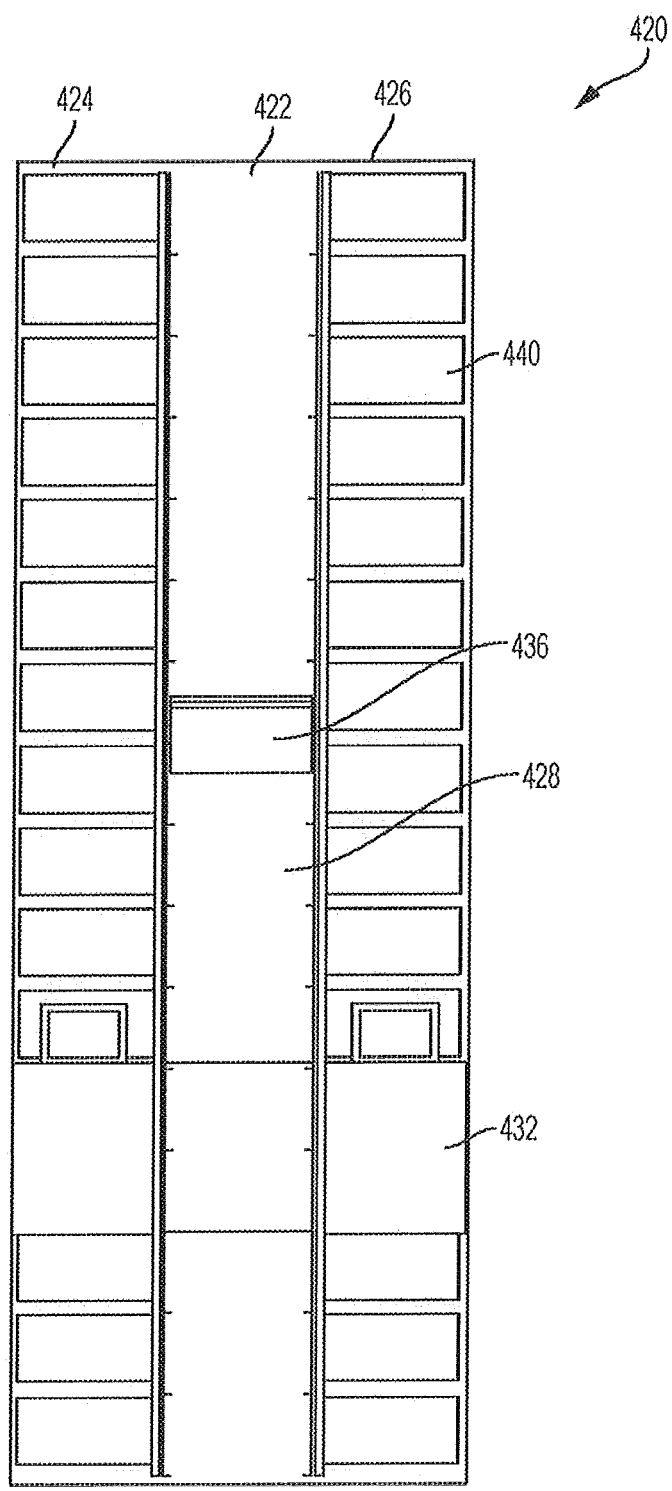
FIG. 16A is a front view of an example order fulfillment system in accordance with aspects of the disclosed embodiment.
Figure 16B:
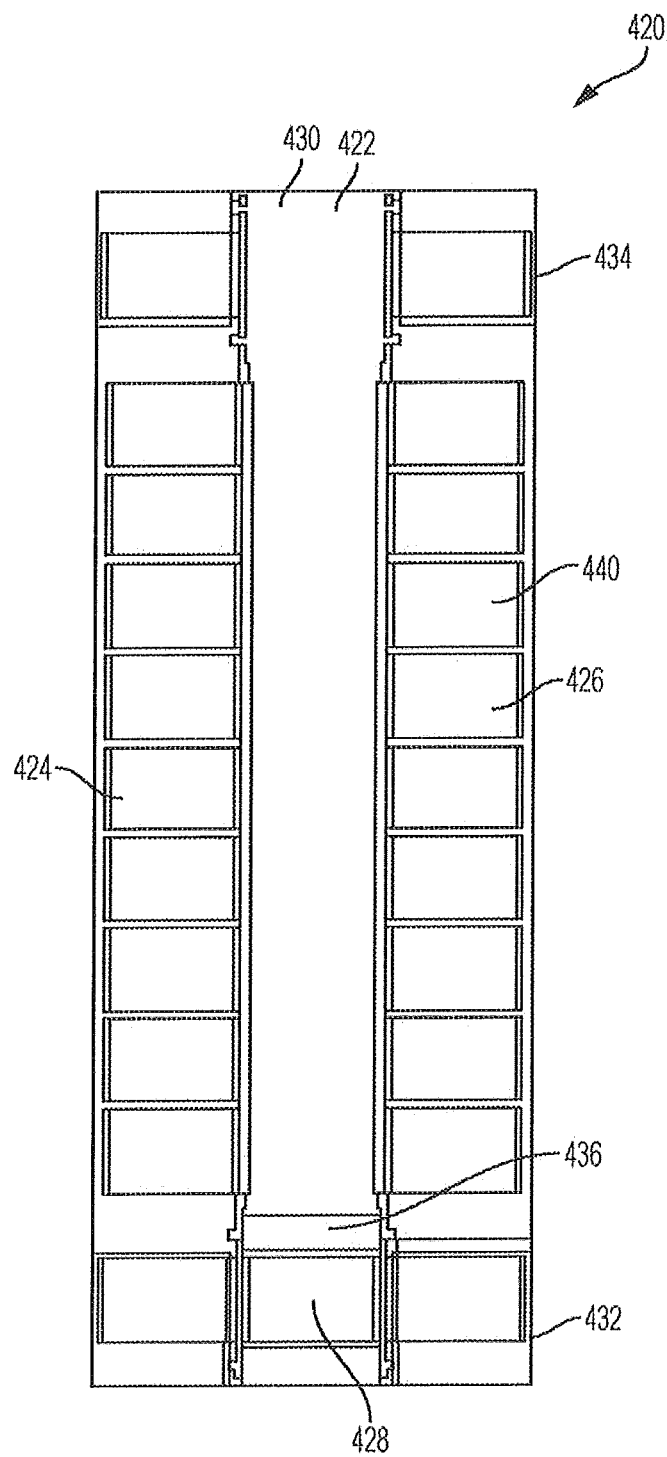
FIG. 16B is a top view of an example order fulfillment system in accordance with aspects of the disclosed embodiment.
Figure 17:
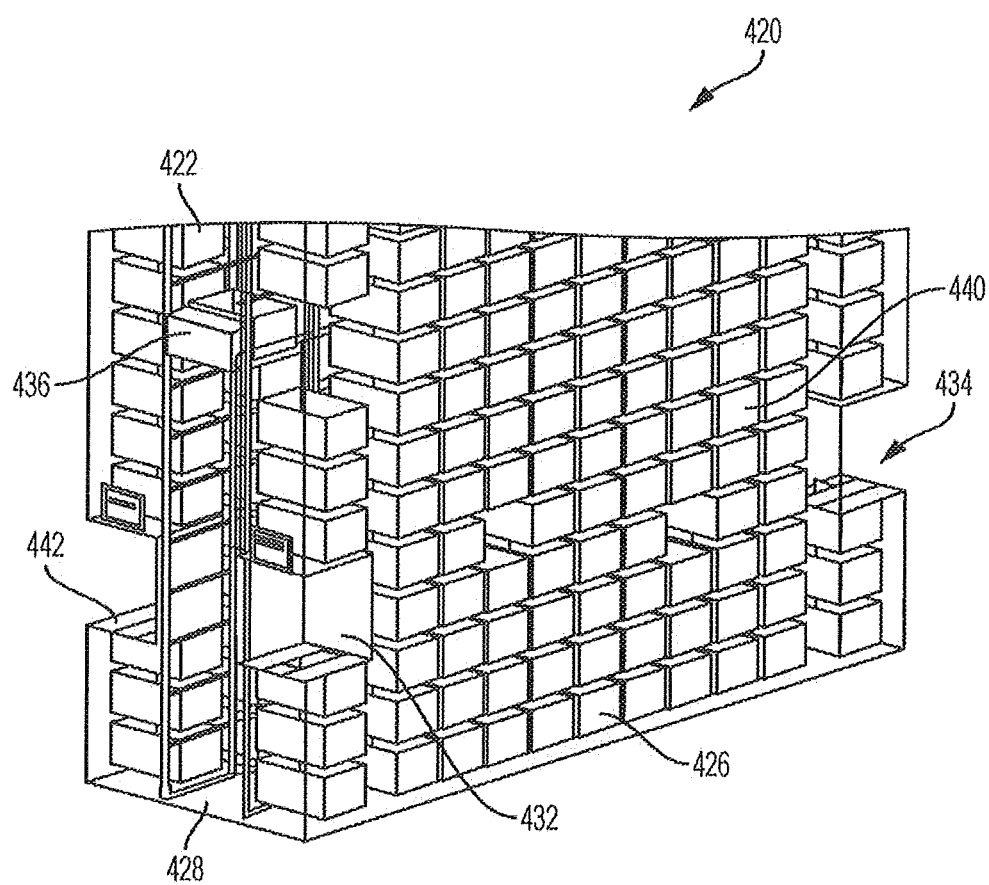
FIG. 17 is a partial isometric view of an example order fulfillment system in accordance with aspects of the disclosed embodiment.
Figure 18:
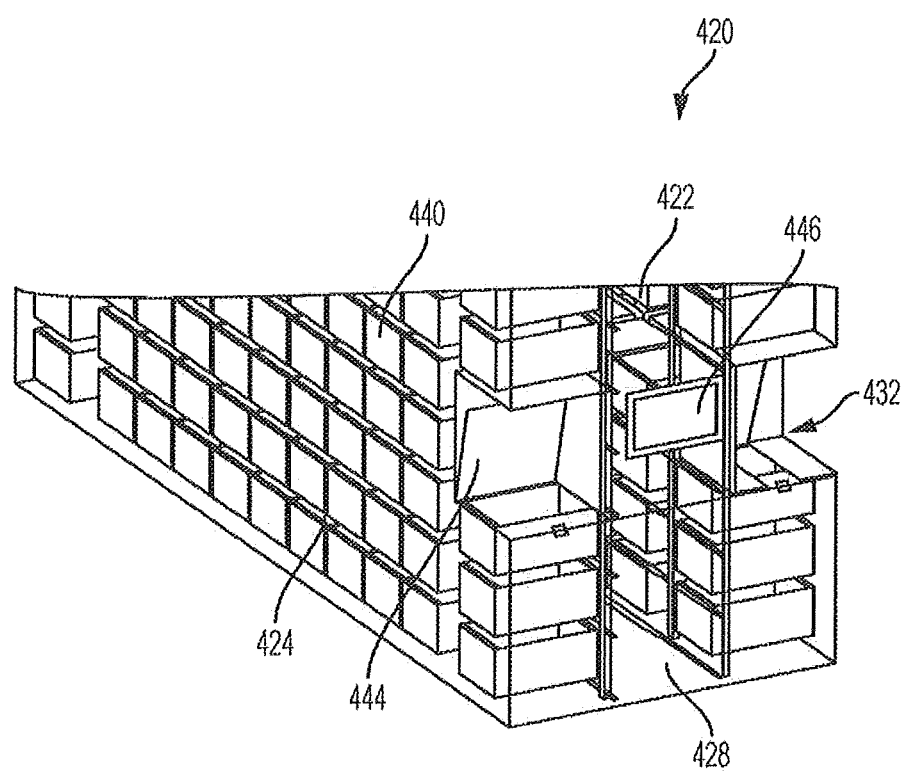
FIG. 18 is a partial isometric view of an example order fulfillment system in accordance with aspects of the disclosed embodiment.

Referring now to FIGS. 15 and 16A-B, there are shown side, front and top views respectively of example order fulfillment system configured in a vending configuration. Referring also to FIGS. 17 and 18, there are shown partial isometric views respectively of the example order fulfillment system. Here, the order fulfillment system may be described as an order vending machine 420 or "OVM" or otherwise. The order vending machine 420 shows an alternate, for example, scaled down version of the robotic vehicle and rack system, for example, that may be utilized in store vending of delivered goods or any other suitable application. For example, the vehicle technology may be used in e-commerce as applied to the "last-mile" delivery problem. For example, "Pure-play" e-commerce companies have little choice but to deliver the vast majority of orders to customers' homes, which may be costly. Retailers who both operate self-service stores and sell online can offer customers the choice of picking orders up at store locations, commonly called "click-and-collect", but in practice this model places an additional and unpredictable workload on store personnel that may result in extended wait times by customers, etc. Here, the order vending machine 420 provides an automated solution that requires a very little floor space (or land) but can securely hold a large number of orders, and also provides convenient on-demand access and short transaction times to customers. Here, the order vending machine 420 may be a robotic vehicle based "micro-warehouse" that may be referred to as an Order Vending Machine (OVM) that operates in conjunction with an e-commerce fulfillment center, for example one equipped with a robotic vehicle based system. In one aspect, Order-Totes ("O-Totes") containing customer orders may be delivered to and stored within the OVM, and then presented on demand to customers, with robotic vehicles performing all required Tote-storage and retrieval functions. Here, FIGS. 15-18 show an embodiment of an order vending machine 420 system, which comprises a single aisle 422 with two opposing multi-level storage modules 424, 426, a Bot-Tower 428, 430 at one or, alternately, both ends of the aisle, an I/O Interface 432, 434 on each Bot-Tower, at least one robotic vehicle 436 (or T-Bot/Tote Bot), and a Controller 438 with wired connections to the I/O Interface 432, 434 and wireless communication to the T-Bots. T-Bots use the vertical towers to access any storage level and horizontal Bot-track within the aisle to access any Tote position on a given level. Totes 440 can also be stored adjacent to each Bot-Tower, except for three consecutive Tote-positions on one side of the tower that are used for the Input/Output interface, where Totes are received and removed during deliveries and also where customer receive their orders contained in the Totes. An OVM can operate with only a single T-Bot. Alternately, more than one may be provided, for example, a second robotic vehicle (or more) may be effective, for example, throughput is increased during the processing of deliveries, thereby minimizing dwell time for both truck and driver, and customer-service levels are improved by the reduction in order-pickup transaction times pickup and by the ability to service two customers concurrently. Similarly, an OVM can operate with a single Bot-Tower at one end of the aisle, but configuring a tower at each end of the aisle may be effective as it provides two I/O interfaces, allowing concurrent service to two customers (or one customer concurrently with delivery processing). The second tower The I/O interface consists of a shelf 442 that holds a single Tote, a moveable Access Panel 444, and a Human/Machine Interface (HMI), such as a touch-screen display 446. Both the Access Panel and the HMI are connected to and controlled by the Controller. The Access Panel is selectively movable between a closed position, which blocks all access, and two or more open positions. A full-open position allows the Tote on the shelf to be removed entirely or an external Tote to be placed onto the shelf; this position is used during delivery transactions. The other open positions provide a customer with reach-in access to the contents of a Tote corresponding to that customer's individual order, as Totes will typically contain multiple orders. FIG. 17 shows Output Ports with Sliding Shutters whereas FIG. 18 shows alternate Output Ports with Hinged Covers, for example, covers that have one or more solenoids to lock shut (shown in front). Alternately, the covers also may be held open by passive magnet when a shopper is retrieving goods. Additionally, the covers may have a damper so they do not slam shut. In one aspect, the two I/O Ports could be useful in also configuring them differently. Perhaps the left side is divided in ¼ and the right side is full access. Depending on the Tote, they may be directed to the portioned or full access side. Alternately, any suitable combination may be used.

Operation of the system generally involves two types of transactions: Tote-removal/insertion transactions and order-pickup transactions. Removal/insertion transactions occur during the processing of a delivery, when an operator arrives with fresh Totes to be placed into storage in the OVM. The operator brings the inbound Totes to an I/O Interface and interacts with the HMI to cause the Controller to open the access panel to the full-open position and to initiate removal/insertion transactions by the T-Bots in the system. On each removal/insertion transaction, a T-Bot retrieves an outbound (typically empty) Tote from storage, transports it to the I/O Interface, and places it on the Shelf, whereupon the operator removes it. The operator then may place an inbound Tote onto the Shelf, which the T-Bot transports into storage. Removal/Insertion transactions continue until there are no more outbound or inbound Totes to be removed or inserted, respectively. The operator then leaves with the removed outbound Totes, which are returned to the fulfillment center and subsequently reused to contain future orders.

When a customer arrives at the OVM to pick up an order, he/she interacts with the HMI at an I/O Interface to validate his/her identity, whereupon the Controller initiates one or more order-pickup transactions performed by the T-Bots. Each such transaction begins with a T-Bot retrieving from storage a Tote containing items ordered by that customer, transporting the Tote to the I/O Interface, and placing it on the Shelf Upon the arrival of an O-Tote on the shelf, the Controller operates the Access Panel to create an opening immediately above the customer's ordered item(s), whereupon the customer removes the item(s) from the Tote. Once all items have been so removed, the Controller closes the Access Panel and instructs the T-Bot to return the Tote to storage.

While this description is focused on the transfer of e-commerce orders to customers, it can readily be seen that the same system can be used generically to implement a very large-scale product-vending machine, which might contain an assortment of SKUs equal to what is found today in a small convenience store. In this application, the Totes would be product-Totes rather than order-Totes, and the customer interaction with the HMI would involve ordering items contained in the P-Totes, rather than picking up products ordered delivered from a remote fulfillment center; that is, the customer's order is fulfilled on the spot at the OVM. For that matter, the same OVM can perform both functions at once.

To illustrate the space efficiency of the OVM, the specific embodiment shown may be roughly 2 meters in width and 6 meters in both length and height, so it has a footprint of 12 square meters. Here, the embodiment may have a maximum storage capacity of 340 Totes. Since multiple orders or SKUs can be contained in each O-Tote or P-Tote respectively, and even allowing for empty Tote positions necessary for efficient operation, this OVM may store between 500 and 2,000 customer orders and/or SKUs.

Figure 19:
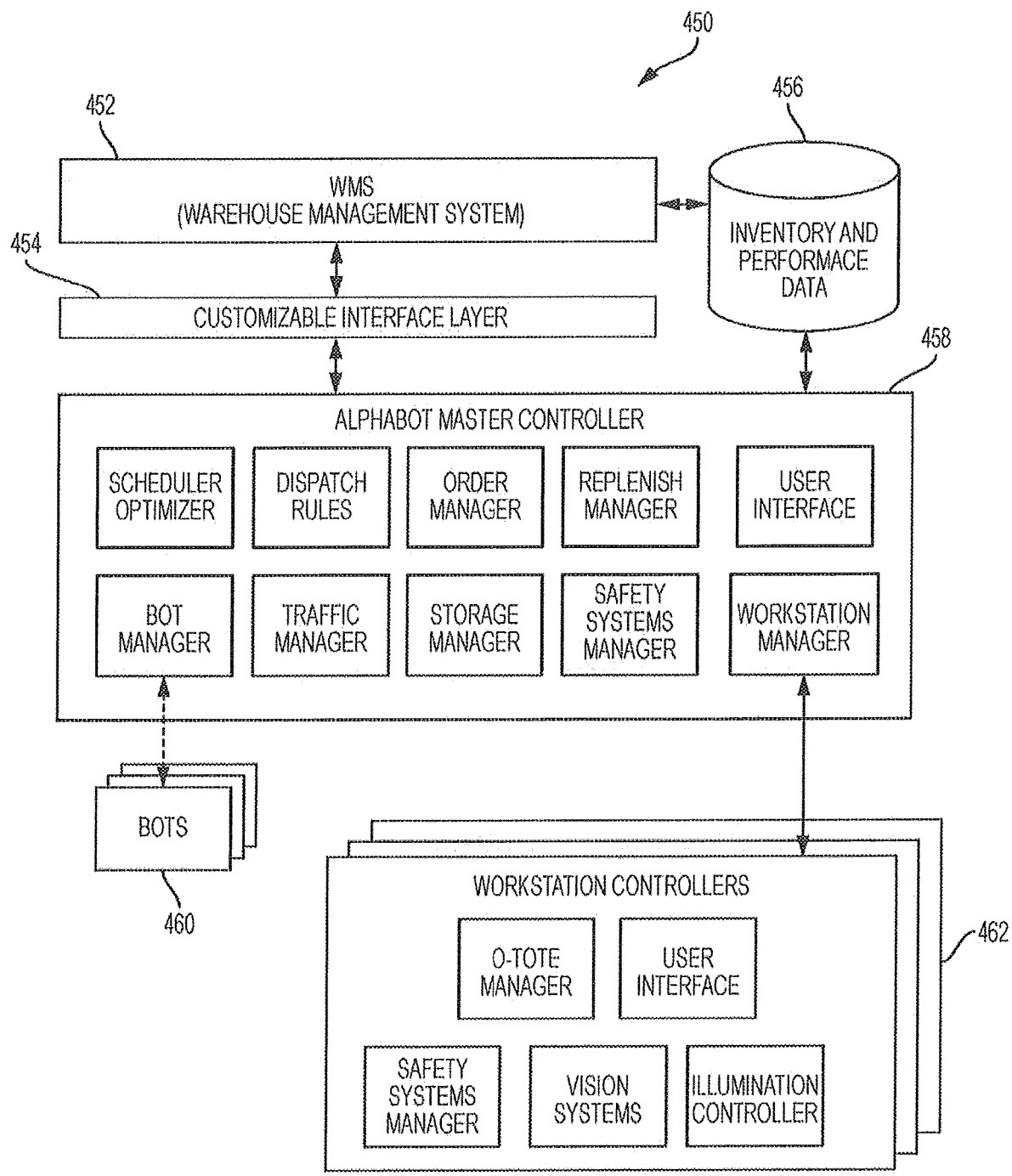
FIG. 19 is a schematic diagram of a control system in accordance with aspects of the disclosed embodiment.

Referring now to FIG. 19, there is shown a schematic diagram of control system 450. Control system 450 may have warehouse management system 452, customizable interface layer 454, inventory and performance data repository 456, robot/vehicle master controller 458, robot vehicle on board controller 460 and workstation controllers 462. Additional modules may be provided to control additional equipment, for example, additional material handling modules, robotics, safety or otherwise. Control system 450 may further be configured with more or less modules or sub modules. Robot/vehicle master controller 458 may have modules such as a schedule optimizer, dispatch rules, order management, replenishment manager, UI, robot manager, traffic manager, storage manager, safety systems manager, and workstation manager. Workstation controllers 462 may have modules such as a Tote or order Tote manager, UI, safety systems manager, vision system and illumination controller. In alternate aspects, more or less modules may be provided. An example embodiment may comprise a non-transitory program storage device (such as memory 456 for example) readable by a machine, tangibly embodying a program of instructions executable by the machine for performing operations, the operations comprising controlling, at least partially, an order fulfillment system.

The order fulfillment systems as described share, at least in part, common components and subsystems that may be configured in any suitable combination or sub combination alone or in combination with other components and subsystems. The order fulfillment systems may include multi-level rack structures for storage of inventory (or "picking stock"), generally configured to maximize space utilization by using all available cubic volume from floor to ceiling for shelving modules that hold products in storage separated by aisles whereby robots access product-storage locations, and subdivided horizontally into a plurality of "tiers", each tier comprising a plurality of storage levels. The order fulfillment systems may further include mobile robots ("Bots"), autonomous vehicles that are free-roaming, i.e. have complete access to all portions of the system, and perform various transfer and transport functions depending on embodiment, for example the movement of containers of products between storage locations within the rack structure and workstations. The order fulfillment systems may further include Bot-transit structures whereby Bots travel in three dimensions: horizontally on planar transit-decks interconnecting the rack structure, workstations and I/O interfaces on a given tier; and vertically on verticals or diagonal ramps that interconnect either storage levels within a tier (Aisle Ramps) or tiers (Transit-Ramps). The order fulfillment systems may further include workstations at which humans or robots transfer picked eaches or cases either directly into order containers or to intermediate robots which then transfer to order containers, depending on the embodiment. The order fulfillment systems may further include input output interfaces whereby product is inducted into the system to replenish the picking stock (input) and picked orders are discharged from the system to be delivered eventually to customers (output). The order fulfillment systems may further include a centralized control system, comprising computers, software, and communications components, which manages the operation of the entire system. Accordingly, all suitable combinations in whole or in part may be provided.

In the context of the exemplary order fulfillment systems and suitable combinations of their subcomponents and systems, various operational scenarios and the subsystems will now be described in greater detail.

The order-fulfillment technology described may be primarily for use in retail supply chains to fill orders for individual item units ("eaches"), for example orders placed by smaller self-service stores to replenish inventory (e.g. drug, convenience or otherwise); or orders placed by end-users (direct-to-consumer). Alternately or in combination, the order-fulfillment technology described may be applied to case-picking, for example, filling orders for cases of product placed by self-service retail stores to replenish their inventory, uses goods-to-palletizer process.

These orders may be filled in a "goods-to-picker" process that uses free-roaming mobile robots, operating within a closed, structured, three-dimensional environment, to perform all movement of containers of products, including: 1) Receiving incoming product-containers and placing into storage in a rack structure to replenish picking stock, retrieving said containers from storage as required to fill orders, transporting those containers to picking workstations where human or robotic pickers remove eaches, then returning the containers to storage, and finally discharging empty containers from the system to be refilled for another cycle of use, and 2) Receiving incoming empty order-containers, placing them into position to receive ordered eaches to be held pending customer delivery, placing filled order-containers into storage as necessary, and discharging said filled order-containers from system for delivery to customers. The mobile robots may have fully random and autonomous access directly all locations within the system's operating environment, including all storage locations, all workstations, and all receiving and shipping locations, by virtue of having self-contained ability to move in all three dimensions within that environment, i.e. two horizontal dimensions as well as the vertical dimension. Two alternatives are disclosed, the difference between them being related to the process used in transferring eaches from product containers to order containers: 1) In the Direct-Put embodiment, picked eaches are transferred directly from a product container into an order container, which is the process model commonly practiced in the field; and 2) in the Indirect-Put embodiment, picked eaches are transferred not directly into product containers but into intermediate robots that then transport them to and transfer them into the assigned order-containers.

Direct Put System

In a direct-put system, eaches are transferred directly from Product-Totes to Order-Totes. This process may minimize the number of each-transfers and so minimizes the capital investment required for a given application. Compared to the Indirect-Put embodiment described below, it has several differences. The first difference is workstation specificity, i.e. once an O-Tote designated to receive order-lines from a given customer order is assigned to a given workstation, the picking of eaches to fill those order-lines can only be performed at that specific workstation, which may lead to delays by robots interfering with each other while trying to get to their assigned destinations. The second difference is related to the first and the use of multi-order workstations where a number of O-Totes are processed concurrently, which extends order-completion latency for a give O-Tote, i.e. the time it spends at the Picking Workstation, since it shares the each-picking resource with all the other concurrent O-Totes.

The direct put system may have eight elements or subsystems. Product Totes ("P-Totes") are containers of the picking stock of eaches used to fulfill orders. Order Totes ("O-Totes") are containers of eaches that have been picked to fulfill specific orders. Autonomous mobile robots are robots that transfer and transport Totes ("T-Bots"). Bot tasks are typically round-trip transactions consisting of two segments, the first segment being the removal of a Tote from storage in the TSS and transport to a destination, and the second segment being the return of a Tote from that same destination back to storage in the TSS, so bots almost always are traveling with a Tote payload onboard. A T-Bot handling a P-Tote is referred to as a P-Bot, while a T-Bot handling an O-Tote is referred to as an O-Bot; a given T-Bot can switch roles on a transaction-by-transaction basis, e.g. perform as a P-Bot on one transaction and then immediately perform as an O-Bot on the very next transaction. A Tote-Storage Structure ("TSS") provides the structural support for stored Totes (both P-Totes and O-Totes) and also for the Bots operating therein, generally configured to maximize space utilization by using all available cubic volume from floor to ceiling for shelving modules that hold Totes in storage separated by aisles that provide robots access to Tote-storage locations. Bot-Transit Structures ("BTS") allow Bots to travel in three dimensions: horizontally on planar Transit Decks that interconnect the rack structure and workstations; and vertically on Vertical Tracks that interconnect storage lanes and workstations at multiple elevations. Alternately, the Bot-Transit Structure ("BTS") may comprise Aisle-Ramp modules, Transit-Ramps, and Transit Decks. Picking Workstations are arrayed at multiple elevations where human or robotic pickers remove eaches from P-Totes and place them into either O-Totes or a robot, depending on embodiment. A Central Control System ("CCS") consists of software, computers, and network equipment, which manages system resources (including all of the various robots), orchestrates the entire order-fulfillment process and all related processes, and provides status and control interfaces to human operators of the system and to external systems. One or more Input/Output ("I/O") Interface at which T-Bots receive Totes entering the system (filled P-Totes and empty O-Totes) and discharge Totes leaving the system (empty P-Totes and filled O-Totes).

Operating processes, all of which are controlled directly or indirectly by the CCS:

P-Totes flow to picking workstations whereby T-Bots retrieve P-Totes containing ordered products from storage in the TSS, transport P-Totes to specified Picking Workstations based on location of specific target order-Totes, and then return P-Totes to storage in the TSS. Typically P-Totes are returned to storage in the TSS even if the last remaining each has been picked and the Tote is empty. Here, the storage location of each returned P-Tote is selected based on close proximity to the next Tote to be handled by the same T-Bot.

O-Totes flow to and from picking workstations whereby O-Bots deliver empty O-Totes to workstations to be filled with eaches ordered by customers and also remove filled O-Totes from workstations; the removal of a filled O-Tote and the delivery of an empty O-Tote typically occur on the same round-trip transaction. Typically the O-Bot first removes an empty O-Tote from storage in the TSS, transports that Tote to the I/O Interface for discharge, immediately picks up a filled O-Tote and departs the workstation. Filled O-Totes are typically then transport to storage locations in the TSS pending delivery to customers, though they can alternatively be taken directly to the I/O Interface for immediate delivery. The storage location of each filled O-Tote stored in the TSS is selected based on close proximity to the next Tote to be handled by the same T-Bot.

Pick and put at workstations occurs where P-Bots present P-Totes to human or robotic pickers, who remove one or more eaches from every P-Tote and place in designated O-Totes (described in more detail below).

Order shipment & O-Tote induction occurs whereby T-Bots remove from storage in the TSS (or alternatively directly from Picking Workstations) filled O-Totes that are to be discharged from the system for delivery to customers and transport them to the I/O Interface. Here, empty O-Totes are inducted into the system through the I/O interface and are typically transported by T-Bot to a storage location in the TSS, where it will remain pending transport to a Picking Workstation, though they can opportunistically (and more efficiently) be transported directly to a workstation if needed immediately. The storage location in the TSS of each incoming empty O-Tote is selected based on close proximity to the next Tote to be handled by the same T-Bot.

Picking-stock replenishment and P-Tote recycling occurs whereby T-Bots receive incoming filled P-Totes at the I/O Interface and transport them into storage in the TSS (or occasionally directly to a Picking Workstation). T-Bots also remove empty P-Totes from storage in the TSS and deliver them to the I/O Interface to be discharged from the system for refilling. The storage location of each filled P-Tote stored in the TSS is selected based on close proximity to the next Tote to be handled by the same T-Bot.

Direct Put System Components:

P-Totes and O-Totes:

P-Totes and O-Totes preferably are dimensionally identical so that any T-Bot can handle either with a fixed-width Tote-transfer mechanism, and therefore perform the roles of both P-Bots and O-Bots. For example, both Totes can have a length of 600 mm, width of 400 mm and height of 300 mm, a widely-used standard size, with height being application dependent based on the most efficient volume for specific product assortments and typical order sizes. P-Totes can be subdivided into multiple compartments, each of which can contain a different SKU, in which case the Tote is referred to as a "multi-SKU" P-Tote ("SKU" being an acronym for "stock-keeping unit", meaning a unique product). Similarly, O-Totes can be subdivided into multiple compartments or can contain multiple separate shipping containers, in which case the Tote is referred to as a "multi-order" O-Tote.

Tote Storage Structure ("TSS")

The Tote Storage Structure is a storage system for holding Totes, comprising a plurality of steel rack modules separated by aisles. Rack modules use frame assemblies as vertical columns, to which attach the horizontal beams that support Totes in storage. Shape of aisle-facing beams includes a horizontal extension from bottom of beam that provide running surface for Bot wheels, hence called "Bot Beams". Design of shelf depends on method Bots use to transfer Totes: i) If Bots lift Totes, two beams are the only support required, and Totes will be stored only one-deep (two Totes between adjacent aisles); ii) If Bots slide Totes across shelf, Tote-support between beams is needed, e.g. wire fabric; compared to a lifting transfer, Bots are less expensive but storage rack is more expensive; however, sliding transfer makes double-deep Tote-storage possible (four Totes between adjacent aisles), which increases storage density and reduces building costs compared to single-deep storage;

The Tote Storage Structure may be subdivided horizontally to form "Tiers"—groups of interconnected storage levels. The number of Tiers is a throughput factor because the greater the number of Tiers the more Bots can operate within the system without excessive congestion. Each tier subdivision within an aisle creates a single "Storage Zone", with a floor provided whereby maintenance technicians can enter that zone to resolve any problems; the single zone must be shut down to all Bot activity during such maintenance visits, but the rest of the system can continue to operate.

Bot Transit Structures ("BTS")

The Bot Transit Structure may have transit decks that are planar structures that serve as roadways whereby Bots can move in two horizontal dimensions between TSS aisles and Picking Workstations. Decks may be typically constructed of plywood panels on a steel support frame. Transit Decks are located at multiple elevations vertically, specifically at every workstation Level.

BTS—Vertical Alternative

Figure 41A:
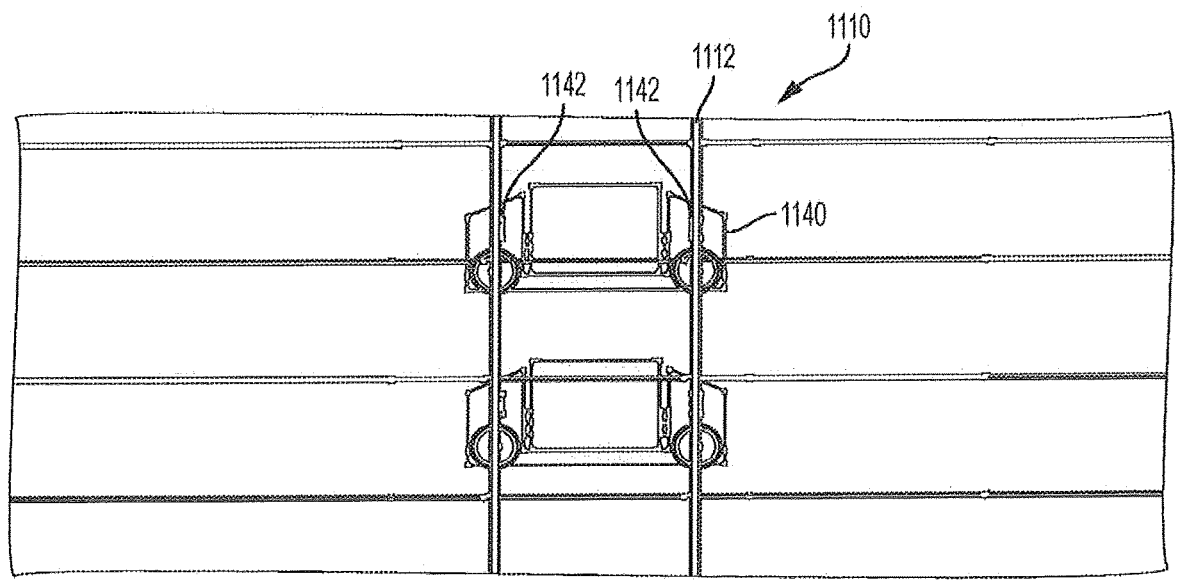
FIG. 41A is a side view of vehicles with a vertical ramp in accordance with aspects of the disclosed embodiment.
Figure 41B:
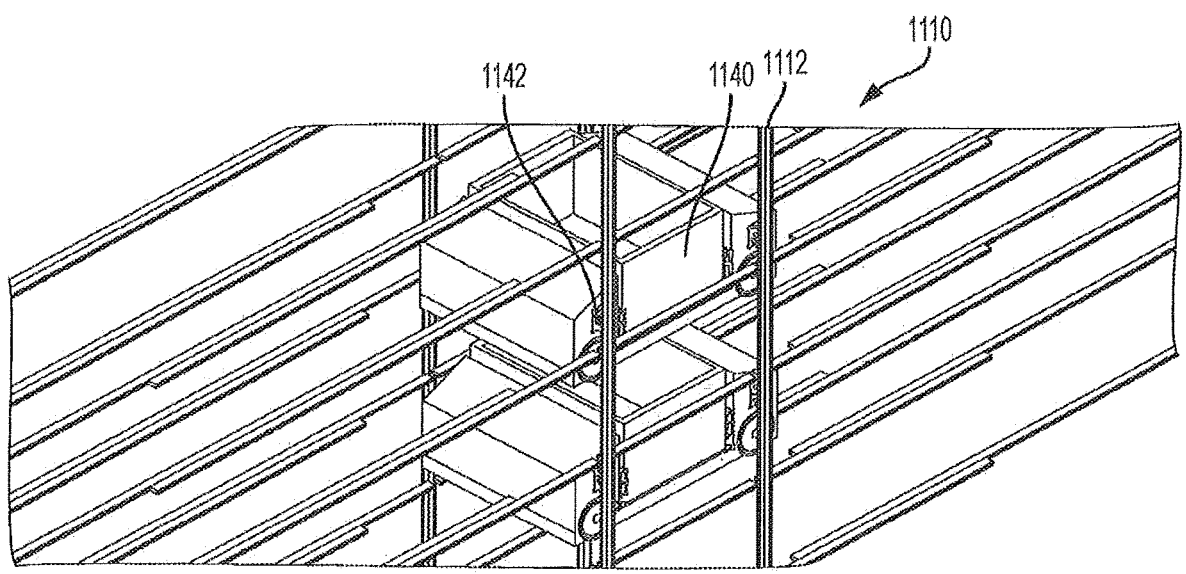
FIG. 41B is an isometric view of vehicles with a vertical ramp in accordance with aspects of the disclosed embodiment.
Figure 42A:
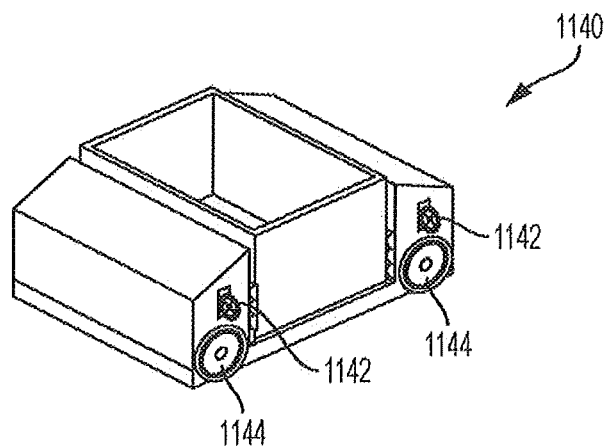
FIG. 42A is an isometric view of a vehicle in accordance with aspects of the disclosed embodiment.
Figure 42B:
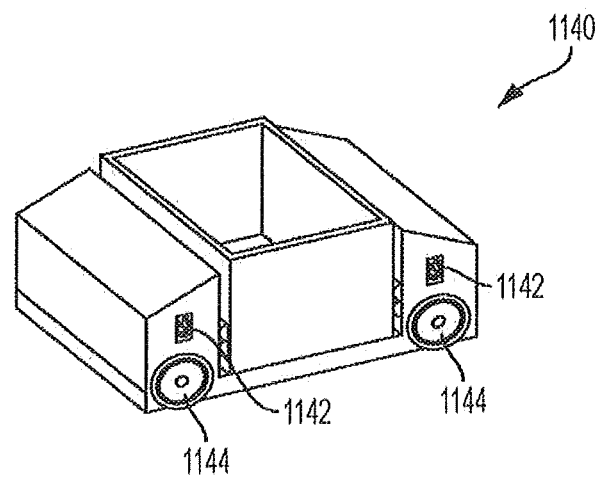
FIG. 42B is an isometric view of a vehicle in accordance with aspects of the disclosed embodiment.
Figure 43A:
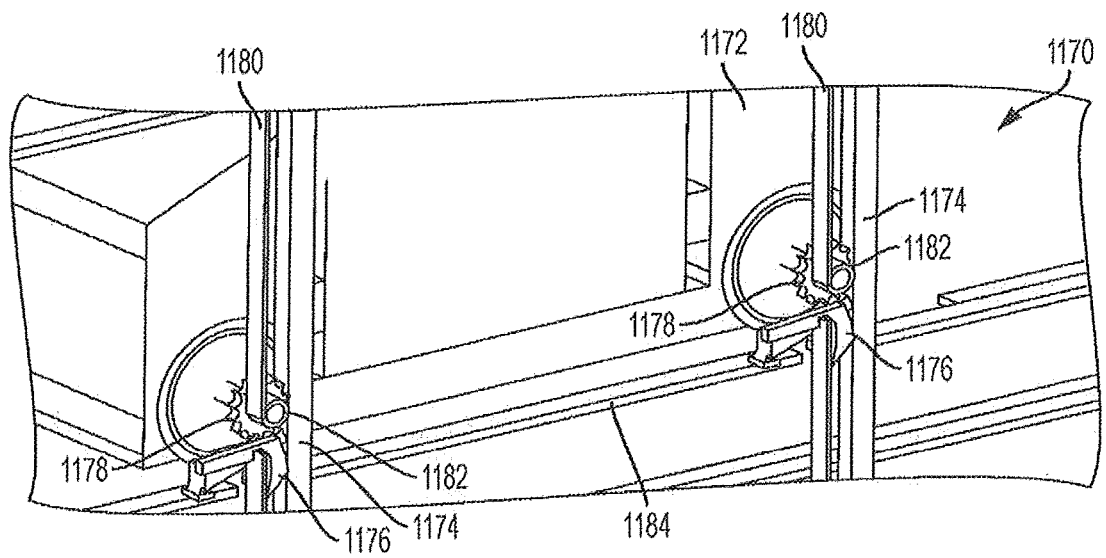
FIG. 43A is an isometric view of a vehicle with a vertical ramp in accordance with aspects of the disclosed embodiment.
Figure 43B:
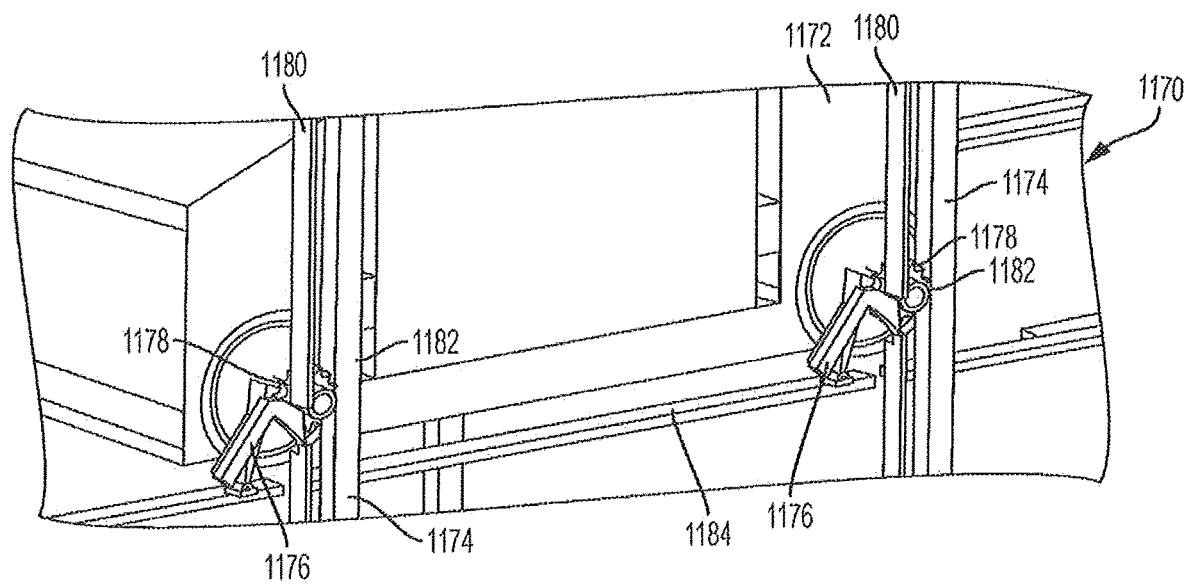
FIG. 43B is an isometric view of a vehicle with a vertical ramp in accordance with aspects of the disclosed embodiment.

Vertical Tracks (or simply "Verticals") are structural subassemblies by which Bots can move vertically up or down to move to any storage level in an aisle or to any workstation level. There are two Verticals at one end or both ends of each aisle, depending on whether there are Transit Decks on one or both ends of the aisles. One Vertical is for travel going up, the other for travel going down. The Verticals are positioned between the aisle and the Transit Decks, with the Up-Vertical attached to the Transit Deck and the Down-Vertical attached to the aisle. FIGS. 43A and 43B show isometric views of vehicles with a vertical ramp 1170. Here, robot 1172 may climb verticals 1174. Here, counter rails have vertical breaks where counter bearing can enter. Shown here is passive switch 1176 for an up ramp where robot 1172 is entering horizontally from left. In FIG. 43B, robot 1172 is climbing vertical 1174 where switch 1176 is pushed out of the way for climbing Bot. In the case of the down ramp, the switch is normally open and may be pushed closed to allow the Bot to exit onto the outer horizontal rail. Each Vertical includes four vertical chain-tracks that are constructed of standard roller-chain welded to a U-shaped channel; four sprocket gearwheels 1178 on the robots engage these chain-tracks. Associated with each chain-track is a Counter-Rail 1180 that engages a bearing 1182 at the end of the gearwheel axis and ensures that the sprocket on the Bot remains properly engaged with the chain-track. At each entry/exit level is a hinged Gate-Switch 1176 which allows bearings to enter and exit the counter-rail channel if a Bot is entering or exiting the Vertical, but also prevents the bearing from leaving the channel if a Bot is passing through that level without exiting. Each Vertical also includes a pair of horizontal Bot Rails 1184 positioned between opposing chain-tracks at each elevation at which Bots can enter or exit the ramp, said rails connecting to the Bot Beams of each storage level and to each Transit Deck. Rail pitch (distance between rails) is same as aisle width at point of connection to Bot Beams of aisle but widens to slightly greater than Bot-width near the chain-tracks in order to permit ascending or descending Bots to pass between the rails. A gap exists in the Bot Rail immediately adjacent to each of the four chain-tracks, which allows the sprocket-wheel axles of a Bot ascending or descending the Vertical to pass through the rail. Up-Verticals may be equipped with charging rails so that Bots can recharge their super-capacitors while ascending. Referring also to FIGS. 41A and 41B, there is shown side and isometric views respectively of vehicles with a vertical ramp 1110. Here, vehicle 1140 climbs verticals 1114 in a vertical climbing configuration of the robot. The difference in this embodiment is gears 1142 are perpendicular to direction of travel. Here, gear 1142 extends out through a gap in "outer horizontal track" to climb. An electronic level may be provided in the robotic vehicle to detect pitch and roll variance such that servo motors may be adjusted to maintain robotic vehicle level variations and eliminate racking. Referring also to FIGS. 42A and 42B, there are shown isometric views of a vehicle in accordance with aspects of the disclosed embodiment.

Figure 44A:
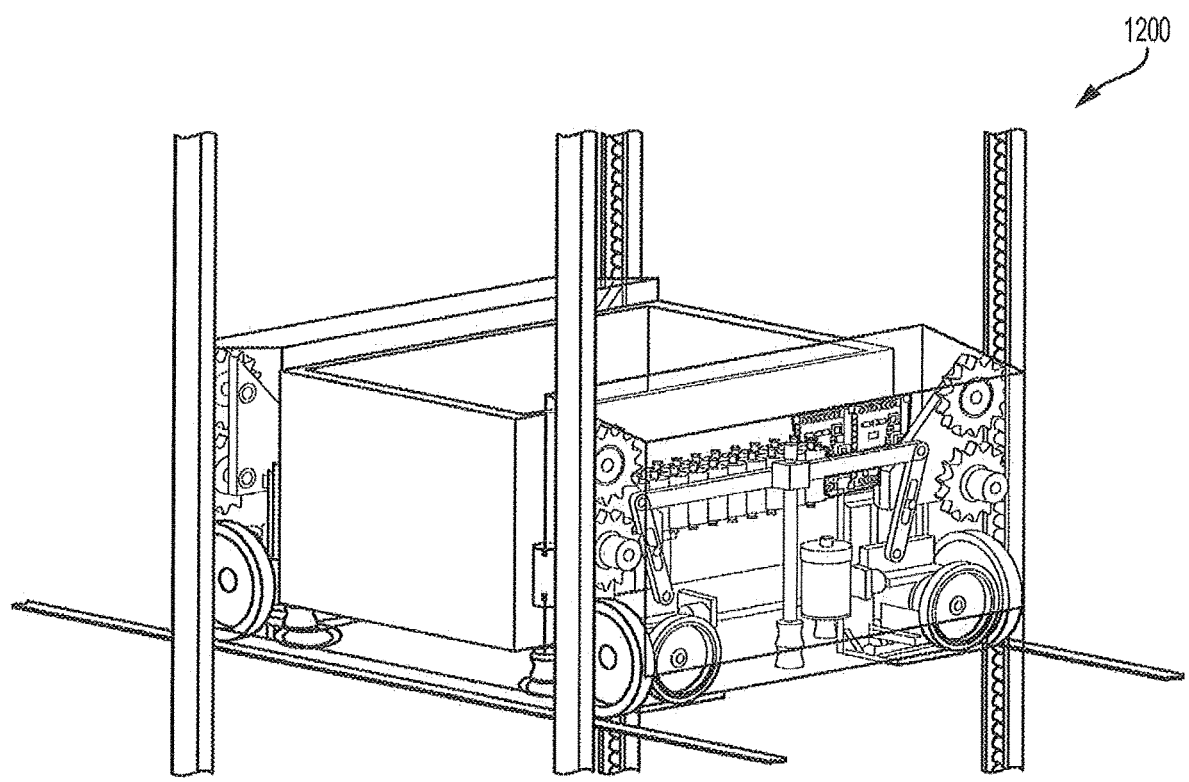
FIG. 44A is an isometric view of a vehicle with a vertical ramp in accordance with aspects of the disclosed embodiment.
Figure 44B:
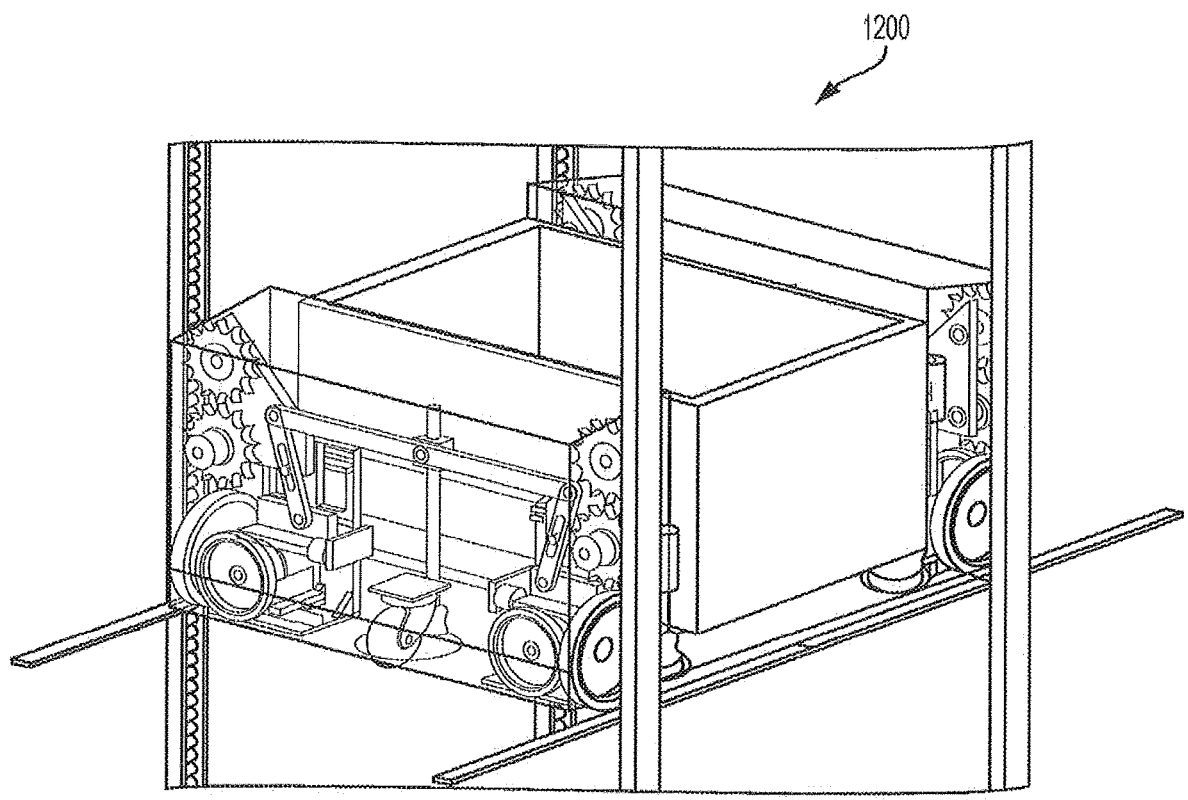
FIG. 44B is an isometric view of a vehicle with a vertical ramp in accordance with aspects of the disclosed embodiment.
Figure 45A:
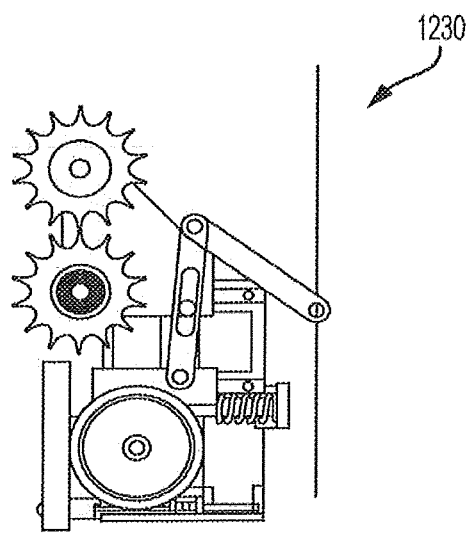
FIG. 45A is an end view of an orthogonal drive unit in accordance with aspects of the disclosed embodiment.
Figure 45B:
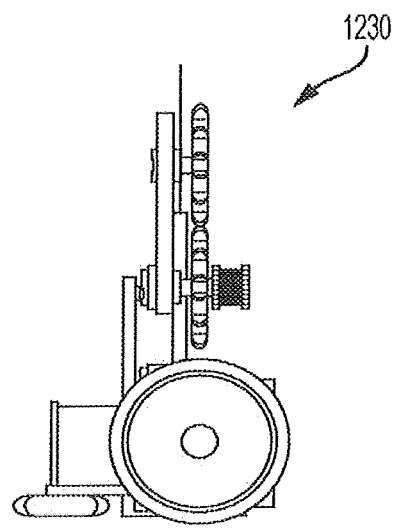
FIG. 45B is a side view of an orthogonal drive unit in accordance with aspects of the disclosed embodiment.
Figure 45C:
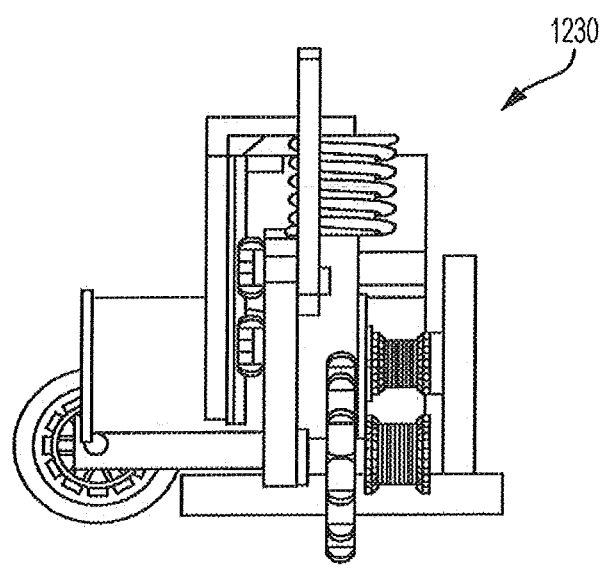
FIG. 45C is a top view of an orthogonal drive unit in accordance with aspects of the disclosed embodiment.
Figure 45D:
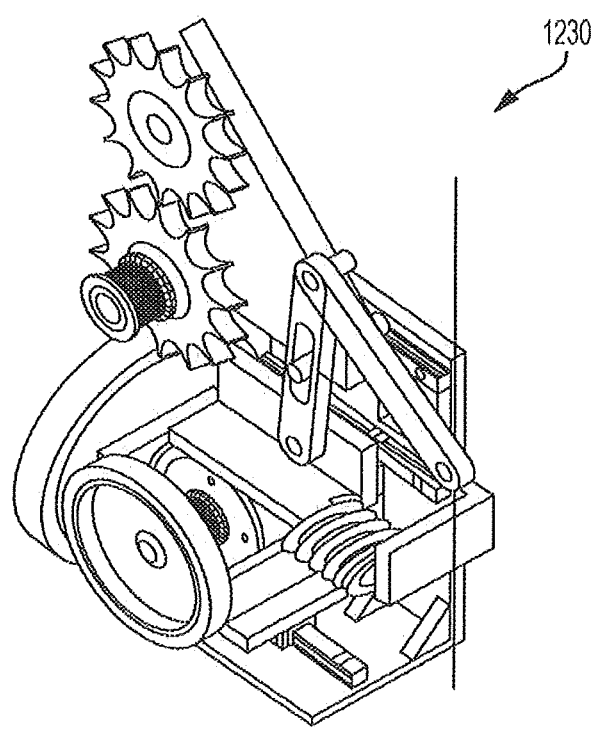
FIG. 45D is an isometric view of an orthogonal drive unit in accordance with aspects of the disclosed embodiment.
Figures 46A, 46B, 46C, 46D:
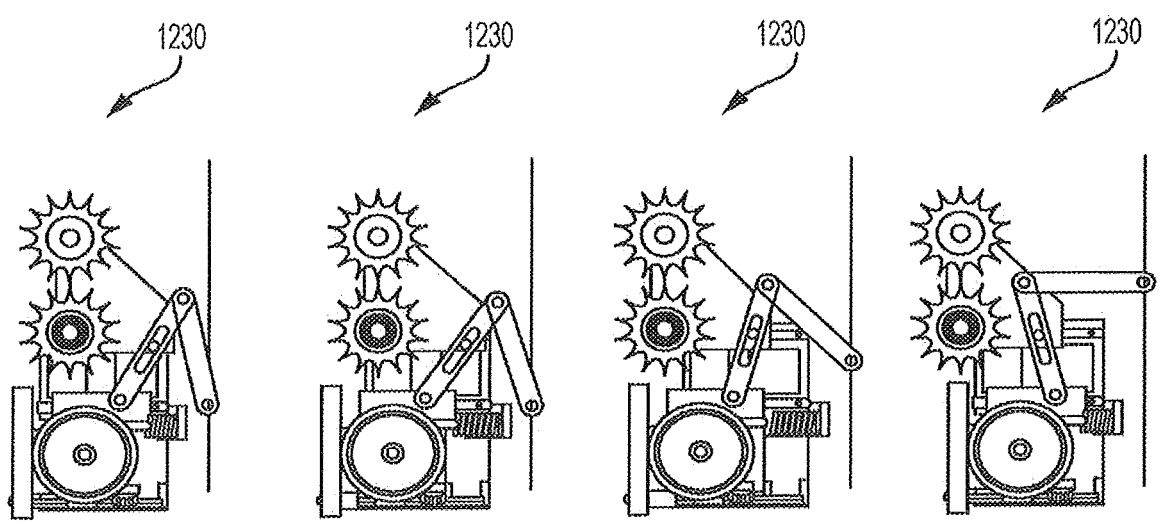
FIG. 46A is an end view of an orthogonal drive unit in accordance with aspects of the disclosed embodiment.
FIG. 46B is an end view of an orthogonal drive unit in accordance with aspects of the disclosed embodiment.
FIG. 46C is an end view of an orthogonal drive unit in accordance with aspects of the disclosed embodiment.
FIG. 46D is an end view of an orthogonal drive unit in accordance with aspects of the disclosed embodiment.
Figure 47A:
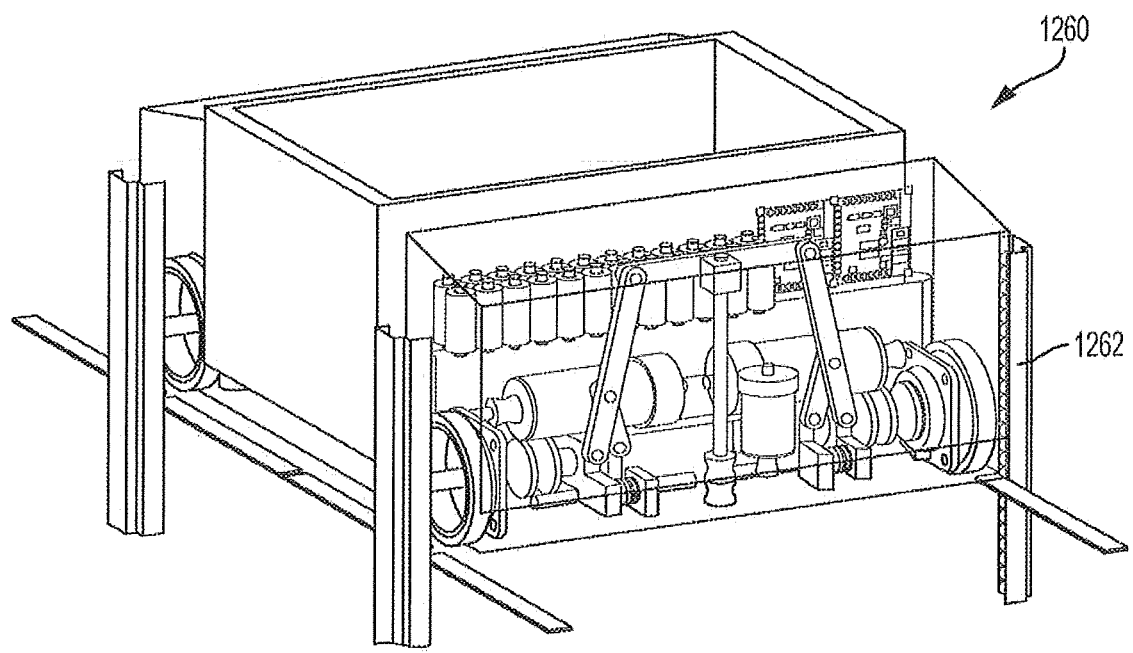
FIG. 47A is an isometric view of a vehicle in accordance with aspects of the disclosed embodiment.
Figure 47B:
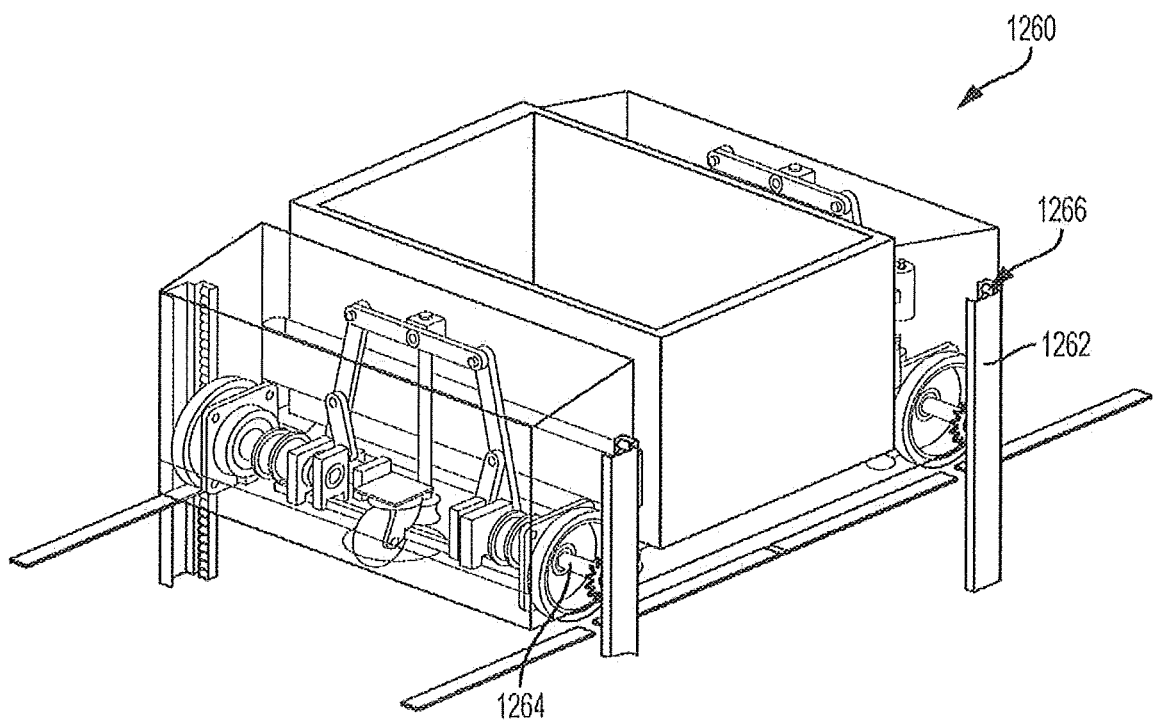
FIG. 47B is an isometric view of a vehicle in accordance with aspects of the disclosed embodiment.
Figure 50A:
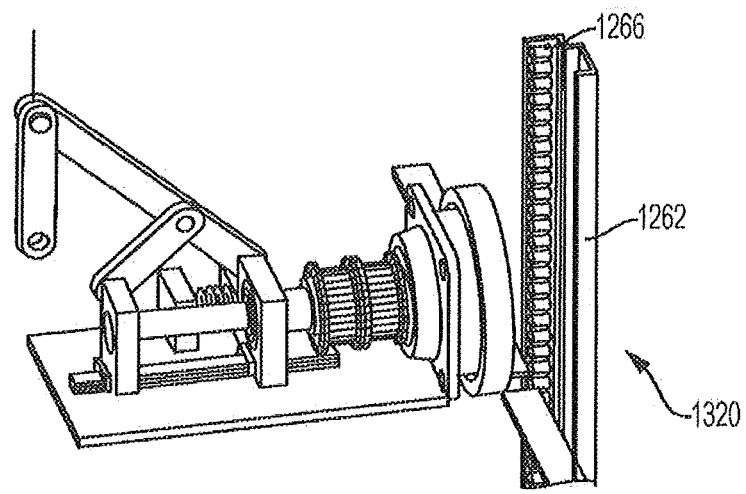
FIG. 50A is an isometric view of an orthogonal drive unit in accordance with aspects of the disclosed embodiment.
Figure 50B:
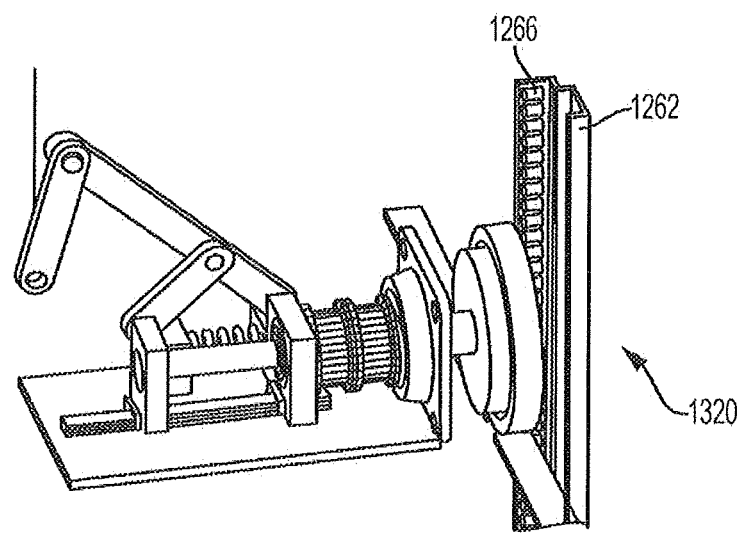
FIG. 50B is an isometric view of an orthogonal drive unit in accordance with aspects of the disclosed embodiment.
Figure 50C:
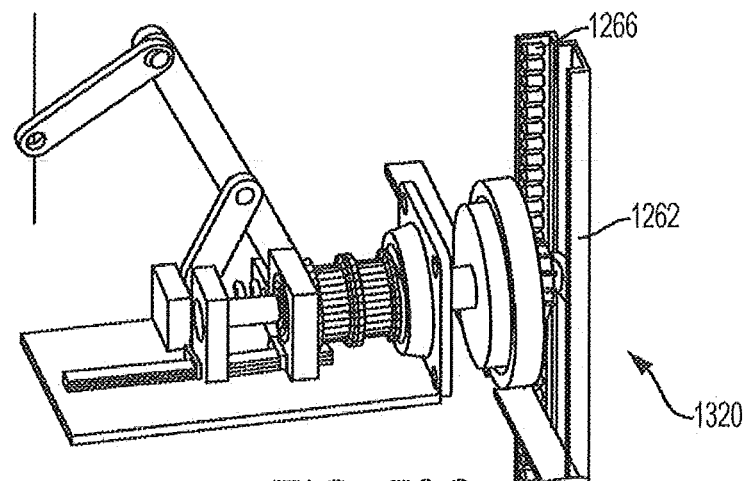
FIG. 50C is an isometric view of an orthogonal drive unit in accordance with aspects of the disclosed embodiment.
Figure 50D:
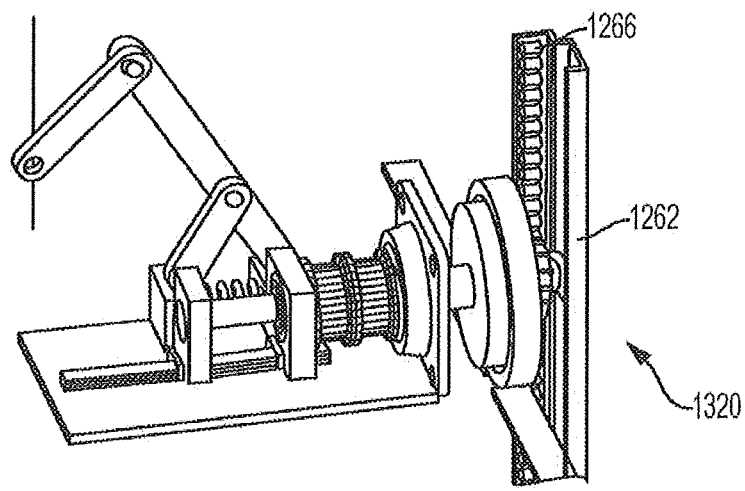
Figure 50E:
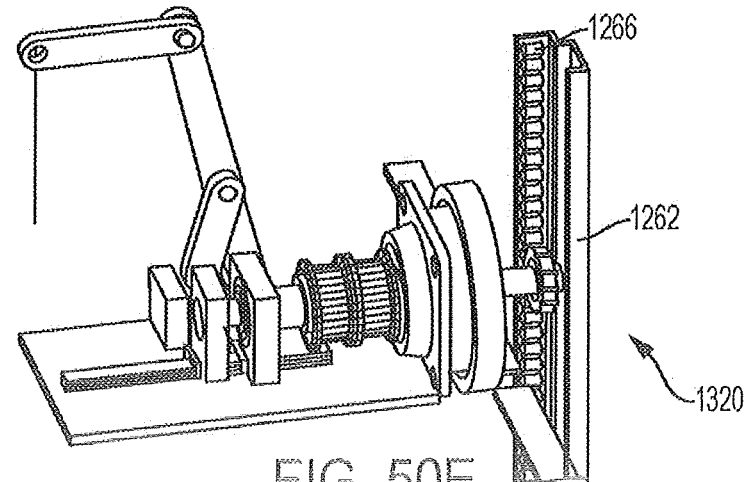

Referring now to FIGS. 47A and 47B, there are shown isometric views of robotic vehicle 1260 engaging verticals 1262. FIG. 47A shows "Unishaft" Bot Front whereas FIG. 47B shows "Unishaft" Bot Rear. Referring also to FIGS. 48A through 48E, there are shown end views of orthogonal drive unit linkage 1290. Referring also to FIGS. 49A through 49E, there are shown rear views of orthogonal drive unit linkage 1320. Referring also to FIGS. 50A through 50E, there are shown isometric views of orthogonal drive unit linkage 1320. FIG. 50A shows wheel in, sprocket in, the position when driving through a rack system. FIG. 50B shows wheel out, sprocket in, the position when driving horizontally through a vertical zone. FIG. 50C shows wheel out, sprocket out, counter bearing not fully extended, the position when Bot drives up to vertical chain. FIG. 50D shows wheel out, sprocket out, counter bearing out with the robotic vehicle ready to climb off, or land on horizontal rails. FIG. 50E shows wheel in, sprocket out, counter bearing out, the position when Bot is climbing through horizontal rails Referring now to FIGS. 44A and 44B, there are shown isometric front views of alternate embodiment vertical climbing vehicles with a vertical ramp 1200. Referring also to FIGS. 45A through 45D, there are shown end, side, top and isometric views respectively of orthogonal drive unit 1230. Referring also to FIGS. 46A through 46D, there are shown end views of orthogonal drive unit 1230. The orthogonal drive unit linkage drive is shown with center link actuated vertically. FIG. 46A shows wheel in, sprocket in. FIG. 46B shows wheel out, sprocket in. Here, the end of center link is in same position and the linkage allows the wheel to passively ride out driven by spring. FIG. 46C shows wheels out, sprocket out. FIG. 46D shows wheels in, sprocket in. Here, the drive wheel is disengaged from the Bot wheel and the distance from the motor center to driven sprocket center is 13 mm longer causing the belt to engage to drive sprocket at same time. Here, the link is horizontal creating rigid engagement of sprocket in vertical chain, like an over-center latch. In this embodiment, the top sprocket is passive and may be used for stability of Bot in roll axis.

BTS—Passive Ramp Alternative

Figure 37A:
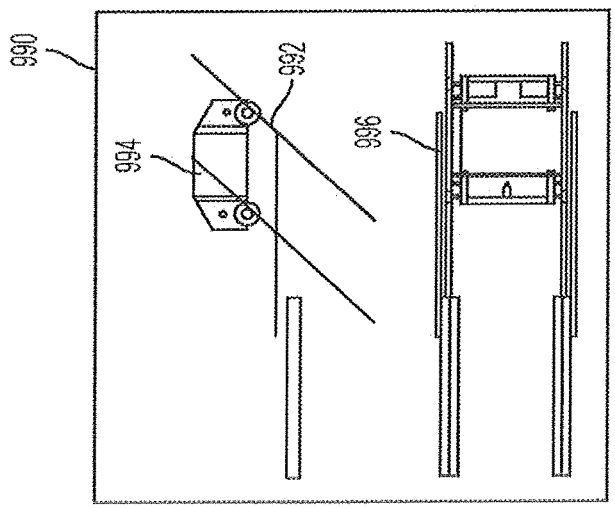
FIG. 37A is a side view of a vehicle with a ramp in accordance with aspects of the disclosed embodiment.
Figure 37B:
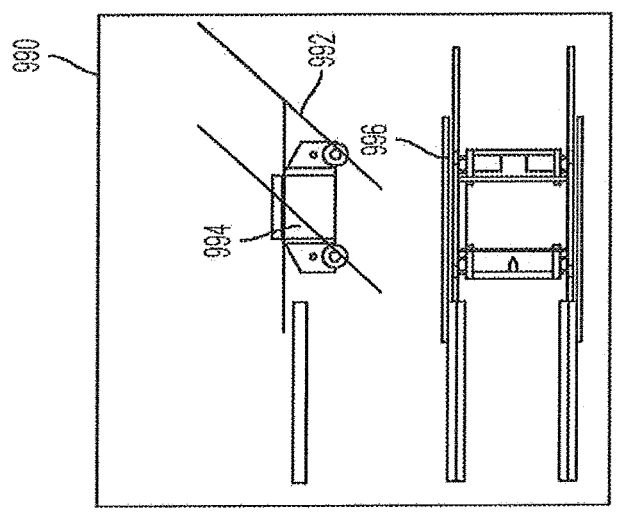
FIG. 37B is a side view of a vehicle with a ramp in accordance with aspects of the disclosed embodiment.
Figure 37C:
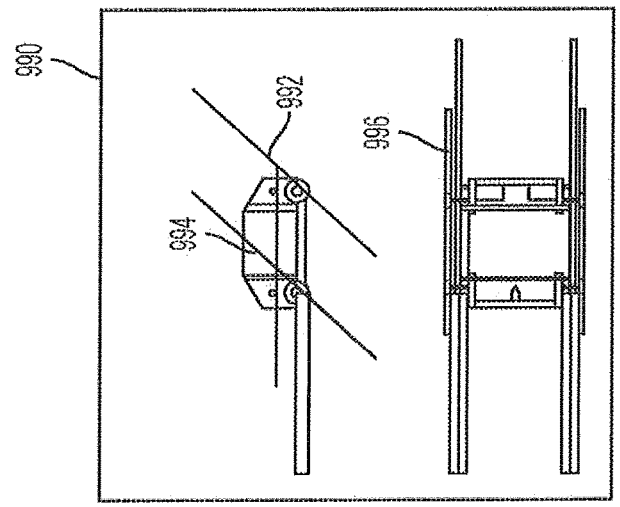
FIG. 37C is a side view of a vehicle with a ramp in accordance with aspects of the disclosed embodiment.
Figure 37D:
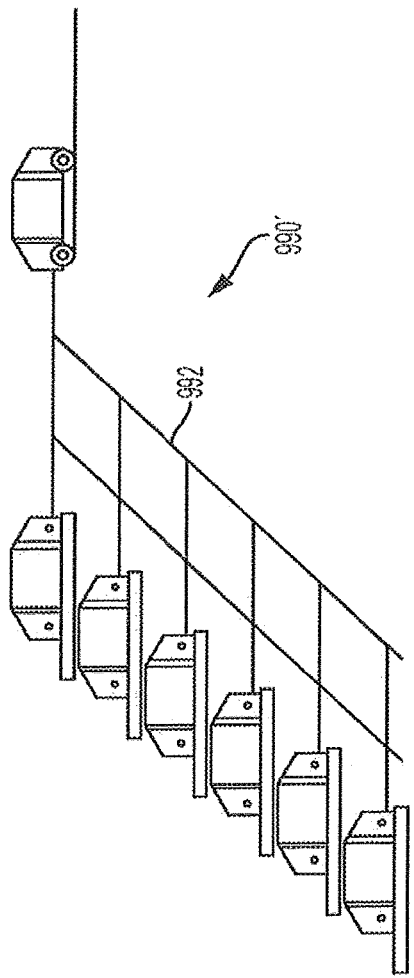
FIG. 37D is a side view of vehicles with a ramp module in accordance with aspects of the disclosed embodiment.
Figure 38A:
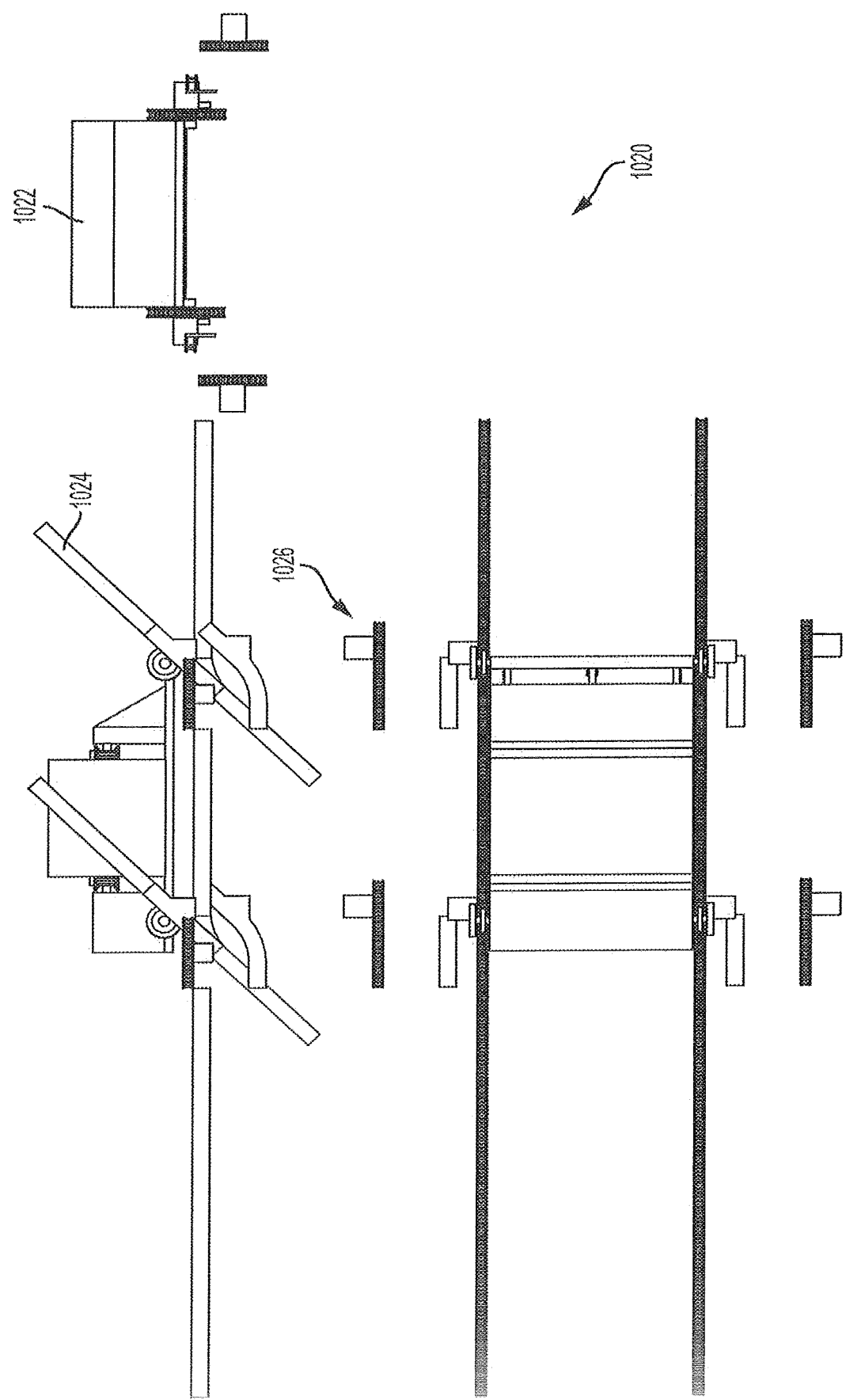
FIG. 38A is a side, end and top view of a vehicle with a ramp in accordance with aspects of the disclosed embodiment.
Figure 38D:
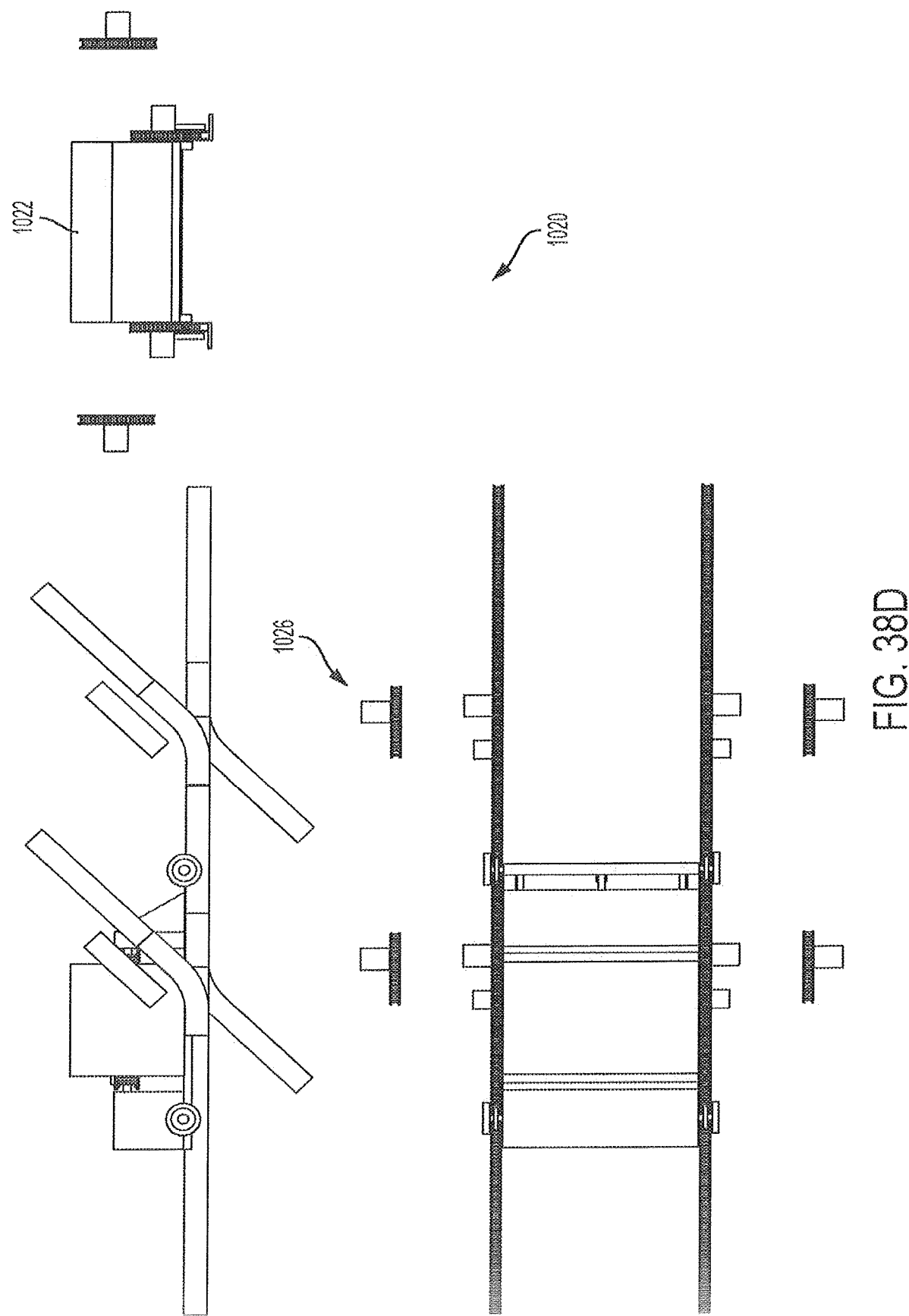
FIG. 38D is a side, end and top view of a vehicle with a ramp in accordance with aspects of the disclosed embodiment.

Aisle Ramps (passive-track embodiment) are structural subassemblies (modules) interconnecting the storage levels within a given Storage Zone (one tier section of one aisle) and the Transit Deck of that tier. FIGS. 37A through 37C shows side and top views of example vehicle with ramp 990 and FIG. 37D shows a side view of example vehicles with ramp module 990'. Each Aisle Ramp module provides pathway for Bots to move between the Transit Deck and any of the interconnected storage levels. Travel can be either bidirectional or unidirectional depending on system topology, i.e. single-ended or double-ended, respectively. Each ramp module includes four diagonal Ramp Tracks 992, one for each of the four wheels on a Bot 994, which are constructed of passive roller-chain welded to a U-shaped channel. Roller chain on each track is engaged by one of four sprocket wheels on the robot. Four tracks enable the robot to remain horizontal when ascending or descending the diagonal ramp. Each ramp module also includes a pair of horizontal Bot Rails 996 positioned between ramp tracks at each elevation at which Bots can enter or exit the ramp. Bot Rails connect on one side to Transit Deck at top of ramp and on other side to each storage level within that Storage Zone. A Bot descending a ramp can enter the ramp only at the top of the ramp from the Transit Deck and can exit the ramp at any storage level within the zone (no reversing maneuver required in either direction) as seen in FIG. 37D. A Bot ascending the ramp can enter the ramp only from one of the storage levels and can exit the ramp only at the top of the ramp to the Transit Deck (no reversing maneuver required in either direction). Rail pitch (distance between rails) is same as aisle width except in the "ramp zone" near the ramp tracks, where pitch increases. A gap exists in the Bot Rail immediately adjacent to each of the four ramp tracks, which allows the sprocket-wheel axles of a Bot ascending or descending the ramp to pass through the rail.

Transit Ramps are structural subassemblies interconnecting the multiple tiers within a system. Each Transit Ramp provides a pathway for robots to move between interconnected Transit Decks, i.e. between tiers. Travel on Transit Ramps is unidirectional by default in order to maximize throughput, but can be bidirectional (at lower throughput) if necessitated as a result of an operational problem that prevents travel on one or more Transit Ramps. Basic design same as that of Aisle Ramps, for example, four roller-chain Ramp Tracks with Bot Rails at each entry/exit elevation. Configuration differs in that all Bot Rails connect on both ends to Transit Decks of each tier. Bots ascending or descending a ramp can enter a ramp from any tier and exit at any other tier, reversing maneuver required on entry if descending (except from top tier) and on exit if ascending (except to bottom tier). Transit Ramps with travel going up are equipped with charging rails so that Bots can recharge their super-capacitors while ascending.

Figure 39A:
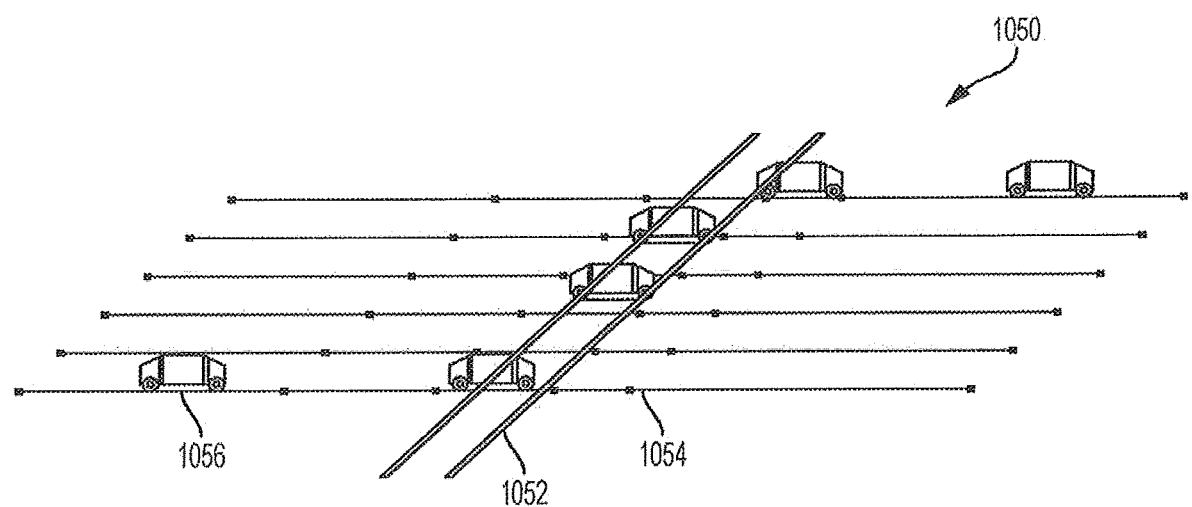
FIG. 39A is a side view of vehicles with a ramp in accordance with aspects of the disclosed embodiment.
Figure 39B:
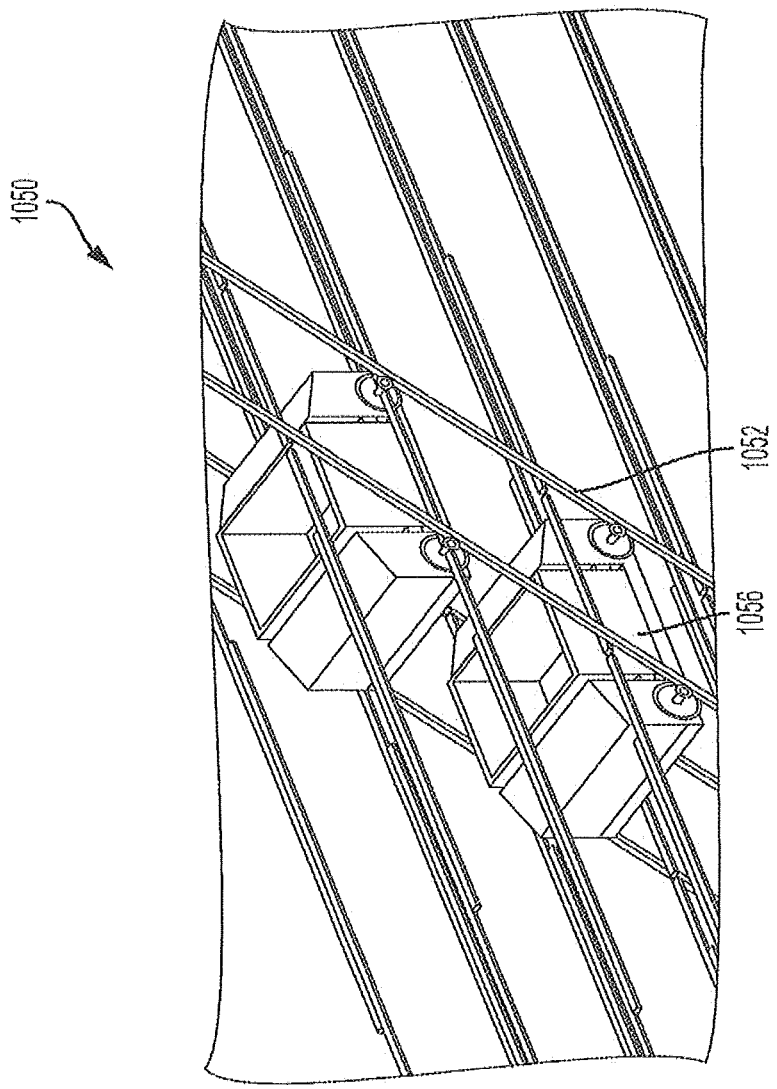
FIG. 39B is an isometric view of vehicles with a ramp in accordance with aspects of the disclosed embodiment.
Figure 39C:
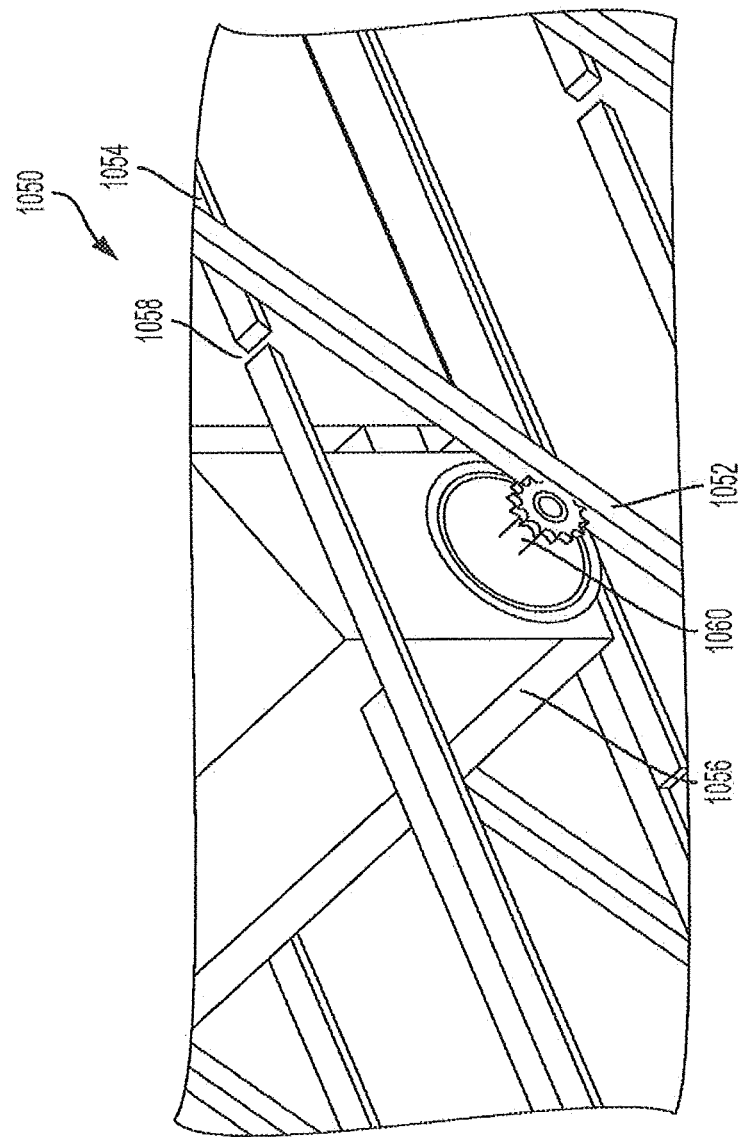
FIG. 39C is an isometric view of a vehicle with a ramp in accordance with aspects of the disclosed embodiment.
Figure 39D:
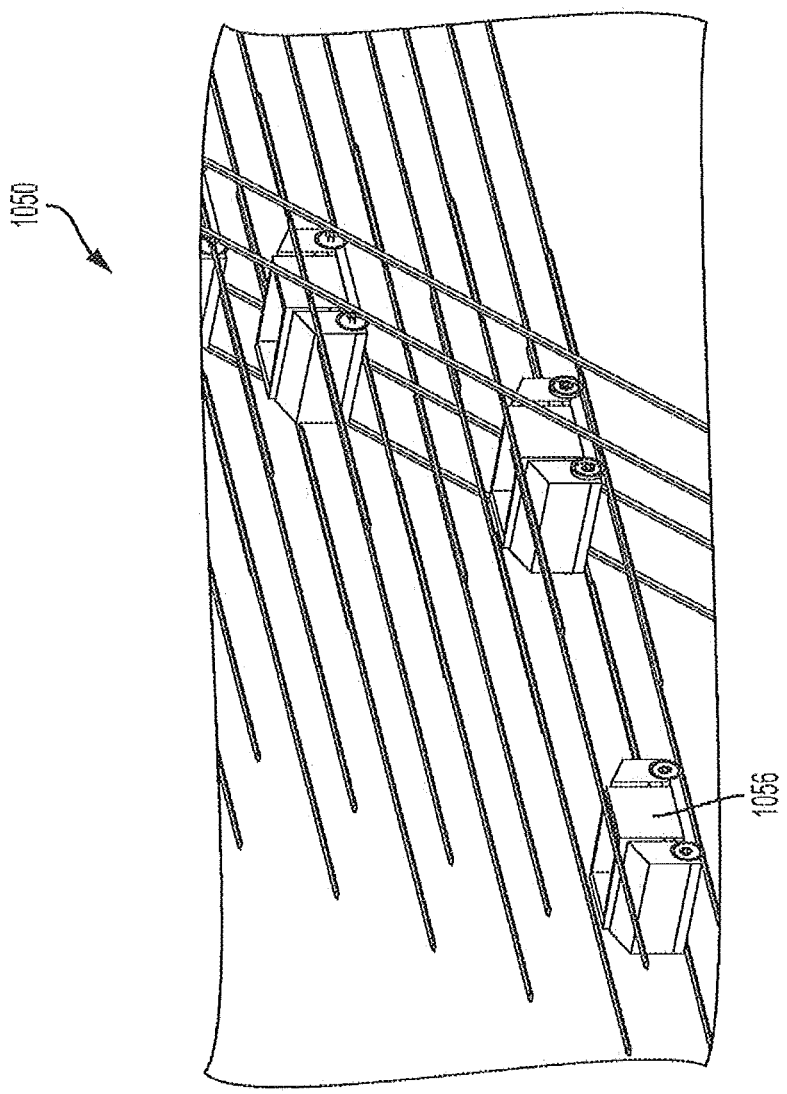
FIG. 39D is an isometric view of vehicles with a ramp in accordance with aspects of the disclosed embodiment.
Figure 39E:
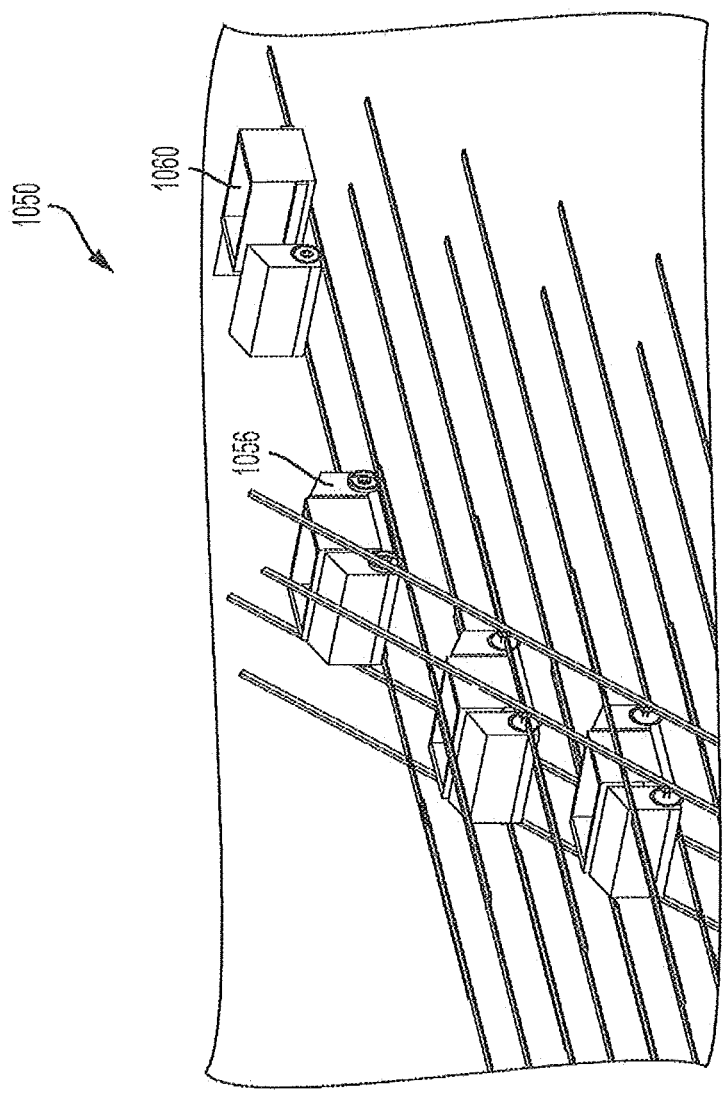
FIG. 39E is an isometric view of vehicles with a ramp in accordance with aspects of the disclosed embodiment.
Figure 40B:
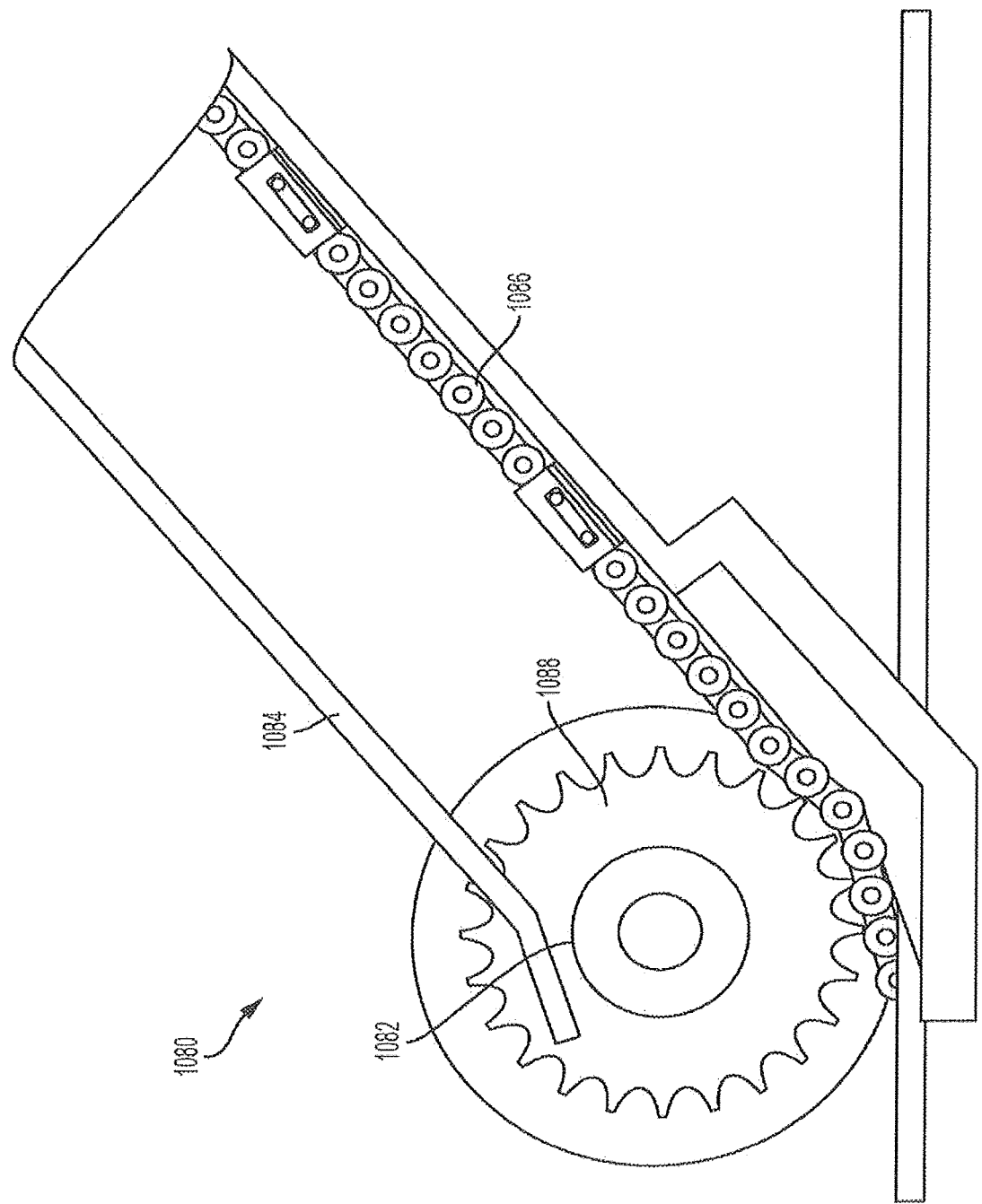
FIG. 40B is a side schematic view of a transmission in accordance with aspects of the disclosed embodiment.
Figure 40C:
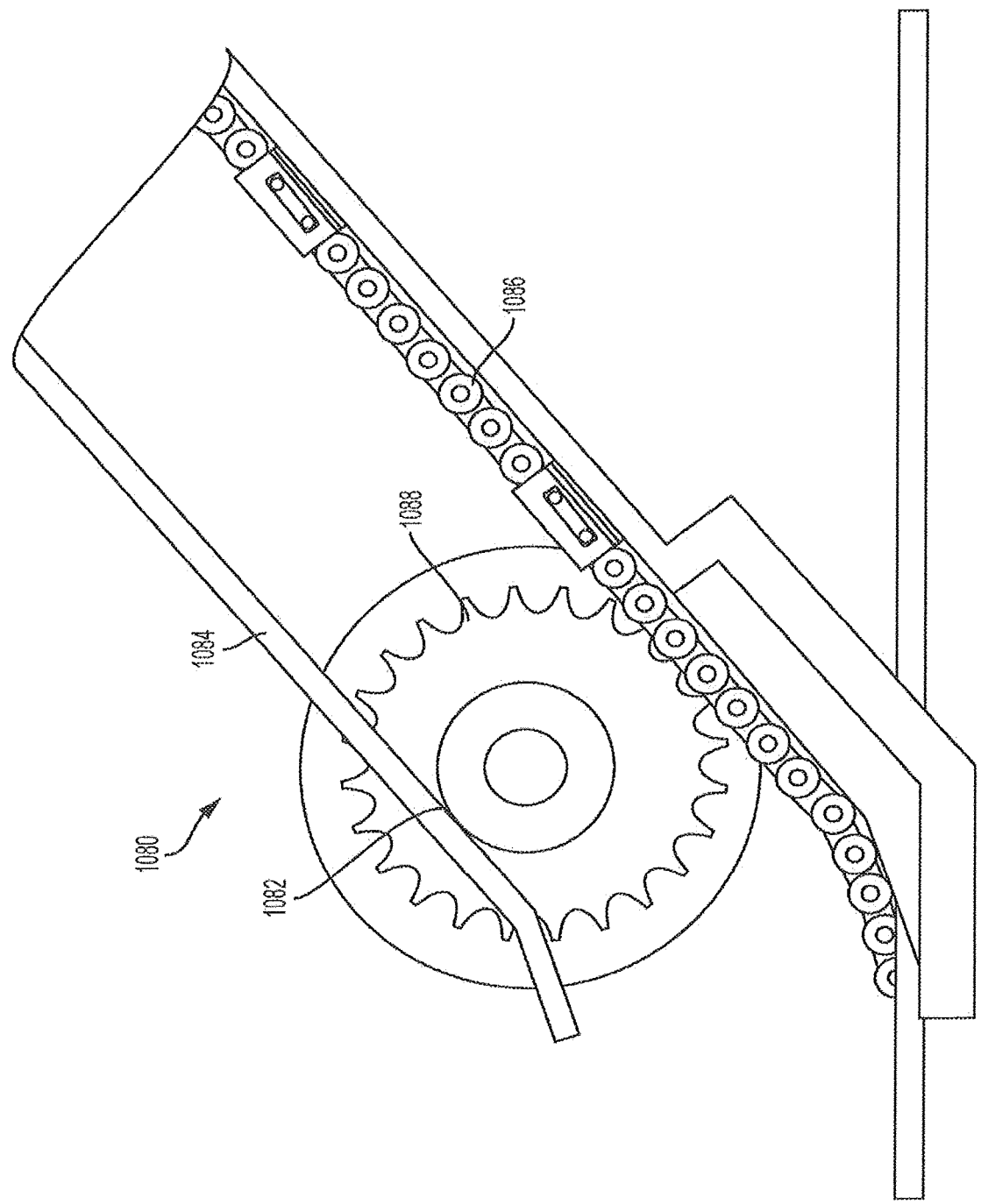
FIG. 40C is a side schematic view of a transmission in accordance with aspects of the disclosed embodiment.
Figure 40D:
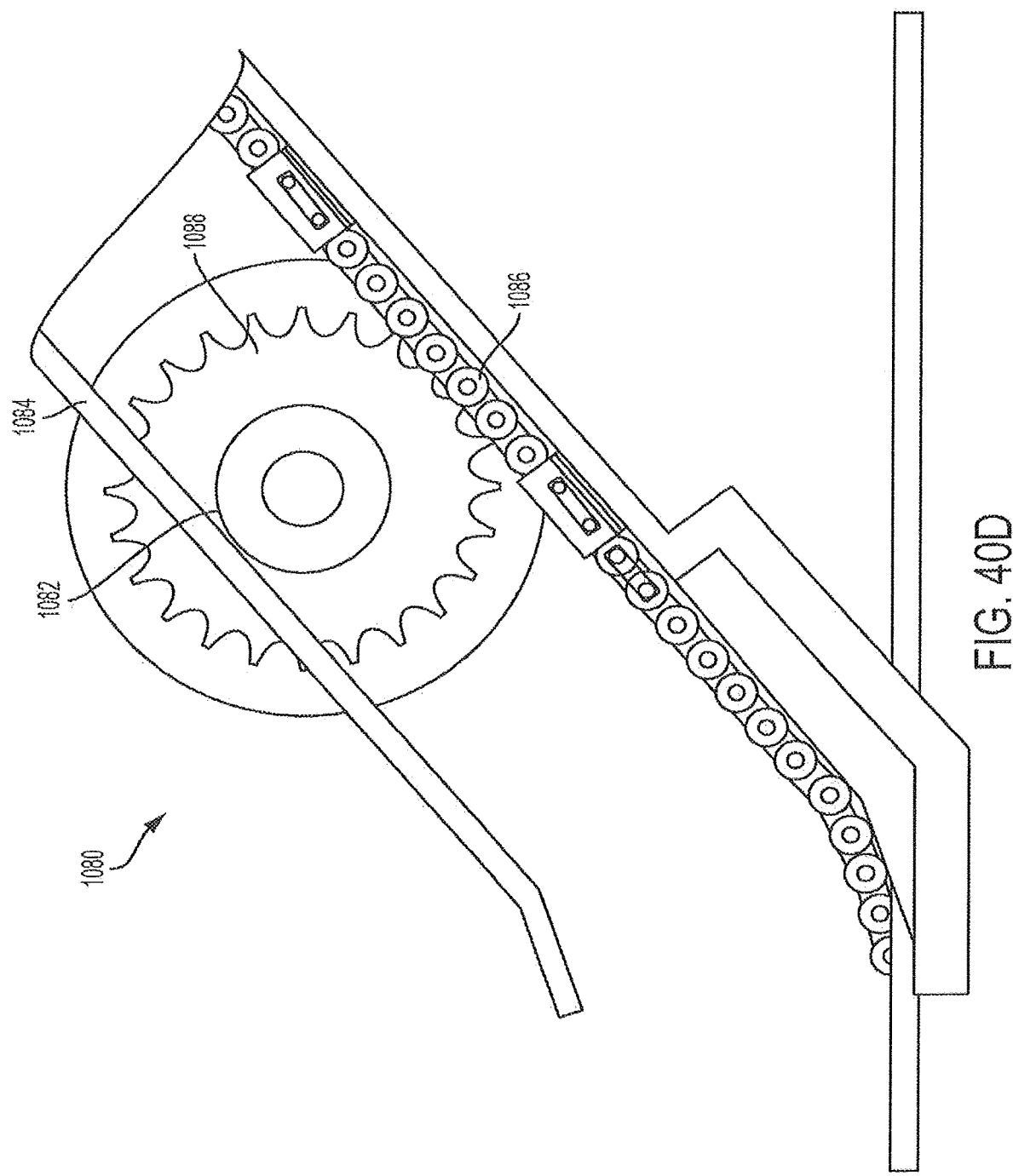
FIG. 40D is a side schematic view of a transmission in accordance with aspects of the disclosed embodiment.

Referring now to FIG. 39A, there is shown a side view of vehicles with a ramp 1050. Referring also to FIGS. 39B through 39E, there are shown isometric views of vehicles with a ramp 1050. FIG. 39A shows a side elevation of ramp 1052 and track 1054. Robotic Vehicles 1056 can enter ramp 1052 on any level and exit ramp 1052 on any level. FIG. 39A shows only entering on bottom level and exiting on top level. FIG. 39B shows robot vehicles 1056 climbing "ramp" 1052. In climbing mode, their wheels are retracted "in" to allow them to rise between the "outer horizontal tracks". Their wheel sprockets are extended "out" to engage "passive roller chain" linearly affixed in the "ramp". FIG. 39C shows a close-up of robotic vehicle 1056 climbing a ramp 1052. A "break" 1058 in "outer horizontal track" 1054 allows "sprocket axle" 1060 to pass through. Here, a completely passive track and ramp system is achieved with no switches or moving parts in the structure. FIG. 39D shows robotic vehicle 1056 in the "non-ramp zone". In the "non-ramp zone", robotic vehicle 1056 drives with wheels and sprockets "in" on "inner horizontal track" to make robotic vehicle 1056 as narrow as possible to reduce storage footprint. When a robotic vehicle 1056 passes through a "ramp-zone" without climbing, it extends its wheels "out" to ride on the "outer horizontal track" that straddles the width of the robotic vehicle 1056 with wheels "in". FIG. 39E shows robotic vehicle 1056 has just exited ramp on top level. The robotic vehicle 1060 is delivering a Tote to a passive storage location adjacent to the "inner horizontal track". Referring also to FIGS. 40A through 40D, there are shown side schematic views of wheels with sprockets 1080 engaging a ramp. Here, counter bearing 1082 engages counter rail 1084 while chain 1086 is engaged by sprocket 1088. FIGS. 40A and 40B show initial engagement where a rubber backing may be provided to enable chain meshing and limit engagement wear. FIGS. 40C and 40D show further progression up the ramp.

BTS—Active Ramp Alternative

Active ramps also use four roller-chain ramp tracks that are engaged by sprocket wheels on Bots. FIGS. 38A through 38D show side, end and top views of a vehicle with a ramp 1020. Here, vehicle 1022 climbs or descends ramp 1024. The figure shows alternative to passive ramp configuration. In this case, ramps include switches 1026 that may be either actuated by the robot or actuated with motors located on the ramps. The motors are commanded by either the robot locally or a central Material Control System (MCS). Here, the ramp tracks are active rather than passive: at each ramp entry and exit point there is a mechanism that can switch any of multiple segments into position to control the path that the vehicle will take when the sprocket wheels engage those segments. This ramp design simplifies and reduces the cost of the robot compared to the passive-track design, but adds complexity and cost to the ramps; while typical applications will favor the passive-track embodiment, applications that require little storage but high throughput may favor the active-track.

T-Bots

Figure 25C:
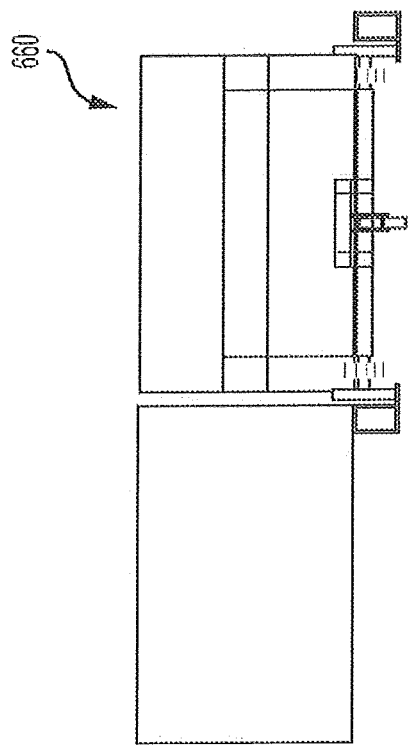
FIG. 25C is an end view of a vehicle in accordance with aspects of the disclosed embodiment.
Figure 25A:
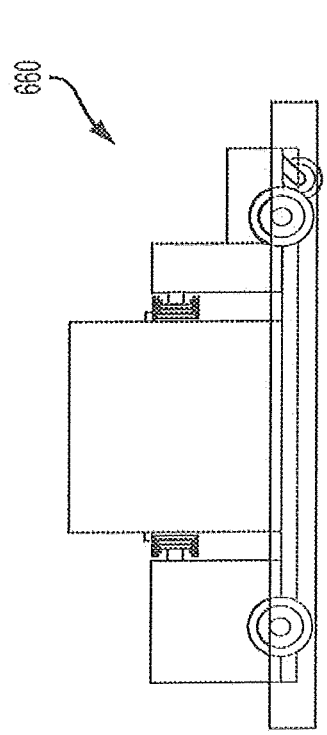
FIG. 25A is a side view of a vehicle in accordance with aspects of the disclosed embodiment.
Figure 25B:
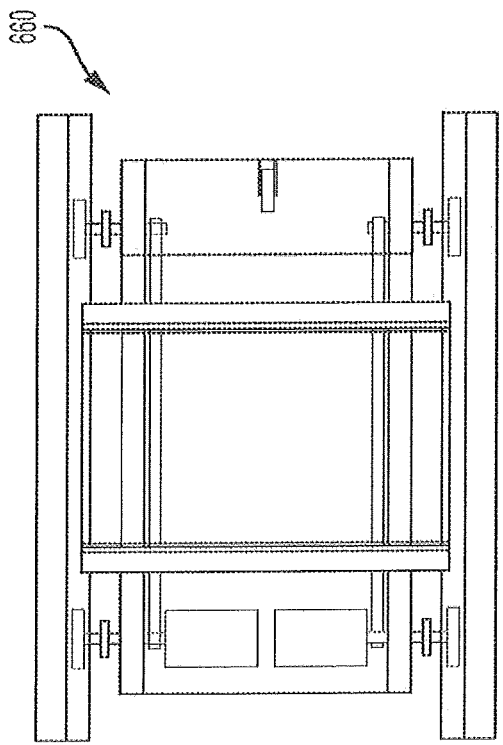
FIG. 25B is a top view of a vehicle in accordance with aspects of the disclosed embodiment.
Figure 31A:
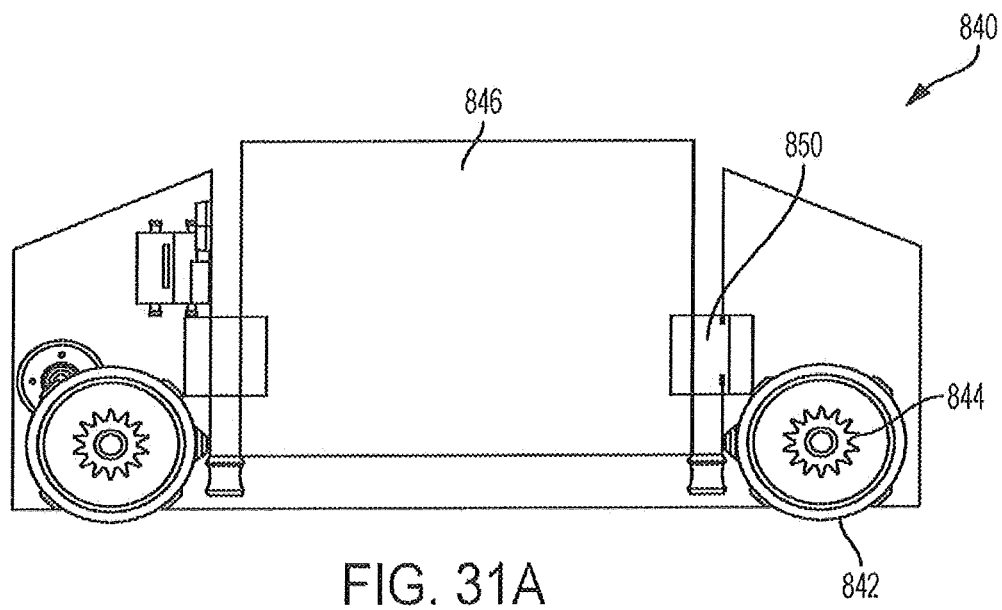
FIG. 31A is a side view of a vehicle in accordance with aspects of the disclosed embodiment.
Figure 31B:
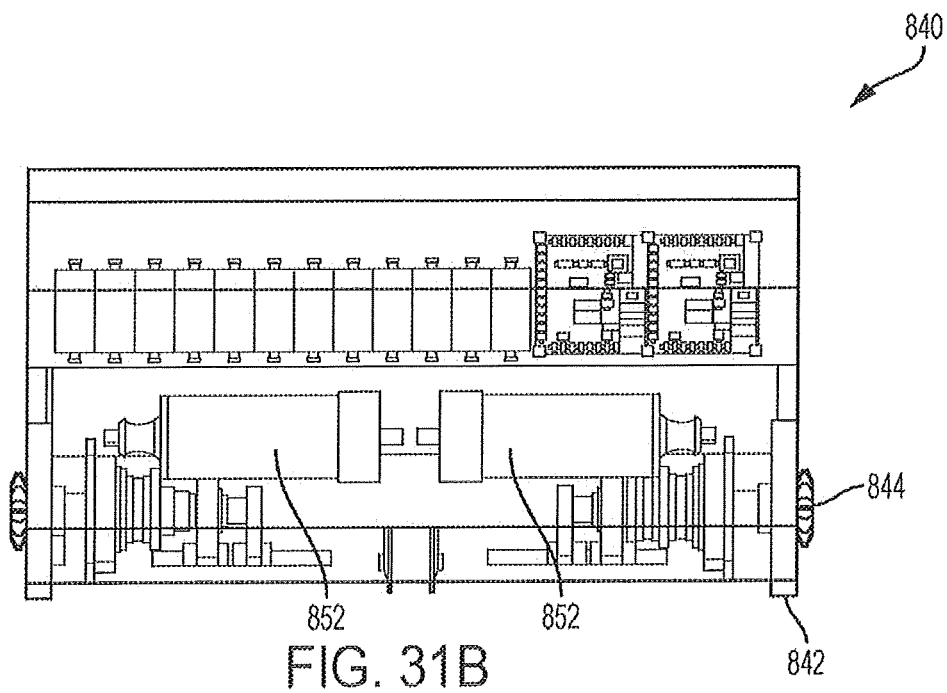
FIG. 31B is an end view of a vehicle in accordance with aspects of the disclosed embodiment.
Figure 31C:
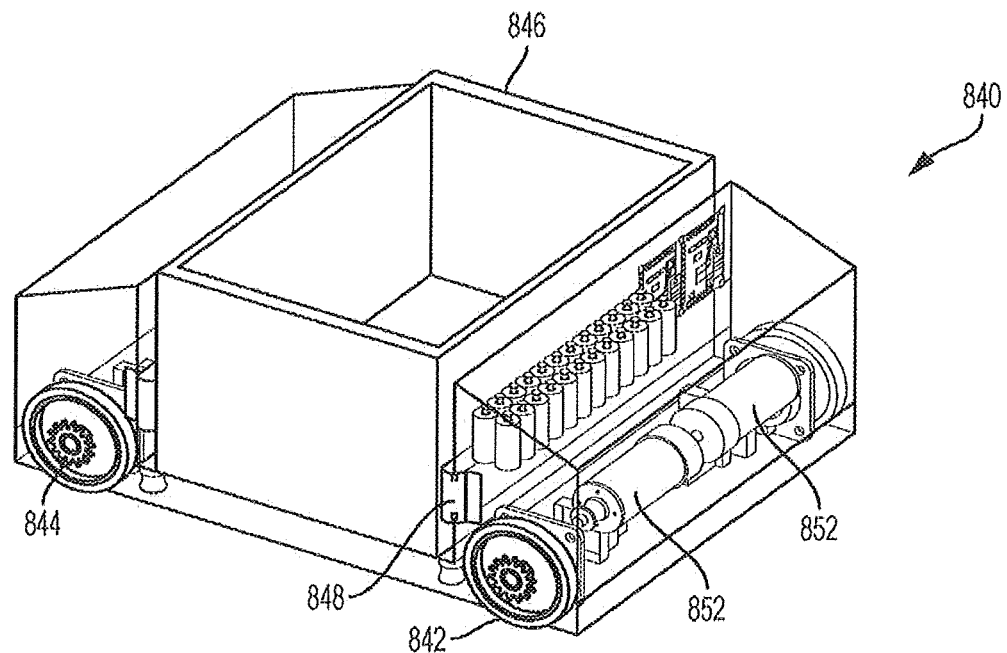
FIG. 31C is an isometric view of a vehicle in accordance with aspects of the disclosed embodiment.
Figure 31D:
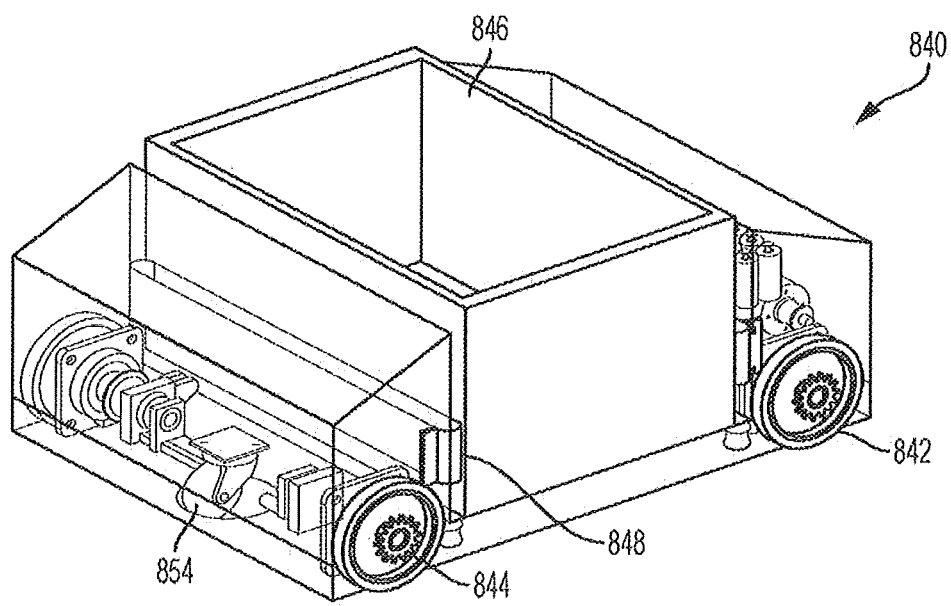
FIG. 31D is an isometric view of a vehicle in accordance with aspects of the disclosed embodiment.
Figure 33:
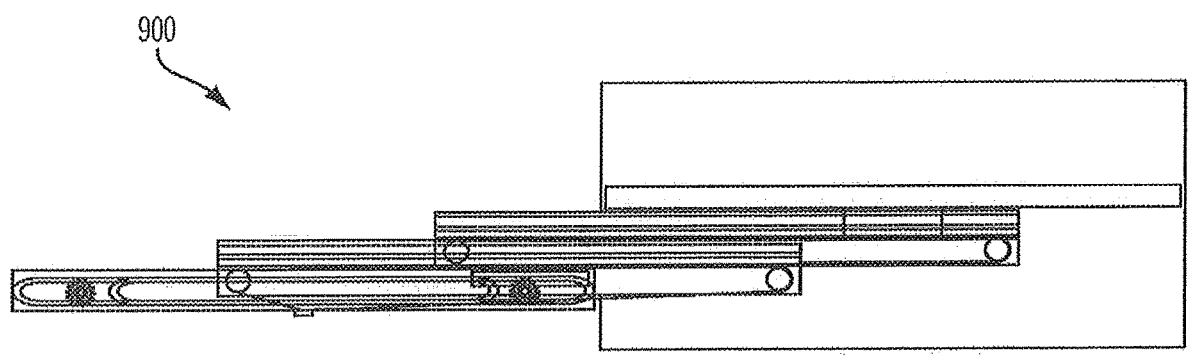
FIG. 33 is a partial side view of a vehicle drive in accordance with aspects of the disclosed embodiment.
Figure 34A:
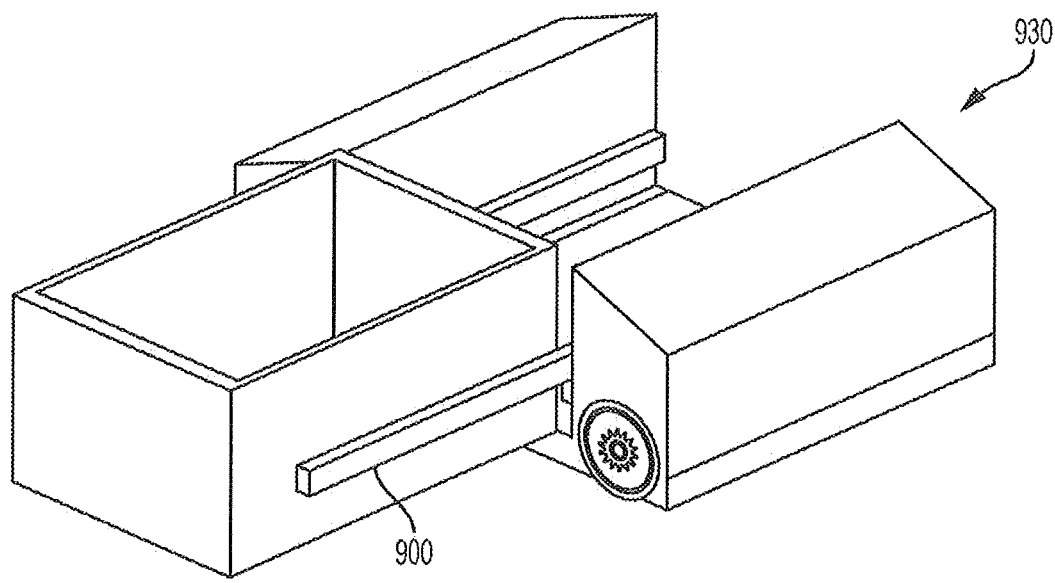
FIG. 34A is an isometric view of a vehicle in accordance with aspects of the disclosed embodiment.
Figure 34B:
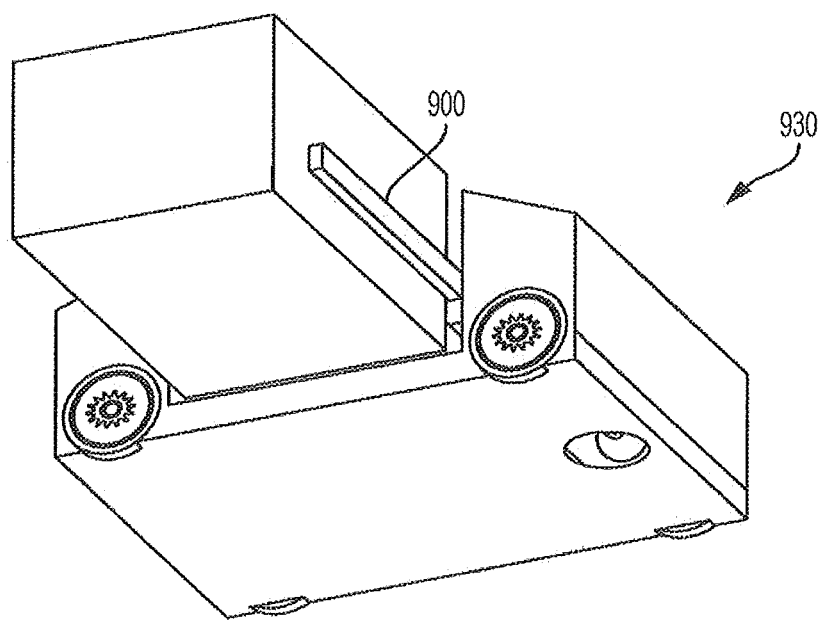
FIG. 34B is an isometric view of a vehicle in accordance with aspects of the disclosed embodiment.

T-Bots are vehicular robots having an approximately rectangular chassis and body panels. By way of example, FIGS. 25A, 25B and 25C show side, top and end views respectively of example vehicle or Tote-Bot "T-Bot" 660. A T-Bot may have an onboard control computer system, including wireless LAN (802.11x) interface for communication with CCS. A T-bot may have sensors as required for location, navigation, payload transfers, etc. FIG. 33 shows a partial side view of vehicle drive or Tote transfer mechanism 900. A T-bot may have a Tote-transfer mechanism 900 by means of which the Bot moves P-Totes or O-Totes between its payload bay and Tote-placement positions in the TSS, at workstations, or at the I/O Interface. As an alternative to Tote sliding, the robotic vehicle may be provided with assembly that permits the Tote to be lifted. Here, FIG. 33 shows a side elevation of a telescoping Tote extend and lift/lower using one drive motor. Slide stages are extended using looped belt or cable anchored on preceding stage. First moving stage follows a chain drive with parallel bearings in elliptical profile to provide lifting and lowering with stage fully extended to left or right. Referring also to FIGS. 34A and 34B, there are shown isometric views of example vehicle 930 with Tote-transfer mechanism 900 extended. FIG. 34A shows the robotic vehicle serving as a P-Bot or O-Bot with linear sliding extension rails that may or may not be lifting. Similarly, FIG. 34B shows a bottom view of a robotic vehicle acting as a P-Bot or O-Bot. A caster wheel on the bottom rear of the robotic vehicle that permits steering on decking, for example, when not in a rack system or on ramp. Here, the robot loads Totes onboard by extending the transfer mechanism to either side of the robot (ambidextrous), engaging the target Tote, and then pulling the Tote onboard by retracting. Further, the Bot unloads Totes by extending the mechanism (which is already engaged with the Tote) to either side to place Tote at target location, releasing the Tote, and then retracting the mechanism. The Bot can either slide the Tote across a supporting surface or lift the Tote prior to the retraction/extension, which would eliminate the need for a supporting surface under the Tote. Referring also to FIGS. 31A and 31B, there are shown side and end views respectively of vehicle 840. Referring also to FIGS. 31C and 31D, there are shown isometric views of vehicle 840. FIG. 31A shows a side elevation of robotic vehicle 840 showing wheels 842, sprockets 844 and Tote 846. Electronics and ultra-capacitors 848 for energy storage are visible in top left. Tote 846 is pushed/pulled into storage using drive belts 848 with flaps 850 shown.

Figure 29A:
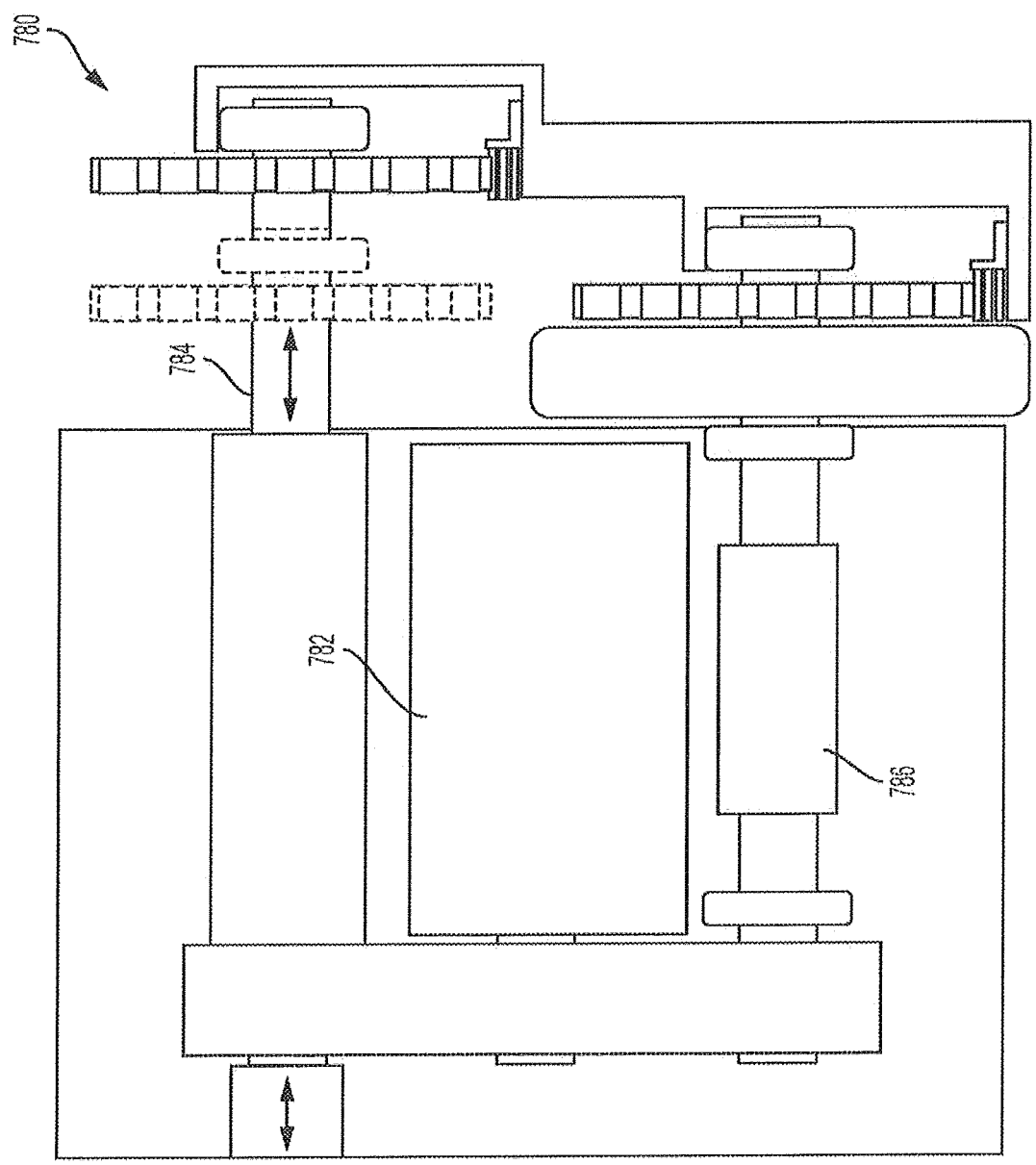
FIG. 29A is a top schematic view of a vehicle drive in accordance with aspects of the disclosed embodiment.
Figure 29B:
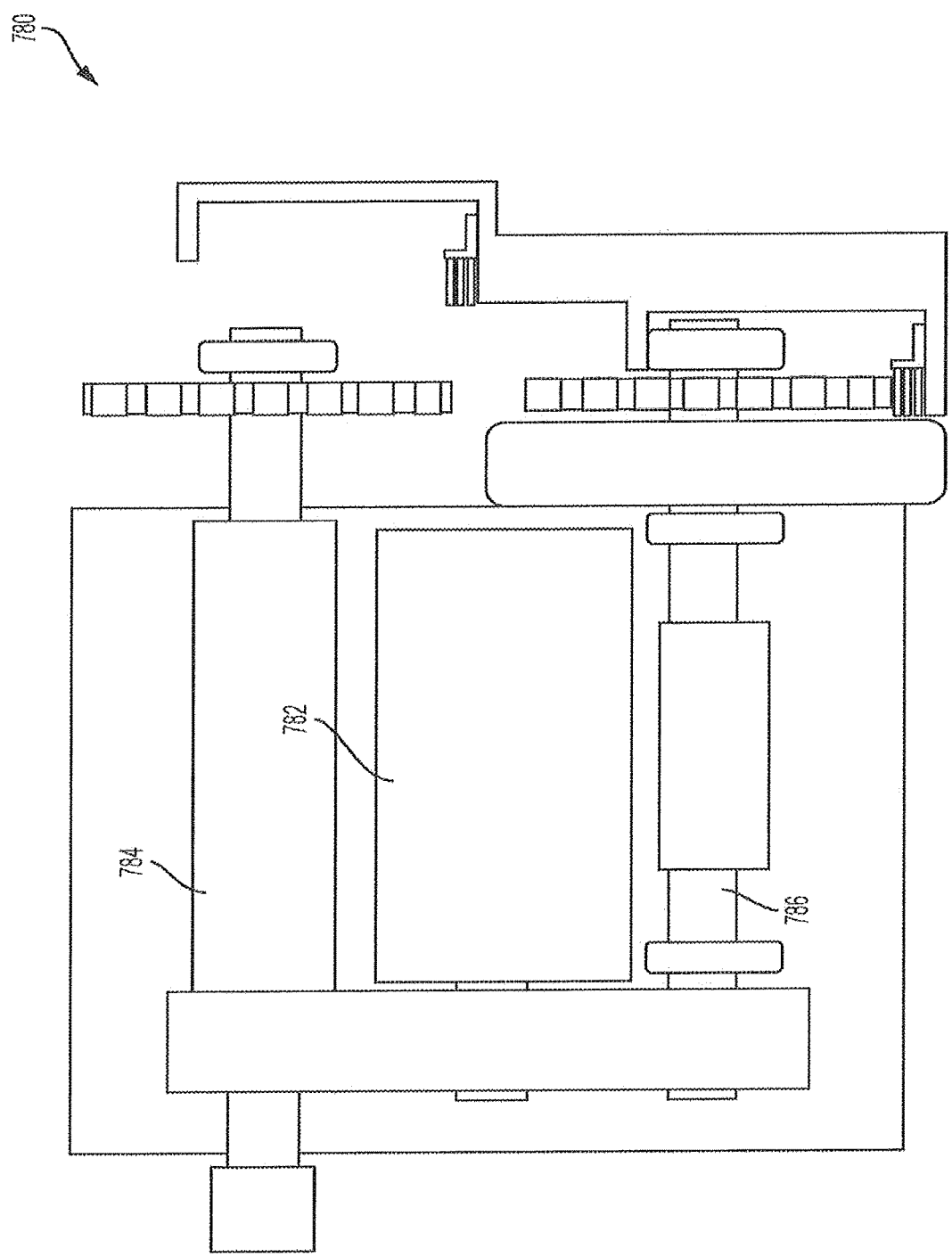
FIG. 29B is a top schematic view of a vehicle drive in accordance with aspects of the disclosed embodiment.
Figure 29C:
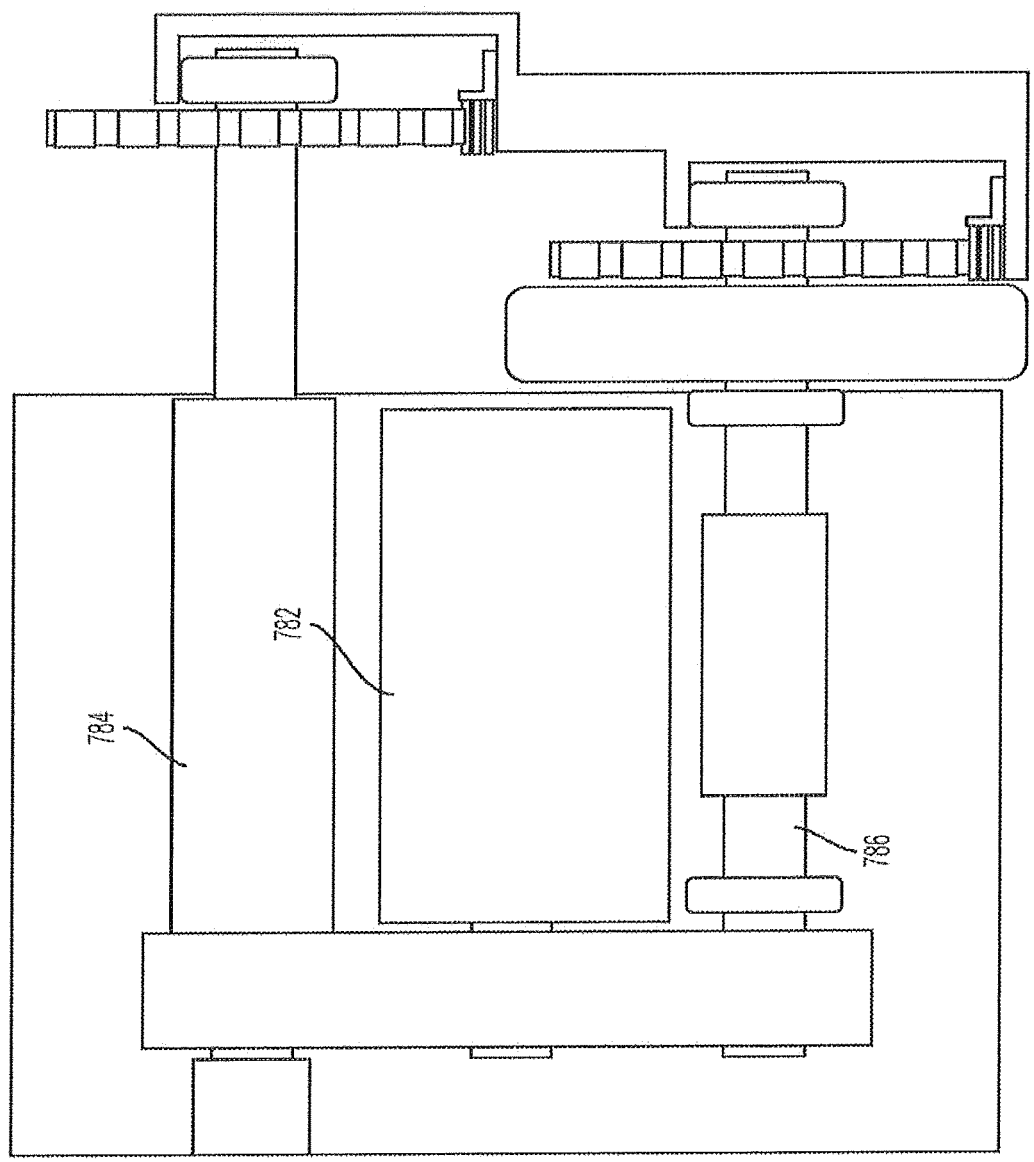
FIG. 29C is a top schematic view of a vehicle drive in accordance with aspects of the disclosed embodiment.
Figure 30A:
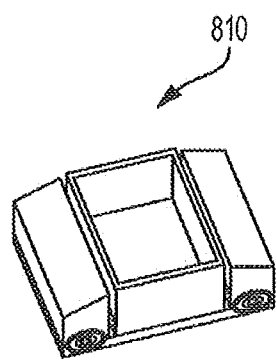
FIG. 30A is an isometric view of a vehicle in accordance with aspects of the disclosed embodiment.
Figure 30B:
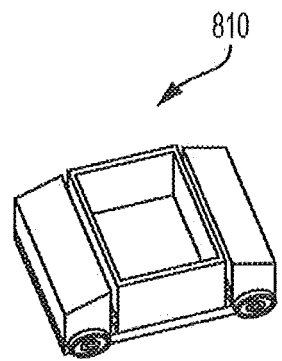
FIG. 30B is an isometric view of a vehicle in accordance with aspects of the disclosed embodiment.
Figure 30C:
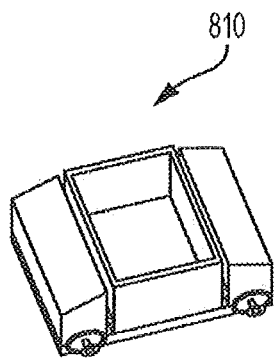
FIG. 30C is an isometric view of a vehicle in accordance with aspects of the disclosed embodiment.
Figure 30D:
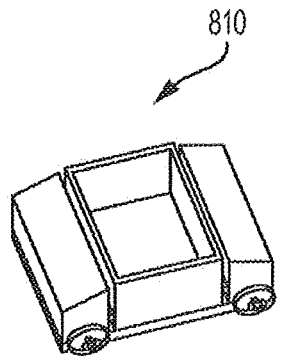
FIG. 30D is an isometric view of a vehicle in accordance with aspects of the disclosed embodiment.
Figure 32:
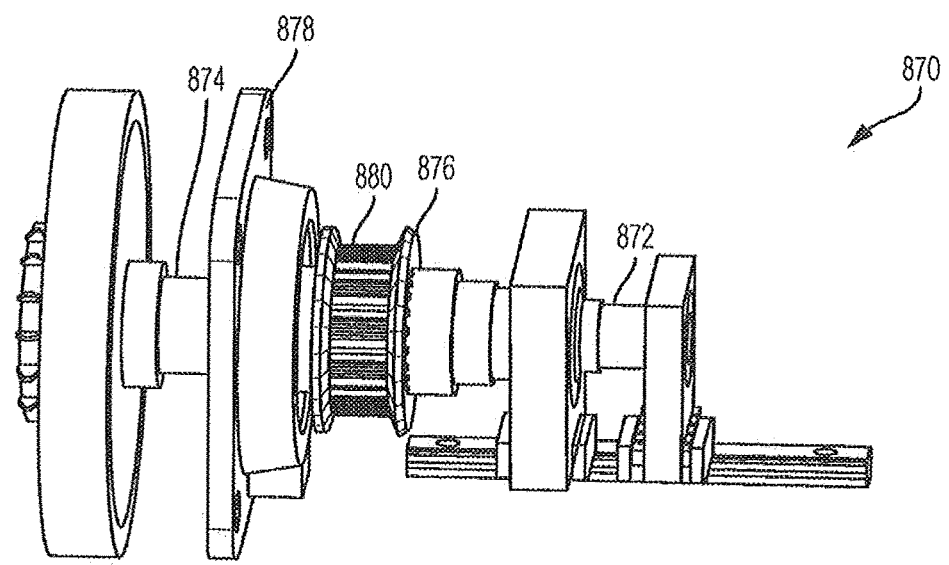
FIG. 32 is a partial isometric view of a vehicle drive in accordance with aspects of the disclosed embodiment.

Referring now to FIG. 32, there is shown a partial isometric view of vehicle drive 870 wheel/sprocket assembly. Here, solid sprocket shaft 872 is contained within hollow wheel shaft 874 contained with hollow drive shaft 876. Shafts are keyed and separated by IGUS polymer bushing to allow axial movement. Drive shaft 876 is supported by flange bearing 878 and driven by toothed pulley 880 shown. End of sprocket and wheel shafts are supported by thrust bearing that is independently extended or retracted. Extension and retraction may be driven by linkage, cable with return spring or pneumatic actuators. Each robotic vehicles has four actuated wheels assemblies, each assembly having an outer cylindrical running wheel, mounted to a hollow drive shaft that is slidably mounted to an actuator. Upon actuation, axle and wheel are extendable and retractable between two wheel positions (retracted position and extended position). Referring now to FIGS. 30A through 30D, there are shown isometric views of example vehicle 810. These figures show four states of the robotic vehicle wheels and sprockets: FIG. 34A shows wheels in, sprockets in, FIG. 34B shows Wheels out, sprockets in, FIG. 34C shows Wheels in, sprockets out, FIG. 34D shows Wheels out, sprockets out. All four states are required as will be described with respect to ramps. When passing through a ramp zone without climbing the state is wheels "out" to engage "outer horizontal track". When entering "up ramp" the state is wheels "out" when approaching "ramp zone", once first wheel passes first ramp sprockets are extended "out", once vehicle starts climbing, wheels are retracted "in" to allow the robotic vehicle to fit between the "outer horizontal tracks". When climbing or descending a ramp the state is Wheels "in", sprockets "out". When exiting an "up ramp" and climbs just above track to be exited the state is extended wheels "out", back down ramp onto "outer horizontal track", back up on "horizontal track", retract sprockets "in" to proceed forward. When entering "down ramp" the state is wheels "out" when approaching ramp zone, once first wheel passes first ramp, sprockets are extended "out. When the robotic vehicle backs up on "outer horizontal track" and climbs ramp backward the wheels are retracted "in" and the robotic vehicle proceeds down the ramp. When exiting a "down ramp" and as the robotic vehicle nears level to exit, the wheels are extended "out" to land on "outer horizontal track". Once on the track, sprockets are retracted "in". Once clear of a "ramp zone" the wheels are retracted "in". Referring also to FIGS. 29A through 29C, there are shown views of example alternate embodiment vehicle drive 780 that has parallel shafts as opposed to concentric shafts. Drive 780 has drive motor with encoder and break 782, first driven shaft with sprocket and bearing 784 and second driven shaft with sprocket and bearing 786. Running wheels runs on horizontal surfaces.

Figure 20A:
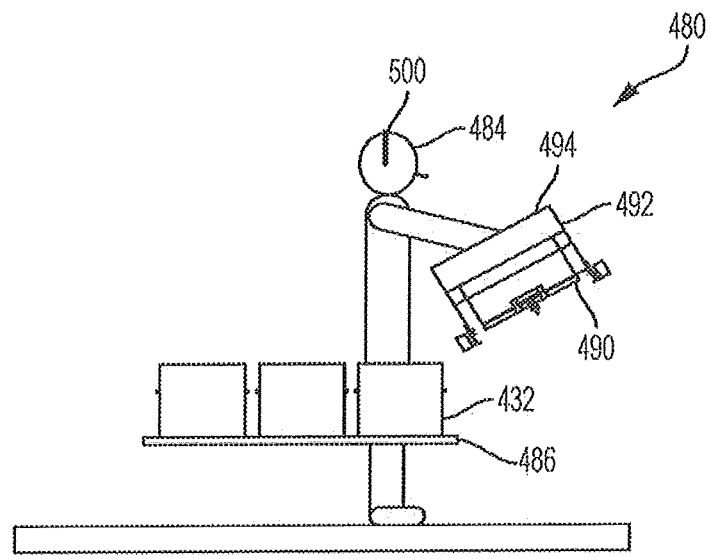
FIG. 20A is an elevation view of an example workstation in accordance with aspects of the disclosed embodiment.
Figure 20B:
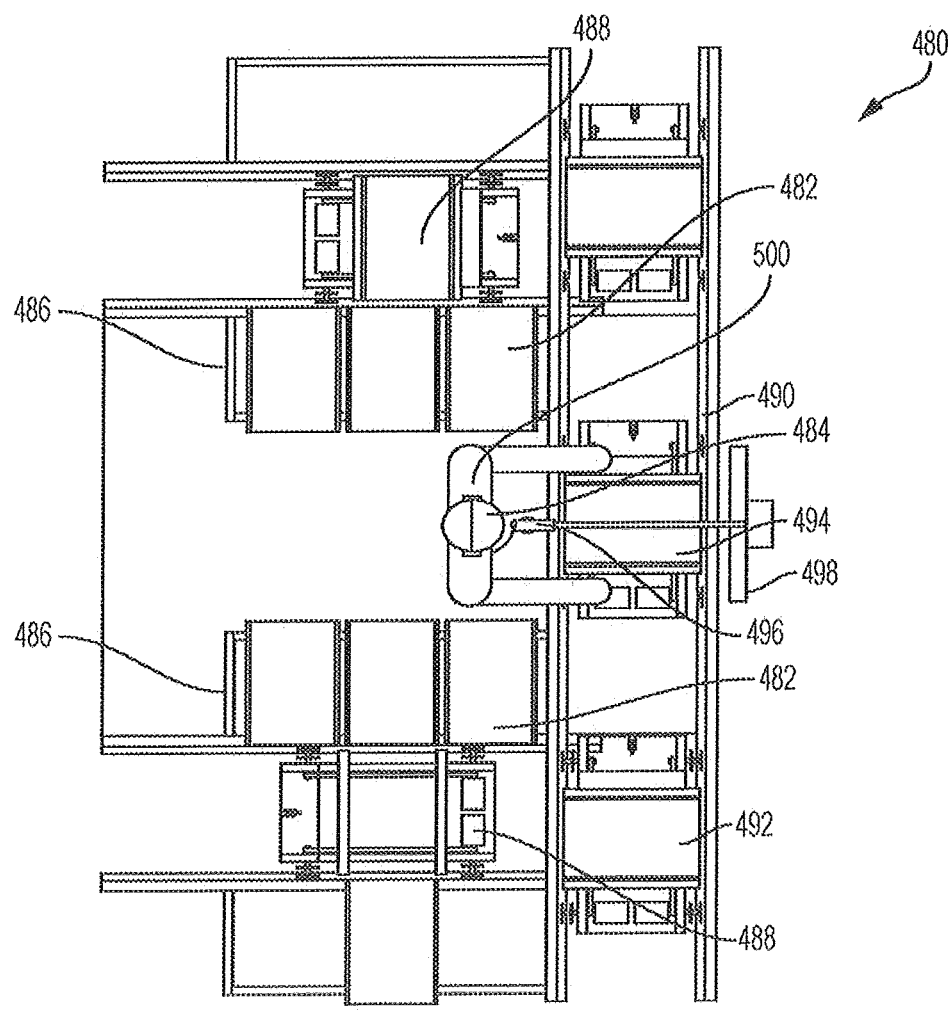
FIG. 20B is a plan view of an example workstation in accordance with aspects of the disclosed embodiment.

Direct Put Workstation Embodiment A:

Referring now to FIGS. 20A and 20B, there are shown elevation and plan views respectively of an example workstation 480. Direct put workstation 480 is a Picker-to-Tote Multi-order workstation design in which multiple O-Totes 482 being filled concurrently remain stationary on holding racks 486 and picker 484 moves to the target Tote on each put. This embodiment may be simpler than Workstation Embodiment B described below, but it requires more movement on the part of the picker, which may result in a lower throughput.

The workstation subsystem has Tote-holding racks 486. There is one Tote-holding rack on each side of picker 484, immediately next to picker, with rear access by O-Bots 488. Empty O-Totes are placed on Holding Racks by O-Bots, remain there until filled, and are then removed by O-Bots. A P-Bot Tilt-Fixture 490 is shown as a tracked fixture immediately in front of picker 484. Here, P-Bots 492 sequentially drive into fixture 490 from one side, stop in position for picker to remove designated number of eaches from onboard P-Tote, then drive out of fixture from the other side and exit Workstation. The fixture tilts Bot roughly 30° towards picker 484 to make it easier for picker 484 to reach and remove eaches from the onboard P-Tote 494. Tilt-Fixture and possibly queue lane leading into fixture are equipped with charging rail so that Bots can recharge super-capacitors on each trip to a workstation. A Machine-Vision Subsystem ("MVS") 496 is shown mounted directly above the Bot Tilt-Fixture where there is a camera assembly (including illumination as required) that looks down on the P-Tote in pick position, and above each Holding Rack are camera assemblies that look down on the O-Totes on the rack. The cameras are connected to vision-computer that is programmed to follow the movements of the picker's hands and analyze the contents of target Totes both before and after the pick/put transaction. Here, pickers may wear gloves that facilitate the process. Target illuminators are shown co-mounted with each camera assembly is a light source, for example, a laser or spotlight that can be aimed at any location within any Tote within the camera's field of view, the purpose of which is to assist the operator in accurately executing the pick/put by illuminating both the location of the target SKU to be picked and the target location within the target O-Tote into which the picked each is to be put. A picker interface is shown where the Workstation Control Computer is able to receive information from and provide information to the picker: 1) Display Screen 498 that shows the remaining number of eaches required to be picked from the target P-Tote, which is decremented with each pick/put cycle; 2) Headset 500 worn by picker, which includes earphone speakers whereby he/she can receive synthesized speech input (and optionally listen to background music) and a microphone whereby he/she can provide input to the computer via its voice-recognition capability. A Workstation Control Computer ("WCC"), manages all processes and activities associated with picking eaches at the workstation. This can be either a "logical" computer running as part of CSS or alternately a separate physical computer that is dedicated to controlling one or more workstations and communicates with the CSS over a network (wired or wireless). The WCC interfaces to picker, Machine-vision subsystem, Target Illuminators, and to P-Bots when they are operating under WCC control; when a P-Bot arrive at entry to workstation queue, CCS passes control of that Bot to WCC.

The workstation process may have the following steps starting with a P-Bot already in Tilt-Fixture and O-Totes on Holding Racks that are repeated recursively until there are no more order-lines to be filled at workstation. WCC activates two Target Illuminators to illuminate both pick and put locations. MVS captures "before" image of P-Tote and target O-Totes. WCC displays on screen both the number of eaches remaining to be picked for current order-line and a graphic showing target O-Tote, and synthesizes voice input of same information through headphones. MVS tracks motion of picker's hands during a pick by means of camera looking down on P-Tote and verifies that picker is picking correct SKU; when hand clears pick zone with picked each: MVS captures "after" image of P-Tote and verifies by comparison with "before" image that at least one each has been removed from P-Tote; WCC decrements the display on screen of number of eaches to be picked; If picked each is final one for current SKU transaction, WCS commands P-Bot to drive off of Tilt-Fixture, the next P-Bot to drive onto Tilt-Fixture, and all other P-Bots in picking queue to advance one Bot Position; the indexing of P-Bots thus occurs while picker is putting into O-Tote, so the picker should never have to wait for the arrival of a P-Bot. MVS tracks motion of picker's hands during a put by means of camera looking down on target O-Tote and verifies that picker puts to correct location in correct O-Tote; when empty hand clears put zone, MVS captures "after" image of P-Tote and verifies by comparison with "before" image that at least one each has been put into O-Tote.

Figure 21A:
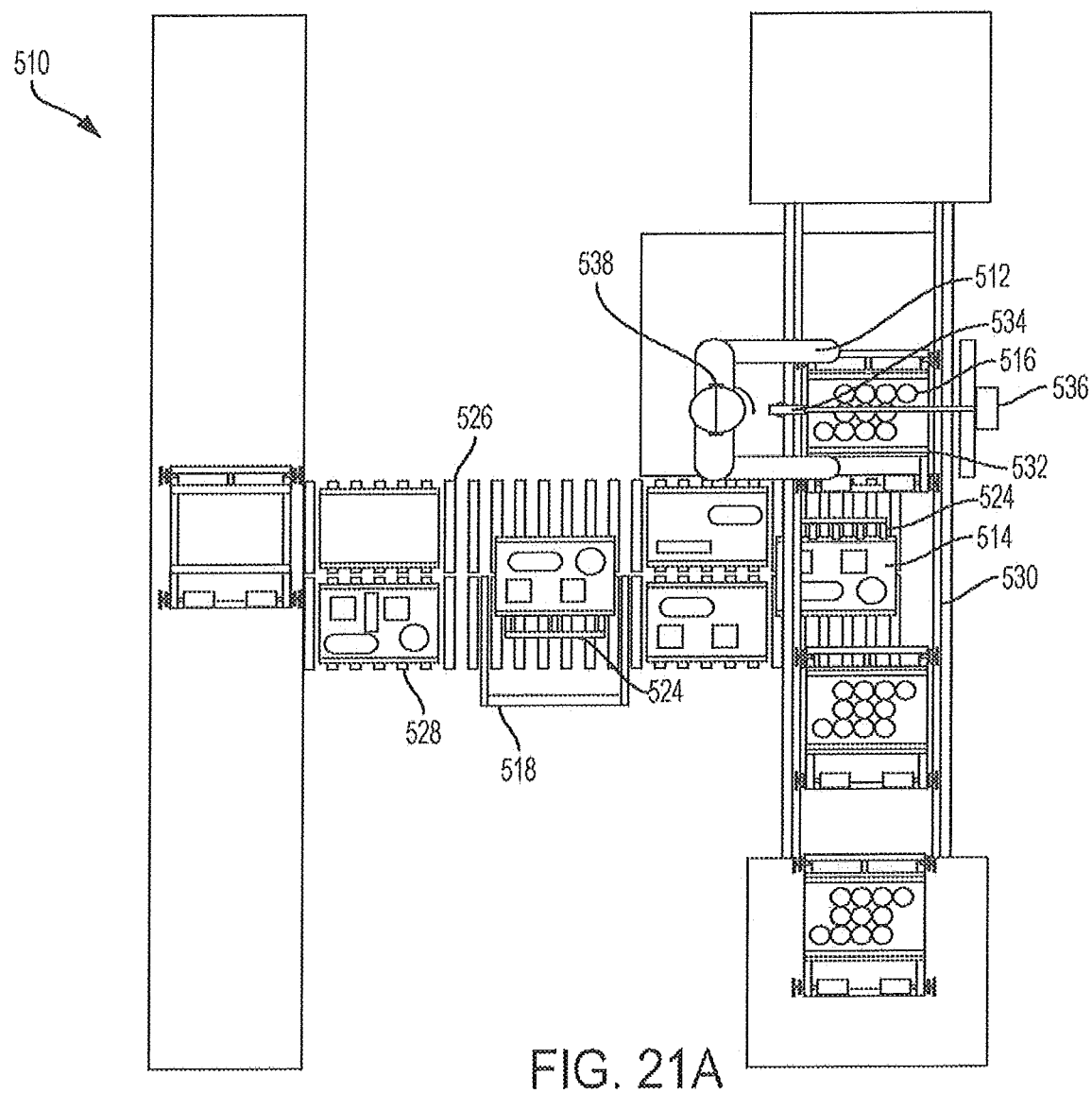
FIG. 21A is a plan view of an example workstation in accordance with aspects of the disclosed embodiment.
Figure 21B:
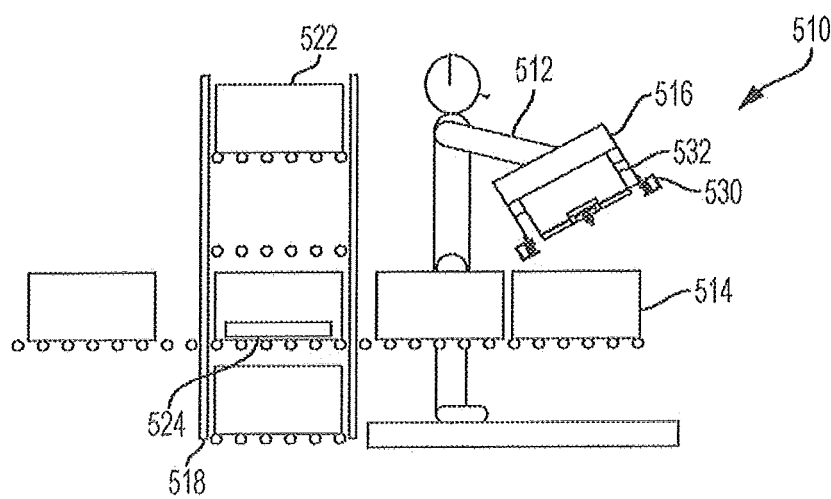
FIG. 21B is an elevation view of an example workstation in accordance with aspects of the disclosed embodiment.

Direct Put Workstation Embodiment B:

Referring now to FIGS. 21A and 21B, there are shown plan and elevation views respectively of an example Tote-to-Picker Multi-order workstation 510. Tote-to-Picker Multi-order workstation 510 is shown where the picker 512 remains stationary and O-Totes 514 are presented to the picker in a sequence that matches the sequence of arriving P-Totes 516, so that there is always only one target O-Tote in put position. In comparison to Embodiment A, this design has mechanisms that move the O-Totes, but requires significantly less movement on the part of the picker and may enables higher picker throughput.

The workstation subsystem has Tote-Handling Subsystem ("THS") 518 that moves O-Totes into put position in sequence to receive picked eaches from P-Totes, including segmented conveyor 520, a vertical resequencer 522, and two cross-transfers 524. Two lanes of segmented roller conveyor—a "Put Lane" 526 and a "Return Lane" 528 are shown. Put Lane is located right next to picker and consists of four segments that move Totes towards and past picker. "Input segment" is where O-Bots place empty O-Totes, and each new Tote remains on the segment until moving forward to the "Ready Segment". "Ready Segment" holds next O-Tote to receive eaches after all puts into current O-Tote on "Put Segment" have completed. "Put Segment" holds target O-Tote into which picker places picked eaches. "Take-Away Segment" moves O-Totes away from "Put Segment"; each Tote is then immediately pushed by Cross-Transfer-1 onto Return Lane of conveyor. Return Lane is located on opposite side of Put Lane from picker and consists of three logical segments that convey O-Totes in opposite direction to that of Put Lane. "Return Segment" is a logical segment comprising two physical conveyor segments that move O-Totes towards and then onto Resequencer Segment; the first segment receives O-Totes from Put Lane via Tote-Pusher-1 and the second segment acts as a buffer for the Re-Sequencing Segment. "Resequencer Segment" is a logical position in Return Lane that is occupied at different times by any of the physical segments within the Vertical Resequencer. "Output Segment" receives outgoing filled O-Totes from Resequencer Segment and holds for pick-up by O-Bot. Vertical Resequencer is an assembly comprising a motorized frame to which are mounted multiple physical conveyor-segment subassemblies; it moves vertically so that any of its physical conveyor segments can be aligned with the Return Conveyor Lane and serve as the Resequencer Segment. Cross-Transfers are shown where there are two mechanisms that transfer O-Totes between the two conveyor lanes, e.g. by pushing them. Cross-Transfer-1 moves Totes from the Take-Away segment of the Put Lane onto the Return Segment of the Return Lane. Cross-Transfer-2 moves Totes from the Re-Sequencing Segment of the Return Lane onto the Ready Segment of the Put Lane. P-Bot Tilt-Fixture 530 is shown as a tracked fixture immediately in front of picker. P-Bots 532 sequentially drive into fixture from one side, stop in position for picker to remove designated number of eaches from onboard P-Tote, then drive out of fixture from the other side and exit Workstation. Fixture tilts Bot roughly 30° towards picker to make it easier for picker to reach and remove eaches from the onboard P-Tote. Tilt-Fixture and queue lane leading into fixture are equipped with charging rail so that Bots can recharge super-capacitors on each trip to a workstation. Machine-Vision Subsystem ("MVS") 534 is mounted directly above the Bot Tilt-Fixture is a camera assembly (including illumination as required) that looks down on the P-Tote 516 in pick position, and mounted above the Put Segment is a camera assembly that looks down on the target O-Tote in put position. All cameras are connected to vision-computer that is programmed to follow the movements of the picker's hands and analyze the contents of target Totes both before and after the pick/put transaction. Target Illuminators are Co-mounted with each camera assembly is a light source, for example, laser or spotlight that can be aimed at any location within any Tote within the camera's field of view, the purpose of which is to assist the operator in accurately executing the pick/put by illuminating both the location of the target SKU to be picked and the target location within the target O-Tote into which the picked each is to be put. Picker Interface is provided where the Workstation Control Computer is able to receive information from and provide information to the picker: 1) Display Screen 536

The workstation process may have the following steps starting with P-Bot already in Tilt-Fixture and O-Totes within the THS, including a target O-Tote in put position) that are repeated recursively until there are no more order-lines to be filled at workstation. WCC activates two Target Illuminators to illuminate both pick and put locations. MVS captures "before" image of P-Tote and target O-Totes. WCC displays on screen the number of eaches remaining to be picked for current order-line and synthesizes voice input of same information through headphones. MVS tracks motion of picker's hands during a pick by means of camera looking down on P-Tote and verifies that picker is picking correct SKU; when hand clears pick zone with picked each. MVS captures "after" image of P-Tote and verifies by comparison with "before" image that at least one each has been removed from P-Tote. WCC decrements the display on screen of number of eaches to be picked. If this was final pick for the current SKU transaction, WCS commands P-Bot to drive off of Tilt-Fixture, the next P-Bot to drive onto Tilt-Fixture, and all other P-Bots in picking queue to advance one Bot Position; the indexing of P-Bots thus occurs while picker is putting into O-Tote, so the picker should never have to wait for the arrival of a P-Bot. MVS tracks motion of picker's hands during a put by means of camera looking down on target O-Tote and verifies that picker puts to correct location in target O-Tote; when empty hand clears put zone. MVS captures "after" image of P-Tote and verifies by comparison with "before" image that at least one each has been put into O-Tote. If this was the final put for the current target O-Tote on this cycle, i.e. next put is for a different O-Tote, the WCC causes the THS to perform a multi-Tote, multi-step move sequence. Current target O-Tote is moved forward from Put Segment to Take-Away segment, and simultaneously O-Tote on Ready Segment is moved forward to take its place as current target O-Tote on Put Segment. Either Cross-Transfer-2 moves an O-Tote from Resequencer Segment onto Ready Segment, or an empty O-Tote on Input Segment is moved onto Ready Segment. Cross-Transfer-1 moves previous target O-Tote from Take-Away segment across to receiving portion of Return Segment. O-Tote on buffer portion of Return Segment is moved forward onto now-empty Resequencer Segment (and if the Tote has received its last each, its movement continues onto Output Segment, where it awaits pick-up by O-Bot). Previous target O-Tote moves from receiving portion of Return Segment to the buffer portion of that segment. Vertical Resequencer moves vertically as necessary to position one of its conveyor segments as the Resequencing Segment, either a segment the next O-Tote to be placed on the Ready Segment or, if the next ready-Tote is to be the empty O-Tote coming from the Input Segment, an empty segment.

Figure 23A:
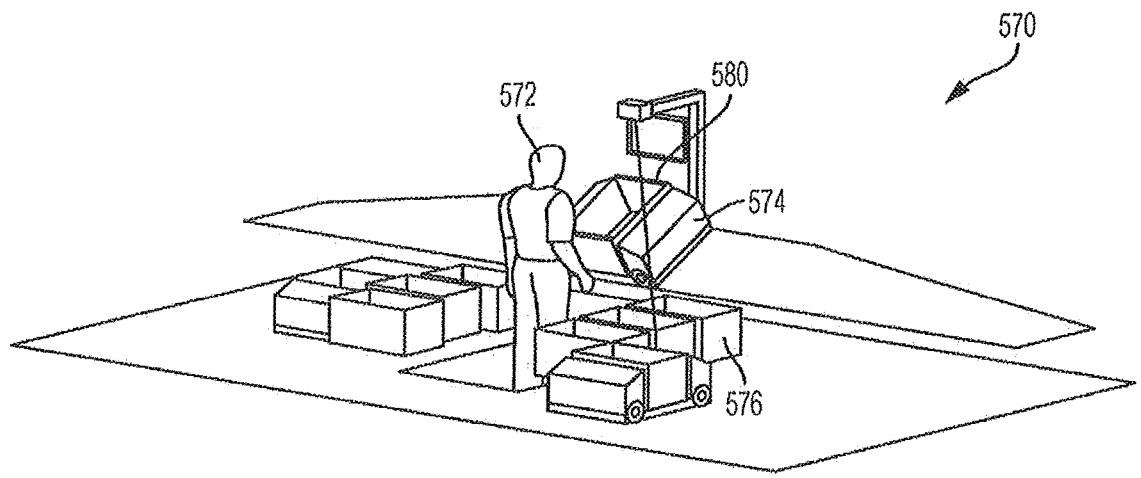
FIG. 23A is an isometric schematic view of an example workstation in accordance with aspects of the disclosed embodiment.
Figure 23B:
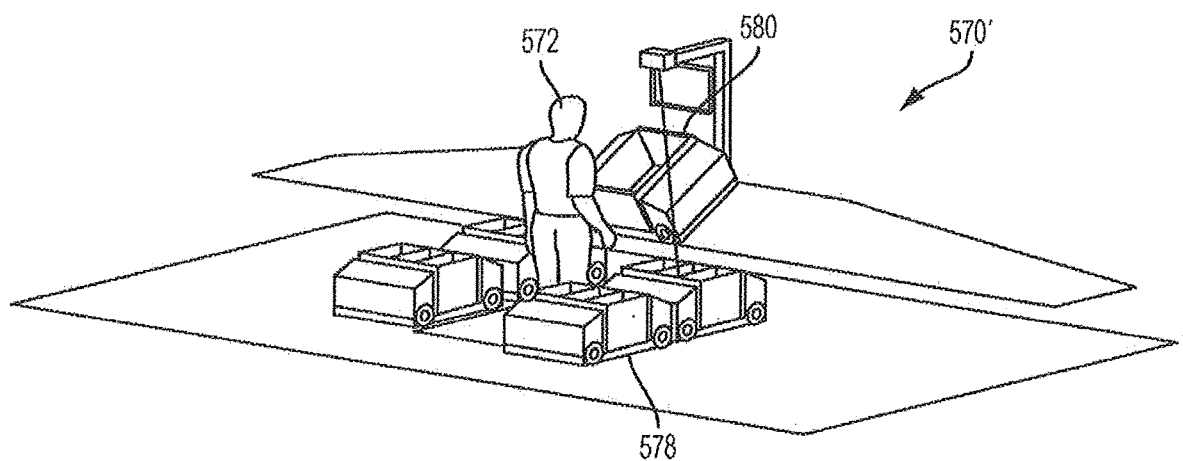
FIG. 23B is an isometric schematic view of an example workstation in accordance with aspects of the disclosed embodiment.
Figure 23C:
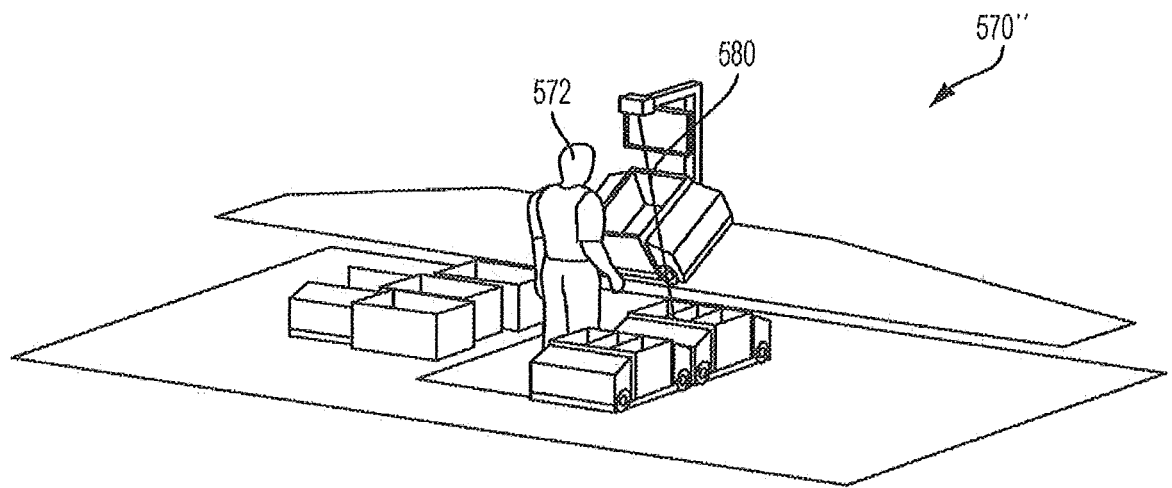
FIG. 23C is an isometric schematic view of an example workstation in accordance with aspects of the disclosed embodiment.

Referring now to FIGS. 23A, 23B and 23C, there are shown isometric schematic views respectively of example workstations 570, 570' and 570". FIG. 23A shows an exemplary Direct Put Workstation where Operator 572 transfers from Product Bot 574 in front of them into Order Totes 576 adjacent to them. Order Totes are deposited and retrieved by Order Bots once Products are deposited. Alternative is for Operator to place Product directly into Order Tote that remains on Order Bot. Matching the Product Bot and Order Tote/Order Bot as the Workstation requires synchronized dispatching. FIG. 23B shows Operator 572 with Each Bots 578 to transfer Products into. This Indirect Put Workstation allows continuous flow of Product Bots and Each Bots in asynchronous operation. The Each Bots travel to the Order Totes locations and deposit the Products. Each Bots may make three or more Order Tote deliveries using their compartments. As an alternative to the Each-Bot, the Operator may place the Product into an Each-Drone that delivers the Product to the Order Tote. Finally, an Each-Drone may automatically pick from the retrieved Product Tote and transport the Product directly to the Order Tote. FIG. 23C shows a mixed direct and indirect put Workstation. Here, robotic vehicles enable Workstations to be flexibly configured and operated on demand. In the preceding, light beams 580 are shown above Operator 572 that directs pick and place locations. Additionally, a high resolution camera with machine vision software is located above the Workstation to ensure that all Operator transfers are correct.

Figure 24A:
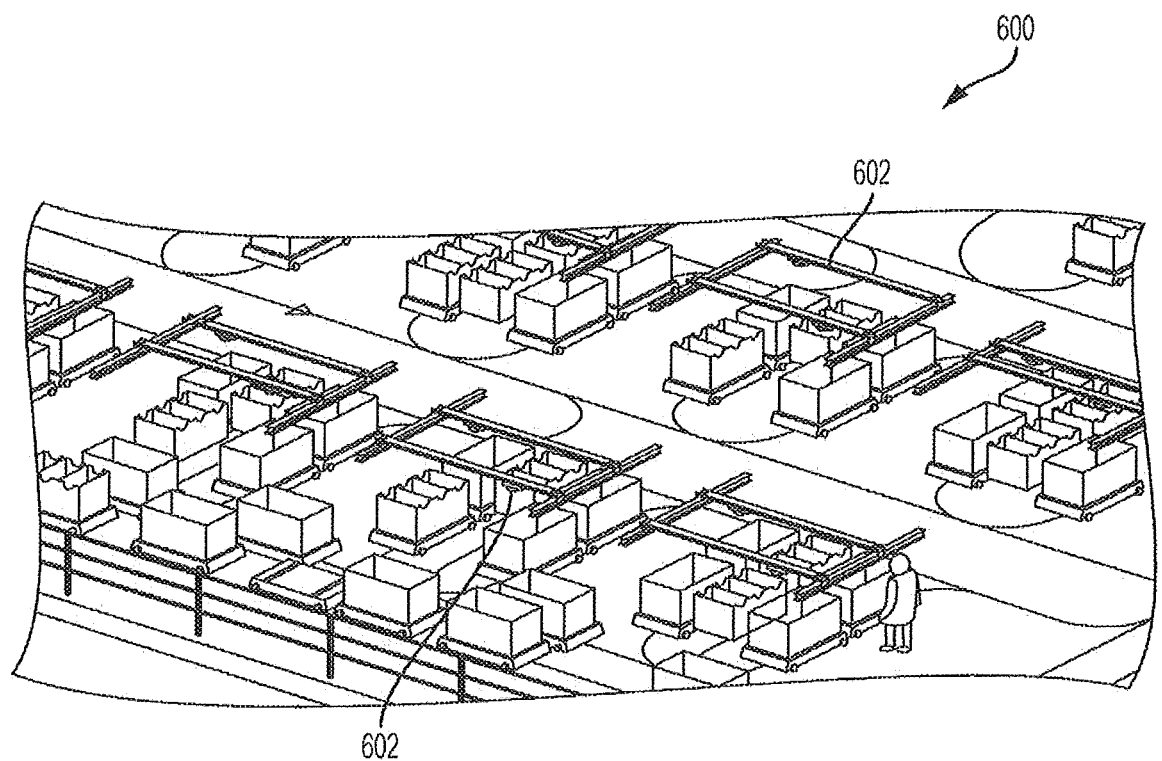
FIG. 24A is an isometric view of example workstations in accordance with aspects of the disclosed embodiment.
Figure 24B:
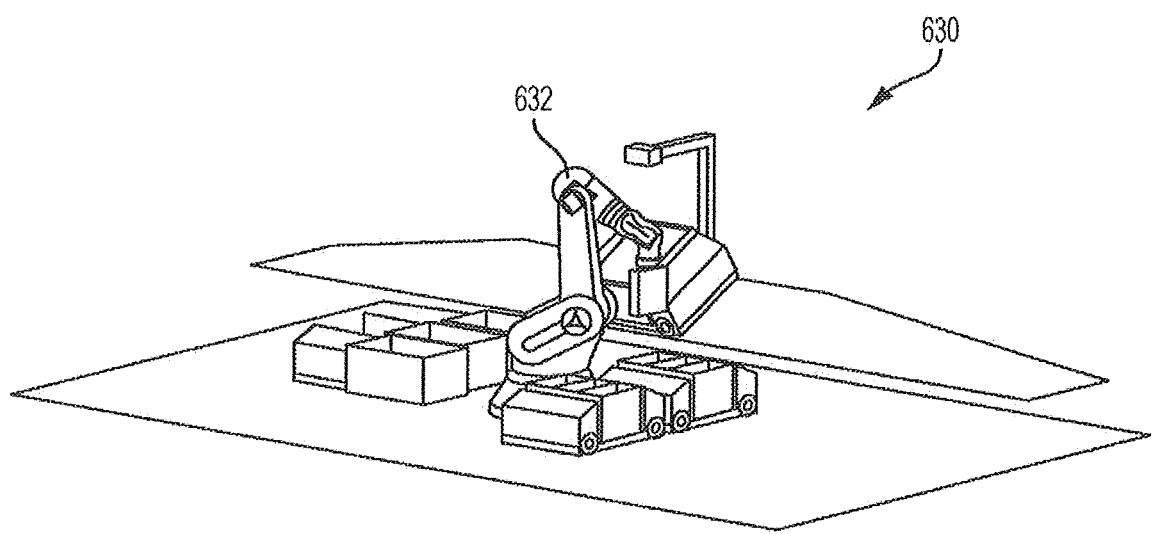
FIG. 24B is an isometric view of example workstations in accordance with aspects of the disclosed embodiment.

Referring now to FIG. 24A there is shown an isometric schematic view of example automated workstation 600. Referring also to FIG. 24B there is shown an isometric schematic view of example automated workstation 630. As an alternate embodiment, human workstations can be replaced with automated Product Bot to Order Tote (Direct Put) or Product Bot to Each Bot (Indirect Put) Workstations. FIG. 24A shows dual gantry system 602 for speed and reliability. Each gantry had multiple grippers, e.g. vacuum, articulated and conforming to enable each picking a wide variety of Products. Alternatively, Workstations can be configured for each types. FIG. 24B shows a 6-axis articulated robot 632 that may be used as an alternative to the gantries shown.

Input/Output "I/O" Interface

The I/O interface is the point of entry for Totes coming into the system (filled P-Totes and empty O-Totes) and the point of exit for outgoing Totes (empty P-Totes and filled O-Totes). T-Bots transport all Totes between the I/O Interface and their origination or destination locations within the system. In one aspect, this is also a subsystem having a plurality of bidirectional belted conveyor spurs. Each spur connects to a single unidirectional input/output conveyor line that connects the system to the rest of the facility within which it operates; incoming Totes flow in on this conveyor line, and outgoing Totes flow out on the same conveyor in the same direction of flow. Each Conveyor Spur further comprises two physical segments of belted conveyor. An inbound segment which holds incoming Totes, located furthest from the input/output conveyor line (and closest to the Transit Deck of the I/O Interface); and an outbound segment, which holds outgoing Totes momentarily before moving them onto the I/O conveyor line. A plurality of Bot Spurs are shown in which T-Bots occupy when executing a Tote-exchange transaction. Each bot spur is constructed using a pair of Bot rails like those used in ramp modules. The number of Bot Spurs is one less than the number of Conveyor Spurs, and a Bot Spur is positioned between adjacent Conveyor Spurs, so there is a Conveyor Spur accessible to a T-Bot on each side of each Bot Spur, and further each Conveyor Spur except for the outer two can be accessed from two Bot Spurs.

The process of Totes flowing through the I/O interface may have the following steps. Each incoming Tote is transferred from the input/output conveyor line onto an empty Conveyor Spur, initially arriving on the Outbound Segment immediately adjacent to the conveyor line and then being immediately transferred to the Inbound Segment where it awaits pickup by a T-Bot. Each T-Bot arriving at the I/O Interface (with an outgoing Tote onboard) enters an empty Bot Spur adjacent to a Conveyor Spur with a target incoming Tote already waiting on the Inbound Segment. The T-Bot first goes the far end of the Bot Spur, past the waiting inbound Tote, and offloads the outgoing Tote is has onboard onto the Outbound Segment of the Conveyor Spur. The T-Bot then immediately moves in the reverse direction to align with the target incoming Tote, transfers it onboard, departs the Bot Spur and transports the Tote to its destination location (typically a storage location in the TSS, but occasionally a Picking Workstation). The outgoing Tote that the T-Bot has been placed onto the Outbound Segment of the Conveyor Spur is transferred at the first opportunity onto the input/output conveyor line and conveyed away from the system.

Indirect-Put System

With an indirect put system, eaches are transferred from product-Totes not into O-Totes but to robots, called Each-Bots ("E-Bots"); E-Bots are then transported by T-Bots to an Order Loading Structure ("OLS") where they transfer the picked eaches into the target O-Totes. The fundamental benefit of decoupling the pick from the put in this fashion is to eliminate workstation specificity for fulfillment, i.e. any order-line can be picked at any workstation. One consequence is that there is considerably less contention by P-Bots for access to workstations compared to the Direct-Put System, since Bots can take a "path of least resistance", for example by going to the nearest workstation and/or to the workstation with the fewest number of P-Bots in the picking queue. An even more important advantage, though, is that order-completion latency can be dramatically reduced by assigning the multiple order-lines assigned to a given O-Tote to multiple T-Bots for fulfillment in parallel at multiple workstations. It will be possible, then, for the system to fill a large order in a matter of just a few minutes. The primary disadvantages of this embodiment in comparison to Direct-Put is that it requires more capital investment, and packing densities will not be as high, which could increase transportation cost if orders must be delivered by truck to customers.

The system includes the same elements/subsystems as the Direct-Put Embodiment as described above plus two additional ones. "E-Bots", "portable" robots, each of which has an external dimensional envelope identical to an O-Tote so that it can received picked eaches at Picker Workstations just like O-Totes, hold those eaches while during transported by T-Bots, and transfer the picked eaches into target O-Totes; E-bots depend on T-Bots and conveyor for movement. A T-Bot carrying an E-Bot is referred to as an "ET-Bot".

Indirect Put System Components:

P-Totes, O-Totes and TSS may be the same as with Direct-Put system described above.

Order-Loading Structure ("OLS")

Order-Loading Structure is a rack structure designed for holding O-Totes for filling by E-Bots and facilitating the transfer of eaches by E-Bots into those O-Totes; in the preferred embodiment the OLS is a special section of the TSS. Operating processes, all of which are controlled directly or indirectly by the CCS may be as follows. Flow of P-Totes to Picking Workstations may be the same as described with the Direct-Put system above. Flow of O-Totes To/From OLS and Shipment to Customer are as follows. Since the OLS is only used for loading O-Totes and not for their intermediate storage, it is kept perpetually filled with O-Totes that are either empty, waiting to be filled, or are in the process of being filled, with the exception of Tote positions intentionally left empty for use in swapping Totes. Filled O-Totes are generally removed immediately once they have received all planned eaches. The CSS initializes the OLS by causing O-Bots to fill it with O-Totes to its maximum planned capacity, leaving a sufficient number of empty Tote positions such that there will always be an empty Tote position reasonably close to any target filled O-Tote where an O-Bot can place an empty O-Tote on the same trip when removing said filled O-Tote. O-Totes are placed on racks only on alternate levels such that directly above each Tote is empty space for an E-Bot to occupy when transferring eaches into the O-Tote. Any empty O-Tote in the OLS can be assigned to receive any designated set of order-lines, so the CCS generally seeks to spread the workload evenly by always selecting an O-Tote on the least-busy loading lane whenever a new O-Tote needs to be activated. Once the filling of an active O-Tote is complete, an O-Bot is assigned to remove the O-Tote from the OLS and transport it either to the I/O Interface for immediate delivery to the customer or into the TSS for intermediate storage. Immediately prior to traveling to the location of the target O-Tote, the O-Bot typically picks up an empty O-Tote either from the I/O Interface or from the TSS and places it into the OLS at a location in close proximity to the target O-Tote, effectively replacing the filled O-Tote with and empty O-Tote to await activation. If the removed O-Tote is going into TSS storage, its storage location is selected based on close proximity to the next Tote to be handled by the same T-Bot; the subsequent shipment of the O-Tote to the customer is the same as with the Direct-Put system described above. If the removed O-Tote is going to the I/O Interface for immediate discharge from the system and delivery to the customer, the Bot Spur to be used for the output is based on the next inbound Tote to be handled by the same T-Bot. For pick at Workstations, P-Bots present P-Totes to human or robotic pickers, who remove one or more eaches from every P-Tote and place in designated E-Bots (described in more detail below). For put at OLS, T-Bot picks up E-Bot containing eaches at workstation and travels to OLS so that E-Bot can transfer eaches into one or more O-Totes. For each such transfer: a. ET-Bot enters an aisle adjacent to the target O-Tote (which may be on either end of the Tote), and one loading-level above the level of the O-Tote. ET-Bot travels to location immediately above target O-Tote and aligns to center the E-Bot on target O-Tote below; b. The T-Bot extends the E-Bot onto the rack so that the Each Handler containing the eaches to be transferred is directly above the target O-Tote; c. The E-Bot then causes the Each Handler to transfer the contained eaches into the target O-Tote. Depending on embodiment of Each Handler, this may be an uncontrolled drop of the eaches or a gentle, controlled drop; and d. After transfer is complete, ET-Bot retracts the E-Bot back onboard and proceeds either to next target O-Tote or back to a workstation to receive more eaches. Picking-Stock Replenishment and P-Tote Recycling occur similar as with the Direct-Put system described above.

The OLS can be a completely separate structure, but may be provided to dedicate specific aisles in the TSS to serve as the OLS, thereby avoiding the need for additional Transit Decks. OLS aisles may be constructed identically to normal storage aisles except that they can be much shorter in length and the shelf is typically not as deep, preferably holding only one Tote between adjacent aisles instead of at least two Totes as with normal Tote storage TSS. The reason for this difference is to give ET-Bots access to both sides of target O-Totes instead of only one side (except Totes on the two outermost shelf-modules), which will significantly reduce potential blocking delays. The term "loading level" is used to refer to each discrete elevation at which Bots can operate, rather than "storage level". O-Bots place O-Totes on alternate levels in the OLS, for example on the odd-numbered loading levels (numbering from bottom to top), and ET-Bots operate on the higher alternate levels, e.g. even-numbered loading levels.

BTS and T-Bots may be the same as with Direct-Put system described above.

Figure 26A:
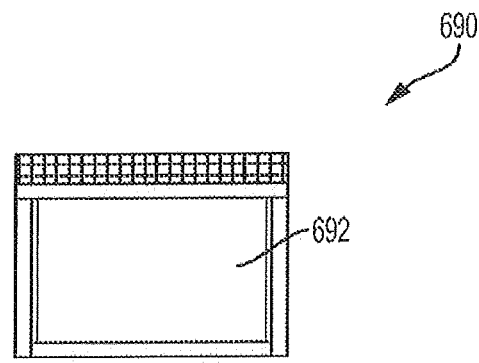
FIG. 26A is an end view of a module in accordance with aspects of the disclosed embodiment.
Figure 26B:
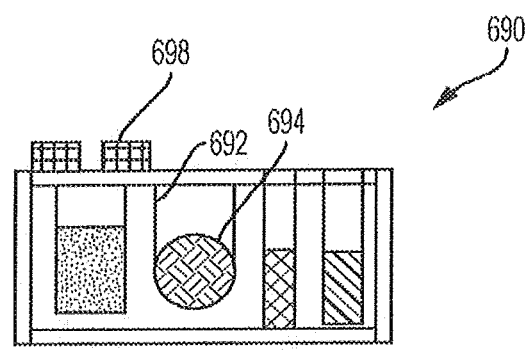
FIG. 26B is a side view of a module in accordance with aspects of the disclosed embodiment.
Figure 26C:
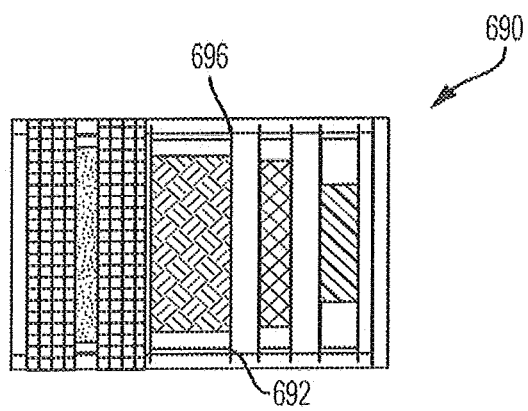
FIG. 26C is a top view of a module in accordance with aspects of the disclosed embodiment.
Figure 27A:
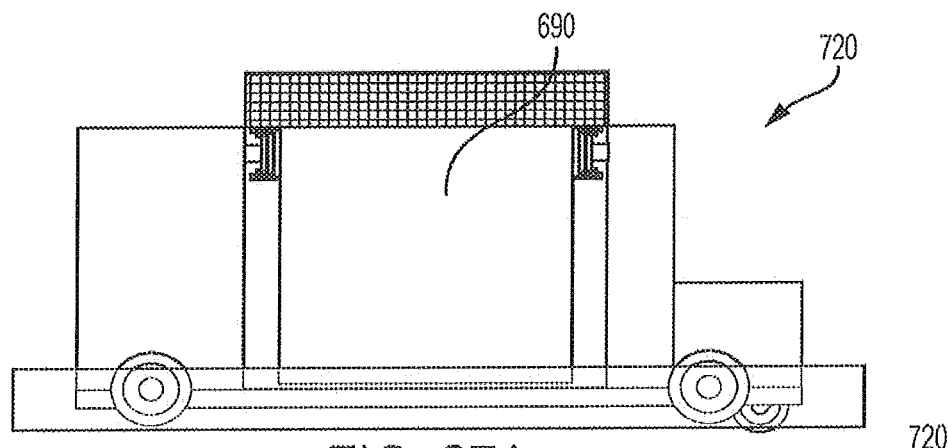
FIG. 27A is a side view of a vehicle in accordance with aspects of the disclosed embodiment.
Figure 27B:
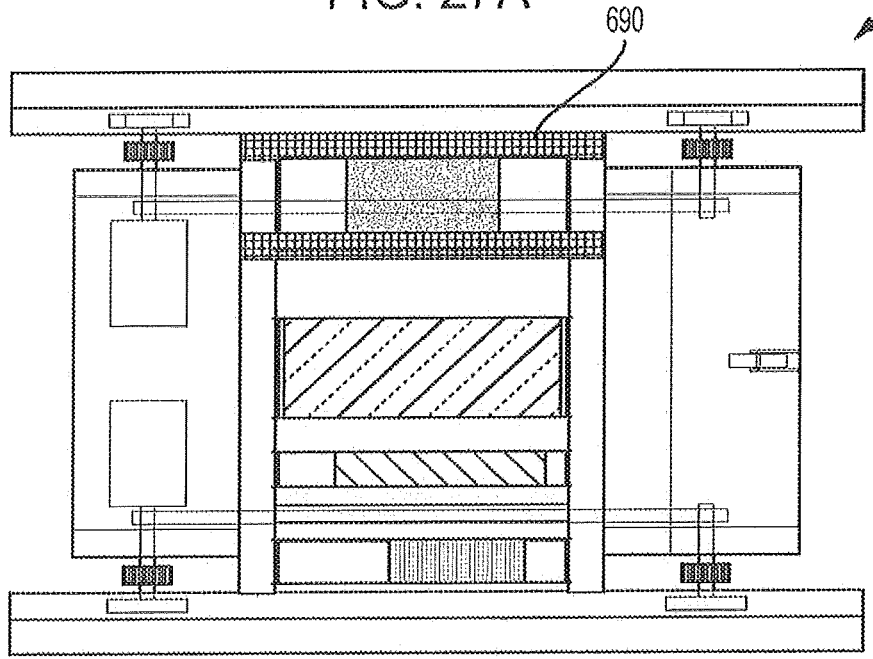
FIG. 27B is a top view of a vehicle in accordance with aspects of the disclosed embodiment.
Figure 27C:
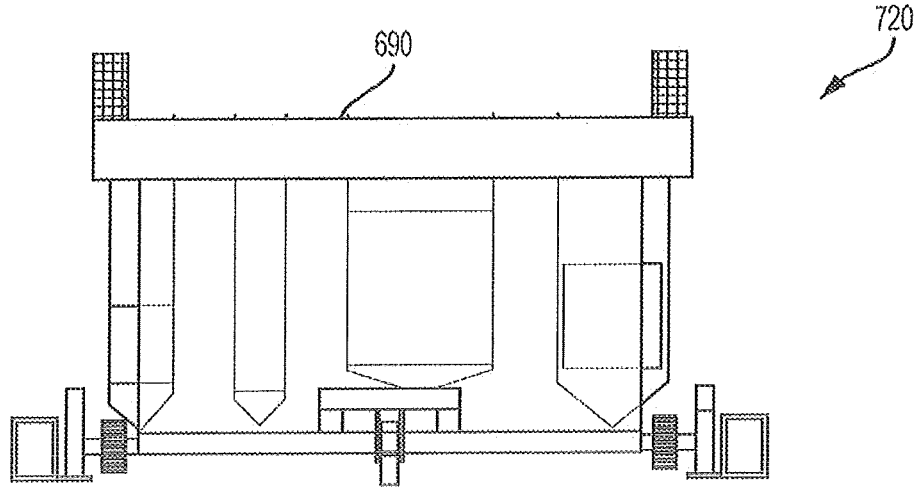
FIG. 27C is an end view of a vehicle in accordance with aspects of the disclosed embodiment.

E-Bots, Each Handlers & Each Manipulator:

Referring now to FIGS. 26A, 26B and 26C, there are shown end, side and top views respectively of example Each-Bot "E-Bot" module 690. Referring also to FIGS. 27A, 27B and 27C, there are shown side, top and end views respectively of example vehicle 720 with E-Bot module 690. E-Bots may be an autonomous transfer mechanism, with physical dimensions identical to an O-Tote, which receives eaches, holds them during transport by a T-Bot, and then transfers the eaches into target O-Totes. The E-bot may have a structural frame with same width and length of an O-Tote and height such that the total height of the Bot is the maximum that can operate within a given system. A control microcomputer may be provided that controls operations of the robot, with wireless network interface by means of which it communicates with CCS. Rechargeable batteries that power operation of the robot may be provided. When the E-Bot is not in use, it may be stored in a section of the OLS that provides electrical power to recharge the batteries. An array of sensors necessary to performing its required functions may be provided. A plurality of Each-Handlers 693, each of which receives and holds eaches, and under control of the robot's control microcomputer transfers eaches to O-Totes. All eaches placed into in a given Each-Handler may be of the same product and associated with a single order-line, but multiple Each-Handlers can be used for a single multi-unit order-line if necessary. Two embodiments of Each-Handlers are described.

Figure 35A:
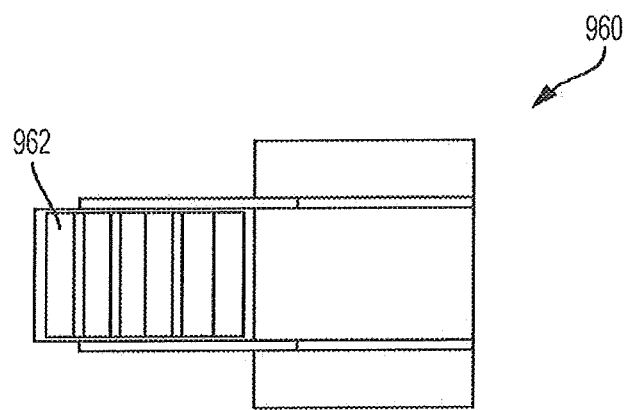
FIG. 35A is a top view of a vehicle in accordance with aspects of the disclosed embodiment.
Figure 35B:
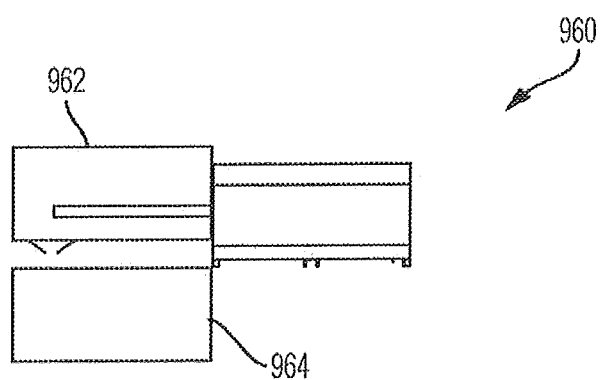
FIG. 35B is a partial side view of a vehicle in accordance with aspects of the disclosed embodiment.
Figure 36A:
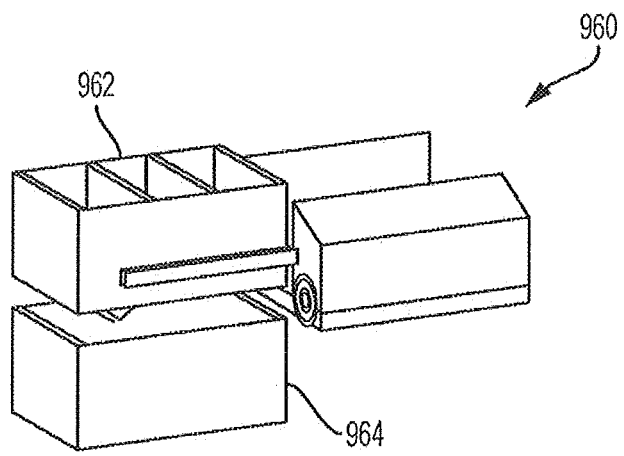
FIG. 36A is an isometric view of a vehicle in accordance with aspects of the disclosed embodiment.
Figure 36B:
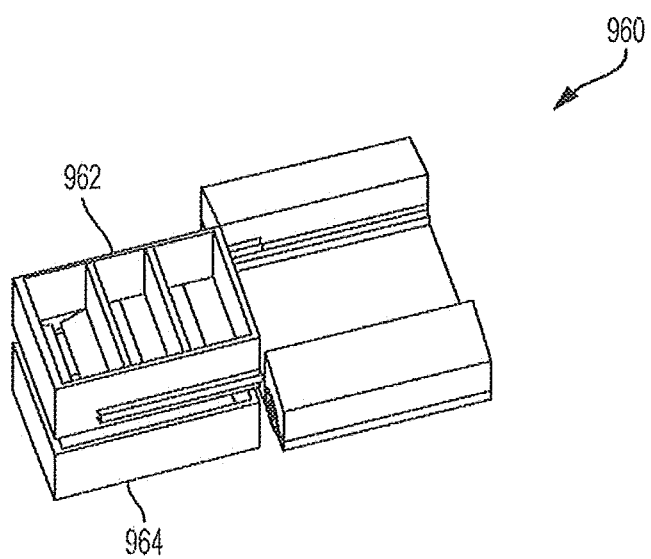
FIG. 36B is an isometric view of a vehicle in accordance with aspects of the disclosed embodiment.

Fixed-width Each-Handler:

Referring now to FIGS. 35A, 35B, 36A and 36B, there are shown isometric views of example robotic vehicle 960 with fixed width each handlers 963. FIG. 35A shows a plan view of a robotic vehicle serving as an Each Bot. The robotic vehicle has retrieved an Each Module 962 to allow it to transform into an Each Bot. This Each Module 962 has three compartments with actuated bottom hopper doors that enable "eaches" to be deposited into Order Totes 964. FIG. 35B shows a side elevation of Each Bot with Order Tote 964 below. The hopper doors are shown open to allow product to be deposited from Each Bot 962 to Order Tote 964. FIG. 36A shows another view of Each Bot 962 above Order Tote 964. FIG. 36B shows Each Bot 962 with hopper doors visible from above. As opposed to hopper doors, a retractable fabric material may be used to lower the Product into the Order Tote as will be described below. Fixed-width Each-Handler consists of multiple compartments the width of which cannot be changed to conform to eaches placed into it. The floor of each compartment can be opened by an actuator in order to let the contained eaches drop out of the bottom and into the target O-Tote, for example, like bomb bay doors on an airplane. This embodiment is mechanically simple and suitable in applications where the range of item dimensions is sufficiently limited that all eaches can fit into the fixed widths of the Each-Handlers, and where the products being handled are sufficiently non-fragile that dropping eaches from a maximum height greater than the height of an O-Tote will not damage either the dropped each or eaches it strikes inside the O-Tote.

Adjustable-Width Each-Handler:

Referring now to FIGS. 26-28, adjustable-width each-handler consists of a plurality of flexible Load Carriers 692 each of which, in combination with a pair of Manipulators, can accommodate a wide variation in the dimensions of eaches, and can perform a gentle transfer of eaches with little or no dropping. The Load-Carrier 692 resembles a hanging file-folder in form. It is constructed from a rectangular Folder Sheet of flexible material, the width of which is less than the width of an O-Tote, said sheet being attached at each end to a rigid Hanging Bar. Each Hanging Bar is actually comprised of two separable segments: a Hangar Segment 694 that is the full width of the E-Bot and provides Load Carrier's hanging means, and a Handle Segment 696 that attaches to and detaches from to the Hangar Segment. The Handle Segment is permanently attached to the Folder Sheet and is the same width as the Folder Sheet. The receiving and carrying function of the Load Carrier is accomplished by bringing the two Hanging Bars together and the ends placed onto opposing sides of the E-Bots frame. The flexible Folder Sheet then folds to form a pouch into which eaches can be placed, in the same way materials can be placed into a hanging file within a drawer.

Each Manipulator:

Each Manipulator 698 includes a device for linear motion by which the Manipulator can move back and forth along the length of the E-Bot above the hanging Load Carriers. A device for grasping and handling the Handle Segment of Hanging Bars is shown. A device for rotational motion, such as a motorized roller, attached by cable to the handling device, by means of which the Manipulator can lower and raise a Load Carrier. The two Manipulators act in concert under control of the Control Microcomputer adjust the width the opening of each Load Carrier by performing the following steps as seen in FIGS. 28A-28F: a) Each Manipulator positions itself over one of the Load Carrier's Hanging Bars and grasps the Handle Segment without detaching it from the Hanging Segment; b) One or both Manipulators move linearly along the length of the E-Bot, thereby moving one or both Hanging Bars, reducing the size of the Load Carrier opening by moving towards each other and increasing the opening by moving away from each other. The two Manipulators act in concert under control of the Control Microcomputer transfer the eaches from a Load Carrier to an O-Tote by performing the following steps: a) Each Manipulator positions itself over one of the Load Carrier's Hanging Bars, grasps the Handle Segment and detaches it from the Hanging Segment; b) both manipulators move towards each other enough to create clearance from the Hangar Segments; c) both manipulators activate the rotational-motion means to lower the Load Carrier into the Tote until the bottom is just above the highest object underneath in the Tote; d) then one Manipulator reverses direction of rotation while the other Manipulator continues the rotation in the same direction, and the Manipulators move slowly towards each other. This causes one end of the Folder Sheet to retract upwards and the other to continue moving down, and the eaches contained in the folder will slide along the material of the Folder Sheet and may tumble in place; e) eventually the Manipulators will come together and the Folder Sheet will become fully vertical, and at some point the contained eaches will fall out of the Load Carrier and into the O-Tote; f) at that point the Manipulator handling the lower end of the Load Carrier and the now-empty Load Carrier will be retracted all the way back up to the Manipulators.

Indirect Put Workstation

Figure 22A:
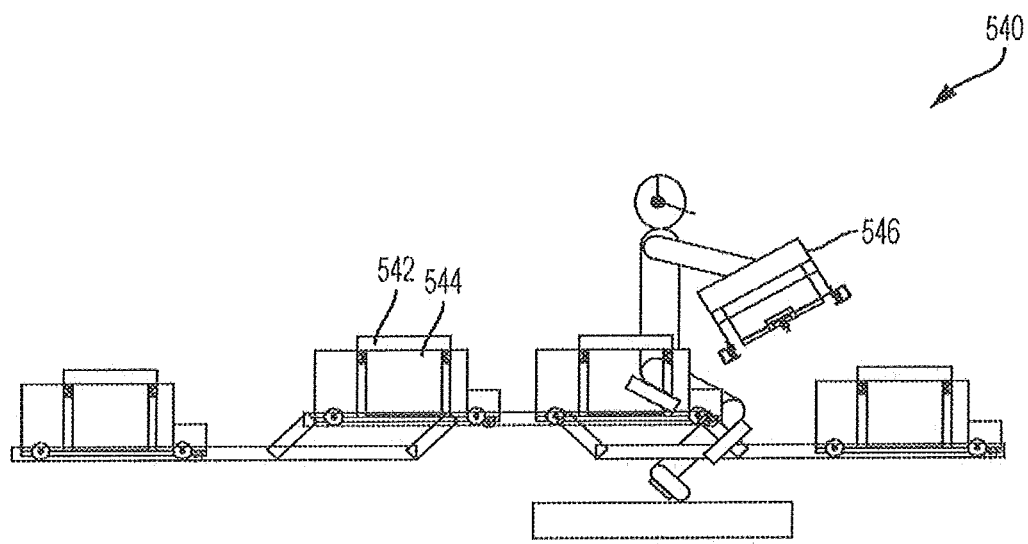
FIG. 22A is an elevation view of an example workstation in accordance with aspects of the disclosed embodiment.
Figure 22B:
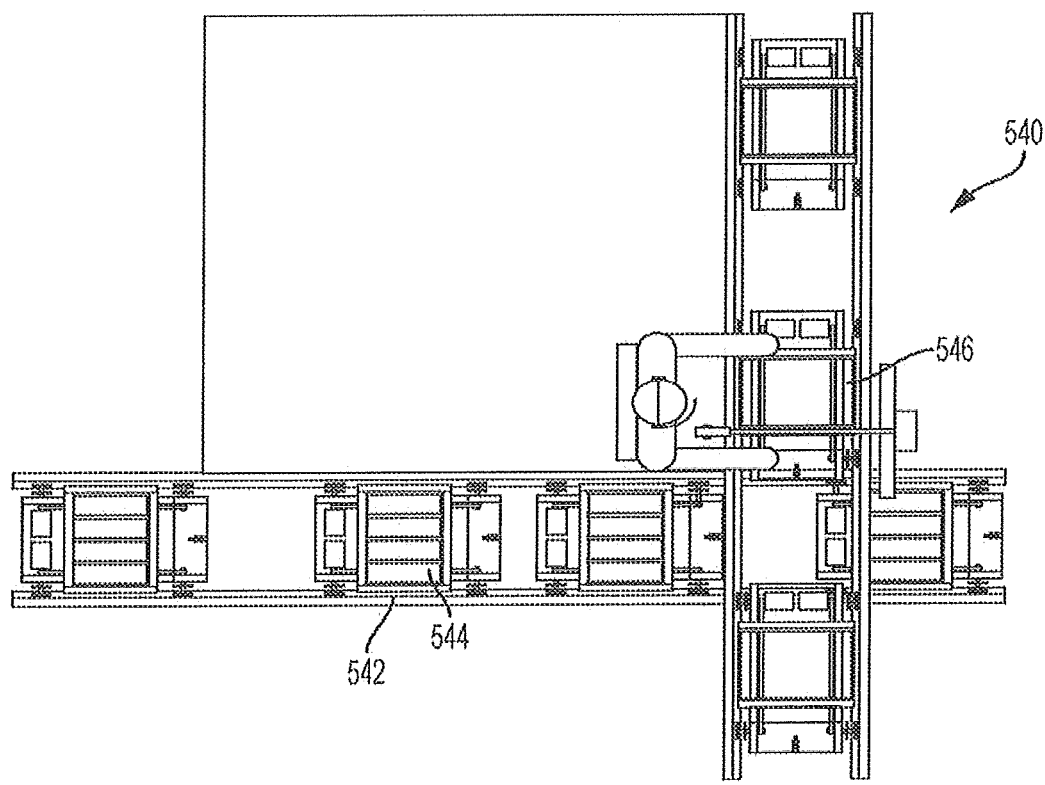
FIG. 22B is a plan view of an example workstation in accordance with aspects of the disclosed embodiment.

Referring now to FIGS. 22A and 22B, there are shown elevation and plan views respectively of an example workstation 540. Either workstation embodiment can be used, for example, direct put workstation A or B, although the Tote-to-picker version B may provide higher picker throughput and may take advantage of the higher P-Bot throughput made possible because of the "any order-line at any workstation" capability. The basic operation of the workstation with either embodiment is essentially the same as with the Direct-Put Embodiment described above, with the following differences related to the fact that E-Bots are not linked to any specific customer orders until eaches are placed into a Load Carrier to fill a specific order-line. The assignment of order-lines to E-Bots and Load Carriers may be essentially arbitrary, so picked eaches will typically be placed into Load Carriers in sequential order, i.e. an E-Bot 542 will have each of its Load Carrier 544 filled one after another from each arriving P-Bot until all Load Carriers are filled and the E-Bot is ready for 546 pickup and transport to the OLS by a T-Bot. In advance of the arrival of each P-Bot at the workstation, the target E-Bot will have been instructed by the CSS to set each Load Carrier opening to a certain width based on the dimensions of the each(es) to be placed into that Load Carrier. The Vertical Resequencer of Workstation Embodiment B may be essentially inactive during picking operation under the Indirect-Put model. Empty E-Bots are placed on the Input Segment of the Put Conveyor Line upon arrival at the workstation and simply advances through that line until all Load Carriers have been filled at the Put Segment, at which point it is transferred to the Return Conveyor line and passes directly through the Resequence Segment to the Output Segment where it awaits pickup by a T-Bot.

I/O Interface may be the same as with Direct-Put system described above.

System Topologies

There are several variations in system topology that can be used for a given system depending primarily on the peak throughput requirements. Going from simplest to most complex these include:

Single-Ended, Bidirectional Flow:

Workstations and Bot Transit Structures are located at only one end of the TSS. Since T-Bots enter and exit aisles at only one end, travel within aisles is by definition bidirectional. Since the points of entry and exit at workstation levels are potential bottlenecks, the number of aisles and number of workstation levels are factors in determining the throughput capacity of a system. That is, the more aisles and the more workstation levels there are in a system, the greater the throughput capacity of that system will be. This topology is suitable for applications with low to medium throughput requirements.

Double-Ended, Bidirectional Flow:

Workstations and Bot Transit Structures are located at both ends of the TSS with bidirectional travel within aisles. By doubling the number of aisle entry/exit points and the number of workstation levels (assuming they are equal on each side), this topology is suitable for applications with high throughput. It also has the potential for improving bot productivity because travel times can often be optimized by giving priority of assignment to Bots located closest to target SKU locations. This configuration offers a natural path of expansion in applications where volume is growing over time.

Double-Ended, Unidirectional Flow:

In applications requiring extremely high throughput, this topology optimizes the flow of Bot traffic by having all Bots travel in the same direction. Bots always enter aisles at one end of the TSS, run the full length of the aisle and exit at the other end of the aisle, creating a circular flow that supports an extremely high rate of throughput. Moreover, at the exit end of the aisle, the movement of T-Bots onto the Transit Deck can be synchronized so Bots are staged at the aisle exits momentarily until a group of them move simultaneously onto the Transit Deck and create a stream of Bots flowing to the workstations located to the side of the TSS. Bots must travel longer distances than with the previous topologies because every trip has a distance of at least twice the length of the aisle, but this flow pattern avoids the massive congestion and deadlocks that can occur with bidirectional travel at extremely high throughput volumes.

Referring now to FIGS. 51A-51J a bot 5100 is shown. The bot 5100 may be substantially similar to the bots described above unless otherwise noted. In this aspect, the bot 5100 includes a frame having a front end 5100A and a rear/back end 5100B that are longitudinally spaced apart from one another. The frame 5100F forms a payload holding area/bed 5180 for holding, e.g. totes 5200 substantially similar to that described above and as will be further described below. The frame 5100F includes movable and/or complaint or sprung sub-frames 5170A, 5170B that are laterally movable in the direction of arrow 5999 in any suitable manner. For example, one or more linear actuators 5175 (or other suitable drive motors) may be mounted to the frame 5100F such that the drive rod/member of the one or more linear actuators 5175 is coupled to each sub-frame 5170A, 5170B for moving each sub-frame in the direction 5999 laterally inward towards a longitudinal centerline CL of the bot 5100. In one aspect, a common drive may be coupled to both of the sub-frames 5170A, 5170B so that a single motor moves both sub-frames 5170A, 5170B laterally inward towards the longitudinal centerline CL of the bot 5100. In one aspect, the common drive may be a screw-drive having an opposing screw transmission or any other suitable drive. In one aspect, one or more lateral biasing members 5171 may be disposed between the frame 5100F and each sub-frame 5170A, 5170B so as to bias each sub-frame 5170A, 5170B laterally outward in the direction 5999. As may be realized, the respective spring or lateral biasing members 5171 (which may have any suitable configuration) provide each sub-frame 5170A, 5170B with independent lateral compliance (for example to partial side obstruction or impediments to the drive, free running or guide wheels of the bot).

The bot 5100 includes horizontal running wheels 5110A, 5110B and 5121A, 5121B mounted to a respective one of the sub-frames 5170A, 5170B. The running wheels 5110A, 5110B are configured as drive wheels (and will be referred to herein as drive wheels 5110A, 5110B) and are coupled to a respective drive motor 5110DA, 5110DB so that each wheel can be individually driven independent of the other drive wheel 5110A, 5110B. In other aspects, the drive wheels 5110A, 5110B may be driven in unison by a common drive motor. In one aspect, each drive wheel 5110A, 5110B is coupled to the respective drive motor 5110DA, 5110DB by any suitable transmission such as belts/pulleys, chains/sprockets, drive shafts, etc. For example, in one aspect, each drive wheel 5110A, 5110B is coupled to its respective motor through a chain drive (although in other aspects a belt or gear drive may be used) having a pinon gear 5110PG mounted to an output shaft of the respective drive motor 5110DA, 5110DB. An idler gear 5110DG is connected to wheel shaft 5110WS (as will be described below) and is drivingly coupled to the pinion gear 5110PG by any suitable chain 5110CN. In one aspect, the pinion gear 5110PG is smaller than the idler gear 5110DG but in other aspects the pinion gear and drive gear may have any suitable gear ratio (e.g. for gear reduction or multiplier). The drive wheels 5110A, 5110B are mounted to a respective one of the wheel shafts 5110WS so that as the wheel shafts 5110WS are driven the drive wheels 5110A, 5110B are driven with the respective wheel shaft 5110WS.

The free running wheels 5121A, 5121B are each configured as wheel couples where each wheel couple includes respective wheels 5120A, 5120B and 5120C, 5120D arranged in-line with each other relative to a direction of horizontal bot travel 5998. The running wheels may be idler wheels (e.g. non-driven). The bot 5100 may also include lateral idler guide wheels 5150 disposed on each sub-frame 5170A, 5170B such that an idler guide wheel is disposed substantially at each corner of the bot 5100. A caster wheel 5160 may also be disposed on the frame 5100F so that the two drive wheels (also referred to herein as traction drives) and the caster wheel 5160 engage a common surface when the autonomous mobile robot or bot 5100 is supported by a deck for horizontal travel. Also, where the bot 5100 is engaged and supported by rails for horizontal travel, the two drive wheels 5110A, 5110B and running wheels 5121A, 5121B engage the rails for supporting the bot 5100 on the rails.

In one aspect, the bot 5110 includes an elevation running drive for driving the bot 5110 along rails between storage levels of the multilevel tote storage structures described herein. In one aspect, the elevation running drive includes drive gears 5140A, 5140B mounted to respective drive shafts 5140S. The drive gears 5140A, 5140B are sized relative to, for example, idler gears 5110DG and/or pinion gears 5110PG to provide any suitable reduction ratio for effecting elevation travel of the bot 5110 compared to a drive ratio provided by the pinion gears 5110PG and idler gears 5110DG to the drive wheels 5110A, 5110B. Each of the drive shafts 5140S are coaxial with a respective one of the wheel shafts 5110WS so that the wheel shafts 5110WS and the drive shafts 5140 are coaxially movable relative to each other in the direction 5999. The idler gears 5110DG are mounted to respective ones of the drive shafts 5140S so that as each idler gear 5110DG is driven by a respective drive motor 5110DA, 5110DB the respective drive shaft 5140S rotates with the idler gear 5110DG. The wheel shafts 5110WS and drive shafts 5140S are arranged so as to be mated with each other so that rotation of the drive shaft 5140S drives rotation of the respective wheel shaft 5110WS (e.g. through for example a spline, square, hex, etc. engagement that allows movement of the shafts relative to each other in the direction 5999). As such, drive wheel 5110A and drive gear 5140A are driven by a common drive 5110DA while drive wheel 5110B and drive gear 5140B are driven by a common drive 5110DB (e.g. the bot 5100 has common drives for both horizontal traverse and elevation traverse.)

A guide bearing/wheel 5140G may be mounted to an end of each drive shaft 5140S (or mounted to the drive gear 5140A, 5140B) so as to rotate independently of the respective drive draft 5140S and drive gear 5140A, 5140B. The guide bearing 5140G is concentrically located with each drive gear 5140A, 5140B and has a smaller diameter than the respective drive gear 5140A, 51040B while in other aspects, the guide bearing 5140G may have any suitable size relative to the drive gear 5140A, 51040B. Each guide bearing 5140G (and drive gears 5140A, 5140B) is mounted to a respective shaft 5140S so as to be movable in direction 5999 relative to the frame 5100F between engaged and disengaged positions where when in the engaged position the guide bearings 5140G (and drive gears 5140A, 5140B) may stand proud off the bot frame 5100F and when in the disengaged position the guide bearings 5140G (and drive gears 5140A, 5140B) may be recessed or flush with the frame 5100F. The guide bearings 5140G cooperate with counter bearings/wheels 5130 that are movably mounted to the frame 5100F. For example, each counter bearing 5130 is mounted to a respective shaft 5130S so as to be movable in direction 5999 relative to the frame 5100F between engaged and disengaged positions where when in the engaged position the counter bearings 5130 may stand proud off the bot frame 5100F and when in the disengaged position the counter bearings 5130 may be recessed or flush with the frame 5100F. The counter bearings 5130 rotate independent of a respective shaft 5130S and are spaced apart from the guide bearings 5140G in the direction 5997 by any suitable distance GZ so that the bot 5100 is cantilevered from elevation tracks 5190 as will be described below.

Each shaft 5130S may be connected to any suitable drive or drives 5130D, such as for example an opposing screw drive or other linear actuator, so that the shafts 5130S are extended and retracted towards and away from each other in the direction 5999. As can be seen best in FIG. 51I the shafts 5130S are mounted to elevation sub-frames frame 5170C, 5170D where each sub-frame 5170C, 5170D is coupled to and connected to the other sub-frame 5170C, 5170D by a common drive 5130D (which may include opposing drive screws) for moving the shafts 5130S and counter bearings 5130 in direction 5999. As can also be seen in FIG. 51I the sub-frames 5170C, 5170D are movably mounted on any suitable number of guides GRR1, GRR2 for guiding movement of the sub-frames 5170C, 5170D in direction 5999. In one aspect, the sub-frames 5170A, 5170B are also mounted to any suitable guides GRR2 for guiding movement of the sub-frames 5170A, 5170B in direction 5999. In one aspect, the shafts 5140S and 5130S are both mounted to the elevation sub-frames 5170C, 5170D so as to be driven, in unison, in direction 5999 with the common drive 5130D so that the counter bearings 5130, the drive gears 5140A, 5140B and guide bearings 5140G are extended laterally away from the centerline CL in unison and retracted laterally towards the centerline CL in unison to engage and disengage elevation tracks 5190 as described herein.

Referring also to FIGS. 51E-51J, the elevation tracks 5190 form a two column or mast structure (referred to herein as tower 5190T) having a common engagement plane where the bot to mast interface surfaces are in a common plane. The elevation tracks 5190 may be disposed within the multilevel tote storage structure in a manner similar to that described above with respect to, for example, the bot towers 428, 430 to allow each bot to traverse between different levels of the multilevel storage structure. In one aspect, the towers 5190T are arranged relative to horizontal rails HRR (on which the bot 5100 traverses) in a manner substantially similar to that described above (however, in this aspect there are two elevation tracks per tower 5190T rather than the four described above) so that the elevation tracks 5190 of the tower 5190T is disposed outboard of the horizontal rails HRR on opposite sides of a bot travel aisle for allowing the bot 5100 to pass between the elevation tracks 51090 of the tower 5190T during traverse along the horizontal rails HRR. Each elevation track 5190 in the tower 5190T is substantially similar to each other, but are opposite in hand such that the elevation tracks 5190 are configured for placement on opposite sides of the bot travel aisle (which is defined by e.g. the horizontal rails HRR and storage locations along one or more sides of the bot travel aisle).

Each elevation track 5190 has a drive surface 5190D and a guide surface 5190B disposed opposite the drive surface 5190D and separated by a thickness of the elevation track 5190. The drive surface includes a gear rack 5195 configured to mesh with the drive gear 5140A, 5140B. The drive surface 5190D also includes a bearing member 5190G configured to interface with the guide bearing 5140G. In one aspect the bearing member 5190G is positioned relative to the gear rack 5195 so that at least the bearing member 5190G sets a depth of engagement between the gear rack 5195 and the drive gear 5140A, 5140B (e.g. by extending from the drive surface 5190D past the gear rack 5195). In other aspects, a diameter of the guide bearing 5140G relative to the drive gear 5140A, 5140B is sized so that at least the guide bearing 5140G sets a depth of engagement between the gear rack 5195 and the drive gear 5140A, 5140B (e.g. the diameter of the guide bearing 5140G is smaller than a diameter of the drive gear 5140A, 5140B). In other aspects, a combination of the guide bearing 5140G and the bearing member 5190G set the depth of engagement between the drive gear 5140A, 5140B and the gear rack 5195. The guide surface 5190B may be a substantially flat surface configured to interface with the counter bearing 5130.

Figure 51A:
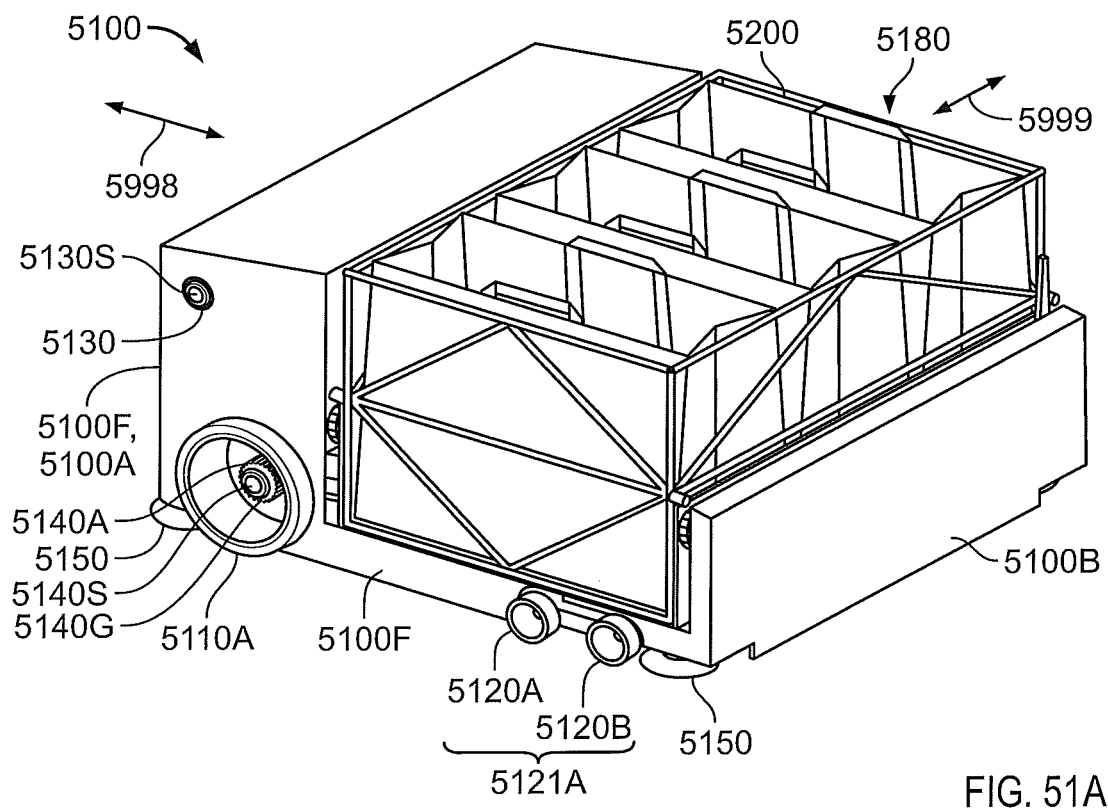
Figure 51B:
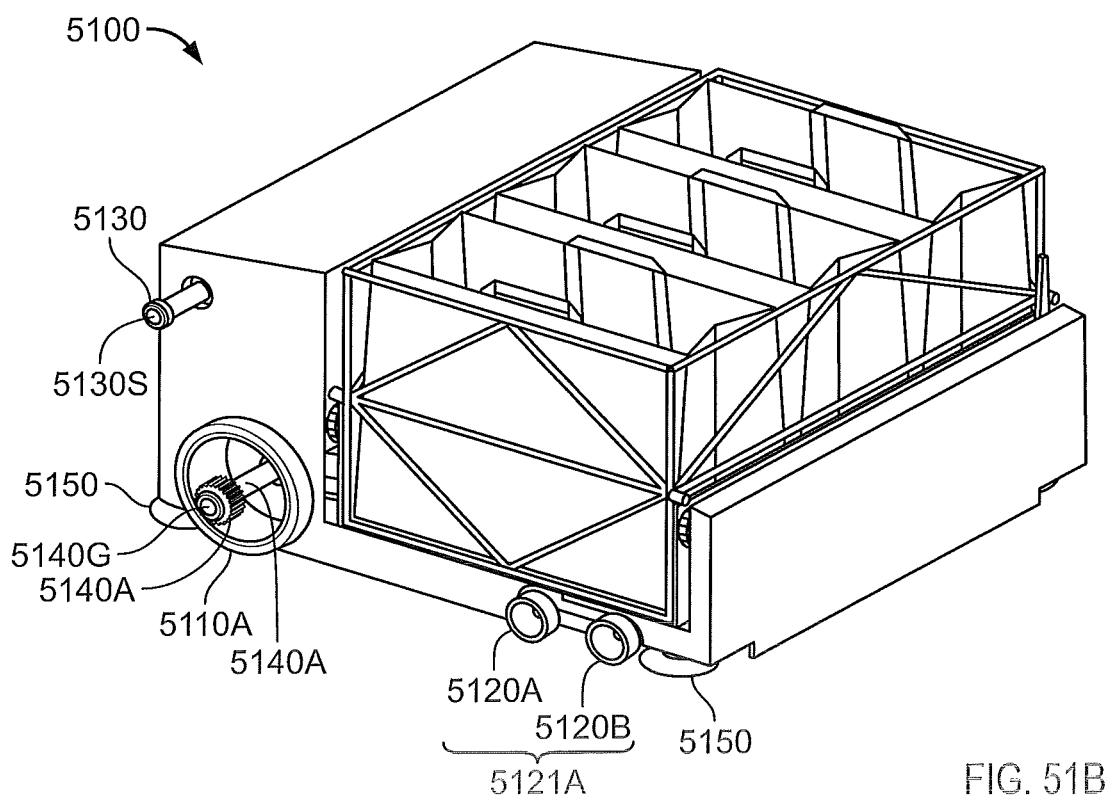
Figure 51C:
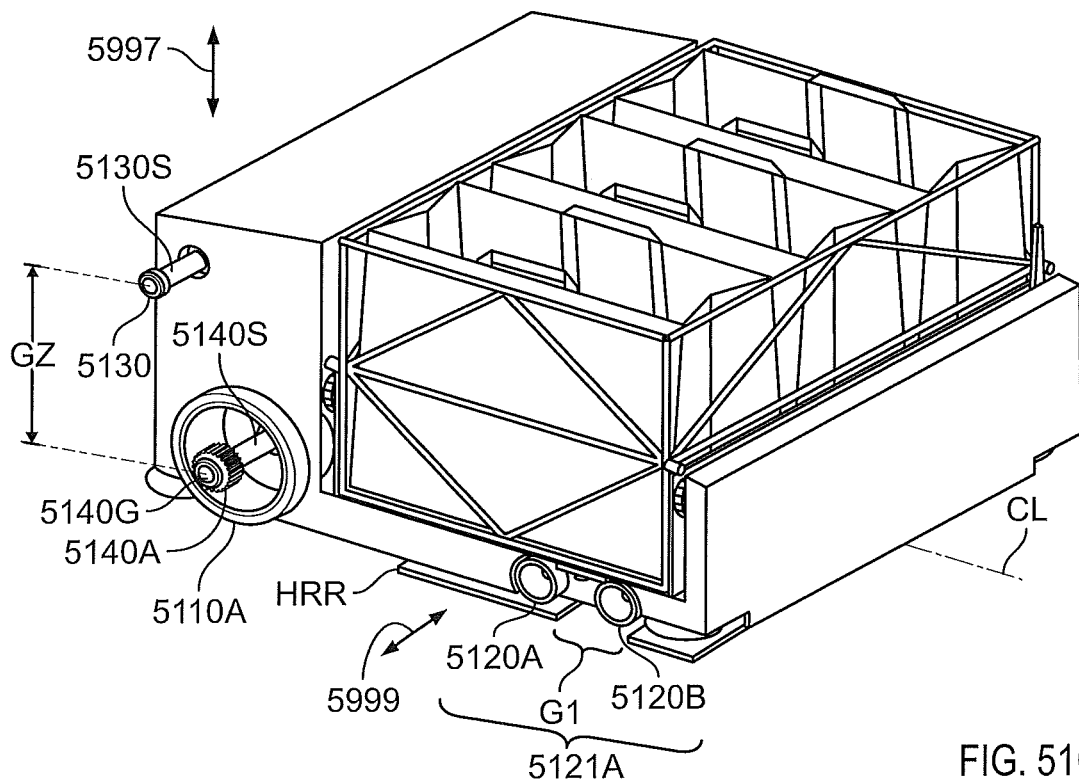
Figure 51D:
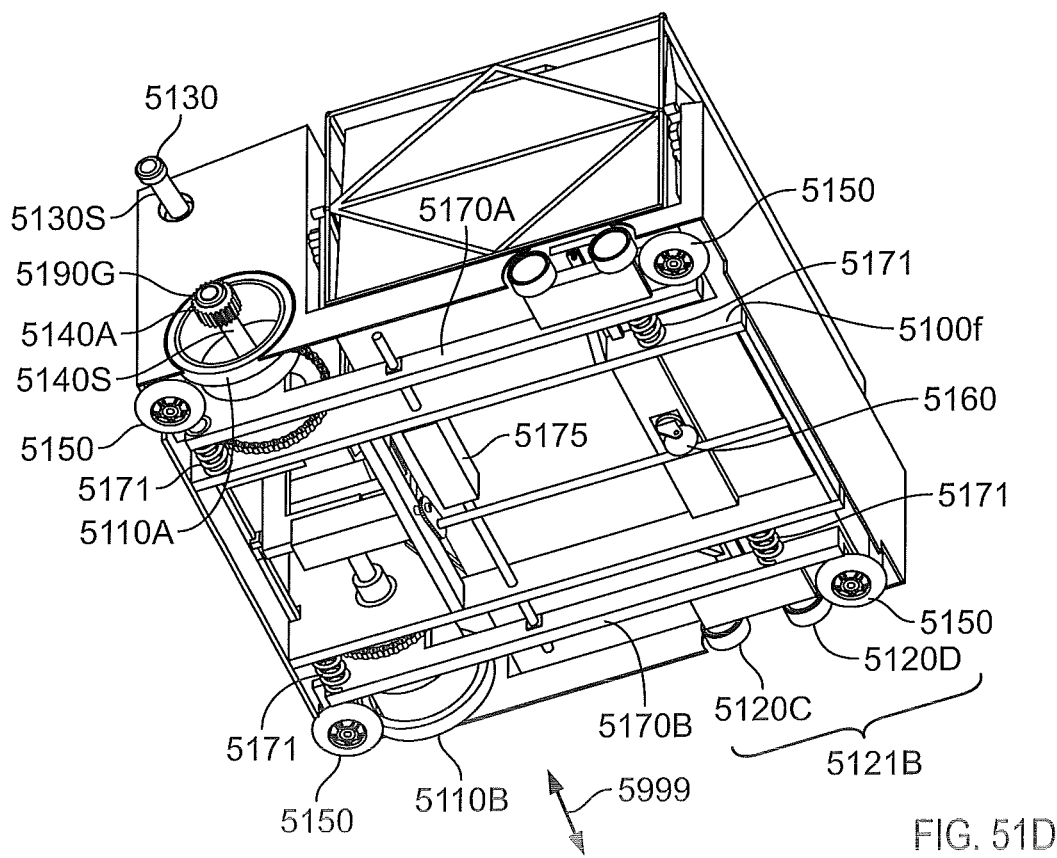

As described above, the horizontal running wheels 5110A, 5110B and 5121A, 5121B as well as the counter bearings 5130, drive gears 5140A, 51040B (in combination with their respective guide bearings 5140G) are each movable between a laterally extended position and a laterally retracted position. In one aspect, for bot 5100 traverse along, for example, the horizontal rails HRR the horizontal running wheels 5110A, 5110B and 5121A, 5121B are in the laterally extended position while the counter bearings 5130, drive gears 5140A, 51040B (in combination with their respective guide bearings 5140G) are in the laterally retracted position as shown in FIG. 51A. In one aspect, for bot 5100 traverse along, for example, the tower 5190T the horizontal running wheels 5110A, 5110B and 5121A, 5121B are in the laterally retracted position while the counter bearings 5130, drive gears 5140A, 51040B (in combination with their respective guide bearings 5140G) are in the laterally extended position as shown in FIGS. 51C and 51D. As an example of horizontal to elevational traverse of the bot 5100, the bot 5100 may travel along the horizontal rails HRR, with the horizontal running wheels 5110A, 5110B and 5121A, 5121B in the laterally extended position so that the counter bearings 5130 and the drive gears 5140A, 5140B (and their respective guide bearings 5140G) are aligned with a respective elevation track 5190 on a respective side of the bot traverse aisle. As may be realized, during bot 5100 traverse along the horizontal rails HRR, the counter bearings 5130, drive gears 5140A, 51040B, and guide bearings 5140G are in the laterally retracted position to avoid contact with the elevation tracks 5190 positioned along an outboard side of the horizontal rails HRR. The bot 5100 may include any suitable sensors or odometry for positioning the bot 5100 relative to the elevation tracks 5190 of the tower 5190T. The shafts 5130S, 5140S of the bot 5100 are longitudinally spaced from each other in the direction 5998 so that, when the bot 5100 is aligned with the elevation tracks 51090 and traversing the tower 5190T the counter bearing 5130 is located on and substantially engaged with the guide surface 5190B of the elevation track 5190 while the guide bearing 5140G (and the drive gear 510A, 51040B) is located on the drive surface 5190D side of the elevation track 5190 and substantially engaged with the bearing member 5190G (and the drive gear 5140A, 5140B is engaged with the gear rack 5195).

When aligned with the elevation tracks 5190, the counter bearings 5130, drive gears 5140A, 51040B (along with the guide bearings 5140G) are laterally extended with, e.g. drive 5130D, so that the counter bearing 5130 is substantially engaged with the guide surface 5190B of the elevation track 5190 and the guide bearing 5140G and the drive gear 5140A, 5140B are substantially engaged with respective ones of the bearing member 5190G the gear rack 5195. To facilitate the initial meshing of the drive gears 5140A, 5140B with a respective gear rack 5195 upon lateral extension of the drive gears one or more of the teeth on the drive gears 5140A, 5140B and/or one or more teeth on the rack (in the area of initial engagement between the drive gears and rack on each storage level) may be beveled/chamfered to allow, e.g., the drive gears 5140A, 5140B to slide between the rack teeth substantially without binding between teeth of the drive gears 5140A, 5140B and the teeth of the gear rack 5195. Alignment of the drive gears 5140A, 5140B and the respective gear rack 5195 may also be facilitated by one of more guide surface of the storage structure, such as for example a riding surface of the horizontal rails HRR, the guide surface 5190B of the elevation tracks 5190 and/or the guide bearing 5190G. In one aspect, the hardness of the gear rack 5195 and the drive gears 5140A, 5140B is such that the drive gears 5140A, 5140B are the wear elements of the elevation running drive and are replaceable (e.g. the hardness of the drive gears is softer than the hardness of the gear rack).

In one aspect, the drives 5110DA, 5110DB are actuated to drive the drive gears 51040A, 5140B so that the bot 5100 traverses in the direction 5997 along the tower 5190T so that the horizontal running wheels 5110A, 5110B and 5121A, 5121B are lifted off of the horizontal rails HRR. The horizontal running wheels are moved to the laterally retracted position with, e.g. linear actuator 5175 where the laterally retracted position of the horizontal running wheels

5110A, 5110B and 5121A, 5121B is such that the bot 5100 is able to pass between the horizontal rails HRR in the direction 5997. The horizontal rails HRR include gaps G1, G2 that are positioned relative to the elevation tracks 5190 and sized so that the counter bearing 5130 and the drive gear 5140A, 5140B (and the respective guide bearing 5140G) as well as their respective shafts/bot axles 5140S, 5130S pass through a respective gap G1, G2 to allow traverse of the bot 5100 along the tower 5190T. Each gap G1, G2 may be sized so that the drive wheels 5110A, 50110B are able to pass over the gap G1, G2 while the bot 5100 is traversing the horizontal rails HRR. Each wheel 5120A, 5120B, 5120C, 5120D in the wheel couplings may be longitudinally spaced from one another so that as one wheel passes over the gap(s) G1, G2 the other wheel in the wheel coupling 5121A, 5121B rides along the horizontal rail HRR maintaining continuous unvaried stability of the bot 5100 riding over the gaps(s) G1, G2 (see e.g. FIG. 51C).

As can be seen in FIGS. 51E-51J the elevation tracks 5190 of the tower 5190T are disposed to engage the bot 5100 so that the common engagement plane between the tower 5190T and the bot 5100 is defined by the coupling between the bot 5100 and the tower 5190T (as described above) at but one end (e.g. the front end 5100A) of the bot 5100 so that the bot 5100 is cantilevered from the tower 5190T so that the engagement between the bot 5100 and the tower 5190T (e.g. the bot 5100 to tower 5190T coupling) is not over-constrained. In other aspects, the coupling between the tower 51090T and the bot 5100 may be arranged so that the coupling is on but one lateral side of the bot 5100. In other aspects the coupling between the tower 5190T and the bot 5100 may be at the back end 5100B of the bot 5100.

As an example of elevational to horizontal traverse of the bot 5100, the bot 5100 may travel along the tower 5190T with the counter bearings 5130, the guide bearings 5140G and the drive gears 5140A, 5140B laterally extended to engage the elevation tracks 5190 of the tower 5190T. The horizontal running wheels 5110A, 5110B and 5121A, 5121B may be in the laterally retracted position. The bot 5100 may travel along the tower 5190T so substantially align the bot 5100 with horizontal rails HRR on a predetermined level of the multilevel storage structure. The bot 5100 may include any suitable sensors or odometery for positioning the bot 5100 along the tower 5190T relative to the predetermined horizontal rails HRR. The horizontal running wheels 5110A, 5110B and 5121A, 5121B may be extended to the laterally extended position where when extended the horizontal running wheels 5110A, 5110B and 5121A, 5121B are vertically aligned with and located above (or substantially on) respective ones of the horizontal rails HRR. The drives 5110DA, 5110DB may be actuated to lower the bot 5100 so that the horizontal running wheels 5110A, 5110B and 5121A, 5121B are in substantial contact with the horizontal rails HRR. The counter bearings 5130, the guide bearings 5140G and the drive gears 5140A, 5140B are laterally retracted to disengage the tower and allow movement of the bot 5100 along the horizontal rails HRR.

Figure 51E:
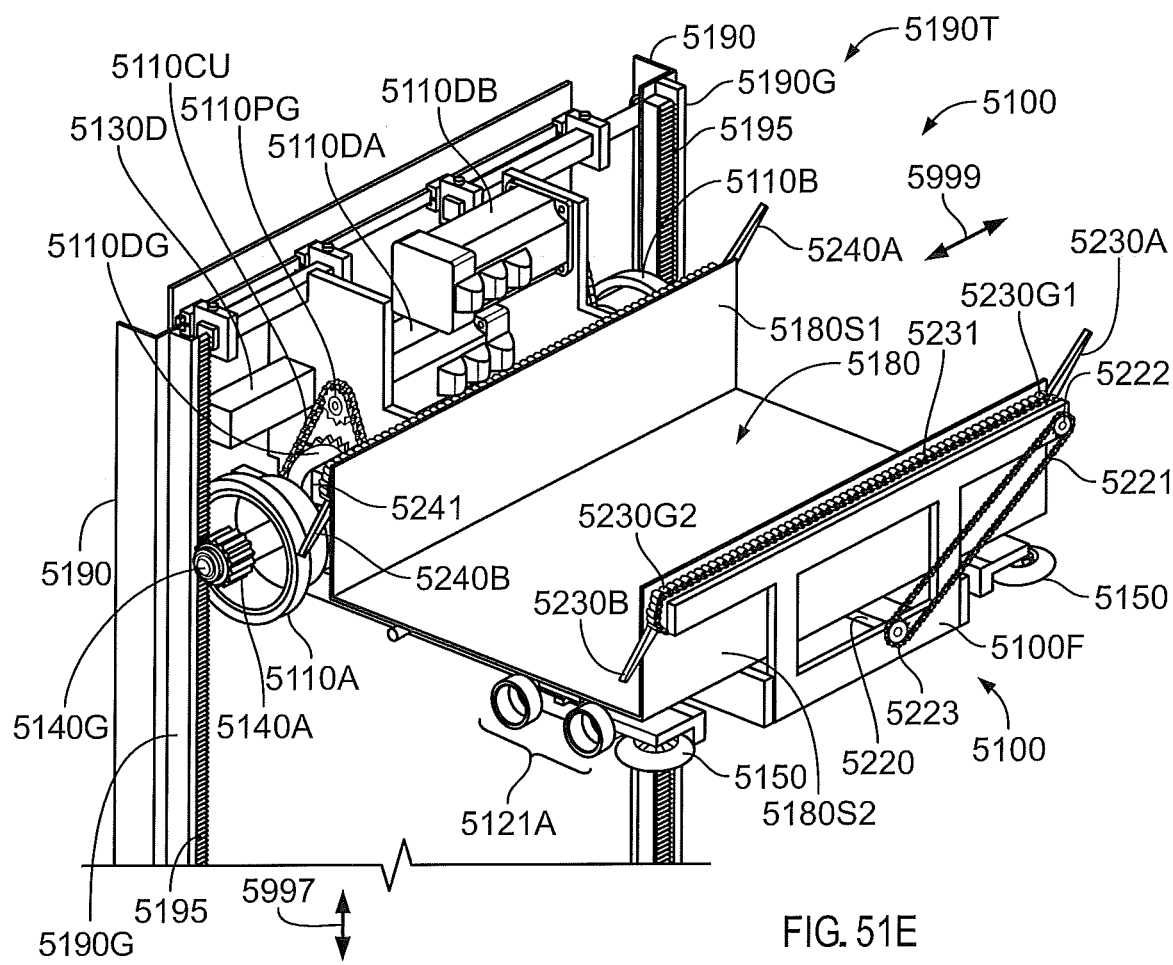
Figure 51F:
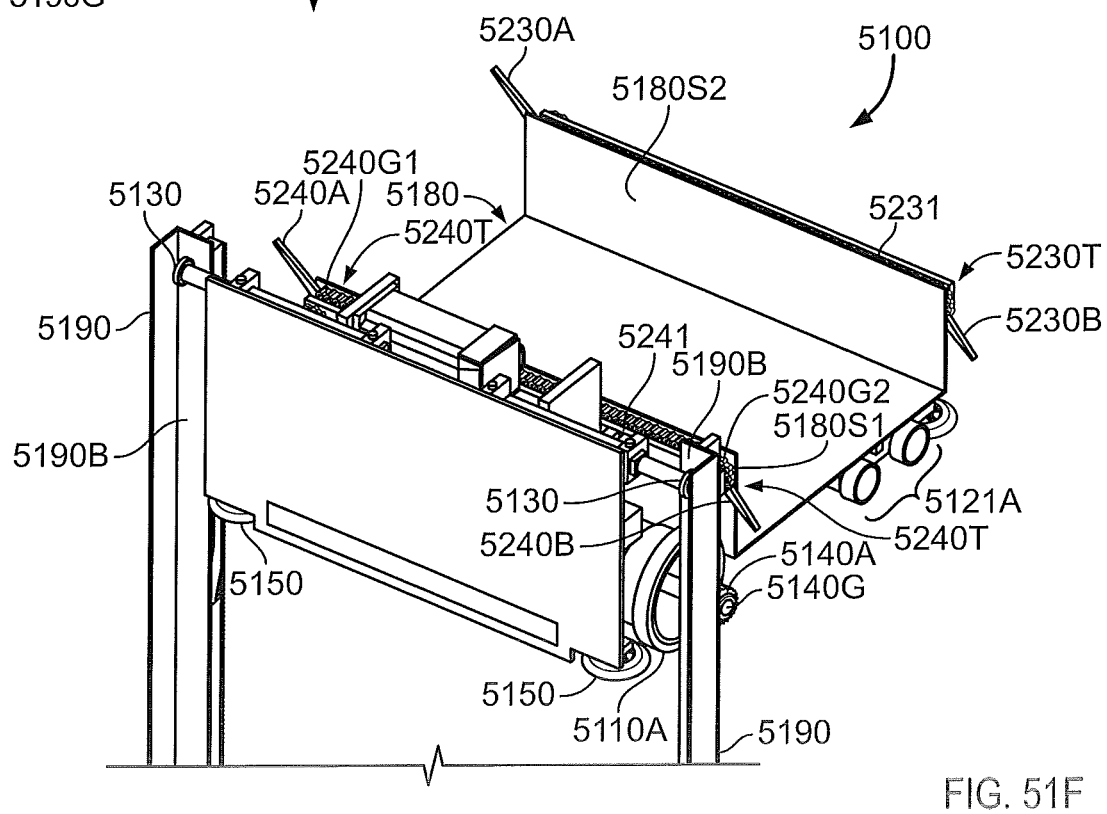
Figure 51G:
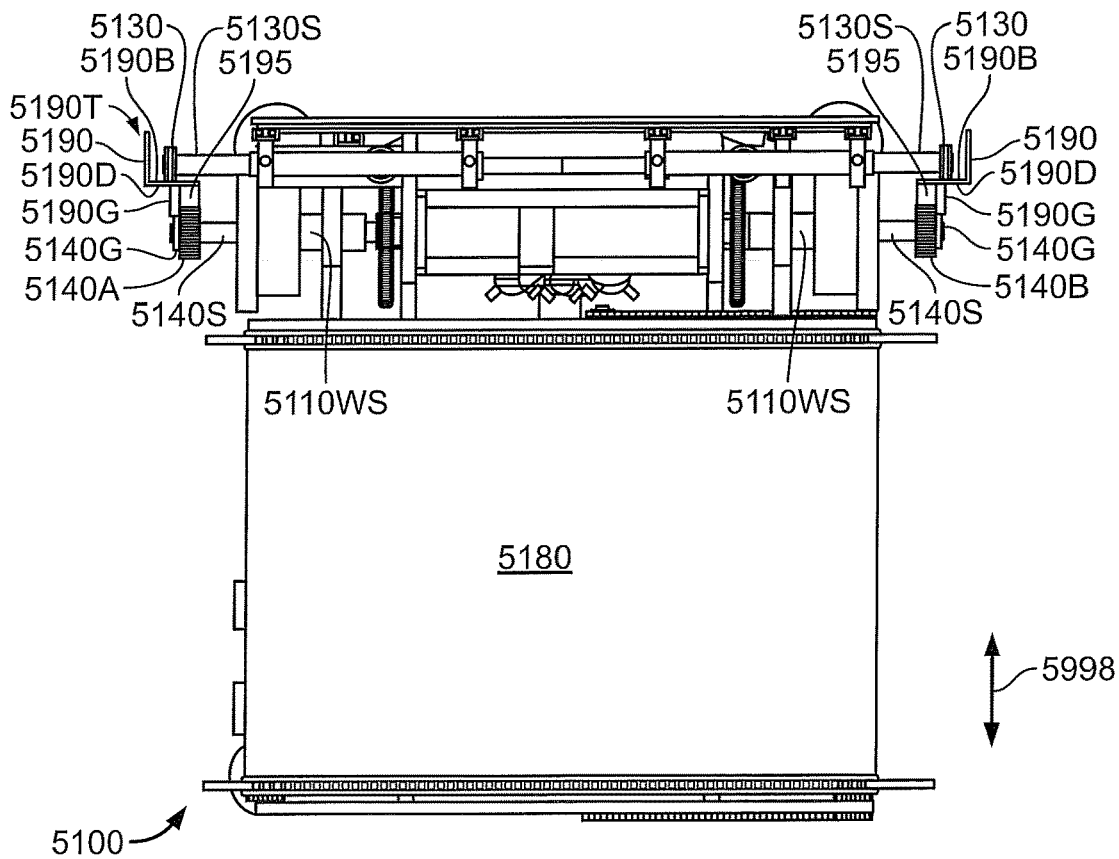
Figure 51H:
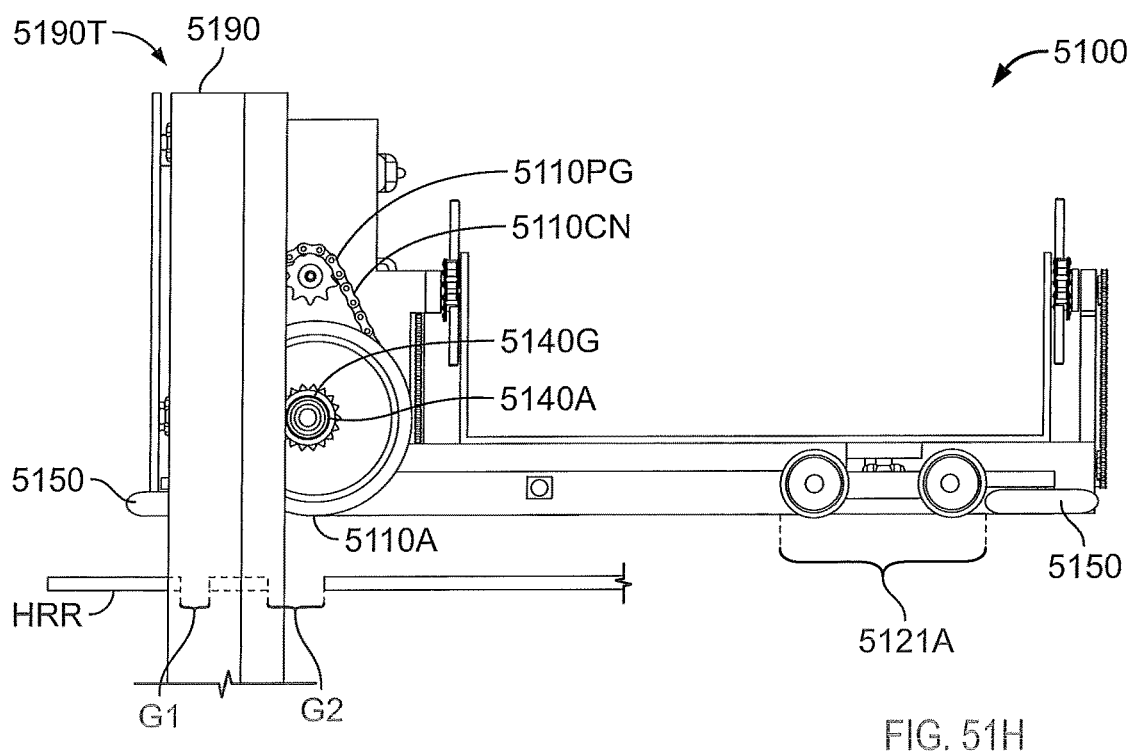
Figure 51I:
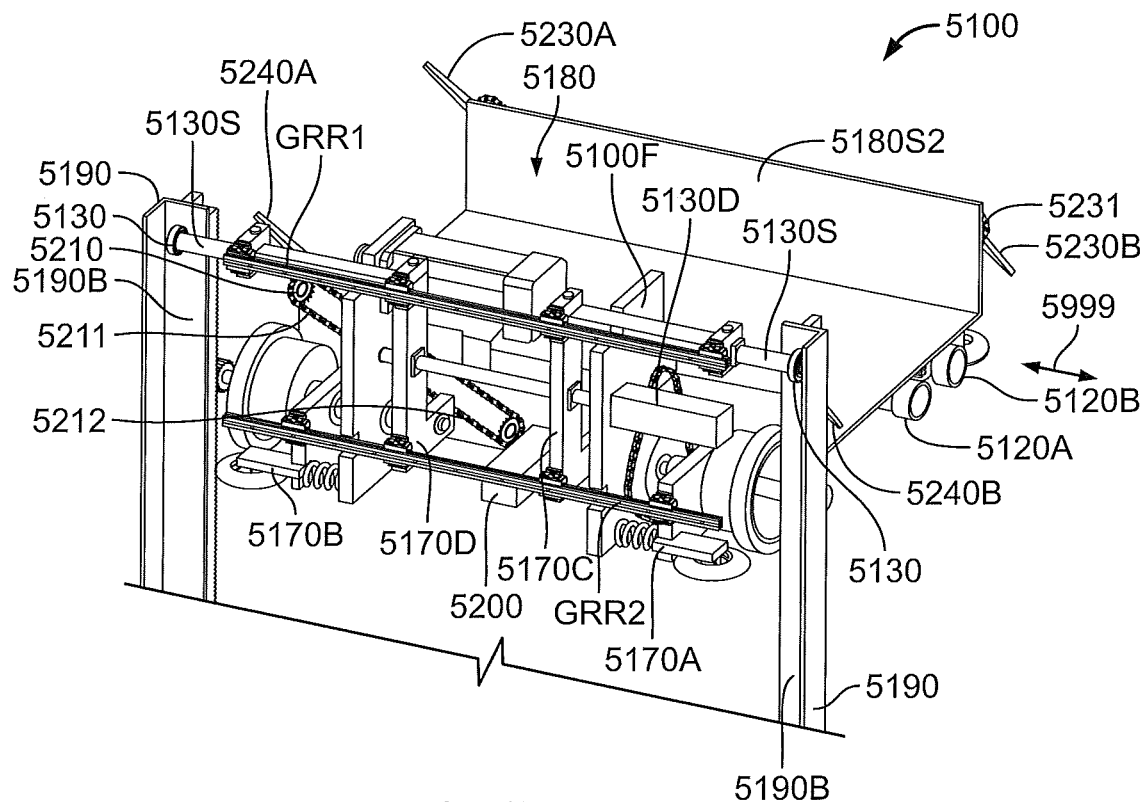
Figure 51J:
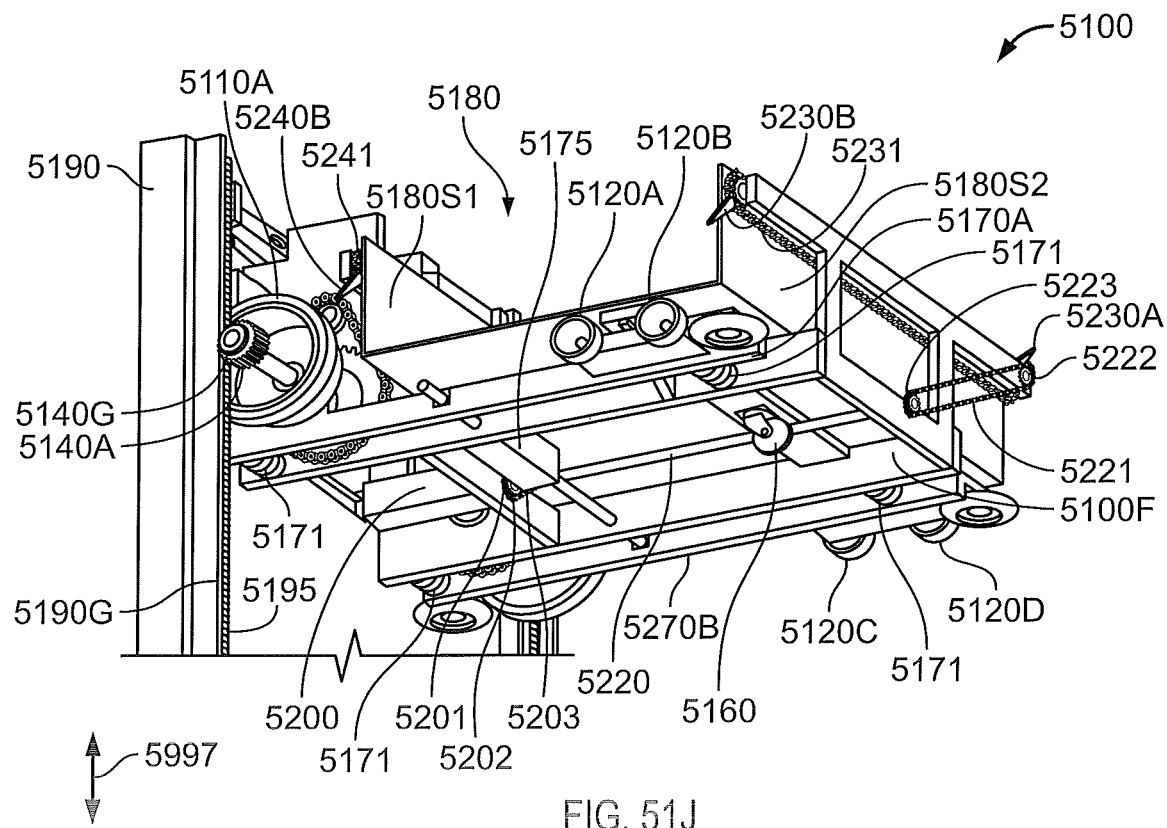

Referring now to FIGS. 51E, 51F, 51I and 51J, the bot 5100 includes a tote transfer system that includes one or more flippers (also referred to as catches or paddles) 5230A, 5230B, 5240A, 5240B that are located adjacent longitudinally spaced side walls 5180S1, 5180S2 of the payload area 5180 and which engage opposite sides of a tote 5300 (as described herein) for transferring the tote 5300 to and from the bot 5100. As will be described herein, the flippers 5230A, 5230B, 5240A, 5240B push and pull totes from and to the payload area 5180 of the bot. In one aspect, the tote transfer system is a bilateral catch that is configured to engage totes on opposing lateral sides of the bot 5100. For example, in one aspect, one or more flippers 5230A, 5230B are mounted to a recirculating bidirectional traverser 5230T (FIG. 51F) where the recirculating bidirectional traverser 5230T is mounted to one or more of the frame 5100F (as shown in FIG. 51J) and the side wall 5180S2 so that the flippers 5230A, 5230B extend above and laterally outward of the side wall 5180S2, while in other aspects the flippers may be actuable members (e.g. between retracted and deployed positions where when in the deployed position the fingers engage a tote) mounted to one or more rigid linear slides that laterally extend for transferring totes to and from the bot 5100. The recirculating bidirectional traverser 5230T may be a substantially continuous loop traversing member that includes a first sprocket 5230G1 and a second sprocket 5230G2 disposed substantially at opposite lateral sides of the frame 5100F. The first and second sprockets 5230G1, 5230G2 are coupled together by a traversing member such as chain 5231 where the flippers 5230A, 5230B are mounted to the chain 5231 so that as the chain 5231 rotates the flippers 5230A, 5230B rotate in unison with the chain 5231. The flippers 5230A, 5230B are positioned on the chain 5231 so as to be opposed to one another (e.g. the flippers 5230A, 5230B are equally spaced about the chain 5231). It should be understood that while chains and sprockets are described with respect to the components of the tote transfer system, in other aspects any suitable drive members may be used, such as belts and pulleys, gear trains, etc.

The recirculating bidirectional traverser 5230T is coupled to a tote transfer drive motor 5200 by any suitable transmission. For example, in one aspect one of the first and second sprockets 5230G1, 5230G2 is coupled to a driven sprocket 5222 where the driven sprocket 5222 and the one of the first and second sprockets 5230G1, 5230G2 are located on a common shaft so as to rotate in unison. A drive sprocket 5223 is mounted to the frame and is coupled to the driven sprocket 5222 by, e.g., chain 5221. In one aspect the drive sprocket 5223 is mounted to a drive shaft 5220 which is coupled to and driven by the drive motor 5200 in any suitable manner so that the drive motor 5200 effects the recirculating bidirectional movement of the flippers 5230A, 5230B.

One or more flippers 5240A, 5240B are also mounted to a recirculating bidirectional traverser 5240T (FIG. 51F) where the recirculating bidirectional traverser 5240T is mounted to one or more of the frame 5100F (as shown in FIG. 51F) and the side wall 5180S1 so that the flippers 5240A, 5240B extend above and laterally outward of the side wall 5180S1. The recirculating bidirectional traverser 5240T is a substantially continuous loop traversing member that is substantially similar to recirculating bidirectional traverser 5240T and includes a first sprocket 5240G1 and a second sprocket 5240G2 disposed substantially at opposite lateral sides of the frame 5100F. The first and second sprockets 5240G1, 5240G2 are coupled together by a chain 5241 where the flippers 5240A, 5240B are mounted to the chain 5241 so that as the chain 5241 rotates the flippers 5240A, 5240B rotate in unison with the chain 5241. The flippers 5240A, 5240B are positioned on the chain 5241 so as to be opposed to one another (e.g. the flippers 5240A, 5240B are equally spaced about the chain 5241).

The recirculating bidirectional traverser 5240T is coupled to the tote transfer drive motor 5200 (e.g. the traversers 5230T, 5240T are driven by a common motor) by any suitable transmission. For example, in one aspect one of the first and second sprockets 5240G1, 5240G2 is coupled to a driven sprocket 5210 (FIG. 510 where the driven sprocket 5210 and the one of the first and second sprockets 5240G1, 5240G2 are located on a common shaft so as to rotate in unison. A drive sprocket 5212 is mounted to the frame and is coupled to the driven sprocket 5210 by, e.g., chain 5211. In one aspect the drive sprocket 5212 is connected to the frame by a drive shaft, where sprocket 5203 (FIG. 51J) is also mounted to the drive shaft (e.g. sprockets 5212, 5203 are located on a common shaft so as to rotate in unison). A drive sprocket 5201 is mounted to drive shaft 5220 and coupled to sprocket 5203 by a chain 5202 so that the drive motor 5200 effects the recirculating bidirectional movement of the flippers 5240A, 5240B. In other aspects, sprocket 5212 may be coupled directly to drive shaft 5220.

As described above, a common drive 5200 drives both recirculating bidirectional traversers 5230T, 5240T however, in other aspects each recirculating bidirectional traverser 5230T, 5240T may have a respective drive (e.g. driven by separate drives) where any suitable transmission connects each recirculating bidirectional traverser 5230T, 5240T to the respective drive. In one aspect, the flippers 5230A, 5240A may be positioned on their respective chains 5231, 5241 so that flipper 5230A is laterally located in substantially the same position as flipper 5240A (e.g. so that the flippers 5230A, 5240A engage and disengage a tote at substantially the same time). Likewise, flippers 5230B, 5240B may be positioned on their respective chains 5231, 5241 so that flipper 5230B is laterally located in substantially the same position as flipper 5240B (e.g. so that the flippers 5230B, 5240B engage and disengage a tote at substantially the same time). In one aspect, one pair of the flippers 5230A, 5240A may be push members configured to push a tote from the bot 5100 to a tote holding location while the other pair of flippers 5230B, 5240B may be pull members configured to pull a tote from a tote holding location onto the bot 5100.

In one aspect, referring also to FIG. 52A, the flippers 5230A, 5240A (e.g. the push members) may have a different configuration than the flippers 5230B, 5240B (e.g. the pull members). For example, the push flippers 5230A, 5240A may have a length L1 that is less than a length L2 of the pull flippers 5230B, 5240B, while in other aspects the flippers 5230A, 5240A, 5230B, 5240B may have substantially the same configuration. The length L1 of the push flippers 5230A, 5240A may be any suitable length so that the flippers 5230A, 5240A are configured to push a tote off of the bot 5100 without generating any lift forces (or forces in the direction 5997) on the tote 5300. The length L2 of the pull flippers 5230B, 5240B may be any suitable length so that the flippers 5230B, 5240B define a cam or ramp surface that engages a respective catch surface or member 5300C1, 5300C2, 5300C3, 5300C4 of tote 5300 where engagement of the flipper 5230B, 5240B with the respective catch surface 5300C1, 5300C2, 5300C3, 5300C4 results in a contact force F (see FIG. 52K) in a direction that has both a lift force $F_L$ component and a pulling force FP component. In one aspect, the lift force component $F_L$ cams the tote 5300 into the payload area 5180 of the bot 5100 so that the tote 5300 is lifted over any offset or edges (such as of the tote holding area or bot) located between the tote holding location 5350 and the payload area 5180 of the bot 5100, while in other aspects the tote 5300 may have rounded or chamfered edges to facilitate passage of the tote 5300 over any edges or offsets of or between the tote holding location 5350 and the payload area 5180.

Referring to FIGS. 52A-52J an exemplary operation of a tote 5300 transfer between a tote holding location 5350 and the bot 5100 will be provided. In one aspect the bot 5100 traverses horizontal rails HRR to a predetermined tote holding location 5350 (FIG. 55, Block 5801). The bot 5100 may include any suitable sensors or odometry to facilitate location determination of the bot 5100 relative to the tote holding location 5350. When the tote 5300 is substantially aligned with the payload area 5180 the flippers 5230B, 5240B (and flippers 5230A, 5240A) are rotated in direction 5399 so that the flippers extend underneath and behind the respective catch surface 5300C1, 5300C2 to cam the tote 5300 into the payload area 5180 of the bot 5100 as described above with respect to FIG. 52K (FIG. 55, Block 5803). The flippers 5230B, 5240B continue to move in direction 5399 to pull the tote laterally in direction 5999A from the tote holding location 5350 to the payload area 5180 of the bot 5100 until the tote 5300 is located at a predetermined loaded position within the payload area 5180 as shown in FIG. 52D (FIG. 55, Block 5804). In one aspect, the bot 5100 includes any suitable sensors for sensing a position of the tote 5300 relative to the payload area 5180 for stopping movement of the recirculating bidirectional traversers 5230T, 5240T when the tote 5300 reaches the predetermined position within the payload area 5180. To transfer the tote 5300 from the bot to the tote holding location 5350 from the same side of the bot 5100 that the tote was transferred onto the bot 5100, the flippers 5230B, 5240B (and flippers 5230A, 5240A) are moved in direction 5398 so that flippers 5230B, 5240B contact respective catch surface 5300C3, 5300C4 of the tote 5300 (FIG. 55, Block 5806). The flippers 5230B, 5240B continue to move in direction 5398 so that the flippers 5230B, 5240B push the tote 5300 laterally in direction 5999B until the flippers 5230B, 5240B disengage the respective catch surface 5300C3, 5300C4 of the tote 5300 so that the tote 5300 is partially pushed off of the bot 5100 (FIG. 55, Block 5808). The flippers 5230A, 5230A (and flippers 5230B, 5240B) continue to move in direction 5398 so that flippers 5230A, 5240A engage respective catch surface 5300C1, 5300C2 where further movement of the flippers 5230A, 5240A in direction 5398 pushes the tote 5300 laterally in direction 5999B off of bot 5100 where the tote 5300 is finally positioned in the tote holding location 5350 when the flippers 5230A, 5240A disengage the respective catch surfaces 5300C1, 5300C2 as the flippers 5230A, 5240A move in direction 5398 (FIG. 55, Block 5811). The flippers 5230A, 5230B, 5240A, 5240B are moved in direction 5399 or direction 5398 to the starting or home position of the flippers 5230A, 5230B, 5240A, 5240B as shown in FIG. 52J, where the home position may be along the centerline CL of the bot 5100 or at any other suitable position along the path of travel of the flippers 5230A, 5230B, 5240A, 5240B (FIG. 55, Block 5812).

Where the tote 5300 is to be pushed off of the opposite lateral side the bot 5100 than the lateral side from which the tote 5300 was pushed onto the bot 5100, referring to FIG. 52D, the flippers 5230B, 5240B (which are engaged with respective catch surfaces 5300C1, 5300C2) move in direction 5399 to partially push the tote 5300 off of the bot in direction 5999A until the flippers 5230B, 5240B disengage the respective catch surfaces 5300C1, 5300C2 (FIG. 55, Block 5814). The flippers 5230A, 5240A (along with flippers 5230B, 5240B) continue to move in direction 5399 so that the flippers 5230A, 5240A engage the respective catch surface 5300C1, 5300C2 to push the tote 5300 in direction 5999A until the flippers 5230A, 5240A disengage the respective catch surfaces 5300C1, 5300C2 to finally position the tote 5300 at a tote holding location (FIG. 55, Block 5816) in a manner substantially similar to that described above and the flippers 5230A, 5240A, 5230B, 5240B are returned to the starting position (FIG. 55, Block 5812).

In another aspect, the bot 5100 includes a tote transfer system that includes one or more flipper (also referred to as catches or paddles) 5400 mounted to a recirculating bidirectional traverser 5400T (that is substantially similar to recirculating bidirectional traversers 5230T, 5240T described above), however in this aspect the recirculating bidirectional traverser 5400T is configured to engage but one side of the tote 5300 (e.g. such as a bottom side 5300B or a front side/face 5300F). In this aspect, the recirculating bidirectional traverser 5400T includes a frame 5400TF that is movably mounted to the frame 5100F (such as by a linear bearing or slide) of the bot 5100 so as to move laterally in direction 5999. For example, a linear drive 5410 (such as a solenoid, or other linear actuator) may be mounted to frame 5100F and connected to the frame 5400TF by any suitable transmission so that the frame 5400TF moves in direction 5999 as will be described below. The linear drive 5410 is a bi-directional drive (such as when the bot 5100 loads and unloads totes from both lateral sides of the bot 5100) while in other aspects the linear drive 5410 is a unidirectional drive (such as when the bot 5100 loads and unloads totes from a single lateral side of the bot 5100). The recirculating bidirectional traverser 5400T also includes sprockets 5407, 5408 disposed on opposite ends of the frame 5400TF and a sprocket 5405 mounted to the frame 5400TF between the sprockets 5407, 5408. The sprockets 5405, 5407, 5408 are coupled to each other by chain 5406 and the one or more flipper 5400 is mounted to the chain so as to move in unison with the chain in a manner similar to that described above. The sprockets 5405, 5407, 5408 and chain 5406 may be arranged in a common plane that is substantially parallel with a plane of a bot traverse surface (such as a deck or rail on which the bot travels). The sprocket 5405 is mounted on a common shaft with sprocket 5404 where the common shaft is supported by the frame 5400TF. A drive 5401 (also mounted to the frame 5400TF) has sprocket 5403 mounted to an output of the drive 5401 where the sprocket 5403 is coupled to sprocket 5404 by chain 5402 so that actuation of drive 5401 causes movement of the one or more flipper 5400 in one or more of directions 5991, 5992.

Referring now to FIGS. 53A-53K an exemplary operation of the tote transfer system including recirculating bidirectional traverser 5400T will be described. In a manner similar to that described above, the bot 5100 is positioned along the horizontal rail HRR so that a tote 5300 is aligned with the payload area 5180 of the bot 5100 with the recirculating bidirectional traverser 5400T in a neutral or starting position (e.g. substantially centered along the centerline CL of the bot 5100). The flipper 5400 is driven by drive 5401 in one of directions 5991, 5992 so that the flipper 5400 extends laterally towards the tote 5300 to be picked (e.g. transferred to the bot 5100) (FIG. 56, Block 5900). The linear drive 5410 is actuated so as to drive the recirculating bidirectional traverser 5400T in direction 5999B so that the flipper 5400 is extended laterally past a catch surface 530005 located on, for example a bottom of the tote 5300 which is located in tote holding location 5350A (FIG. 56, Block 5902). The flipper is driven in direction 5991 to engage the catch surface 530005 (so that a contact direction between the flipper and catch surface is substantially parallel with the traverse direction of the tote into the payload area) and pull the tote 5300 into the payload area 5180 (FIG. 56, Block 5904) and the linear drive 5410 is also actuated to move the recirculating bidirectional traverser 5400T in direction 5999A, which also pulls the tote 5300 into the payload area 5180 (FIG. 56, Block 5906).

In one aspect, the tote 5300 is picked and placed to a common lateral side of the bot 5100. In this aspect, the recirculating bidirectional traverser 5400T is moved in direction 5999B by linear drive 5410 so that the flipper 5400 is spaced from the catch surface 530005 as shown in FIG. 53G (FIG. 56, Block 5908). The flipper 5400 is moved in direction 5991 so that the flipper extends laterally towards (but longitudinally offset from) the catch surface 530005 (FIG. 56, Block 5910) and the linear drive 5410 moves the recirculating bidirectional traverser 5400T in direction 5999A to place the flipper 5400 laterally outward of the catch surface 530005 (FIG. 56, Block 5912). The flipper 5400 is moved in direction 5992 to engage the catch surface 530005 (so that a contact direction between the flipper and catch surface is substantially parallel with the traverse direction of the tote off of the payload area) and to push the tote 5300 out of the payload area 5180 to tote holding location 5300A as shown in FIG. 53J (FIG. 56, Block 5914). The linear drive 5410 moves the recirculating bidirectional traverser 5400T in direction 5999B to further push the tote 5300 into tote holding location 5350A for finally positioning the tote 5300 in told holding location 5350A as shown in FIG. 53K (FIG. 56, Block 5916). The recirculating bidirectional traverser 5400T is moved in direction 5999A so that the recirculating bidirectional traverser 5400T is disposed within the payload area 5180, such as at the neutral position, so that the bot 5100 may traverse through the storage system for picking/placing other totes 5300.

In one aspect, the tote 5300 is picked and placed to and from opposite lateral sides of the bot 5100. Referring again to FIG. 53F the tote 5300 is pulled into the payload area 5180, as described above, from tote holding location 5350A. The flipper 5400 is moved in direction 5992 so that the flipper 5400 extends laterally towards (but longitudinally offset from) catch surface 530006 (which is located on the bottom of tote 5300 and on an opposite side of the tote 5300 from catch surface 530005) (FIG. 56, Block 5918) in a manner substantially similar to that shown in FIG. 53H. In one aspect the recirculating bidirectional traverser 5400T may be moved in direction 5999A to provide clearance between the flipper 5400 and the catch surface 530006 to allow the flipper 5400 to rotate past the catch surface 530006. The linear drive 5410 moves the recirculating bidirectional traverser 5400T in direction 5999B so that the flipper 5400 is disposed laterally outward of catch surface 530006 in a manner substantially similar to that shown in FIG. 53J (FIG. 56, Block 5920). The flipper is moved in direction 5991 to engage the catch surface 530006 (so that a contact direction between the flipper and catch surface is substantially parallel with the traverse direction of the tote off of the payload area) and push the tote in direction 5999A towards tote holding location 5350B (FIG. 56, Block 5922). The linear drive 5410 moves the recirculating bidirectional traverser 5400T in direction 5999A to further push the tote in direction 5999A and finally position the tote 5300 within the tote holding location 5350B in a manner substantially similar to that shown in FIG. 53K (FIG. 56, Block 5924). The recirculating bidirectional traverser 5400T is moved in direction 5999B so that the recirculating bidirectional traverser 5400T is disposed within the payload area 5180, such as at the neutral position, so that the bot 5100 may traverse through the storage system for picking/placing other totes 5300.

Referring now to FIGS. 54A and 54G, an order fulfillment workstation 5500 is shown. While one workstation 5500 is shown in FIG. 54A it should be understood that the storage and structure 5563 (which is substantially similar to the storage structures described herein) may have any suitable number of workstations 5500. For example, FIG. 54G illustrates an exemplary configuration of workstations 5500 where at least three workstations 5500 are disposed on each storage level, while in other aspects any suitable number of workstations may be disposed on each storage level. The workstations 5500 for the different levels may be vertically offset from one another such as being stacked one above the other or stacked in a staggered arrangement. In one aspect, each workstation 5500 is communicably connected to two transit decks 5550A, 5550B, while in other aspects each workstation 5500 may be communicably connected to any suitable number of transit decks. In one aspect, each transit deck 5550A, 5550B may correspond to a respective storage level while in other aspects the transit decks 5550A, 5550B may correspond to a common storage level (e.g. there is more than one transit deck associated with each storage/picking level). In another aspect, there may be towers (substantially similar to elevation tracks 5190) that are located on or otherwise connected to (or disposed within) the transit decks (or aisles) that communicably connect one or more of the transit decks 5550A, 5550B (or aisles) of the different storage levels to from a travel loop with another tower so that bots 5100 may travers between the stacked transit decks 5550A, 5550B (or aisles) to any desired/predetermined level of the storage structure. The workstations 5500 are configured to accommodate a picker 5520 that transports one or more eaches from a tote (e.g. a P-tote) on one of the bots 5100 to a "put" location in a tote (e.g. an O-tote) on another one of the bots 5100. The workstations 5500 may be arrayed at multiple elevations where human or robotic pickers remove eaches from product Totes (P-totes) and place them into either order Totes (O-totes) or a mobile robot, depending on the system configuration and in a manner substantially similar to that described above. In one aspect, the workstation 5500 includes conveyance lanes or aisles 5501, 5502, 5503, 5504, elevation towers 5190T and a picker platform 5510 disposed at a pick station 5530. A workstation 5500 is disposed at each transit deck level so that bots 5100 on each transit deck have access to a workstation 5500. In the exemplary aspect illustrated in FIG. 54A two transit deck levels 5550A, 5550B are shown connected to a common workstation 5500 however, in other aspects any suitable number of transit deck levels may be connected to a common workstation 5500.

Each of the conveyance lanes 5501, 5502, 5503, 5504 has a respective entry and/or exit 5500E in communication with a respective transit deck 5550A, 5550B. As can be seen in FIG. 54A conveyance lanes 5501, 5504 have entry/exits 5500E in communication with transit deck 5550B while conveyance lanes 5502, 5503 have entry/exits 5500E in communication with transit deck 5550A. The conveyance lanes 5501-5504 include rails WRR that are substantially similar to rails HRR described above with respect to the aisles providing access to the tote storage/holding locations. As can also be seen in FIG. 54A elevation towers 5190TWA-5190TWD connect stacks of conveyance lanes to each other in a manner substantially similar to that described above with respect to elevation towers 5190T. The elevation towers 5190TWA-5190TWD are substantially similar to the elevation towers 5190T described above. As an example, elevation towers 5190TWA, 5190TWB connect conveyance lanes 5503, 5504 so that bots 5100 can traverse between the conveyance lanes 5503, 5504. Elevation towers 5190TWC, 5190TWD connect conveyance lanes 5501, 5502 so that bots 5100 can traverse between the conveyance lanes 5501, 5502.

In one aspect, one or more of the conveyance lanes 5501-5504 and towers 5190TWQ-5190TWD may be angled (e.g. tilted or raked) relative to the transit decks 5550A, 5550B and the operator platform 5510 so that when the P-totes and O-totes are presented to the picker 5520 by the respective P-bot and O-bot, the P-totes and O-totes are angled so that the picker 5520 can view and access the P-totes and O-totes for picking and placing eaches from pick/place positions defined by the towers 5190TWQ, 5190TWC adjacent the pick station 5530. In other aspects, the conveyance lanes 5501-5504 and towers 5190TWQ-5190TWD may have any spatial relationship with the pick station 5530 and/or transit decks 5550A, 5550B for presenting the totes to the picker 5520 in any suitable spatial orientation.

In one aspect, the conveyance lanes 5501-5504, the elevation towers 5190TWA-5190TWD and the pick station 5530 have a symmetric structure with independent product bots (P-bots) and order bots (O-bots) paths and positions. In this aspect there may be lateral symmetry (in direction 5599) so that there is a left/right symmetrical arrangement. For example, the left/right symmetrical arrangement may be such that P-bots carrying P-totes are arranged on the right side of the workstation 5500 while O-bots carrying O-totes are arranged on the left side of the workstation 5500. In other aspects, the P-bots and P-totes may be on the left side of the workstation 5500 while the O-bots and O-totes are on the right side of the workstation 5500.

In one aspect, there are dedicated bot flow entry and exit conveyance lanes for both the P-bots and O-bots. For example, the flow of bots to the pick station 5530 may be such that the bots travel from lower conveyance lanes to upper conveyance or in other aspects, from upper conveyance lanes to lower conveyance lanes. For example, where bots travel from lower conveyance lanes to upper conveyance lanes, P-bots carrying eaches to be picked enter one or more lower/bottom conveyance lane(s) 5501, traverse tower 5190TWC to one or more upper conveyance lane(s) 5502 so that the each(es) can be picked where the P-bot exits the workstation using the one or more upper conveyance lane(s) 5502. Similarly, e.g., O-bots carrying O-totes to which eaches are to be placed enter one or more lower/bottom conveyance lane 5504, traverse tower 5190TWA to one or more upper conveyance lane(s) 5503 so that the each(es) can be placed where the O-bot exits the workstation using the one or more upper conveyance lane(s) 5503. In other aspects, the entrance of bots to the workstation may be timed such that the bots can enter and exit from both the upper conveyance lanes 5502, 5503 and the lower conveyance lanes 5501, 5504 where the towers 2190TWA-5190TWD are employed to route bots past one another such as when bots are entering and exiting a common conveyance lane 5501-5504. In the examples, described above, the flow of P-bots carrying P-totes and the flow of O-bots carrying O-totes are both generally in a common direction, such as both in the direction of arrow 5598 from lower conveyance lanes to upper conveyance lanes or both in the direction of arrow 5597 from upper conveyance lanes to lower conveyance lanes. However, in other aspects, the flow of one or more of the P-bots and O-bots may be in the direction of arrow 5597 from upper conveyance lanes to lower conveyance lanes. For example, the flow of P-bots and P-totes may be in the direction 5598 while the flow of O-bots and O-totes may be in the direction 5597 or vice versa.

In one aspect, each side of the workstation 5500 (e.g. the product side and the order side) has dedicated flow direction elevation towers. For example, elevation tower 5190TWC on the product side of the workstation 5500 may be dedicated to the upward flow of bots while elevation tower 5190TWD on the product side of the workstation 5500 may be dedicated to the downward flow of bots or vice versa. Similarly, elevation tower 5190TWA on the order side of the workstation 5500 may be dedicated to the upward flow of bots while elevation tower 5190TWB on the order side of the workstation 5500 may be dedicated to the downward flow of bots or vice versa. The dedicated flow of bots for each tower 5190TWA-5190TWD on the respective order or product side of the workstation 5500 generates, for example, an elevation flow loop in one or more of directions 5597, 5598 between the levels of conveyance lanes 5501-5504 on the respective order and product sides of the workstation 5500 in a manner substantially similar to that described above. As noted above, while only two conveyance lanes are shown stacked one above the other on each side of the workstation, in other aspects (as shown in FIG. 54F) each side of the workstation may have any suitable number of conveyance lanes stacked one above the other, such as more or less than two conveyance lanes. Where more than two conveyance lanes are provided, stacked one above the other, on the product side and/or the order side of the workstation 5500 the towers 5190TWA-5190TWD may have intermediate entrance and exits that allow bots to enter/exit the towers from the intermediate conveyance lanes IL disposed between the uppermost and lowermost conveyance lanes 5502, 5501 of the stack of conveyance lanes.

As described above, the towers 5190TWA, 5190TWC adjacent the pick station 5530 define the pick/place positions of the bots (e.g. the P-totes and O-totes). For example, the pick positions may be defined by the towers 5190TWA, 5190TWC so as to be substantially at the top of the towers 5190TWA, 5190TWC at a position along the tower that allows the bots to transition between the towers 5190TWA, 5190TWC and the respective uppermost conveyance lane 5502, 5503. As also described above, the towers 5190TWA, 5190TWC may be angled relative to the pick station 5530 for presenting the P-totes and O-totes to the picker 5520 in any suitable spatial orientation. In one aspect, the other towers 5190TWB, 5190TWD (e.g. disposed along the conveyance lanes 5501-5504 on an opposite side of the towers 5190TWA, 5190TWC, that define the pick/place positions, from the picker 5520) that form the elevation loop with a respective one of the towers 5190TWA, 5190TWC may be angled at the same angle as the towers 5190TWA, 5190TWC or angled at any suitable different angle relative to the pick station 5530. In one aspect, the towers 5190TWB, 5190TWD may be substantially upright (e.g. vertical). In one aspect, as described above, the conveyance lanes 5501-5504 may also be angled with respect to the pick station so as to form ramps between the transit decks 5550A, 5550B (and/or intermediate decks IL) and the operator platform 5510 where the ramps allow for substantially orthogonal alignment between one or more of the towers 5190TWA-5190TWD and the respective conveyance lanes 5501-5504 to facilitate ease of constraints and repeat engagement for bot 5100 transitions from the towers 5190TWA-5190TWD to the conveyance lanes 5501-5504 and vice versa. In one aspect the tower rake/angle establishes or defines the ramp pitch.

In one aspect, the workstation 5500 includes any suitable Machine-Vision Subsystem ("MVS") 5560 which may be substantially similar to that described above. For example, the MVS 5560 may include any suitable visual indicators (e.g. such as displays and/or light sources), any suitable aural indicators, any suitable motion sensors/cameras, any suitable beam sensors/light curtains (e.g. break the beam/curtain sensors), glove tracking systems or any other suitable devices for indicating a pick location, indicating a place location, indicating a quantity to be picked/placed, tracking the motion of the picker's 5520 hands, verifying a pick and/or verifying a place. In one aspect, a controller 5500C is provided for controlling the aspects of the workstation 5500 described herein where the controller 5500C is resident at the workstation 5500, a central control system CCS (such as described above), a bot 5100 controller or a combination thereof. The controller 5500C communicates with the machine vision system 5560 to effect the picking and placing of eaches as described herein.

In one aspect, the controller 5500C is configured to identify and validate an effective pick where the controller 5500C issues a confirmation to a P-bot that a pick has been effected from the P-bot. The P-bot is configured (e.g. the P-bot controller is programmed) such that when the P-bot receives the pick confirmation issued from the controller 5500C, the P-bot automatically moves from the pick station 5530. In one aspect, the P-bot controller may be programmed such that upon receiving the pick confirmation the P-bot traverses to an exit of a respective conveyance lane 5502 or in other aspects, the P-bot enters into a tower, such as tower 5190TWD, to return back to the entry conveyance lane 5501 for re-entry into the pick queue.

In one aspect, the controller 550C is configured to identify and validate an effective place where the controller 5500C issues a confirmation to an O-bot that a place has been effected to the O-bot. The O-bot is configured (e.g. the O-bot controller is programmed) such that when the O-bot receives the place confirmation issued from the controller 5500C, the O-bot automatically moves from the pick station 5530. In one aspect, the O-bot controller may be programmed such that upon receiving the place confirmation the O-bot traverses to an exit of a respective conveyance lane 5503 or in other aspects, the O-bot enters into a tower, such as tower 5190TWB, to return back to the entry conveyance lane 5504 for re-entry into the place queue. In one aspect, the O-bot may re-enter into the place queue until the controller 5500C issued an order complete command to the O-bot at which time the O-bot exits the pick station 5530 to the transit deck(s).

In one aspect, referring to FIGS. 58 and 59, each bot flow (e.g. P-bots and O-bots) through the workstation 5500 has a predetermined action cycle and pacing/time measure to effect a pick/place event (where the pick/place event is e.g. a removal of an each from a P-tote carried by a P-bot and/or placement of the each into an O-tote carried by an O-bot) with a feedback loop (shown schematically in FIGS. 58 and 59) assisting the picker with pacing to maintain synchronization between activity of the picker, the P-Bots and the O-Bots. In one aspect the action cycle and pacing of the P-bots is substantially similar to the action cycle and pacing of the O-bots. In one aspect, each pick/place event for a corresponding action cycle (e.g. with a bot up-flow in the direction of arrow 5598) comprises a three motion action set that defines a respective workstation event where the respective workstation events include positioning the P-bot (or O-bot) at a pick (or place) location, providing instructions for picking and placing the each and departure of the P-bot or O-bot from the pick station 5530 (either to exit the workstation 5500 to traverse to a tower for re-entering the respective P-bot or O-bot queue). In other aspects, there may be more or less than three motions in an action set (respectively of the picker, the O-Bot and the P-Bot for a pick/place workstation event) where the number of motions in the action set may depend on the bot flow through the workstation.

Each action in the three motion action set may have a predetermined time measure (e.g. about 1 second from start/initiation to finish/completion of each action, in other aspects the time measure may be more or less than about 1 second) with a predetermined proportion with respect to the time measure of each action of the three motion action set and hence with respect to the total time measure of the combined set. In one aspect, the actions of the P-bots and O-bots are matched or synchronized but are offset by a partial time measure (as shown in FIG. 59 with respect to the P-Bot and O-Bot measured action PB1-PB3 and OB1-OB3), such as for example, the actions of the O-bots may be offset from the actions of the P-bots along the pacing scale by half of a time measure or any other suitable partial time measure offset as will be described below. Each hand of the picker 5520 is also coordinated or synchronized with the other hand of the picker 5520 to effect picking an each from a P-bot in a corresponding measure with the P-bot motion and placing the each to an O-bot in a corresponding measure with the O-bot motion as will also be described below.

In one aspect, the picker 5520 actions (see Picker measured action P1-P3 in FIG. 59) for each respective pick and place of an each controls a corresponding P-bot action PB1-PB3 and/or a corresponding O-bot action OB1-OB3 as described above where the controller 5500C issues pick and place confirmations to the P-bots and O-bots for initiating a subsequent bot action such as, e.g., P-bot and O-bot departure from the pick station 5530. In one aspect, the picker pick/place event also has a matching or synchronized three motion action set (in other aspects there may be more or less than three motions in the action set) which occurs in concert with the workstation event action set described above and a feedback loop that aids the picker in maintaining the pacing described below. For example, in one aspect, the picker 5520 three motion action set includes picking an each from the P-tote carried by the P-bot located at the pick location of the pick station 5530, transferring the each from the picker's right hand to the picker's left hand (or vice versa) and placing the each to the O-tote carried by the O-bot located at the pick location of the pick station 5530. Each of the actions in the picker three motion action set is performed within a matching measure along the pacing scale of each corresponding bot and with each other as will be described in greater detail below.

For example, referring also to FIGS. 54A-54D, each pick/place event starts with a P-Bot A in pick position (see FIGS. 54A, 54B and 58), with the picker's right hand inside the P-tote carried by P-Bot A, where the picker's right hand picks an each from the P-tote carried by P-Bot A (FIG. 57, Block 5700). With P-bot A located at the pick position, P-Bot B is in "ready position" within tower 5190TWC below P-bot A (see FIGS. 54A and 58). On the picker's left, two order bots O-bot A, O-bot B are indexing, with O-bot A from the previous order-line exiting the workstation 5500 along conveying lane 5503 (or in other aspects down tower 5190TWB to re-enter the O-bot queue) and O-bot B for the current order-line ascending along tower 5190TWA from the ready position into the place position (see FIGS. 54B, 54C and 58; FIG. 57, Block 5702). The picker's right hand is removed from the P-tote carried by P-bot A carrying the picked each (see picker measured action P1) such that when the picker's right hand is about half-way between the pick point and a transfer midpoint (e.g. a point in space about midway between the P-bot pick location and the O-bot place location), the controller 5500C issues an effective pick confirmation to P-bot A and P-bot A accelerates away from the pick position and exits the workstation 5500 (see P-Bot measured action PB1) to, for example, the upper transit deck 5550A, or in other aspects enters tower 5190TWD to re-enter the P-bot queue (FIG. 57, Block 5704) while O-Bot B is commanded by the controller to move into the place position (O-Bot measured action OB1). At the transfer midpoint the picked each is transferred from the picker's right hand to the picker's left hand where the left hand continues to carry the picked each to the place location and the right hand returns to the pick location (FIG. 57, Block 5705). As P-bot A moves away from the picker, (and simultaneously with the transport and transfer of the picked each from the picker's right hand to the picker's left hand for placing the each) P-bot B is moved or indexed from the ready position to the pick position (P-Bot measured action PB2), arriving in the pick position, e.g., about when the picker's hand is about halfway between the transfer midpoint and the pick point on its return to the tote (FIG. 57, Block 5707). Also simultaneously with the transfer of the picked each, P-bot C enters the workstation 5500 from the lower transit deck 5550B and moves to the front of the workstation to enter the P-bot queue (FIG. 57, Block 5709).

The picker 5520 places the picked each to the O-tote carried by O-bot B (FIG. 57, Block 5711) and P-Bot B arrives at the pick position (P-Bot measured action PB2). The picker 55820 removes the picker's left hand from the O-tote (see picker measured action P2) carried by O-bot B such that when the picker's left hand is about half-way between the place point and the transfer midpoint, the controller 5500C issues an effective place confirmation to O-bot B and O-bot B accelerates away from the pick position (see O-Bot measured action OB2) and exits the workstation 5500 to, for example, the upper transit deck 5550A, or in other aspects enters tower 5190TWB to re-enter the O-bot queue (FIG. 57, Block 5713). As O-bot B moves away from the picker, (and simultaneously with movement of the picker's left hand to the transfer midpoint and movement of the picker's right hand to the pick location) the picker picks an each from P-Bot B (Picker measured action P3) which triggers the departure of P-Bot B (P-Bot measured action PB3) from the workstation, as described above, as well as the arrival of O-bot C to the place position (O-Bot measured action OB3) where O-Bot C is moved or indexed from the ready position to the place position, arriving in the place position, e.g., about when the picker's left hand is about halfway between the transfer midpoint and the place location (FIG. 57, Block 5715). Also simultaneously with the movement of the picker's left hand, O-bot D enters the workstation 5500 from the lower transit deck 5550B and moves to the front of the workstation to enter the O-bot queue (FIG. 57, Block 5717).

In the pick/place event described above, the workstation 5500 utilizes a dual synchronization system that includes, for example, a sensory synchronization system 5805 (e.g. pacing system 5802) and a visual synchronization system (e.g. pick to light system 5810) which may be part of or otherwise connected to a central control system CCS (described above) or any suitable controller such as controller 5500C. In combination, the pacing system 5800 and the pick to light system 5810 define the picker feedback loop as shown. The sensory synchronization system 5805 includes sensory stimulus input for the picker 5520, such as aural stimulus, tactile stimulus, etc., that provides a beat (e.g. corresponding to or setting the event measure and having a predetermined relationship to the beat, e.g., the 1 second event time noted above) in the time measure of the picker and bot motions described above where the beat sets the pacing of the motions and provides the feedback loop signal assisting the picker with pacing. For example, said sensory stimulus could include music with a precise and pronounced beat at a desired frequency. The sensory synchronization system 5805 defines a feedback loop 5820 in the controller 5500C for order output and bot flow where the bot departure from the pick station is controlled by the effective pick/place actions 5830, P1-P3 of the picker 5520 as described above. The visual synchronization system 5810 (which includes the pick/place location indicators such as the pick to light, place to light described above) directs the picker 5520 to the pick and place locations for the eaches and compliments the pacing of the picker and bot motions so that the order output is effected.

FIGS. 60A, 60B, 60C, 60D, 60E, 60F, and 60E represent a step-wise progression of the vehicle transitioning from horizontal movement to vertical movement, in accordance with aspects of the disclosed embodiment. Specifically, the vehicle in the form of the bot 5100 is shown, which as indicated elsewhere herein may be substantially similar to the bots described throughout this disclosure unless otherwise noted.

In FIGS. 60A through 60C, the bot 5100 travels horizontally from right to left across the page. At FIGS. 60D to 60E, the drive gear 5140B (and not shown, but on the opposite side drive gear 5140A) and guide bearings are extended laterally away from the body of the bot 5100 to engage with the elevation track 5190. Each elevation track 5190 has a drive surface 5190D and a guide surface 5190B disposed opposite the drive surface 5190D and separated by a thickness of the elevation track 5190, and the drive surface includes a gear rack 5195, as described and shown elsewhere herein.

In FIGS. 60F to 60G, the bot 5100 travels vertically up the elevation track 5190.

In accordance with one or more aspects of the disclosed embodiment a vertical traverse and drive apparatus comprises:

two masts arranged relative to horizontal rails within an automated vehicle traverse aisle of a storage and retrieval system, each of the two masts being opposingly arranged on opposite sides of the automated vehicle traverse aisle, each of the masts includes one side that has a rack and an idler bearing engagement and guide surface where the idler bearing engagement and guide surface is configured position a drive of an automated vehicle relative to the rack so that the rack engages the drive to effect traverse of the automated vehicle along a respective mast, and an opposite side that has a counter rail configured to engage an automated vehicle counter wheel so that at least the counter rail and the idler bearing engagement and guide surface effect cantilevering the automated vehicle from the two masts.

In accordance with one or more aspects of the disclosed embodiment, each of the two masts include gaps through which the horizontal rails pass, the horizontal rails being positioned to engage horizontal traverse wheels of the automated vehicle.

In accordance with one or more aspects of the disclosed embodiment a pick and place workstation comprises:

an operation station disposed adjacent a pick location and a place location;

a sensory synchronization system in communication with an operator at the operator station; and a visual synchronization system in communication with an operator at the operator station, where the sensory synchronization system and the visual synchronization system define a pacing system that includes a feedback loop in the pacing, where the feedback loop correlates pick events between operation motions and motions of bots that interface with the pick and place locations.

FIGS. 51A-52J illustrate a tote transfer system for transferring totes between a mobile robot and tote holding locations on either side of the mobile robot. When transferring totes to or from a mobile robot by the fingers of the tote transfer system, it is advantageous to avoid generation of vertical forces parallel to the vertical walls of the tote. Such forces include lift force, $F_L$, shown in FIG. 52K. Such forces may also include frictional forces due to engagement between the tote transfer system fingers and a vertical surface of the tote. Such upward or downward forces may cause a tote to tip over or not properly seat on the mobile robot or tote holding locations.

Figure 67A:
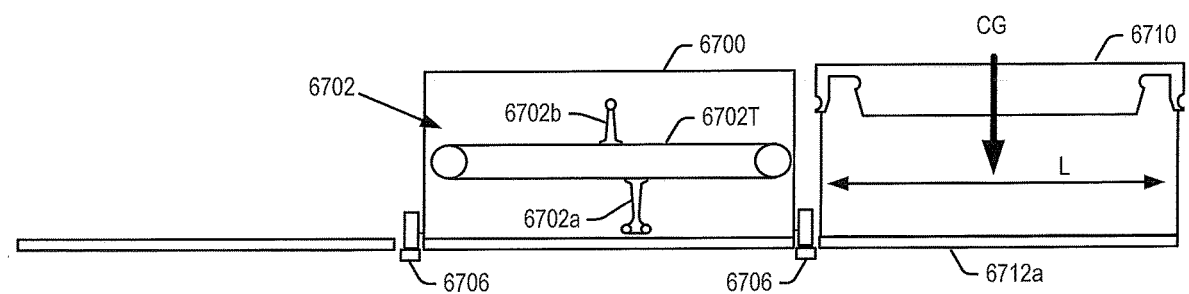

FIGS. 67A-68G illustrate a tote and tote transfer system which prevent vertical forces that might otherwise tip or disrupt the transfer of a tote between a mobile robot and tote holding locations on either side of the robot. FIG. 67A is a cross-sectional front view of a mobile robot 6700 in an aisle between a pair of tote holding locations on either side of the mobile robot 6700, including tote holding location 6712a. The mobile robot 6700 may include a tote transfer system comprising a pair of tote transfer mechanisms 6702. The cross-sectional views of FIGS. 67A-68G show a single tote transfer mechanisms 6702. However, the tote transfer system on mobile robot 6700 may include a pair of such tote transfer mechanisms 6702, positioned on either side of the payload holding area/bed 5180 for holding totes as shown in FIG. 51E.

FIGS. 67A-68G show only those features of the mobile robot 6700 helpful to an understanding of the tote transfer system. However, mobile robot 6700 may include any of the features mobile robot described above. As described above, the mobile robot 6700 may be configured to travel on tracks 6706 (into or out of the page of FIG. 67A). Once aligned with a tote holding location, such as tote holding location 6712a, a tote 6710 may be transferred onto the payload holding area/bed 5180 of the mobile robot 6700 by the tote transfer mechanism, or vice-versa.

Each tote transfer mechanism 6702 of the mobile robot tote transfer system may be identical to each other, and while the following describes one such tote transfer mechanism, the description applies to both. A tote transfer mechanism 6702 may include a bidirectional traverser 6702T, which may be identical to the bidirectional traverser 5230T described above with respect to FIGS. 51A-52J. The traversers 6702T may be coupled to a driven sprocket 5222 (FIG. 51E), which is in turn driven by a drive sprocket 5223. The drive sprocket 5223 may be coupled to and driven by a drive motor 5200 in any suitable manner so that the drive motor 5200 effects the recirculating bidirectional movement of the traversers 6702T in unison with each other.

A pair of fingers 6702a and 6702b may be affixed to the traverser 6702T. The details of fingers 6702a and 6702b are described below. But in general, the finger 6702a includes a proximal end affixed to traverser 6702T and a distal end opposite the proximal end including a pair of rollers. The finger 6702b includes a proximal end affixed to traverser 6702T and a distal end opposite the proximal end including a single roller. The fingers 6702a and 6702b may be opposed to each other on traverser 6702T, and finger 6702a may be slightly longer so as to extend further off of traverser 6702T than finger 6702b. In embodiments, finger 6702a may be 3.8 Inches long, and finger 6702b may be 2.85 inches long. The difference in finger length must permit 6702a to engage with pocket 6730, and allow finger 6702b to travel past the pocket when a tote 6710 is fully located in the tote hold location 6712c.

Figure 67B:
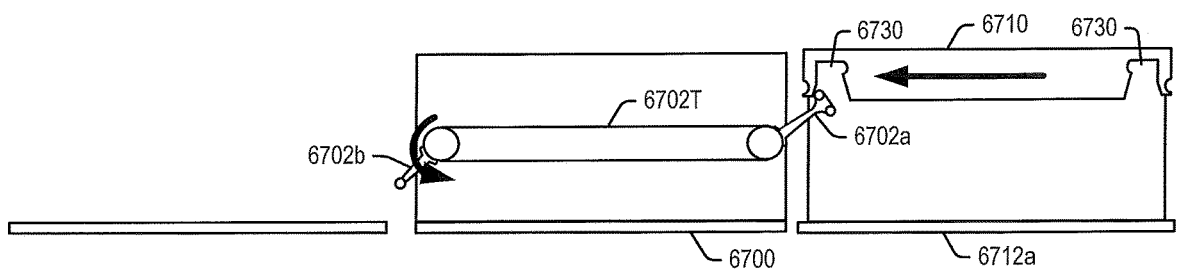
Figure 67C:
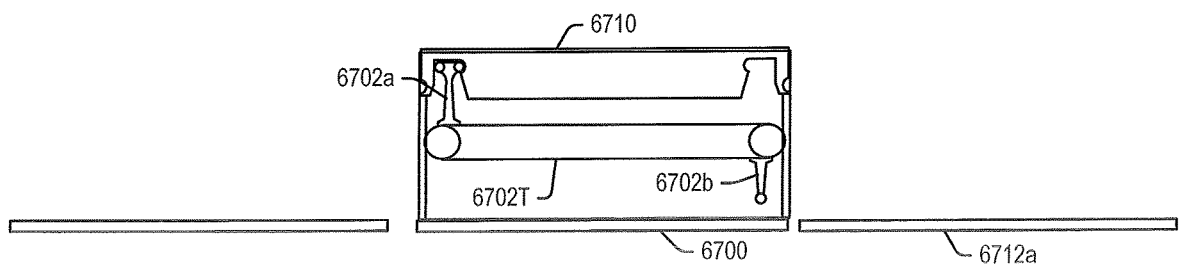

The tote transfer system may be used to transfer a tote 6710 from a tote holding location 6712 as shown in FIGS. 67A-67C. The tote 6710 may include a center of gravity, CG (FIG. 67A) somewhere near the middle of the length, L, of tote 6710. The precise location of the CG of tote 6710 may vary depending on the weight and positions of items within the tote 6710.

In accordance with aspects of the present technology, tote 6710 may further include pockets 6730 and concave detents 6740 formed in an upper rim of the tote 6710. As seen for example in the perspective view of FIG. 67D, tote 6710 includes sides 6710a, 6710b, and ends 6710c, 6710d. Each of sides 6710a, 6710b includes an upper rim 6738 having a thickness of for example 0.36 inches, though this thickness may vary in further embodiments. A pair of pockets 6730 are formed in the rim 6738 in each side 6710a, 6710b. The pockets 6730 formed in a side may be the mirror image of each other and positioned in the rim adjacent the ends as seen 6710c, 6710d.

Figure 67D:
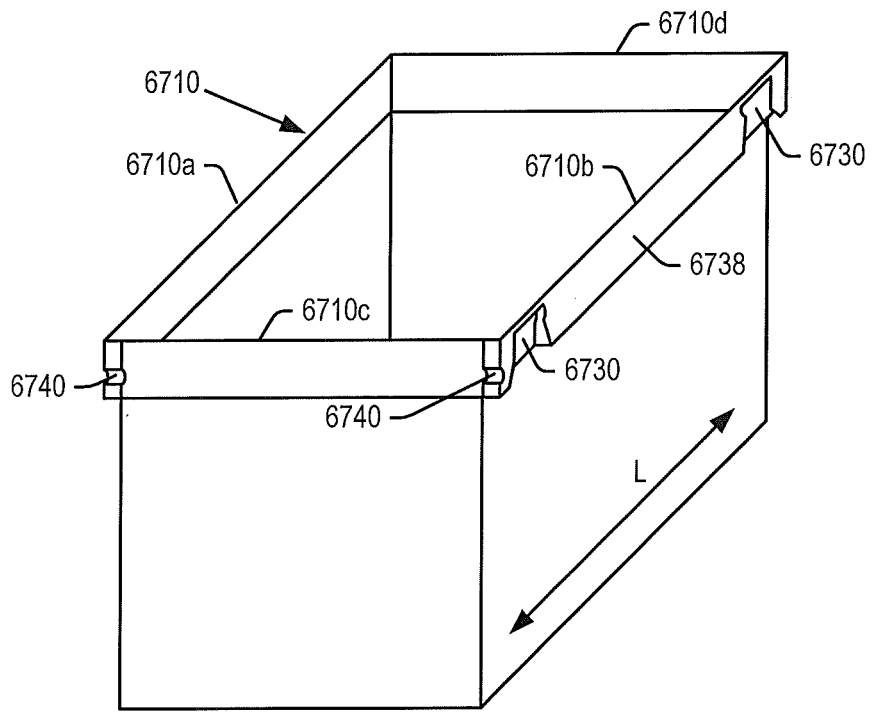
Figure 67E:
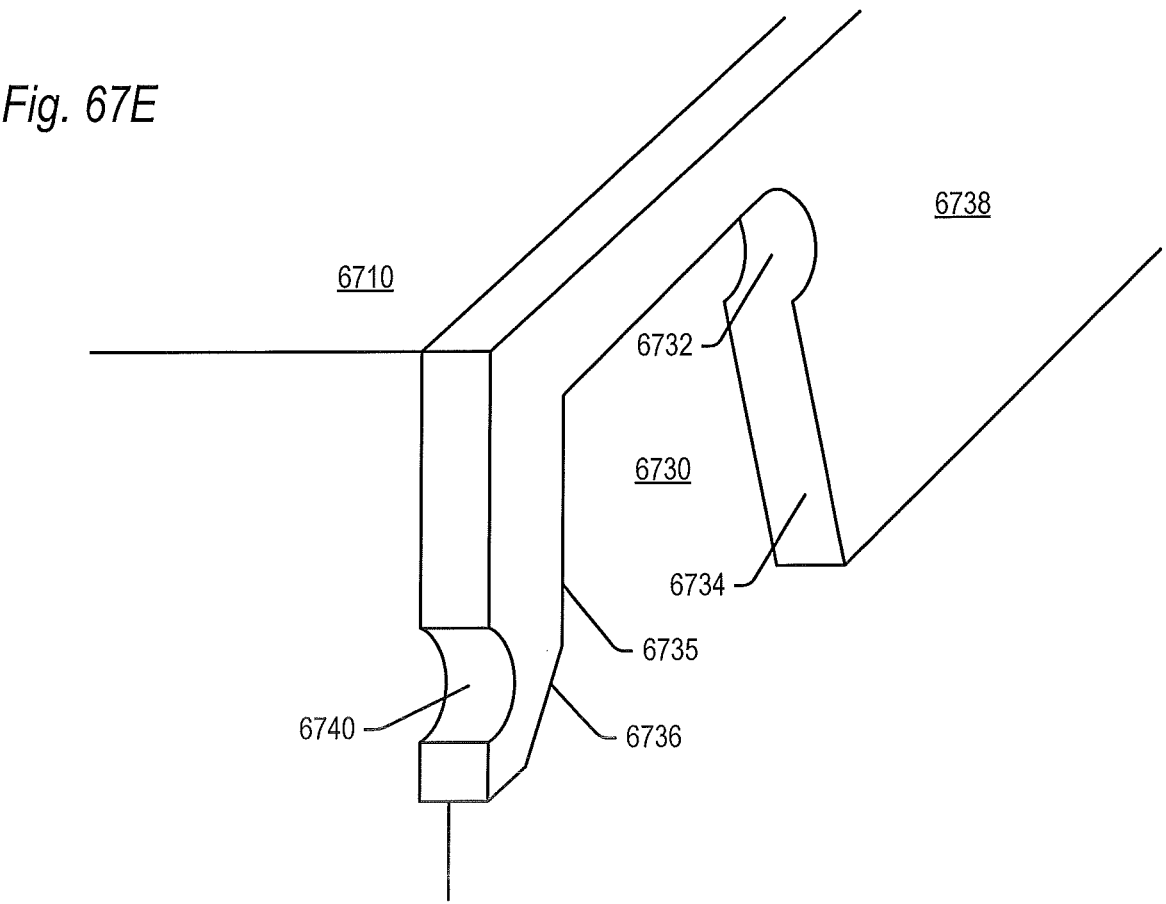
Figure 67F:
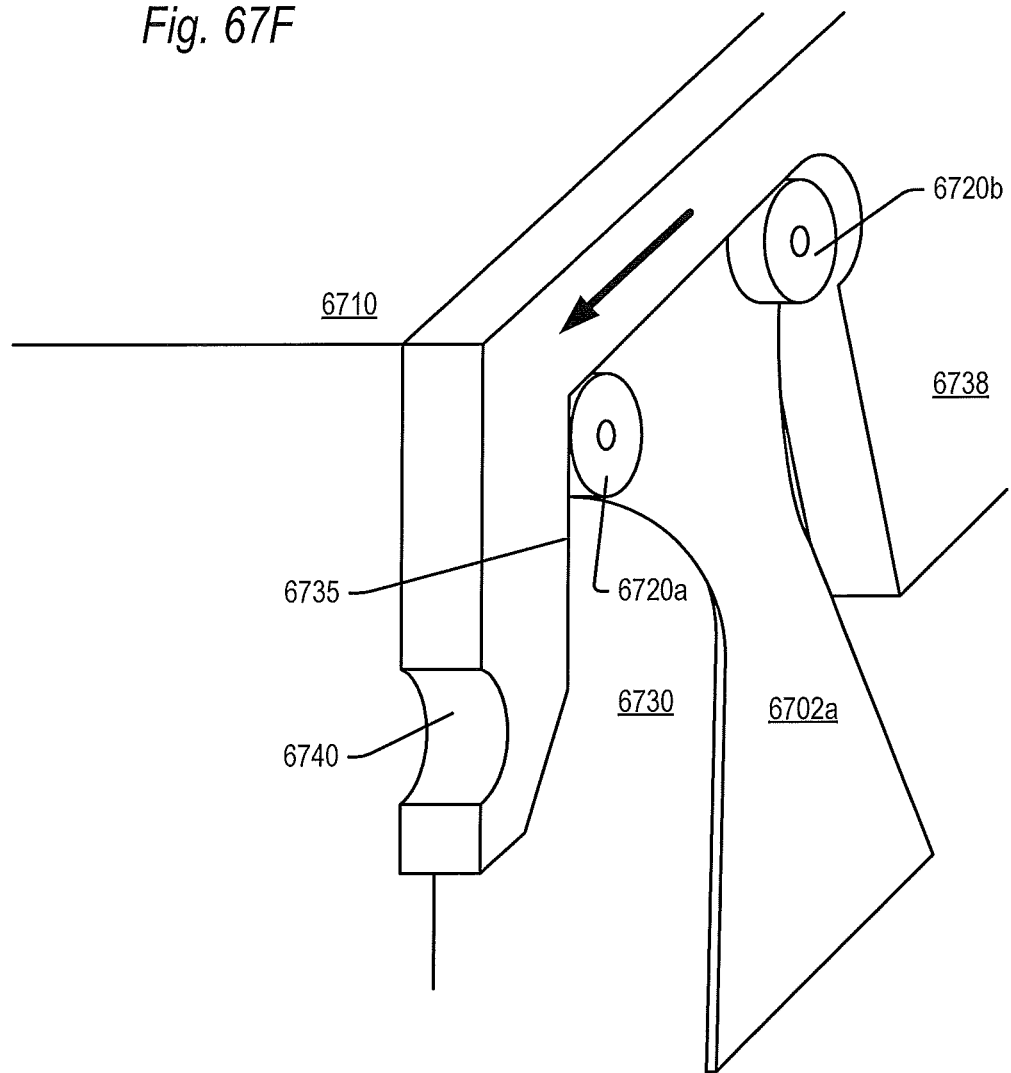

As seen in the perspective views of FIGS. 67D and 67E, each pocket 6730 may include a concave recess 6732 in a side wall of the pocket that is most distal from the end 6720. In embodiments, the concave recess 6732 may be circular or oval, with a radius of curvature slightly larger than the radius of the rollers of finger 6720a. FIG. 68I shows a force vector, Fv, between the concave recess and the corner of the tote. The surface of the concave recess 6732 where roller contacts may have a surface perpendicular to this vector to ensure that the finger 6702a does not create a lifting force that could cause the tote to disengage from the fingers. The same contour and physics apply to the concave detent 6740 as the concave recess 6732.

The concave recess 6732 may give way to a side wall 6734 which may slope distally down to the bottom of rim 6738. In further embodiments, the sidewall 6734 may be vertical. The pocket 6730 further includes a sidewall 6735 opposed to sidewall 6734. The sidewall 6735 may be vertical though it may slope proximately or distally in further embodiments. The bottom of sidewall 6735 may include an inclined surface 6736 which slopes proximally at a greater angle than the sidewall 6735.

Referring again to the perspective view of FIG. 67D, each of the ends 6710c, 6710d may include a pair of concave detents 6740. In embodiments, the concave detent 6740 may be circular or oval, with a radius of curvature slightly larger than the radius of the roller of finger 6720b. As seen in FIG. 67E, the concave detents 6740 may be formed in the edge of upper rims 6738 exposed at ends 6710c, 6710d, though it is possible that the concave detents 6740 be formed closer to the middle of ends 6710c, 6710d in further embodiments. In embodiments, the concave detents 6740 may be formed 2.5 inches from an upper edge of tote 6710, though this distance may vary in further embodiments. The height of the concave detent 6740 is determined by the height of the upper edge of the traverser 6702T, added to the length of the finger 6702b.

Referring again to FIGS. 67A-67C, the traverser 6702T rotates (counterclockwise FIGS. 67A-67C) until the finger 6702a engages within pocket 6730, and in particular, when a roller 6720a of finger 6702a engages against inclined surface 6736, as shown in FIG. 67B. Continued counterclockwise rotation of the traverser 6702T seats the finger 6702a fully within pocket 6730, as shown for example in the enlarged perspective view of FIG. 67F.

The finger 6702a includes a pair of rollers 6720a and 6720b at its distal end. These rollers may have the same radius, which examples may for example be 0.5 inches, though this radius may vary in further embodiments. The rollers 6720a, 6720b may be spaced from each other a distance of 1.3 inches, so as to be able to fit against a top portion of the pocket 6730 without binding. The rollers 6720a, 6720b are free to rotate at the end of finger 6702a.

Once the finger 6702a is fully engaged within pocket 6730, continued counterclockwise rotation of the traverser 6702T results in the roller 6720a of finger 6702a exerting a force against the sidewall 6735 (FIG. 67F) to pull the tote 6710 entirely onto the mobile robot 6700 (FIG. 67C).

As used herein, the fingers "pull" the tote 6710 onto the mobile robot 6700 or tote holding surface 6712 when the fingers are exerting a force within pocket 6730 that is directed away from the center of gravity, CG, of the tote 6710. Conversely, the fingers "push" the tote 6710 onto the mobile robot 6700 or tote holding surface 6712 when the figures are exerting a force within pocket 6730 or against concave detent 6740 that is directed toward the center of gravity, CG, of the tote 6710. As explained hereinafter, is a feature of the present technology that, when pushing the tote 6710, the fingers 6702a and 6702b are engaged within and against a concave surface, either the concave recess 6732 in pocket 6730, or the concave detent 6740.

Once a tote 6710 has been transferred onto a mobile robot, it may be transported within the storage facility, and for example, brought to a workstation where items are added and/or removed from the tote 6710. At some point, it may be desirable to return the tote 6710 to a storage shelf, such as for example a tote holding location 6712b (FIG. 67G) located on the opposite side of the mobile robot 6710 from the tote holding location 6712a from which the tote was acquired.

Figure 67G:
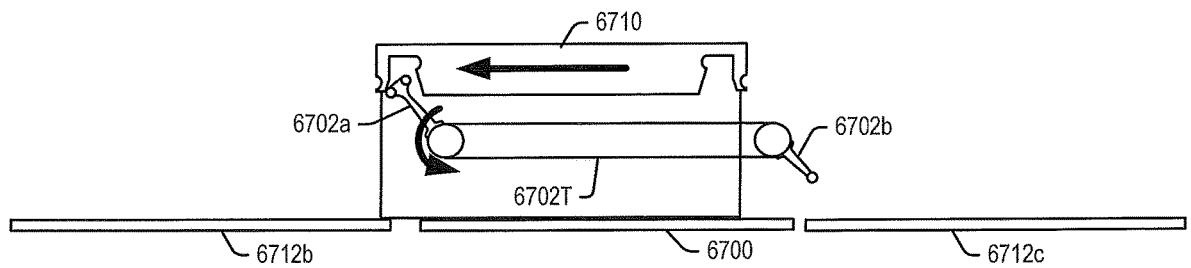
Figure 67H:
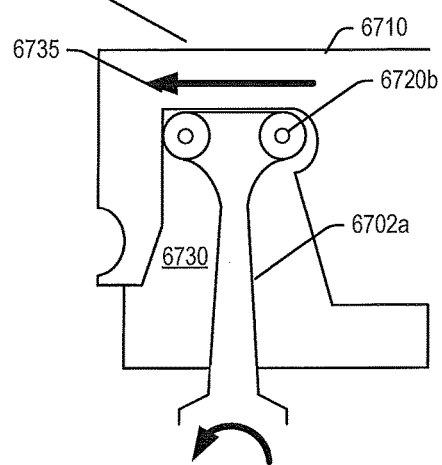
Figure 67I:
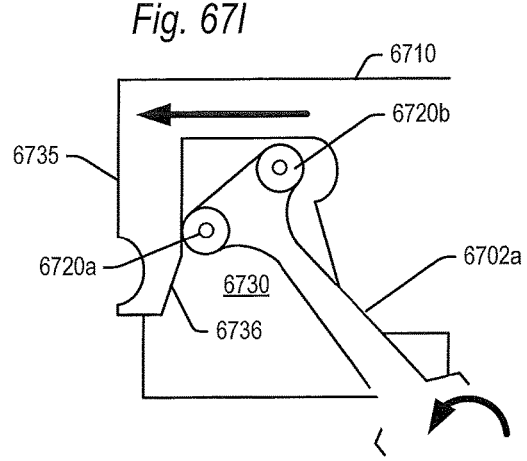
Figure 67J:
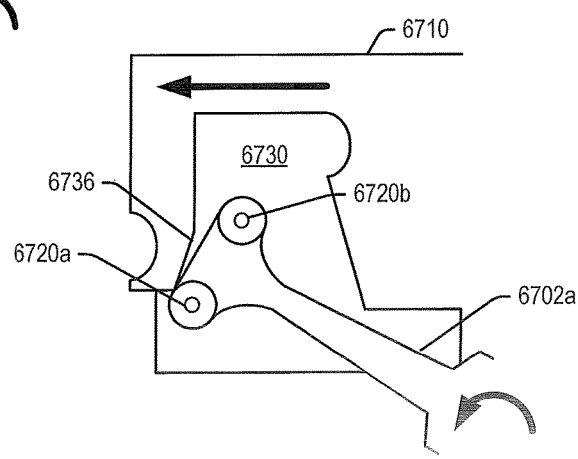
Figure 67K:
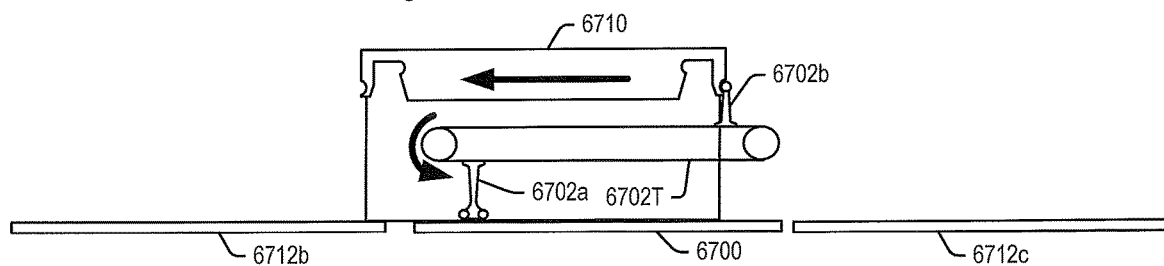

In this instance, the traverser 6702T once again rotates counterclockwise as shown in FIGS. 67G-67J to initiate movement of the tote 6710 onto tote holding location 6712b (for clarity, most of the mobile robot 6700 apart from the tote transfer mechanism is obscured from view in FIGS. 67G and 67K). At the position shown in the enlarged view of FIG. 67J, the finger 6702a has completed its lateral translation on traverser 6702T and is rotating about the sprocket of the traverser. Accordingly, the finger 6702a rotates out of the pocket 6730 so that the finger 6702a no longer pulls or otherwise moves the tote 6710.

However, continued counterclockwise rotation of the traverser 6710T will subsequently bring the finger 6702b into contact with an end 6730 of tote 6710 as shown in FIG. 67K. The finger 6702b includes a roller 6722 at its distal end. The roller 6722 have a radius of for example 1.25 inches, though this radius may vary in further embodiments. The roller 6722 is free to rotate at the end of finger 6702b.

Figure 67L:
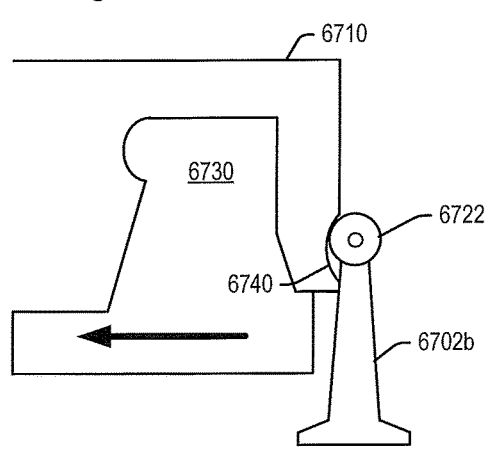
Figure 67M:
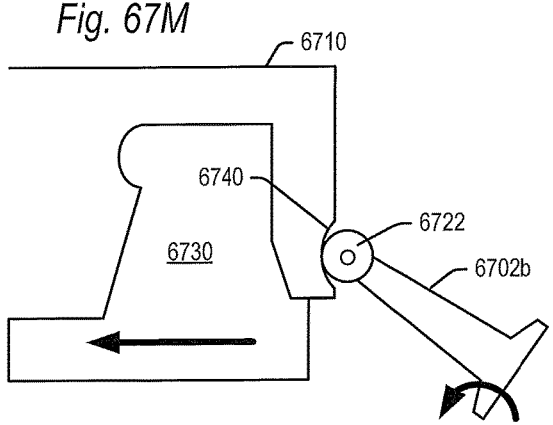
Figure 67N:
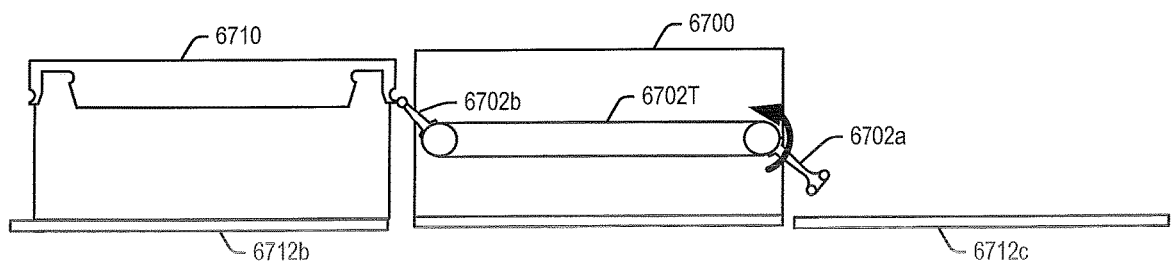
Figure 67O:
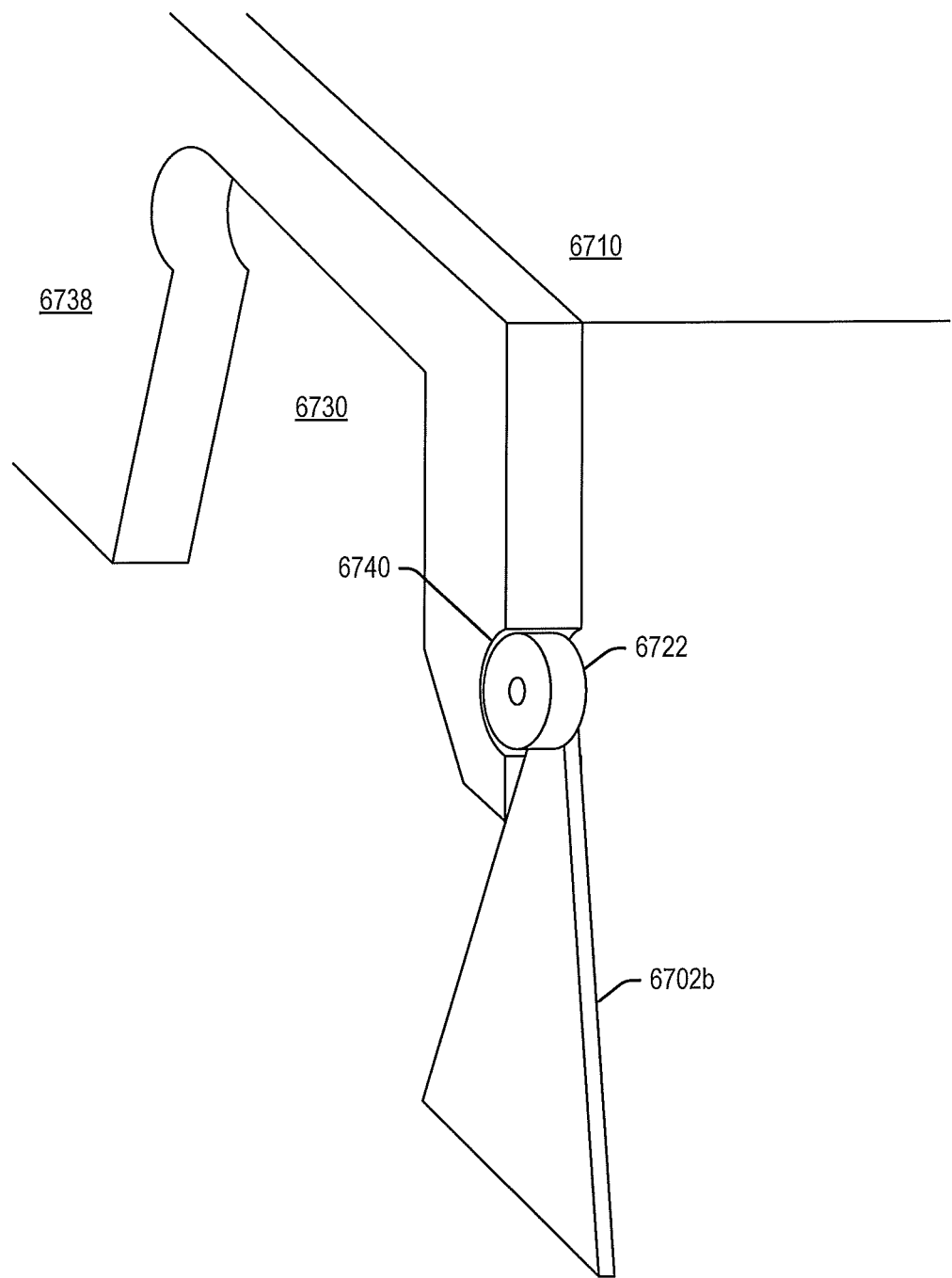

The finger 6702b is sized and positioned so that, when reaching engagement with the end of the tote 6710 as shown in FIG. 67K, the roller 6722 engages within the concave detent 6740 as shown for example in the enlarged front view of FIG. 67L and the enlarged perspective view of FIG. 67O. Thereafter, continued counterclockwise rotation of the traverser 6702T, with the finger 6702b engaged within concave detent 6740, pushes the tote off of the mobile robot 6700 and onto the tote holding location 6712b. As noted, in accordance with the present technology, as the tote 6710 is being pushed to the tote holding location 6712b, the roller 6722 of finger 6702b is engaged against a concave surface—concave detent 6740.

At the position shown in the enlarged view of FIG. 67M, the finger 6702b has completed its lateral translation on traverser 6702T and is rotating about the sprocket of the traverser. Accordingly, the finger 6702b rotates down the concave detent 6740 and out of the concave detent 6740, so that the finger 6702b no longer pushes or otherwise moves the tote 6710. At this point, the tote 6710 is fully positioned on the tote holding location 6712b as shown in FIG. 67N.

After the finger 6702b has pushed the tote into tote holding location 6712c as shown in FIG. 68N, the finger 6702b is able to pass back to the vertical position as shown in FIG. 67A. A larger roller on 6702b improves the resistance to unintentionally engaging the roller into the pocket 6730.

As opposed to returning the tote 6710 to a tote holding location 6712b, it may be desirable to transfer the tote 6710 to a tote hold location 6712c on the same side of the mobile robot from which the tote was acquired. Such an embodiment will now be described with reference to FIGS. 68A-68I (for clarity, most of the mobile robot 6700 apart from the tote transfer mechanism is obscured from view in FIG. 68A).

Figure 68A:
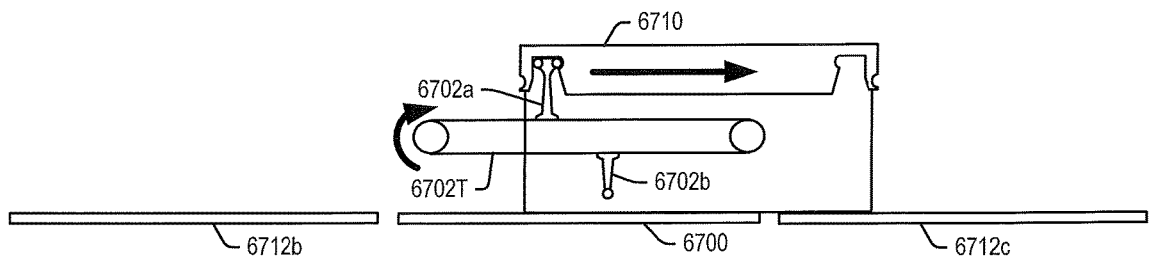
Figure 68B:
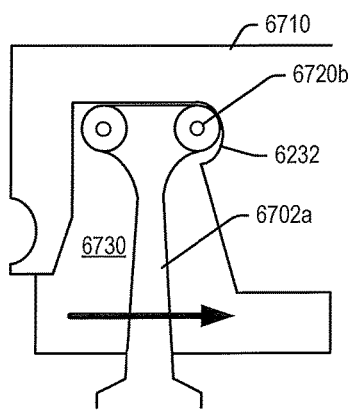
Figure 68C:
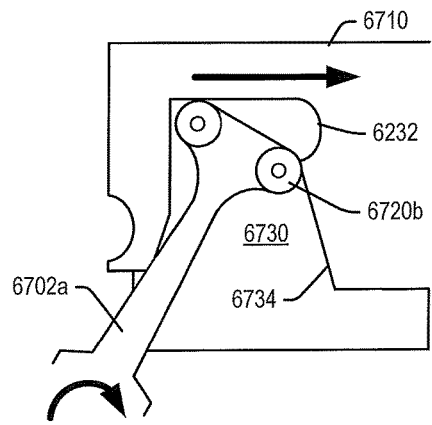

In this embodiment, relative to a position of the tote transfer mechanism shown in FIG. 67C, the tote transfer mechanism rotates clockwise as shown in FIG. 68A so that the finger 6702a engages a surface within pocket 6730 to push the tote 6710 from the mobile robot onto the tote holding location 6712c. As seen in the enlarged front view of FIG. 68B and perspective view of FIG. 68D, as the tote is being pushed, the roller 6720b of finger 6702a engages within and against concave recess 6732.

Figure 68E:
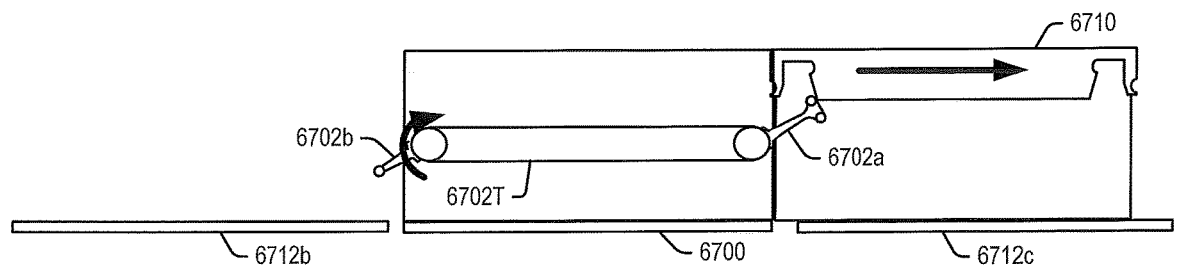

The finger 6702a continues to push on the tote 6710, engaged within concave recess 6732, until the finger 6702a reaches the limit of its lateral translation on traverser 6702T. Thereafter, as shown in the enlarged view of FIG. 68C, the roller 6720b rolls down and out of the concave recess 6732, possibly down part of pocket sidewall 6734, and then out of engagement with the pocket 6730 and tote 6710 as shown in FIG. 68E.

Figure 68F:
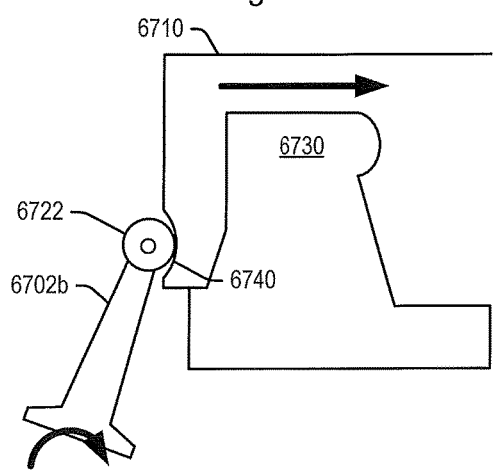
Figure 68G:
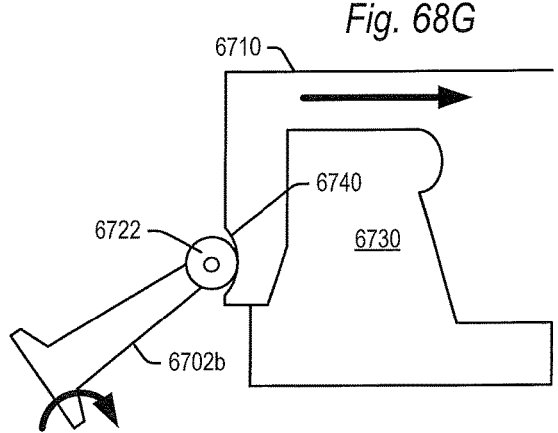

The tote 6710 is mostly, but not completely, loaded onto the tote holding location 6712c at this point. The traverser 6702T continues its clockwise rotation until the finger 6702b engages an end 6710c, 6710d of the tote 6710. Specifically, as shown in FIG. 68F, as the tote 6710 is being pushed, the roller 6722 of finger 6702b is engaged against a concave surface—concave detent 6740.

Figure 68H:
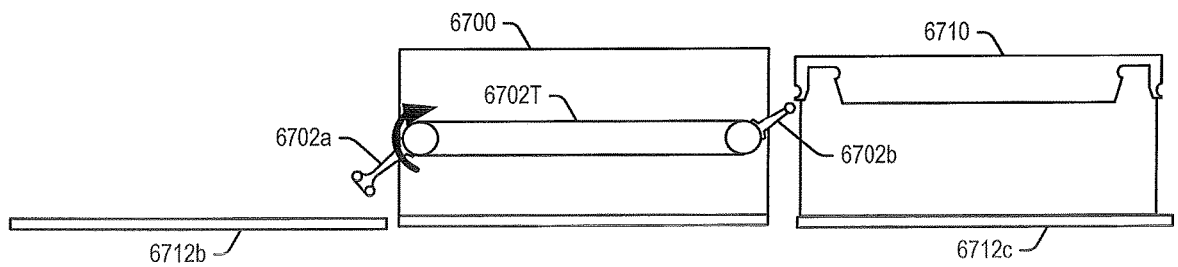
Figure 68I:
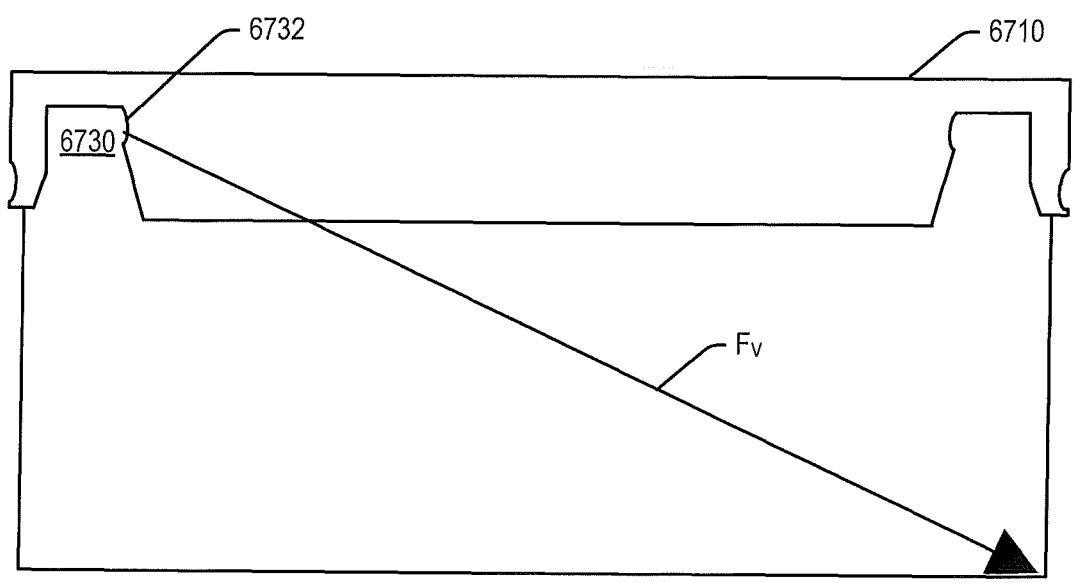

The finger 6702 is at or near the end of its lateral stroke when the roller 6722 engages the concave detent 6740. Thus, as shown in the enlarged views of FIGS. 68F and 68G, the finger 6702b rotates down the concave detent 6740 and out of the concave detent 6740, so that the finger 6702b no longer pushes or otherwise moves the tote 6710. At this point, the tote 6710 is fully positioned on the tote holding location 6712c as shown in FIG. 68H.

In the description above, the tote 6710 was initially acquired from a tote holding location to the right of the mobile robot 6700 from the perspective of FIGS. 67A and 67B by counterclockwise rotation of the traverser 6702T. Thus, the longer finger 6712a initially seated in the pocket 6730 at the left of the tote, again from the perspective of FIGS. 67A and 67B.

The tote 6710 may alternatively been acquired from a tote handling location to the left of the mobile robot 6700 from the perspective of FIGS. 67A and 67B by clockwise rotation of the traverser 6702T. In this instance, the longer finger 6712a would have initially seated within the pocket 6730 at the right of the tote from the perspective of FIGS. 67A and 67B. In this case, the tote 6710 may thereafter be transferred to a tote storage location on an opposite side of the mobile robot 6700 as described in FIGS. 67G-67M, with the directions reversed relative to that described above. The tote may alternatively be transferred to a tote storage location on the same side of the mobile robot 6700 as described in FIGS. 68A-68I, with the directions reversed relative to that described above.

Embodiments described above with respect to FIGS. 67A-68H provide a novel tote and novel system for transferring totes between a mobile robot and tote holding locations without generating vertical forces that can otherwise overturn the tote or disrupt proper seating of a tote on the mobile robot or tote holding location. When a tote is being pulled (force exerted in a direction away from a center of gravity of the tote), a roller of the tote transfer mechanism finger may engage a flat and/or vertical surface. This surface may be provided within a pocket of the tote. When a tote is being pushed (force exerted in a direction away from a center of gravity of the tote), a roller of the tote transfer mechanism finger may engage a concave surface. The engagement of a roller against the concave surface prevents vertical forces at the point of engagement.

In summary, in one embodiment, the present technology relates to a mobile robot for travelling within an order fulfillment center including a horizontal deck and one or more vertical storage racks, a vertical storage rack of the one or more storage racks including a plurality of horizontal rails, spaced apart from each other on respective levels of the vertical storage rack, and at least a pair of tracks, spaced apart from each other and extending between the plurality of levels of the vertical storage rack, the mobile robot comprising: a plurality of horizontal traction drives configured to drive the mobile robot in at least two non-parallel directions around the horizontal deck, and to drive the mobile robot along a pair of horizontal rails on a level of the vertical storage rack; a plurality of vertical traction drives configured to drive the mobile robot along the pair of tracks; and a motor for supplying torque to the plurality of horizontal traction drives and the plurality of vertical traction drives.

In another embodiment, the present technology relates to a mobile robot for travelling within an order fulfillment center including a horizontal deck and one or more vertical storage racks, a vertical storage rack of the one or more storage racks including a plurality of horizontal rails, spaced apart from each other on respective levels of the vertical storage rack, and at least a pair of tracks, spaced apart from each other and extending between the plurality of levels of the vertical storage rack, the mobile robot comprising: a first plurality of wheels for engaging the horizontal deck to move the mobile robot in at least two non-parallel directions around the horizontal deck; a second plurality of wheels for engaging a pair of horizontal rails on a level of the vertical storage rack to move the mobile robot along the pair of horizontal rails; and a plurality of drive gears for engaging the pair of tracks to move the mobile robot along the pair of tracks between the plurality of levels of the vertical storage rack.

In a further embodiment, the present technology relates to a mobile robot for travelling within an order fulfillment center including a horizontal deck and one or more vertical storage racks, a vertical storage rack of the one or more storage racks including a plurality of horizontal rails, spaced apart from each other on respective levels of the vertical storage rack, and at least a pair of tracks, spaced apart from each other and extending between the plurality of levels of the vertical storage rack, the mobile robot comprising: a motor; a plurality of horizontal traction drives configured to be driven to rotate by the motor to advance the mobile robot along a pair of spaced apart horizontal rails on a level of the vertical storage rack; a plurality of vertical traction drives configured to be driven to rotate by the motor to advance the mobile robot along the pair of tracks, the plurality of vertical traction drives further configured to move between extended positions where the plurality of vertical traction drives engage within the pair of tracks to enable vertical movement of the mobile robot, and retracted positions where the plurality of vertical traction drives do not obstruct travel of the mobile robot along the pair of horizontal rails past the pair of tracks.

In a further embodiment, the present technology relates to a mobile robot for travelling within an order fulfillment center including a horizontal deck and one or more vertical storage racks, a vertical storage rack of the one or more storage racks including a plurality of horizontal rails, spaced apart from each other on respective levels of the vertical storage rack, and at least a pair of vertical tracks, spaced apart from each other and extending between the plurality of levels of the vertical storage rack, the mobile robot comprising: a motor; a first shaft configured to be driven by the motor; a pair of wheels at opposed sides of the mobile robot and configured to rotate with the first shaft, the pair of wheels configured to advance the mobile robot along a pair of spaced apart horizontal rails on a level of the vertical storage rack; a second shaft configured to be driven by the motor; a pair of drive gears at opposed sides of the mobile robot and configured to rotate with the second shaft, the pair of drive gears configured to advance the mobile robot along the pair of vertical tracks; wherein the second shaft is coaxial with the first shaft and configured to translate with respect to the first shaft to move the pair of drive gears between extended positions where the pair of drive gears engage within the pair of vertical tracks to enable vertical movement of the mobile robot, and retracted positions where the pair of drive gears do not obstruct travel of the mobile robot along the pair of horizontal rails past the pair of vertical tracks.

In another embodiment, the present technology relates to a system for transporting items within an order fulfillment center including a horizontal deck and one or more vertical storage racks, a vertical storage rack of the one or more storage racks including a plurality of horizontal rails, spaced apart from each other on respective levels of the vertical storage rack, and at least a pair of vertical tracks, spaced apart from each other and extending between the plurality of levels of the vertical storage rack, the mobile robot comprising: support means for supporting the items during transport; horizontal drive means for driving the support means in at least two non-parallel directions around the horizontal deck, and for driving the support means along a pair of horizontal rails on a level of the vertical storage rack; vertical drive means for driving the support means along the pair of tracks; and torque generation means for supplying torque to the horizontal drive means and vertical drive means.

In a further embodiment, the present technology relates to a system for transporting items within an order fulfillment center including a horizontal deck and one or more vertical storage racks, a vertical storage rack of the one or more storage racks including a plurality of horizontal rails, spaced apart from each other on respective levels of the vertical storage rack, and at least a pair of vertical tracks, spaced apart from each other and extending between the plurality of levels of the vertical storage rack, the mobile robot comprising: support means for supporting the items during transport; horizontal drive means for driving the support means along a pair of horizontal rails on a level of the vertical storage rack; vertical drive means for driving the support means along the pair of tracks; retraction means for moving the vertical drive means between an extended position where the vertical drive means engages within the pair of tracks to enable vertical movement of the support means, and a retracted position where the vertical drive means does not obstruct travel of the support means along the pair of horizontal rails past the pair of tracks.

The following embodiments A-L illustrate embodiments of a BOT for transferring containers to and from storage shelves.

Embodiment A

A mobile robot for travelling within an order fulfillment center to transfer a container to and from a storage shelf, the container including a first end, a second end opposite the first end, and first and second opposed sides extending between the first and second ends, the first side including a first catch surface proximate the first end and a second catch surface proximate the second end, the mobile robot comprising:

a first flipper mounted to circulate with respect to a side of the mobile robot in first and second opposite directions;

a second flipper mounted to circulate with respect to the side of the mobile robot in first and second opposite directions;

wherein the first flipper and the second flipper are configured such that the first flipper engages the first catch surface and moves the container part way from the mobile robot to the storage shelf upon circulation of the first flipper over a first range of motion in the first direction; and wherein the first flipper and the second flipper are configured such that the second flipper engages the second catch surface and completes transfer of the container from the mobile robot to the storage shelf upon circulation of the second flipper over a second range of motion in the first direction.

Embodiment B

The mobile robot of embodiment A, wherein the second flipper is disengaged from the second catch surface during the first range of motion.

Embodiment C

The mobile robot of embodiment B, wherein the first flipper is disengaged from the first catch surface during the second range of motion.

Embodiment D

The mobile robot of embodiment A, wherein the first flipper is longer than the second flipper.

Embodiment E

The mobile robot of embodiment A, wherein the first and second flippers are mounted on a closed loop chain supported on first and second sprockets.

Embodiment F

The mobile robot of embodiment E, wherein the first flipper is mounted on the chain and moves the container by engagement with the first catch surface until the first flipper rotates around the first sprocket and clears the first catch surface during the first range of motion.

Embodiment G

The mobile robot of embodiment F, wherein the second flipper is mounted on the chain and moves the container by engagement with the second catch surface until the second flipper rotates around the first sprocket and clears the second catch surface during the second range of motion.

Embodiment H

The mobile robot of embodiment A, wherein the first flipper and the second flipper are configured such that the first flipper engages the second catch surface and moves the container from the storage shelf onto the mobile robot as the circulating traverser circulates over a third range of motion in the second direction.

Embodiment I

A mobile robot for travelling within an order fulfillment center to transfer a container to and from first and second storage shelves on opposed sides of the mobile robot, the container including a first end, a second end opposite the first end, and first and second opposed sides extending between the first and second ends, the first side including a first catch surface proximate the first end and a second catch surface proximate the second end, the mobile robot comprising:

a circulating support mounted on the mobile robot and configured to circulate in first and second opposite directions;

a first flipper mounted on the circulating support;

a second flipper mounted on the circulating support, the first and second flippers mounted on the circulating support in positions that are diametrically opposed to each other;

wherein the circulating support, the first flipper and the second flipper are configured such that the first flipper engages the first catch surface and moves the container part way from the mobile robot to the first storage shelf as the circulating support circulates over a first range of motion in the first direction; and wherein the circulating support, the first flipper and the second flipper are configured such that the second flipper engages the second catch surface and completes transfer of the container from the mobile robot to the first storage shelf as the circulating support circulates over a second range of motion in the first direction.

Embodiment J

The mobile robot of embodiment I, wherein the circulating support, the first flipper and the second flipper are configured such that the first flipper engages the second catch surface and moves the container part way from the mobile robot to the second storage shelf as the circulating support circulates over a third range of motion in the second direction; and wherein the circulating support, the first flipper and the second flipper are configured such that the second flipper engages the first catch surface and completes transfer of the container from the mobile robot to the second storage shelf as the circulating support circulates over a fourth range of motion in the second direction.

Embodiment K

The mobile robot of embodiment I, wherein the circulating support, the first flipper and the second flipper are configured such that the first flipper engages the second catch surface and moves the container from the first storage shelf onto the mobile robot as the circulating support circulates over a fifth range of motion in the second direction.

Embodiment L

The mobile robot of embodiment K, wherein the circulating support, the first flipper and the second flipper are configured such that the first flipper engages the first catch surface and moves the container from the second storage shelf onto the mobile robot as the circulating support circulates over a sixth range of motion in the first direction.

The following embodiments M-JJ illustrate embodiments of a system for transferring items between product containers and order containers at a workstation by BOTs moving to and from the workstation.

Embodiment M

A system for transferring items between product containers and order containers in an order fulfillment center, comprising:

a workstation, comprising a product side pick position receiving product containers, and an order side place position receiving order containers, items being transferred from the product containers at the product side pick position to the order containers at the order side place position to fulfill orders, a transfer position comprising at least one of the product side pick position and the order side place position; and mobile robots for carrying at least one of the product and order containers to and from the transfer position, the mobile robots comprising a first set of drives configured to move the mobile robots along a level of a plurality of levels toward the transfer position, and the mobile robots comprising a second set of drives configured to move the mobile robots between the plurality of levels toward the transfer position.

Embodiment N

The system of embodiment M, wherein the first set of drives are configured to move the mobile robots along the level toward both the product side pick position and the order side place position, and the second set of drives configured to move the mobile robots between the plurality of levels toward both the product side pick position and the order side place position.

Embodiment O

The system of embodiment M, wherein a first mobile robot of the mobile robots moves along the level toward the transfer position as a second mobile robot of the mobile robots moves between the plurality of levels.

Embodiment P

The system of embodiment M, wherein the level comprises a first level, the system further comprising a second level of the plurality of levels, the first set of drives further configured to move the mobile robots along the second level away from the transfer position.

Embodiment Q

The system of embodiment P, wherein a first mobile robot of the mobile robots moves along the first level toward the transfer position while a second mobile robot of the mobile robots moves along the second level away from the transfer position.

Embodiment R

The system of embodiment M, the plurality of levels comprising first and second level transfer sections, the second set of drives configured to move the mobile robots between levels along the first level transfer section in a first direction toward the transfer position, and the second set of drives configured to move the mobile robots between levels along the second level transfer section in a second direction, opposite the first direction, away from the transfer position.

Embodiment S

The system of embodiment R, a mobile robot of the mobile robots moving along the level toward the transfer position, and then moving between levels along the first level transfer section to be positioned at the transfer position.

Embodiment T

The system of embodiment S, wherein the level comprises a first level, the mobile robot moving away from the transfer position along a second level of the plurality of levels after being positioned at the transfer position.

Embodiment U

The system of embodiment S, the mobile robot moving between levels away from the transfer position along the second level transfer section after being positioned at the transfer position.

Embodiment V

A system for transferring items between product containers and order containers in an order fulfillment center, comprising:
a workstation, comprising a product side pick position receiving product containers, and an order side place position receiving order containers, items being transferred from the product containers at the product side pick position to the order containers at the order side place position to fulfill orders, a transfer position comprising at least one of the product side pick position and the order side place position;
mobile robots for carrying at least one of the product and order containers to and from the transfer position; and
a support structure for supporting the mobile robots, the support structure comprising:
a plurality of levels wherein a first mobile robot moves toward the transfer position along a first level of the plurality of levels and a second mobile robot moves away from the transfer position along a second level of the plurality of levels, and
one or more level transfer sections through the plurality of levels, wherein the first mobile robot moves between levels toward the transfer position along a first level transfer section of the one or more level transfer sections.

Embodiment W

The system of embodiment V, wherein each of the product side pick position and order side place position are connected to the plurality of levels and one or more level transfer sections such that mobile robots move toward and away from the product side pick position while mobile robots move toward and away from the order side place position.

Embodiment X

The system of embodiment V, wherein the first and second mobile robots include horizontal traction drives for moving the first and second robots toward and away from the transfer position along the first and second levels.

Embodiment Y

The system of embodiment V, wherein the first and second mobile robots include vertical traction drives for moving the first mobile robot between levels toward the transfer position along the first level transfer section.

Embodiment Z

The system of embodiment V, wherein the first mobile robot moves along the first level to an end position at the workstation, and then moves between levels along the first level transfer section to be positioned at the transfer position.

Embodiment AA

The system of embodiment Z, wherein the first mobile robot moves upward along the first level transfer section to be positioned at the transfer position.

Embodiment BB

The system of embodiment Z, wherein the second mobile robot moves along the second level away from the transfer position as the first robot arrives at the transfer position from the first level transfer section.

Embodiment CC

The system of embodiment BB, the one or more level transfer sections comprising a second level transfer section, wherein the second mobile robot moves away from the transfer position along the second level transfer section after moving away from the transfer position along the second level.

Embodiment DD

The system of embodiment V, wherein the first mobile robot moves along the first level transfer section to the first level, and then moves along the first level to the transfer position.

Embodiment EE

The system of embodiment DD, the one or more level transfer sections comprising a second level transfer section, wherein the second mobile robot moves between levels along the second level transfer section away from the transfer position as the first robot arrives at the transfer position on the level.

Embodiment FF

The system of embodiment EE, wherein the second mobile robot moves away from the transfer position along the second level after moving away from the transfer position along the second level transfer section.

Embodiment GG

A system for transferring items between product containers and order containers in an order fulfillment center, comprising:
a workstation, comprising a product side pick position receiving product containers, and an order side place position receiving order containers, items being transferred from the product containers at the product side pick position to the order containers at the order side place position to fulfill orders, a transfer position comprising at least one of the product side pick position and the order side place position;
a support structure for supporting the mobile robots, the support structure comprising:
a plurality of levels, and
a level transfer section; and
mobile robots for carrying at least one of the product and order containers to and from the transfer position, a first mobile robot of the mobile robots comprising:
a horizontal drive for moving the first mobile robot toward the transfer position along a first level of the plurality of levels, and for moving the first mobile robot away from the transfer position along a second level of the plurality of levels, and
a vertical drive for moving the first mobile robot upward to the transfer position.

Embodiment HH

The system of embodiment GG, wherein the transfer position is the order side place position, a second mobile robot of the mobile robots comprising:
a horizontal drive for moving the second mobile robot toward the product side pick position along the first level, and for moving the second mobile robot away from the product side pick position along the second level, and
a vertical drive for moving the second mobile robot upward to the product side pick position.

Embodiment II

The system of embodiment HH, wherein the first robot remains at the order side place position as the second robot departs from the product side pick position after transfer of product from the product container on the second robot to the order container on the first robot.

Embodiment JJ

The system of embodiment HH, wherein the second robot remains at the product side pick position as the first robot departs from the order side place position after transfer of product from the product container on the second robot to the order container on the first robot.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances.

We claim:

1. A system for transferring a tote between a mobile robot and first and second storage shelves on opposed sides of the mobile robot, the tote comprising a side wall configured to be oriented parallel to an axis of transfer of the tote between the mobile robot and the first and the second storage shelves, and two end walls configured to be oriented perpendicular to the axis of transfer, the side wall extending between the two end walls, the system comprising:
a traverser configured to reciprocate;
a first finger mounted on the traverser and configured to reciprocate with the traverser;
a second finger mounted on the traverser and configured to reciprocate with the traverser, the first finger being longer than the second finger;
wherein the first finger is configured to engage against a first surface formed on the side wall of the tote, between the two end walls, to pull the tote from the first storage shelf onto the mobile robot, and
wherein the first finger is configured to engage against the first surface formed on the side wall to pull the tote toward the second storage shelf, and
wherein the second finger is configured to engage against a second surface formed on the side wall to push the tote onto the second storage shelf.

2. The system of claim 1, wherein the first finger extends underneath and behind the first surface to engage against the first surface of the tote to pull the tote from the first storage shelf onto the mobile robot.

3. The system of claim 1, wherein the traverser comprises first and second spaced apart sprockets and a chain wrapped around the first and second sprockets.

4. The system of claim 1, wherein the first and second fingers are positioned on the traverser so as to be opposed to each other.

5. The system of claim 1, further comprising a drive motor mechanically coupled to the traverser, the drive motor configured to drive the traverser in first and second opposed directions.

6. The system of claim 1, wherein the first finger is configured to engage the first surface extending from the tote, wherein the first surface is within a pocket formed on the side wall.

7. The system of claim 6, wherein the second finger is configured to engage against the second surface, wherein the second surface is outside the pocket.

8. The system of claim 1, further comprising a third storage shelf on a same side of the mobile robot as the first storage shelf, wherein the first finger is configured to engage against a third surface of the tote to push the tote from the mobile robot toward the third storage shelf, and wherein the second finger is configured to engage against a fourth surface of the tote to push the tote onto the third storage shelf.

9. A system for transferring a tote between a mobile robot and first and second storage shelves on the same side of the mobile robot, the tote comprising a side wall configured to be oriented parallel to an axis of transfer of the tote between the mobile robot and the first and the second storage shelves, and two end walls configured to be oriented perpendicular to the axis of transfer, the side wall extending between the first and second end wall, the system comprising:
- a traverser configured to reciprocate;
- a first finger mounted on the traverser and configured to reciprocate with the traverser;
- a second finger mounted on the traverser and configured to reciprocate with the traverser, the first finger being longer than the second finger;
- wherein the first finger is configured to engage against a first surface formed on the side wall of the tote, between the two end walls, to pull the tote from the first storage shelf onto the mobile robot, and
- wherein the first finger is configured to engage against a second surface formed on the side wall to push the tote from the mobile robot toward the second storage shelf, and
- wherein the second finger is configured to engage against a third surface formed on the side wall to push the tote onto the second storage shelf.

10. The system of claim 9, wherein the first finger is configured to engage a first pin on the first surface extending from the tote.

11. The system of claim 10, wherein the second finger is configured to engage a second pin on the second surface, spaced from the first pin, and extending from the tote.

12. The system of claim 11, wherein the second finger is configured to engage the third surface by engaging a second surface of the first pin extending from the tote.

13. A system for transferring a tote between a mobile robot and at least one of first and second storage shelves on opposed sides of the mobile robot, the tote comprising first and second opposed side walls configured to be oriented parallel to an axis of transfer of the tote between the mobile robot and the first and the second storage shelves, and first and second end walls, the first and second side walls extending between the first and second end walls, the system comprising:
- a first transfer mechanism on a first side of the mobile robot, the first transfer mechanism comprising:
- a first traverser configured to reciprocate;
- a first finger mounted on the first traverser and configured to reciprocate with the first traverser;
- a second finger mounted on the first traverser and configured to reciprocate with the first traverser, the first finger being longer than the second finger;
- wherein the first finger is configured to engage against a first surface formed on the first side wall of the tote, between the first and second end walls, to pull the tote from the first storage shelf onto the mobile robot, and
- wherein the first finger is configured to engage against the first surface formed on the first side wall of the tote to pull the tote toward the second storage shelf, and
- wherein the second finger is configured to engage against a second surface formed on the first side wall of the tote to push the tote onto the second storage shelf; and
- a second transfer mechanism on a second side of the mobile robot, the second transfer mechanism comprising:
- a second traverser configured to reciprocate;
- a third finger mounted on the second traverser and configured to reciprocate with the second traverser;
- a fourth finger mounted on the second traverser and configured to reciprocate with the second traverser, the third finger being longer than the fourth finger;
- wherein the third finger is configured to engage against a third surface formed on the second side wall of the tote, between the first and second end walls, to pull the tote from the first storage shelf onto the mobile robot, and
- wherein the third finger is configured to engage against the third surface formed on the second side wall of the tote to pull the tote toward the second storage shelf, and
- wherein the fourth finger is configured to engage against a fourth surface formed on the second side wall of the tote to push the tote onto the second storage shelf.

14. The system of claim 13, wherein the first finger comprises a proximal end affixed to the traverser and a distal end comprising a pair of wheels configured to rotate.

15. The system of claim 13, wherein the second finger comprises a proximal end affixed to the traverser and a distal end comprising a wheel configured to rotate.

16. The system of claim 13, wherein the first finger is configured to engage the first surface by engaging a vertical surface within a pocket formed on the first side wall of the tote.

17. The system of claim 16, wherein the second finger is configured to engage the second surface by engaging a surface on the tote outside of the pocket.

18. The system of claim 16, further comprising a third storage shelf on a same side of the mobile robot as the first storage shelf, wherein the first finger is configured to engage against a fifth surface of the tote to push the tote from the mobile robot toward the third storage shelf, and wherein the second finger is configured to engage against a sixth surface of the tote to push the tote onto the third storage shelf.

19. The system of claim 18, wherein the fifth surface is located inside the pocket.

20. The system of claim 13, wherein the first finger extends underneath and behind the first surface to engage against the first surface of the tote to pull the tote from the first storage shelf onto the mobile robot.

21. The system of claim 13, wherein the traverser comprises first and second spaced apart sprockets and a chain wrapped around the first and second sprockets.

22. The system of claim 13, wherein the first and second fingers are positioned on the traverser so as to be opposed to each other.

23. A system for transferring a tote between a mobile robot and first and second storage shelves on opposed sides of the mobile robot, the tote comprising a side wall configured to be oriented parallel to an axis of transfer of the tote between the mobile robot and the first and the second storage shelves, and two end walls configured to be oriented perpendicular to the axis of transfer, the side wall extending between the two end walls, the system comprising:
- a traverser configured to reciprocate;
- a first finger mounted on the traverser and configured to reciprocate with the traverser, the first finger comprising a proximal end affixed to the traverser and a second end distal from the traverser;

a first roller having a first axis of rotation and mounted on the first finger, at the distal end of the first finger;

a second roller having a second axis of rotation spaced from the first axis of rotation and mounted on the first finger, at the distal end of the first finger;

a second finger mounted on the traverser and configured to reciprocate with the traverser, the first finger being longer than the second finger;

wherein the first roller of the first finger is configured to engage against a first surface formed on the side wall of the tote to pull the tote from the first storage shelf onto the mobile robot, and wherein the first roller of the first finger is configured to engage against the first surface formed on the side wall to pull the tote toward the second storage shelf, and wherein the second finger is configured to engage against a second surface formed on the side wall to push the tote onto the second storage shelf.

24. The system of claim 23, wherein the second roller of the first finger is configured to engage against a third surface formed on the side wall of the tote to push the tote from the mobile robot toward the first storage shelf.

25. The system of claim 24, wherein the third surface is concave.

26. The system of claim 23, wherein the traverser comprises first and second spaced apart sprockets and a chain wrapped around the first and second sprockets.

27. The system of claim 23, wherein the first and second fingers are positioned on the traverser so as to be opposed to each other.

28. The system of claim 23, further comprising a drive motor mechanically coupled to the traverser, the drive motor configured to drive the traverser in first and second opposed directions.

* * * * *

UNITED STATES PATENT AND TRADEMARK OFFICE
CERTIFICATE OF CORRECTION

| | | |
|---|---|---|
| PATENT NO. | : 11,203,486 B2 | |
| APPLICATION NO. | : 16/419910 | |
| DATED | : May 2, 2023 | |
| INVENTOR(S) | : Lert, Jr. et al. | |

It is certified that error appears in the above-identified patent and that said Letters Patent is hereby corrected as shown below:

On the Title Page

(72) please add Michael Chesna Saugas, MA (US)

Signed and Sealed this
Twelfth Day of December, 2023

Katherine Kelly Vidal
*Director of the United States Patent and Trademark Office*